US005734924A

United States Patent [19]

Cheng et al.

[11] Patent Number: 5,734,924

[45] Date of Patent: Mar. 31, 1998

[54] SYSTEM FOR HOST ACCESSING LOCAL MEMORY BY ASSERTING ADDRESS SIGNAL CORRESPONDING TO HOST ADAPTER AND DATA SIGNAL INDICATING ADDRESS OF LOCATION IN LOCAL MEMORY

[75] Inventors: Yu-Ping Cheng, San Jose; Ta-Lin Chang, Cupertino; Shih-Tsung Hwang, San Jose, all of Calif.

[73] Assignee: Advanced System Products, Inc., Santa Clara County, Calif.

[21] Appl. No.: 111,192

[22] Filed: Aug. 27, 1993

[51] Int. Cl.[6] .................... G06F 13/10

[52] U.S. Cl. .................... 395/824; 395/410

[58] Field of Search .................... 395/250, 275, 395/375, 650, 821, 425, 725

[56] References Cited

U.S. PATENT DOCUMENTS

| | | | |
|---|---|---|---|
| 4,268,906 | 5/1981 | Bourke et al. | 364/200 |
| 4,371,932 | 2/1983 | Dinwiddie, Jr. et al. | 364/200 |
| 4,901,232 | 2/1990 | Harrington et al. | 364/200 |
| 4,939,644 | 7/1990 | Harrington et al. | 364/200 |
| 4,975,829 | 12/1990 | Clarey et al. | 395/500 |
| 5,008,808 | 4/1991 | Fries et al. | 395/275 |
| 5,014,094 | 5/1991 | Itoh | 364/200 |
| 5,031,091 | 7/1991 | Wakatsuki et al. | 395/275 |
| 5,131,081 | 7/1992 | MacKenna et al. | 395/275 |
| 5,155,857 | 10/1992 | Kunisaki et al. | 395/800 |
| 5,222,221 | 6/1993 | Hori et al. | 395/375 |
| 5,421,014 | 5/1995 | Bucher | 395/650 |
| 5,448,702 | 9/1995 | Garcia, Jr. et al. | 395/325 |

OTHER PUBLICATIONS

*Texas Instruments SN75C091A SCSI Bus Controller Data Manual,* Texas Instruments, Inc., 1990.

*Primary Examiner*—Thomas C. Lee
*Assistant Examiner*—Anderson I. Chen
*Attorney, Agent, or Firm*—Skjerven, Morrill, MacPherson, Franklin & Friel; David T. Millers

[57] ABSTRACT

A host adapter contains a RISC processor, a local memory, and a memory management unit that permits the RISC processor and a host computer system to access a local memory. The host computer system writes command descriptions directly into the local RAM. The RISC processor retrieves and processes the command descriptions. The local RAM may be divided into numbered command description blocks having a fixed size and format. In standard bus protocols, such as SCSI-2, block numbers are used as tag messages. Such tag messages allow the host adapter to quickly identify information used when an SCSI I/O request is resumed. The command description blocks may be linked into lists, including an active list containing command description blocks that are ready for the RISC processor and a free list containing command description blocks that are available for use by the host computer.

24 Claims, 73 Drawing Sheets

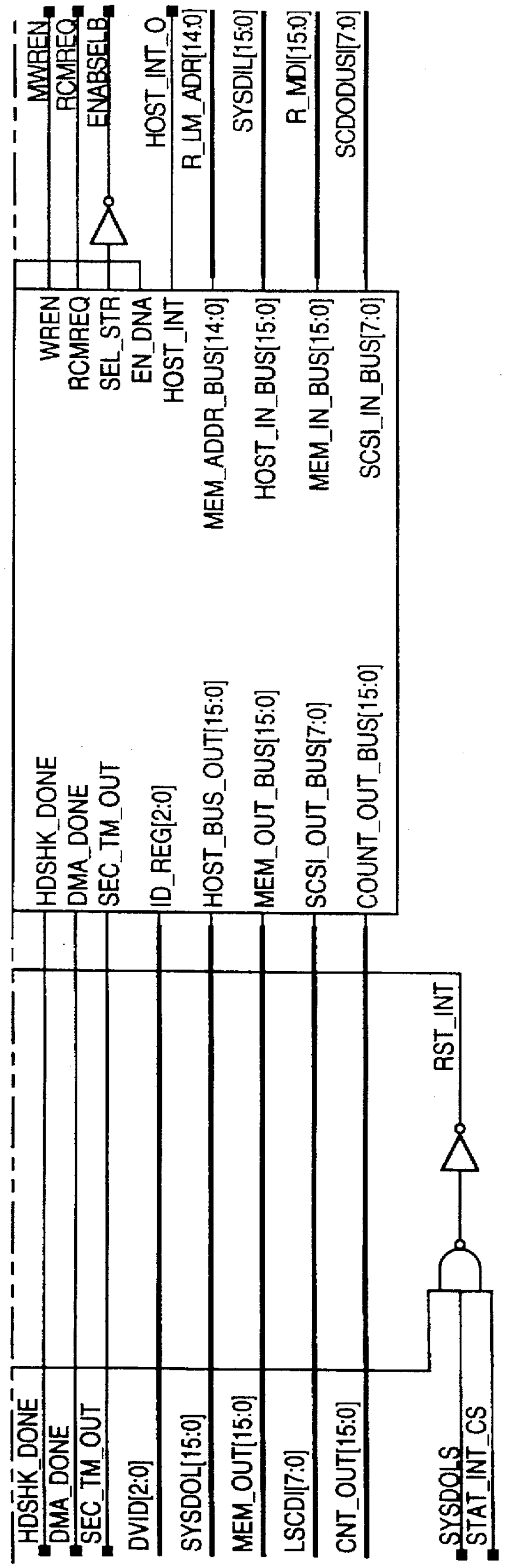
FIG. 14C
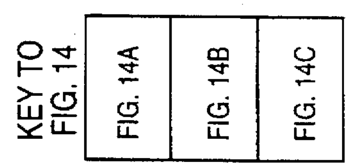

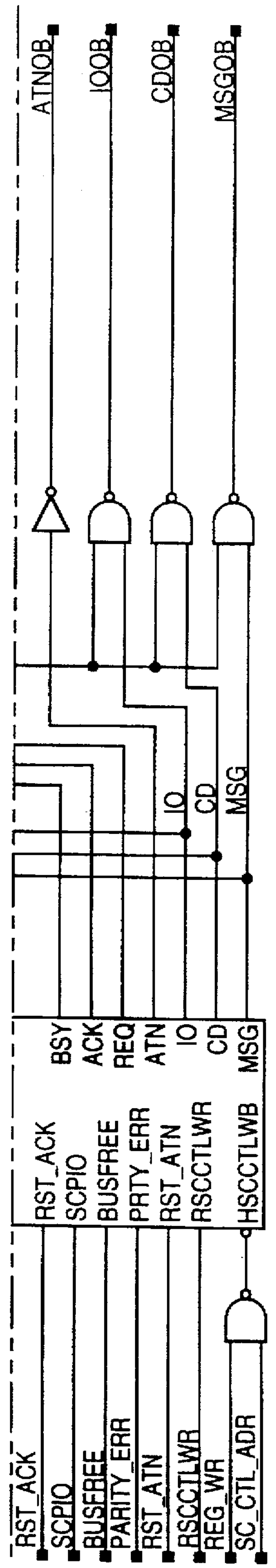
FIG. 17E
KEY TO FIG. 17
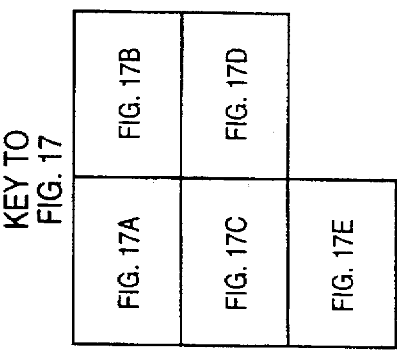

KEY TO FIG. 18

| | |
|---|---|
| FIG. 18A | FIG. 18B |
| FIG. 18C | FIG. 18D |

KEY TO FIG. 21

| | |
|---|---|
| FIG. 21A | FIG. 21B |
| FIG. 21C | FIG. 21D |

KEY TO FIG. 22

| | |
|---|---|
| FIG. 22A | FIG. 22B |
| FIG. 22C | FIG. 22D |
| FIG. 22E | FIG. 22F |

SYSTEM FOR HOST ACCESSING LOCAL MEMORY BY ASSERTING ADDRESS SIGNAL CORRESPONDING TO HOST ADAPTER AND DATA SIGNAL INDICATING ADDRESS OF LOCATION IN LOCAL MEMORY

CROSS-REFERENCES TO RELATED APPLICATIONS

This application is related to, and incorporates by reference, U.S. patent application entitled "SCSI BUS CONTROLLER WITH STORAGE FOR PERIPHERAL DEVICE CONFIGURATION DATA", and U.S. patent application entitled "METHOD AND CIRCUIT FOR RESOLVING I/O PORT ADDRESS CONFLICTS", both filed on the same date as the present application.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to communications between a host computer and attached devices, and in particular relates to an host adapter which employs an embedded RISC (Reduced Instruction Set Computing) processor and a partitioned local memory to provide an interface between a computer coupled to a first bus, such as a VESA bus, and peripheral devices coupled to a second bus, such as an SCSI (Small Computer System Interface) bus or a ISA bus.

2. Description of Related Art

Standard buses, such as ISA, EISA, VESA, PCI, and SCSI buses, are commonly used to create interfaces between the mother board of a computer and add-on devices. Often adapters are required between a first type of bus and a second type of bus. FIG. 1 shows a system with mother board 110 of a host computer 100 that communicates with devices 121–123 through local bus 120. Each device 121–123 occupies a portion of the address space of host computer 100 and is identified by a base I/O port address.

The mother board 110 contains an adapter 115 (or interface circuitry) for operating local bus 120. Adapter 115 implements the protocols of bus 120 and generates signals which direct communications to the correct target device 121–123.

Device 123 is an adapter between local bus 120 and SCSI bus 130. Peripherals 131–133 on SCSI bus 130 are daisy chained together and are identified by device IDs within the range from 0 to 7 or 15 if an SCSI-2 bus is used. SCSI controller 150 issues SCSI I/O requests to the attached devices 131–133 according to device ID.

Typically, host computer 100 communicates with devices 121–123 and 131–133 by sending commands and I/O requests, such as a requests for a block of data from a hard disk, through the appropriate adapters 115 and/or 150. Most adapters require supervision by the mother board 110, although some functions can be completed by adapter 115 or 150 without supervision. It is desirable to provide adapters 115 and 150 that need minimal supervision, so that host computer 100 can perform other operations while adapters 115 and 150 process I/O requests.

SCSI controllers illustrate prior art host adapters. With one prior art SCSI controller, mother board 110 of host computer 100 sends an I/O request to SCSI controller 150 by writing to a set of registers in controller 150. SCSI controller 150 may have several sets of registers. Each set of registers typically contains the number of bytes that can be addressed by the mother board 110. For example, if local bus 120 is a VESA bus, each device (or card) 121–123 attached to bus 120 occupies 16 bytes of the host computer's address space, and SCSI controller 150 would have one or more 16-byte register sets. The number of simultaneous I/O requests that an SCSI controller can handle is typically limited by the number of register sets.

A problem with using registers to hold the I/O requests is that the expense of registers permits only a few register sets per a controller. In the register implementation, if a host computer has tens or hundreds of simultaneous I/O requests, the mother board must wait until a preceding SCSI I/O request is completed before sending a new I/O request. Further, a single register set may be too small to contain a description of a complicated I/O request. For complicated I/O requests, typically, further information must be requested from the host computer, which interrupts host computer operations and slows operations of the host computer, the adapter, and any devices attached to the host computer.

In another prior art SCSI system, mother board 110 writes a description of an I/O request into main memory then provides a pointer to the description. SCSI adapter 123 uses the pointer to access the command description when local bus 120 is available. Typically, SCSI adapter 123 copies the description from main memory on mother board 110 into registers in SCSI controller 150. Using main memory permits the mother board to write as many command descriptions as are need (limited by the size of the main memory). However, copying creates traffic on local bus 120 and slows execution of the I/O requested because when SCSI bus 130 is available bus 120 may not be.

Adapter 115 that couples mother board 110 to an ISA, EISA, PCI, or other standard local bus 120 experiences similar problems. In particular, adapter 115 often monitors and controls several simultaneous commands and I/O requests. If host computer 100 has another I/O request while adapter 115 is busy or has reached its capacity, host computer 100 must wait.

Host adapters are needed which economically handle hundreds of simultaneous commands and I/O requests, which minimize host supervision, and which minimize copying of data.

SUMMARY OF THE INVENTION

In accordance with the present invention, circuits and methods are provided for multi-threaded communications between a host computer system and devices on a bus. According to one embodiment of the invention, a host adapter contains a dedicated processor and a memory management unit that permits the processor and the host computer system to directly access a local memory. The host computer system writes command descriptions into the local memory of the processor where the command descriptions are retrieved and processed by the processor. RAM inexpensively provides storage for hundreds of command descriptions so that the host computer will rarely be delayed by limited capacity in the adapter. Further, the command description can be sufficiently complete that the processor can transmit the command to a target device and process the command with minimal host intervention.

Typically, the local memory is divided into command description blocks having a predefined size and format so that the starting local addresses of the command description blocks are multiples of a fixed quantity. The command description blocks can be numbered, and the numbers, instead of longer local addresses, can be used to identify the command description blocks. In standard bus protocols, for example SCSI-2, the block numbers can be used as tag messages. Such tag messages allow the host adapter to quickly identify the block needed when an SCSI I/O request is resumed.

The command description blocks can be linked into lists, such as an active list containing command description blocks that are ready for the processor to process and a free list containing command description blocks that are available for use by the host computer. The processor can monitor the free list for command description blocks written by the host computer then move the written blocks to the active list. Completed command description blocks can be moved from the active list to the end of the free list and can be used to pass to the host computer information concerning the completed command. The free and active list permits commands to be processed and completed in random order to increase flexibility and performance.

BRIEF DESCRIPTION OF THE DRAWINGS

Similar or identical items in different Figures have the same reference numerals or characters.

DETAILED DESCRIPTION OF THE PREFERRED EMBODIMENTS

Embodiments of the present invention provide multi-threaded control of devices such as peripheral devices attached to an SCSI bus or IDE cards attached to an AT bus.

Figure 2A:
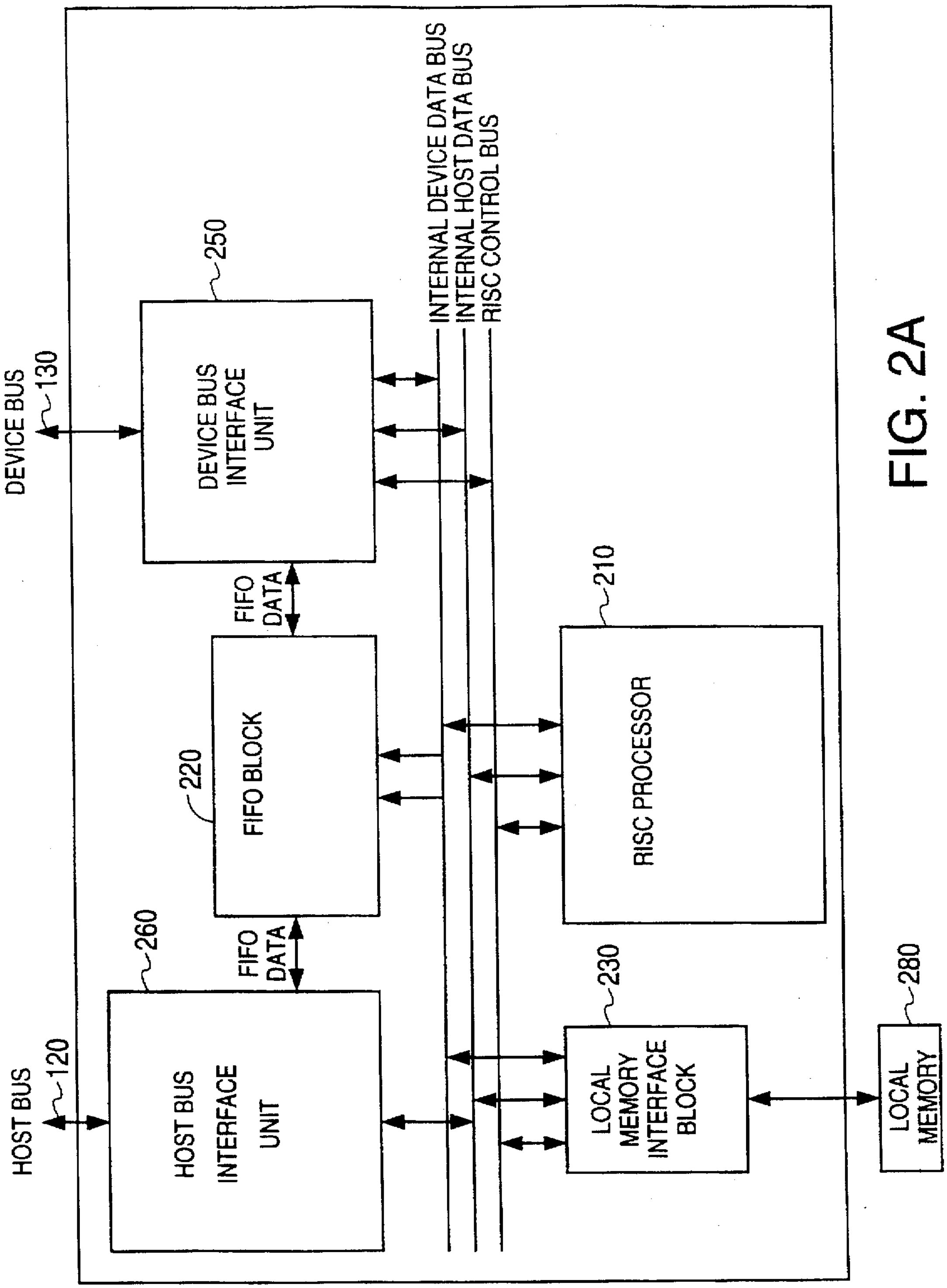
FIG. 2A shows an host adapter according to an embodiment of the present invention which uses a processor and a partitioned local memory to provide a multi-threaded interface age between a host bus and a device bus.

FIG. 2A shows an adapter according to an embodiment of the present invention. The adapter is typically employed on the mother board of a host computer or on a card which plugs into a slot coupled to host bus 120. The adapter creates an interface between host bus 120 and device bus 130. Typically, the host bus is a VESA, ISA, EISA, or PCI bus so that the adapter is in the address space of the host computer. Device bus 130 is for coupling to several devices, such as IDE cards or peripheral devices. Device bus 130 can be but is not limited to an ISA, EISA, or SCSI bus.

In one specific embodiment, host bus 120 is a VESA bus and device bus 130 is an ISA bus. VESA bus 120 provides a fast data transfer rate between the host computer and the adapter. ISA bus 130 provides a slower data transfer rate to one or more plug-in cards (IDE devices). In another specific embodiment disclosed in greater detail below, host bus 120 is a VESA bus and device bus 130 is an SCSI bus.

The adapter shown in FIG. 2A includes a host bus interface 260 and a device bus interface 250. Interfaces 250 and 260 create and receive signals for implementing the necessary protocols on busses 130 and 120 respectively. Many types of such interface circuits are known in the art. A FIFO block 220 is provided to buffer data transfers such direct data transfer between host bus 120 and device bus 130. FIFO block 220 may be omitted in some embodiments.

A processor 210 controls the bus interfaces 250 and 260 according to a program stored in local memory 280. Processor 210 is shown as a RISC processor but any appropriate processor as controller may be employed. The instruction set and the circuitry of processor 210 can be tailored for the functions provided and in particular, can be tailored for control of busses 120 and 130.

A local memory interface 230 permits a host computer, through host bus 120 and host bus interface 260, to directly access local memory. The host computer writes command descriptions into local memory 280. Processor 210 retrieves and processes the command descriptions. Local memory 280 is typical RAM that provides space for hundreds of command descriptions.

This embodiment of the invention provides several advantages when compared to adapters that employ registers or adapters that read command descriptions from main memory. Because local RAM is relatively inexpensively, space for hundreds of command description can be provided, and the command descriptions can be as long as necessary. The host computer writes the description directly into memory 280 and does not need to wait when registers are filled with unprocessed commands. Multiple commands for each device can be queued for execution. There is no need for the host computer to poll the adapter to check whether a new command can be written and no delay before the host computer recognizes that another command can be written. The commands can be sent by the adapter as soon as device bus 130 and the target device are free. There is no delay waiting for host bus 120 to become free so that the adapter can request needed information. Because memory 280 is local, processor 210 does not create traffic on host bus 120 to access and execute the command descriptions. The adapter can use local memory 280 to save information when a command is disconnected and retrieve information when a command is resumed, so that the adapter can efficiently monitor and control simultaneous commands without host intervention.

Figure 1:
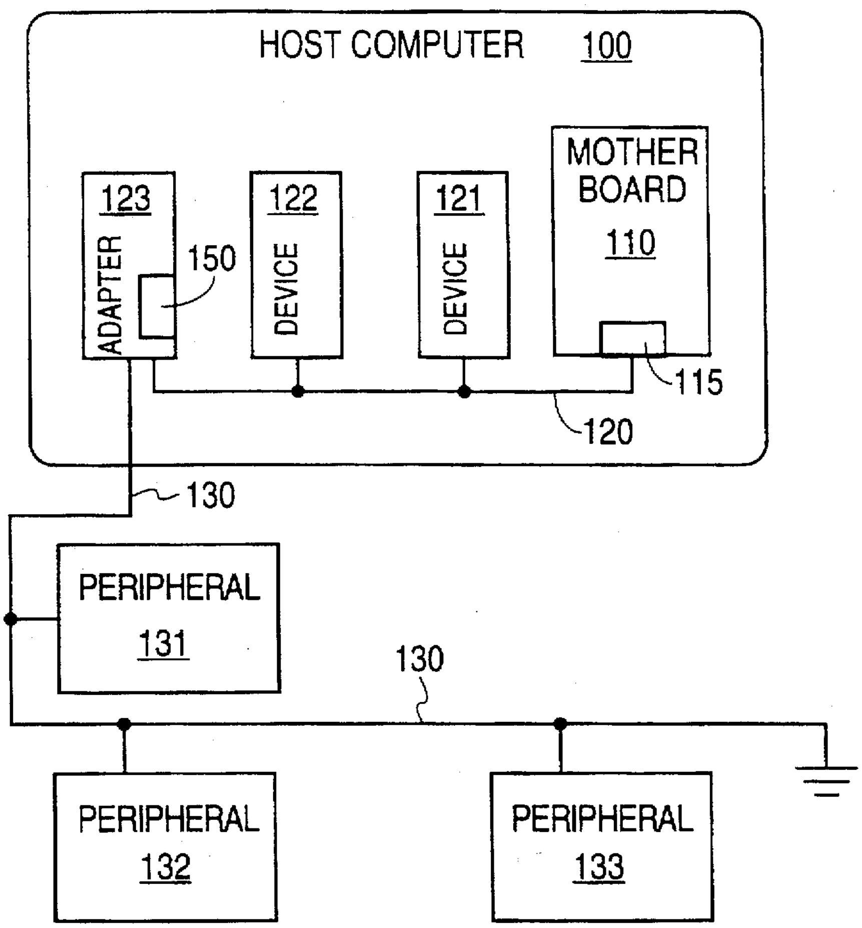
FIG. 1 shows a system in which a host computer communicates with peripherals attached to an SCSI bus.

The ability to handle multiple commands is important for SCSI host adapters. As shown in FIG. 1, peripherals 131–133 on SCSI bus 130 are daisy chained together and identified by device IDs within the range from 0 to 7 or 15 if an SCSI-2 bus is used. SCSI controller 150 identifies SCSI I/O requests to the attached devices 131–133 by device ID. ANSI X3.131-1986, which is incorporated herein by reference in its entirety, defines the original SCSI protocol, referred to herein as SCSI-1. SCSI-1 permits a single active I/O request per device for a total of seven active I/O requests from the host computer. In addition, the host computer may have several I/O requests that must wait until a prior I/O requests is completed.

A newer version of the SCSI protocol, referred to herein as SCSI-2, is defined by ANSI X3.131-1993, which is also incorporated by reference in its entirety. SCSI-2 permits multiple active I/O requests for each device. SCSI-2 I/O requests are identified by device ID and an 8-bit tag message. Accordingly, the host computer can issue up to 15×256=3840 simultaneous I/O requests all of which have been started on an SCSI bus. Multiple I/O requests provide SCSI-2 with greater versatility and faster response times than SCSI-1.

Figure 2B:
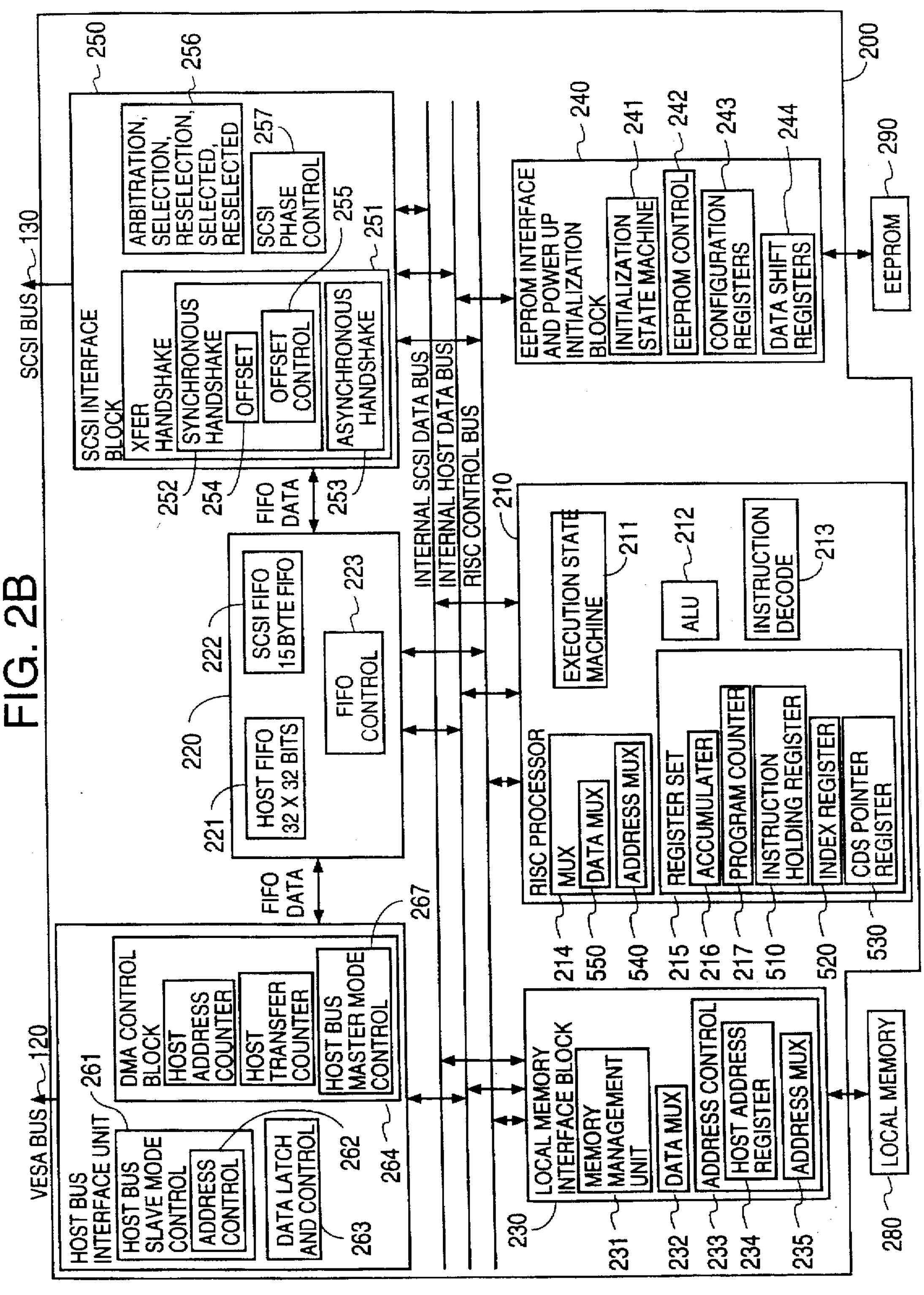
FIG. 2B shows an SCSI host adapter according to an embodiment of the present invention.

FIG. 2B shows a block diagram of an SCSI host adapter according to an embodiment of the present invention. The host adapter includes three separate ICs, an SCSI controller 200, local memory 280, and an EEPROM 290. In other embodiments, all the circuitry can be combined on a single IC (integrated circuit) or divided into several separate ICs.

SCSI controller 200 can be part of an adapter card, such as adapter card 123 in FIG. 1, which connects to a local bus 120 and an SCIS bus 130 or may be provided directly on the mother board of a host computer where the SCSI controller 200 communicates with a CPU through a local bus on the mother board. Local memory 280 and EEPROM 290 are local to SCSI controller 200 meaning that SCSI controller 200 can access memory 280 and EEPROM 290 directly using local addresses without using a shared local bus 120 of a host computer. Local storage provides faster access without using the resources of bus 120 or the host computer.

SCSI controller 200 contains a host bus interface 260 which receives and transmits signals on local bus 120. Local bus 120 is a VESA bus but other types of bus, for example an ISA, EISA, or PCI bus, may be used. Typically, host bus interface 260 contains a slave mode control circuit 261 to communicate with a host computer that acts as bus master. Slave mode control circuit 261 includes address decode circuit 262 which interprets an I/O port address provided on bus 120 to determine if data from the host computer is directed to controller 200. Data latch and control circuit 263 is used to latch data that is directed to controller 200. DMA control circuit 264 is provided so that host bus interface 260 can perform as bus master of local bus 120 during a DMA transfer to the host computer. DMA control circuit 264 includes a host address counter 265 to contain the address in main memory, a host transfer counter 266 for holding a count of the number of bytes transferred, and host bus master mode control circuit 267 to implement the protocol necessary to act as master of bus 120. The specific structure of host bus interface 260 depends on the kind of local bus 120 and protocols implemented.

FIFO block 220 provides host FIFO 221, SCSI FIFO 222, and FIFO control circuit 223 which buffer data transfers. FIFO block 220 is typically used to compensate for lack of synchronization of buses 120 and 130 and difference in data handling rates of host bus interface 260 and SCSI interface 250. Such FIFO blocks are often used for DMA operations and are well known in the art.

EEPROM interface 240 provides an interface to non-volatile memory, EEPROM 290. EEPROM interface 240 includes an initialization state machine 241 which provides initialization functions, an EEPROM control circuit 242 which provides control signals for reading from and writing to EEPROM 290, and a configuration register 243 and a data shift register 244 used in an I/O port address selection circuit such as the address selection circuits described in U.S. patent application entitled "METHOD AND CIRCUIT FOR RESOLVING I/O PORT ADDRESS CONFLICTS". During initialization, EEPROM interface 240 provides configuration data such as an I/O port base address that host bus interface 260 compares to addresses provided on bus 120.

SCSI interface 250 creates and receives signals on SCSI bus 130 and implements handshaking signals defined by SCSI protocols. SCSI interface 250 includes a transfer handshake circuit 251 which includes synchronous handshake circuit 252 and asynchronous handshake circuit 253 that generates signals and timing for synchronous and asynchronous data transfers. Included in synchronous handshake circuit 252 are a local storage circuit 254 for containing offset and rate data for the SCSI devices and a offset control circuit 255 for keeping a count of unacknowledged bytes sent to an SCSI device. Control circuits 256 and 257 control the SCSI phase for arbitration, selection, and reselection according to the SCSI protocol.

Processor 210 and the host computer access local memory 280 through local memory interface 230. Local memory interface 230 includes a memory management unit 231 for providing control signals for local memory 280 and a data multiplexer 232 and address control 233 for selecting whether processor 210 or the host computer has access to memory 280.

Memory 280 is typically RAM and partitioned to provide space for code and variables and space for command description blocks (CDBs) which describe SCSI I/O requests. Partitioning can be implemented in software by defining addresses which divide memory 280 into sections or implemented in hardware using separate RAM ICs for different memory areas in local memory 280.

Typically, a device driver program executed by the host computer implements the conventions necessary for communication between the host computer and controller 200. During start-up, the device driver program loads program code for processor 210 into local memory 280. During operation, the device driver program writes I/O request descriptions for SCSI controller 200 into a command description block in local memory 280. Data is written to SCSI controller 200 and local memory 280 through VESA bus 120 using I/O port addresses which correspond to SCSI controller 200. For a VESA bus, controller 200 occupies sixteen I/O port addresses. To write to local memory 280, the host computer writes a local address and data to one or more of the I/O port addresses.

The local address indicates a location in local memory 280 and is written into a host address register 234 inside local memory interface 230. Data from the host computer goes directly into local memory 280 at the local address indicated by host address register 234. For writing blocks of data, host address register 234 can be automatically incremented (or decremented) by local memory interface 230 after (or before) every write to local memory 280 so that a single local address is sufficient for writing a string of data to local memory 280.

The host computer reads from local memory 280 by writing a local address to the I/O port address that corresponds to host address register 234 then reading from an I/O port address that corresponds to local memory 280. To make reading of data blocks faster, local memory interface 230 automatically increments (or decrements) host address register 234 after (or before) every read from local memory 280.

Appendix I describes an assignment of I/O port addresses in one embodiment of the present invention. As shown in appendix I, a word size register can be at an even address and a byte size register at an odd address even though the addresses of the registers seem to overlap. Words at base I/O port address plus eight and base I/O port address plus ten are data and local address used to read or write to local memory 280. In the local address word, fourteen bits are the local address. The high bits may be used for other purposes such as to indicate whether data is written to or read from local memory 280.

Figure 3:
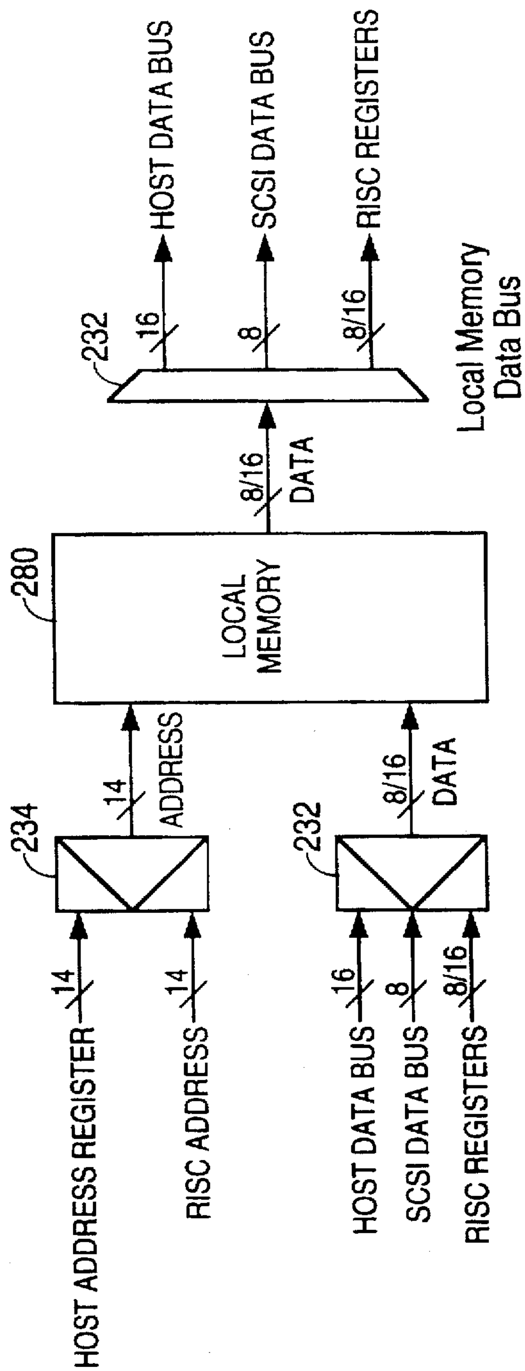
FIG. 3 shows a block diagram of a portion of a local memory control circuit for an SCSI host adapter according to an embodiment of the present invention.

Processor 210 also writes to and reads from local memory 280. FIG. 3 illustrates how local memory interface 230 controls access to local memory 280. Address multiplexer 235 selects between two address sources, the host address register 234 or processor 210. Select signals for multiplexer 235 are provided by memory management unit 231 on the basis of a priority system. In one embodiment, the host computer is always given highest priority so that when the host computer and processor 210 simultaneously attempt to access memory 280, memory management unit 231 provides select signals granting access to the host computer.

Data input multiplexer 232 selects the input data bus from which data is written to local memory 280. When the host computer supplies the address, VESA bus 120 supplies the data. When processor 210 supplies the local address, data can come from registers in processor 210 or from the SCSI bus 130 via SCSI interface 250. Accordingly, data from the SCSI bus 130 can be saved into local memory 280 without first loading the data into a register in processor 210.

Output data from local memory 280 is also controlled by the supplier of the local address. When host address register 234 supplies the local address, data is provided to the host computer on VESA bus 120. When processor 210 supplies the address, data is routed either to a register in processor 210 or to SCSI data bus 130.

Figure 4:
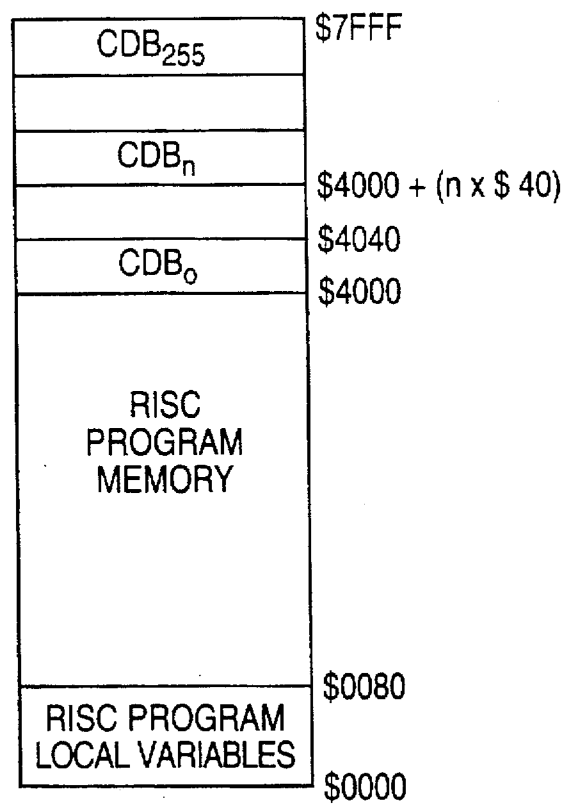
FIG. 4 shows a memory map of local memory of an SCSI controller according to an embodiment of the present invention.

FIG. 4 shows a partitioning of local memory according to one embodiment of the present invention. In FIG. 4, the high addresses, \$4000–\$7FFF, of local memory are dedicated to two hundred and fifty six 64-byte command description blocks $CDB_0$–$CDB_{255}$. Each command description block $CDB_n$ has a block number n, where $0 \leqq n \leqq 255$, and a starting local address \$4000+(n×\$40). More generally, any starting address and any size command description block can used in other embodiments. Low addresses, \$0000–\$3FFF, contain local variables and a program used by processor 210. If two separate RAMs are provided, one for CDB memory and another for program memory, 14 bit addresses and enable signals for each RAM are sufficient to access local memory 280.

The host computer writes I/O request descriptions into command description blocks $CDB_n$. 64-byte command description blocks provide enough memory to store information necessary to describe most SCSI I/O requests. For complicated scatter or gather operations, two or more CDBs can be linked together to describe a single I/O request. Larger or smaller CDB could be employed, but when the size of the CDB is a power of two, the block number n can provide a portion of the starting address of a CDB. CDB starting address are easily calculated by arithmetically shifting the block number n to the left and adding a constant if necessary.

Processor 210 is dedicated to operations of the controller 200 and may be custom designed with a reduced instruction set tailored for SCSI operations and manipulating CDBs. Processor 210 includes an execution state machine 211, an arithmetic logic unit 212, an instruction decode circuit 213, multiplexers 214, and a register set 215.

Figure 5:
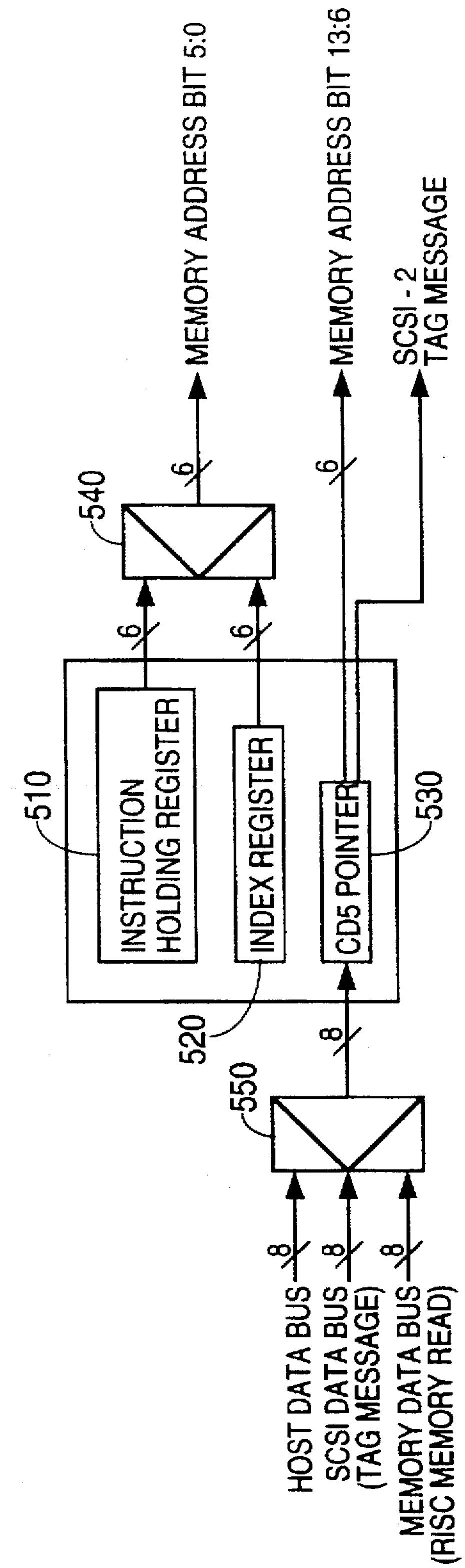
FIG. 5 shows a block diagram of registers used by a processor to provide a local address pointing to a location in a command description block.

FIG. 5 shows three registers from register set 215, instruction register 510, index register 520, and CDB pointer register 530, used by processor 210 to determine an address in a CDB. CDB pointer register 530 holds a block number n which indicates a CDB and provides bits six through thirteen of a 14-bit local address. CDB pointer register 530 can be written to from SCSI interface 250, from local memory 280, or by the host computer.

When SCSI controller 200 operates SCSI-2 peripherals on SCSI bus 130, multiple I/O commands may be sent to a single SCSI-2 peripheral device. A device ID and an 8-bit tag message passed between controller 200 and the SCSI-2 device identify each command. A block number which identifies a command description block can be used as the tag message. This provides quick identification of the correct CDB when an I/O command is resumed. The tag message can be directly loaded into CDB pointer register 530 from SCSI bus 130 when an I/O request is resumed.

Least significant bits zero through five of a local address are an offset within a CDB and are provided either by index register 520 or instruction register 510. Multiplexer 540 selects which of the registers 510 or 520 provides the least significant bits. The selection depends on the instruction in instruction register 510. For some instructions, the offset is incorporated in the instructions, and instruction register 510 provides bits zero to five. For other instructions, index register 520 provides the least significant bits of the address in a CDB. The offset in index register 520 can be increment or decremented before or after a read or write to a command description block. Appendix II provides a description of the instruction set used in one embodiment of the present invention.

Each CDB contains fields for information which describes an I/O request and fields used by processor 210 while an I/O request is active. Some of the fields in each CDB may contain include:

1) Forward and backward pointers that link the CDBs into linked lists;

2) An SCSI device ID indicating a target SCSI peripheral device to which the request is directed;

3) SCSI command and length bytes indicating the operation and the number of bytes in a requested I/O;

4) A main memory address and length which indicate where data transfer is directed;

5) A pointer to an additional CDB for a scatter-gather address list used when data transfer is directed at several locations in main memory;

6) A main memory address for sense data if check status is returned;

7) Completion status bytes for indicating how much of the requested I/O is complete;

8) A status byte for indicating the status, EMPTY, READY, SG_LIST, ACTIVE, DISCONNECT, or DONE, of the CDB; and 9) A storage area used during a disconnect for data needed when an I/O request is resumed.

Processor 210 and the host computer keep track of which CDBs contain descriptions of I/O requests and which CDBs are available for new command descriptions. A specific method of monitoring CDBs is described below. Many other systems are possible and within the scope of the present invention.

CDBs may be organized into a free list of CDBs available for new command descriptions and an active list of CDBs containing descriptions being processed by processor 210. Initially, all of the CDBs in local memory 280 are in the free list and have a status byte set to EMPTY, a forward pointer which points to the next CDB in order of CDB number, and a backward pointer which points to the previous CDB. $CDB_{255}$ points forward to $CDB_{255}$ and $CDB_0$ points backward to $CDB_0$ indicating the ends of the lists. Driver software in the host computer initializes a variable first_empty_CDB to zero indicating the first CDB to which the host computer can write and a variable last_empty_CDB to 255.

When the host computer has an I/O request to send on an SCSI bus, the device driver writes to the command description block indicated by variable first_empty_CDB, changes the status byte of the CDB to READY, then changes variable first_empty_CDB to the next CDB in the free list. Processor 210 periodically checks the free list for CDBs with status READY and moves the ready CDBs to the active list. The active list can be for example a circular linked list. After an I/O request described by a CDB in the active list is completed, the CDB can be removed from the active list and inserted at the end of the free list. An interrupt to the host computer is generated so that the host computer checks the CDB at the end of the free list and reads status information of the completed I/O request. The host computer then changes the status byte of the CDB to empty and changes variable last_empty_CDB.

Figure 6:
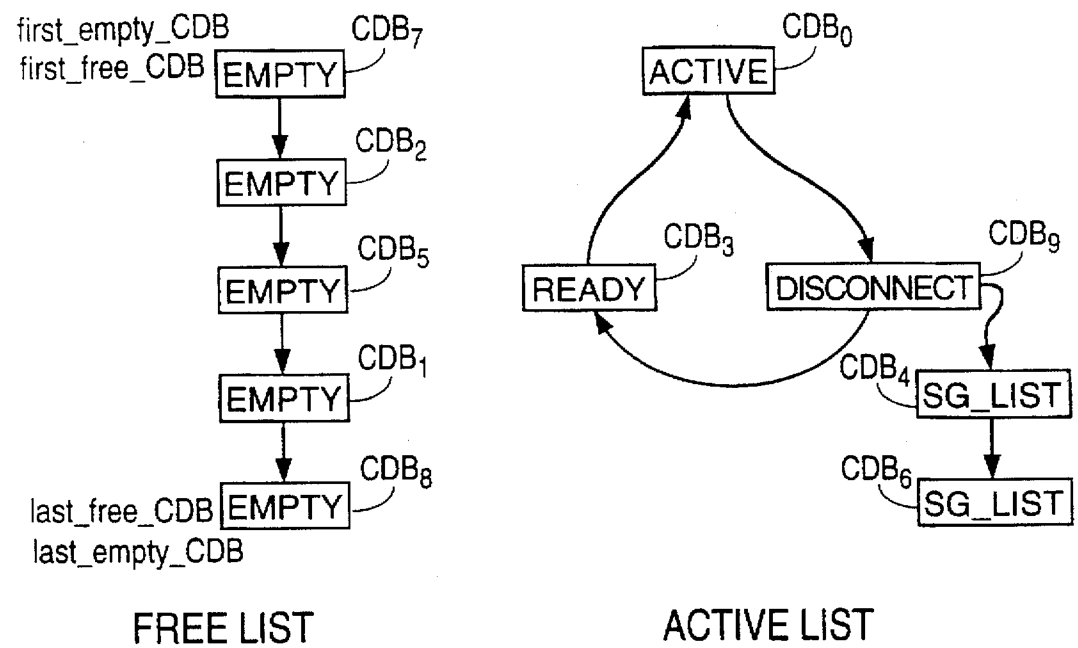
FIG. 6 shows an example free list and active list used during operation of a controller according to an embodiment of the present invention.

After controller 200 handles several I/O requests, the order of the CDBs can be mixed so that forward and backward pointers need not point to an adjacent CDBs. FIG. 6 shows an example of a free list and an active list containing ten command description blocks $CDB_0$–$CDB_9$. The CDBs have addresses in memory ordered according to the block number 0–9. The status of each CDB ($CDB_0$–$CDB_9$) is indicated as READY, EMPTY, DONE, ACTIVE, or $SG_0$LIST. The logical order of the CDBs in the free list and active list is indicated by arrows in FIG. 6 which point from one CDB to the next CDB in the respective lists. For example, in FIG. 6, $CDB_1$ is one forward of $CDB_5$ in the free list, even though the CDBs are widely separated in address.

Processor 210 uses local variables first_free_CDB and last_free_CDB which have initial values 0 and 255 respectively to track of the ends of the free list. The first_free_CDB and last_free_CDB variables are closely related to but not always equal to the first_empty_CDB and last_empty_CDB variables kept by a device driver in main memory. The active list contains CDBs being processed by processor 210. At most one CDB in the active list can have status ACTIVE. Status ACTIVE indicates the command described in the CDB is currently using SCSI bus 130. All other CDBs in the active list are READY indicating an I/O request identified by processor 210 but not yet initiated on SCSI bus 130, DISCONNECT indicating an I/O request was initiated but the target device disconnected before completing the I/O request, or SG_LIST indicating a CDB containing information to be used during scatter-gather functions of an ACTIVE, READY, or DISCONNECT CDB. As shown in FIG. 6, SG_LIST command description blocks $CDB_4$ and $CDB_6$ are not part of the circular structure of the active list, but rather are pointed to by a scatter-gather pointer in $CDB_9$.

The free list contains CDBs that processor 210 has not yet identified as requiring any action. These include EMPTY CDBs that contain no command description, READY and SG LIST CDBs written by the host computer but not yet identified by processor 210, and DONE CDBs that processor 210 placed at the end of the free list after completion of a requested I/O.

Figure 7A:
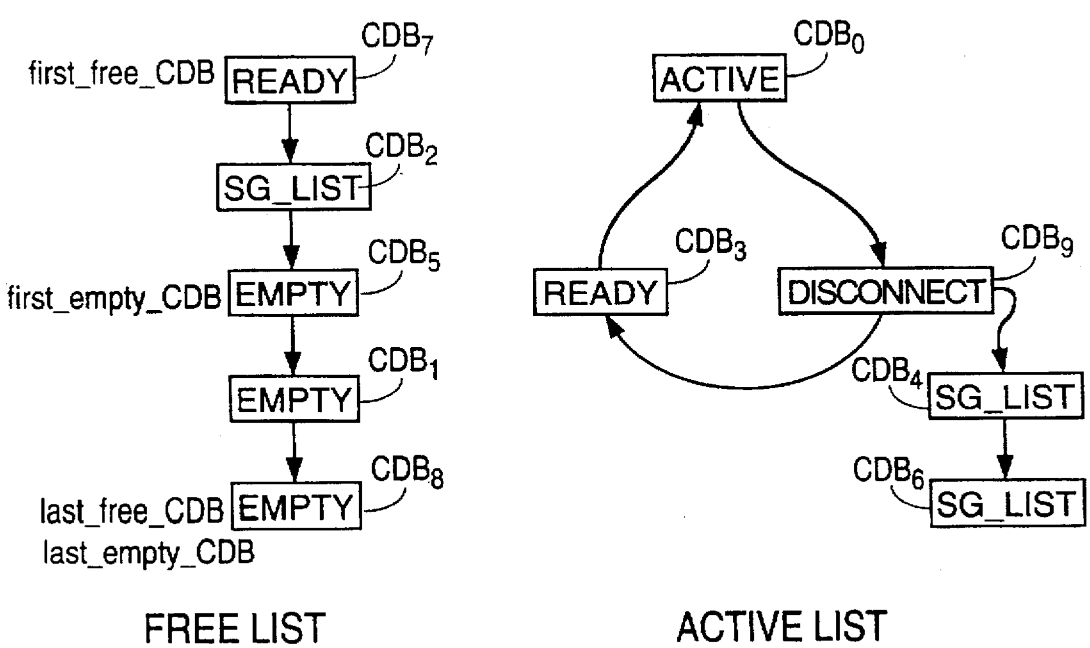
FIGS. 7A, 7B, and 7C show changes in the free list and active list as I/O requests are added and processed.
Figure 7B:
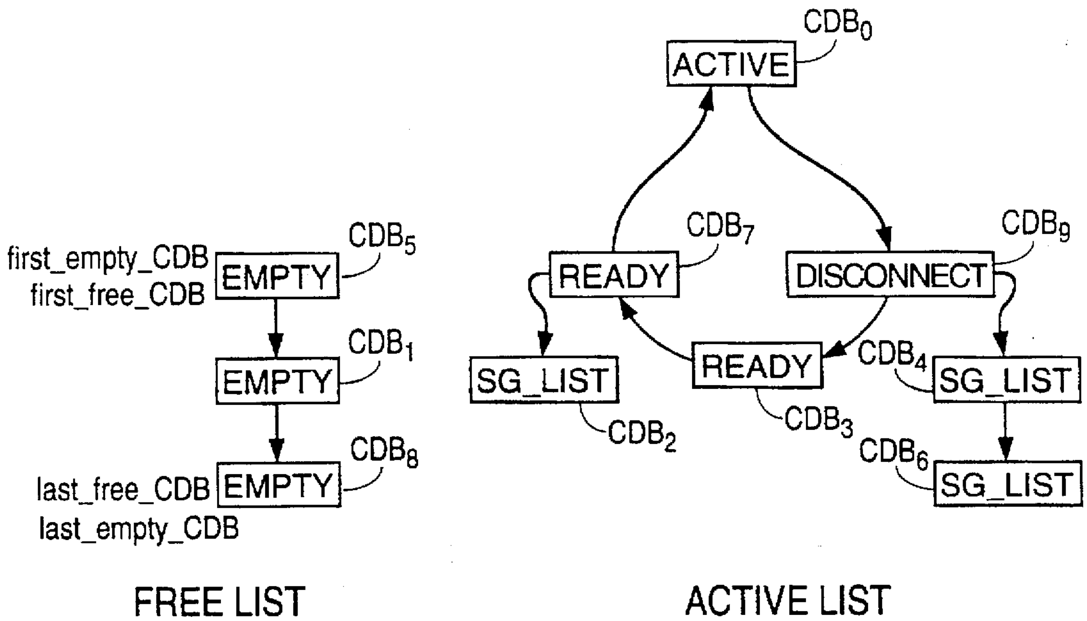
Figure 7C:
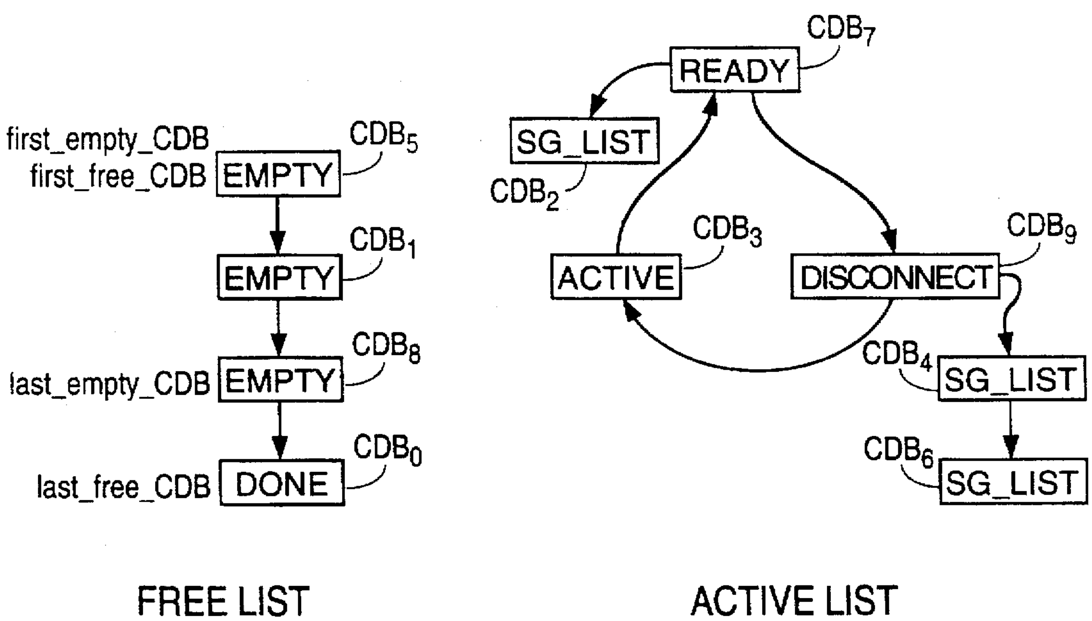

FIGS. 7A, 7B, and 7C provide examples of how the free list and active list shown in FIG. 6 change as I/O requests are processed. When the host computer has a new I/O request, the device driver writes an I/O request description to the command description block pointed to by variable first_empty_CDB, $CDB_7$ in FIG. 6. If the I/O request has long list of addresses and transfer amounts for a scatter-gather operation, the host computer writes a scatter-gather list in the following command description block, $CDB_2$, and sets a scatter gather pointer in $CDB_7$ to point to $CDB_2$. As many additional CDBs as necessary may be used for a scatter gather list. Once the I/O request description is finished, the host computer changes the status byte of the $CDB_7$ to READY, changes the status byte of the $CDB_2$ to SG_LIST, and changes variable first_empty_CDB to point to a CDB one forward, $CDB_5$ as shown in FIG. 7A.

The host computer may write further I/O requests, for example in $CDB_5$ and $CDB_1$, until variable first_empty_CDB equals variable last_empty_CDB. Since 256 CDBs are provided in the embodiment of FIG. 2B, this should rarely happen, but more that 256 CDBs can be provided if necessary to avoid delays while a host computers waits for an empty CDB.

Processor 210 monitors the status bytes of CDBs in the free list starting with the CDB indicated by variable first_free_CDB, $CDB_7$. When processor 210 finds that the status of $CDB_7$ is READY, the controller moves variable first_free_CDB forward and moves the READY command description block $CDB_7$ into the active list as shown in FIG. 7B. $CDB_7$ is inserted into the active list by changing the forward pointer of $CDB_7$ to point to the ACTIVE command description block $CDB_0$ and the backward pointer of $CDB_7$ to point to $CDB_3$. The backward pointer of $CDB_0$ and the forward pointer of $CDB_3$ are changed to point to $CDB_7$. The SG_LIST command description block $CDB_2$ is removed for the free list and is already pointed to by a scatter-gather pointer in command description block $CDB_7$.

CDBs in the active list, $CDB_0$, $CDB_9$, $CDB_3$, and $CDB_7$ in FIG. 7B, are processed by processor 210 and SCSI interface 250. When the ACTIVE CDB is complete or disconnected, SCSI bus 130 becomes free. If no device on SCSI bus 130 attempts reselection of a disconnected I/O request, processor 210 searches the active list for a ready CDB to initiate on the SCSI bus 130. As described in U.S. Pat. Application entitled "SCSI BUS CONTROLLER WITH STORAGE FOR PERIPHERAL DEVICE CONFIGURATION DATA", processor 210 can check the capabilities of a device targeted by a CDB. In particular, processor 210 can check to see if the target device is SCSI-2 compatible. If not, a CDB may be delayed until a previous CDB for the same device is completed. For SCSI-2 peripherals, processor 210 initiates an I/O request on SCSI bus 130 and provides the block number as a tag message.

After an SCSI I/O request is initiated, the target device often disconnects while processing the request. This frees SCSI bus 130 for other uses. Processor 210 saves information needed to resume the I/O requested in the disconnected CDB then changes the status of the CDB to DISCONNECT. For example, processor 210 may save a main memory address and a remaining transfer count for an I/O request in the CDB describing the disconnected I/O request.

When a peripheral is ready to reselect an I/O request and SCSI bus 130 is free, the peripheral initiates SCSI handshaking which is responded to by SCSI interface 250. SCSI-2 peripheral devices return a device number and a tag message. The tag message is the block number of the resumed CDB. Processor 210 can quickly identify the address of the CDB from the tag message. With 256 CDBs, the CDBs are in one to one correspondence with the possible tag messages. SCSI-1 devices provide a device ID but do not provide a tag message. Processor 210 searches the active list of CDBs for the one disconnected CDB with the device ID.

When a requested I/O is completed, processor 210 sets the status of the completed CDB to DONE, inserts the CDB at the end of the free list, and changes variable last_free_CDB to point to the inserted CDB. For example, if the ACTIVE command description block, $CDB_0$ in FIG. 7B, is completed, $CDB_0$ is moved to the end of the free list and the active list is reconnect into a loop as shown in FIG. 7C. Moving a CDB to the end of the free list can require the changing forward or backward pointers in up to four CDBs, the CDB moved, the last CDB in the free list, and the two CDBs in active list which are one forward or backward of the moved CDB.

Processor 210 generates an interrupt for the host computer requesting that the host computer check completed CDB's. If two CDBs are completed within a short time, a single interrupt can request that the host computer check all the completed CDBs. The host computer checks the completion status of the DONE CDBs and SG_LIST CDBs forward of the CDB indicated by variable last_empty_CDB, changes the status byte of the CDBs to EMPTY, clears scatter-gather pointers, then updates variable last_empty_CDB.

Handling of the CDBs and SCSI interface 250 is the primary function of processor 210. Accordingly, the instruction set of processor 210 can be tailored for these tasks and the circuity of processor 210 can be tailored to implement the instruction set. Appendix II discloses an instruction set for one embodiment of processor 210 for use in an SCSI host adapter in accordance with the present invention. A program, in the language of Appendix II, which implements the above disclosed handling of CDBs and SCSI interface 250 is disclosed in Appendix III.

Specific Embodiment of an SCSI Controller

Figure 8A:
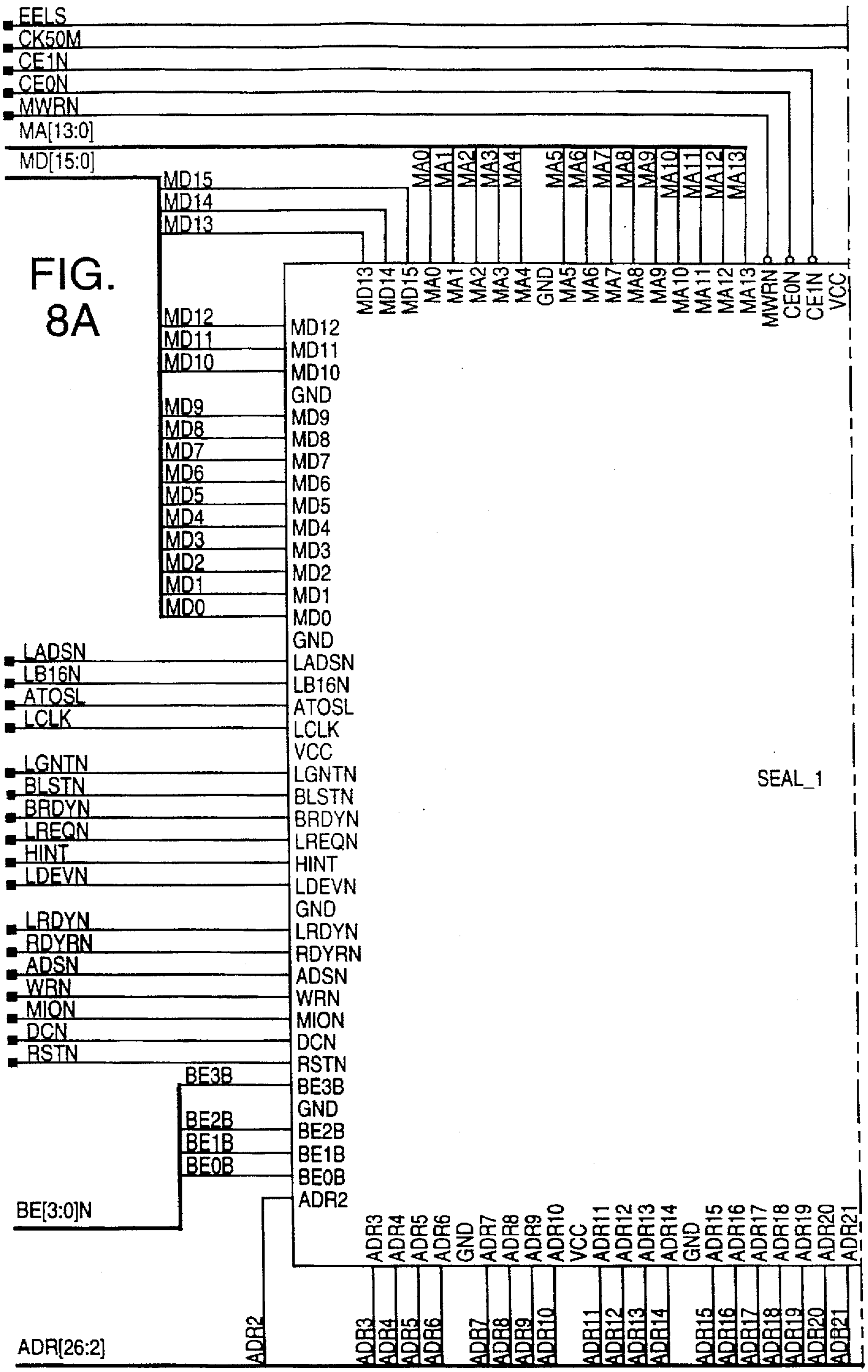
FIG. 8 shows a diagram of the I/O lines of an SCSI controller IC according to an embodiment of the present invention.
Figure 8B:
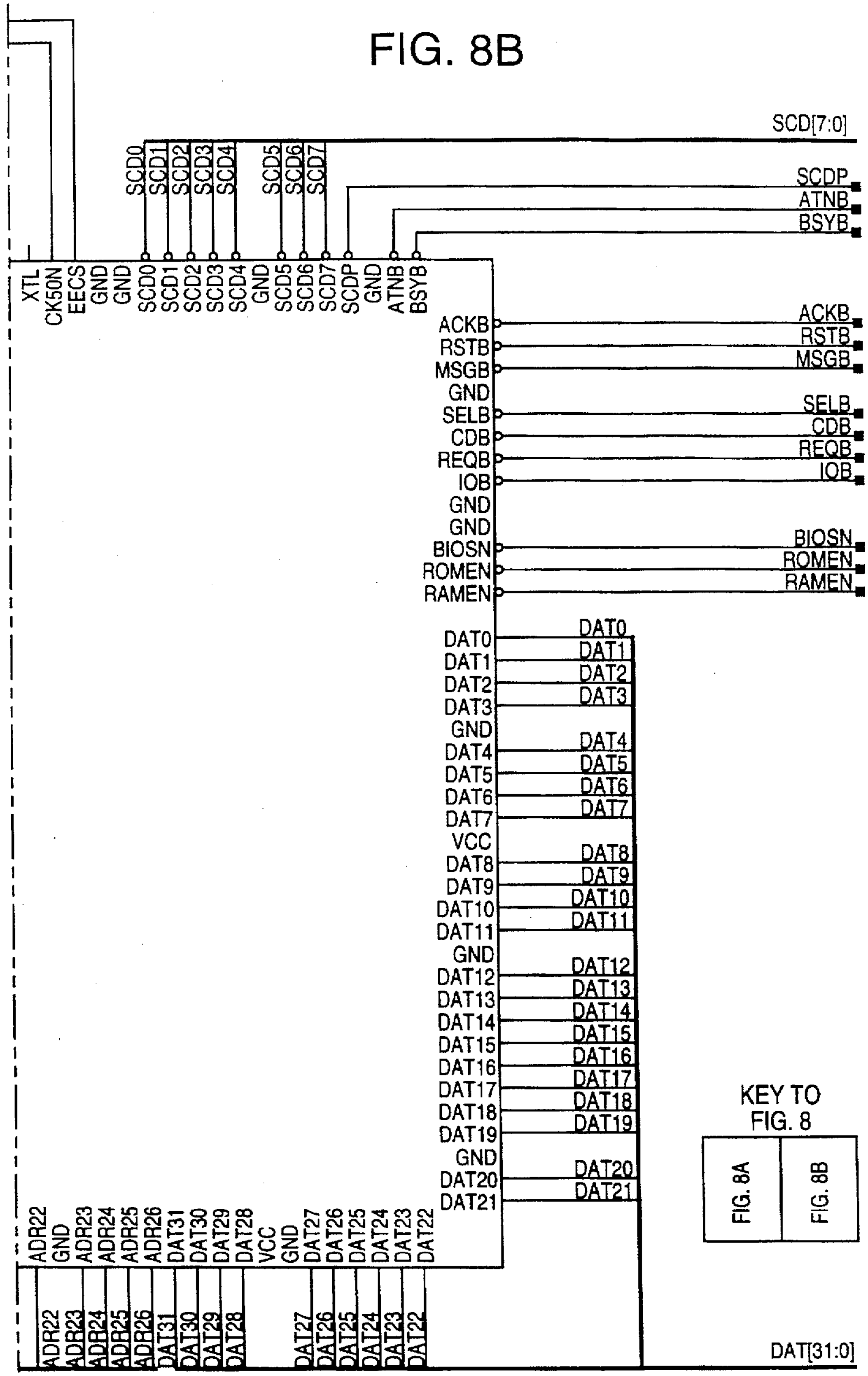

FIG. 8 shows I/O pins of an SCSI controller chip SEAL_1 according to an embodiment of the present invention. Controller chip SEAL_1 has a 24-bit address bus ADR and a 32-bit data bus DAT for connection to a VESA bus of a host computer. A 4-bit byte enable bus BE selects the bytes on data bus DAT which are used by controller SEAL_1. Standard VESA bus control signals as define in the VESA specification are handled on lines LADSN (local bus address strobe), LB 16N (local bus size 16-bit), LCLK (local CPU clock), LGNTN (local bus grant), BLSTN (burst transfer last), BRDYN (burst transfer ready), LREQN (local bus request), HINT (host interrupt), LDEVN (local bus device acknowledge), LRDYN (local bus device ready), RDYRN (ready return), ADSN (address data strobe), WRN (read or write status), MION (memory or I/O status), DCN (data or code status), and RTSN (system reset).

Line ATOSL carries a signal that enables or disable automatic I/O port address selection as describe in U.S. patent application entitled "METHOD AND CIRCUIT FOR RESOLVING I/O PORT ADDRESS CONFLICTS", attorney docket No. M-2563.

I/O) pins for connections to an external local memory (RAM or EEPROM) are provided by a 16-bit local data bus MD and a 14-bit local address bus MA. Lines EECS, CEON, and CE1N are used select whether an external EEPROM chip, a first RAM chip, or a second RAM chip are accessed through data bus MD and address bus MA. Lines CK50M and MWRN carry a clock signal and a read-write signal for local memory.

SCSI interface is provided through an 8-bit SCSI data bus SCD and SCSI handshake lines ATNB (attention), BSYB (busy), ACKB (acknowledge), RSTB (reset), MSGB (message), SELB (selection), CDB (command or data), REQB (request), and IOB (I/O). Line SCDP controls parity checks of the SCSI protocol. Such signals are well known in the art and described by ANSI X3.131-1993 and ANSI X3.131-1986.

Lines BIOSN, ROMEN, and RAMEN control whether a basic input output system (BIOS) for the controller chip is loaded from local memory and whether a RAM or ROM bios is used. Such BIOS are well known and described for example in the *IBM PC/AT Technical Reference Manual* published by IBM in 1983.

FIGS. 9–18 show block and circuit diagrams of controller chip SEAL_1. FIGS. 9–13 show I/O buffers for the I/O pins disclosed in regard to FIG. 8. In FIGS. 9–13 buffers IBT and IBS are input buffers. Buffers IBTP1 are input buffers with pull-ups to stop the input from floating. Buffers UO1, UO2, UO3, and UO4 are output buffers. Buffer UB4 is bidirectional. Buffers UT2P2 and UT3P2 are input-output buffers with a pull-up on the input. Drivers DV1 and DV2 are predrivers for output signals.

Figure 10A:
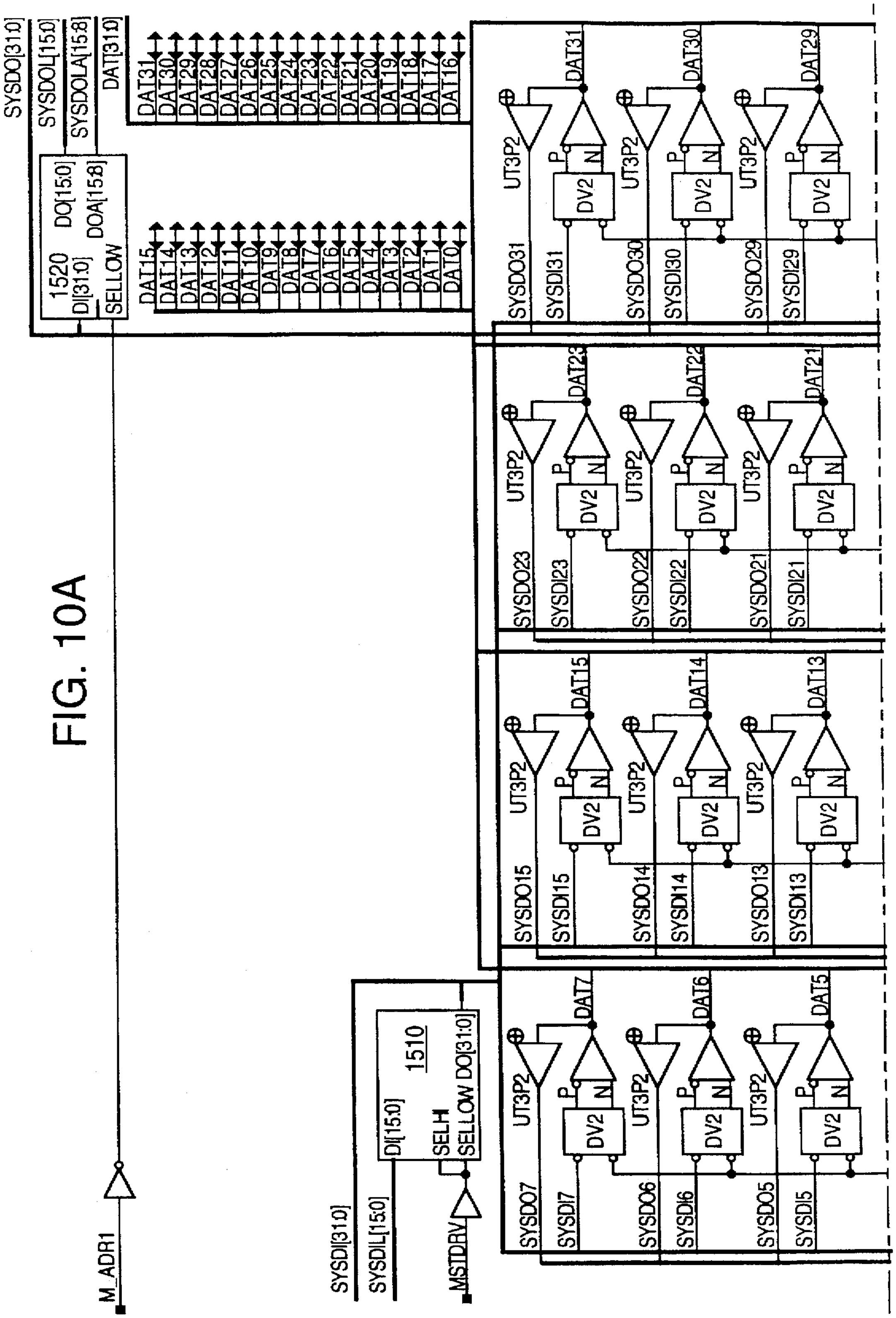
Figure 10B:
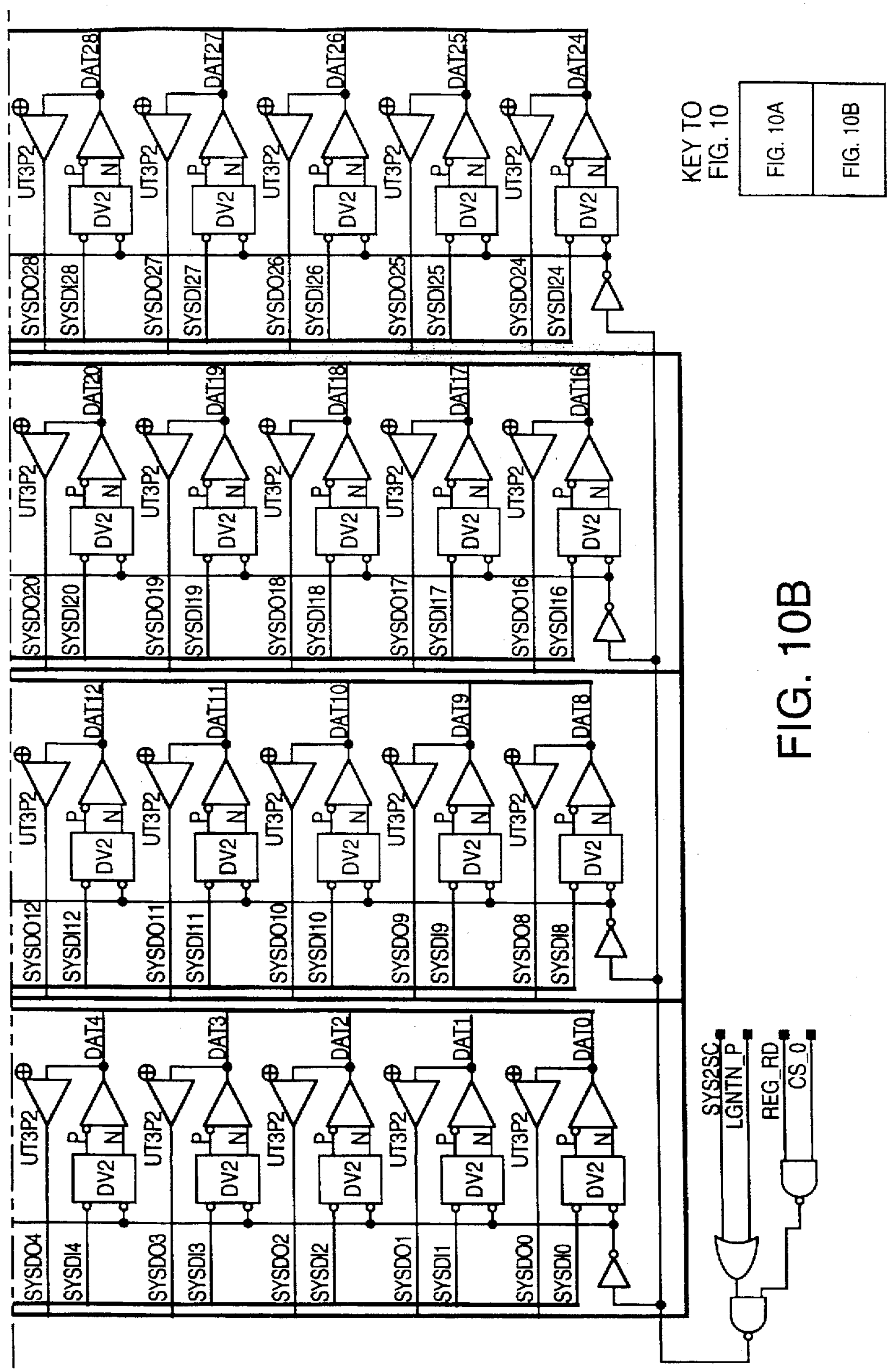

FIG. 10 also includes a 16-bit to 32-bit multiplexer 1510 and a 32-bit to 16-bit multiplexer 1520 which selectably connect data bus DAT to internal data buses SYSDI, SYSDIL, SYSDO, SYSDOL, and SYSDOLA. In FIG. 13, blocks DO_DI are historesis buffers, and parity generator PRTY_OUT generates a signal indicating the parity of SCSI output data.

Figure 14A:
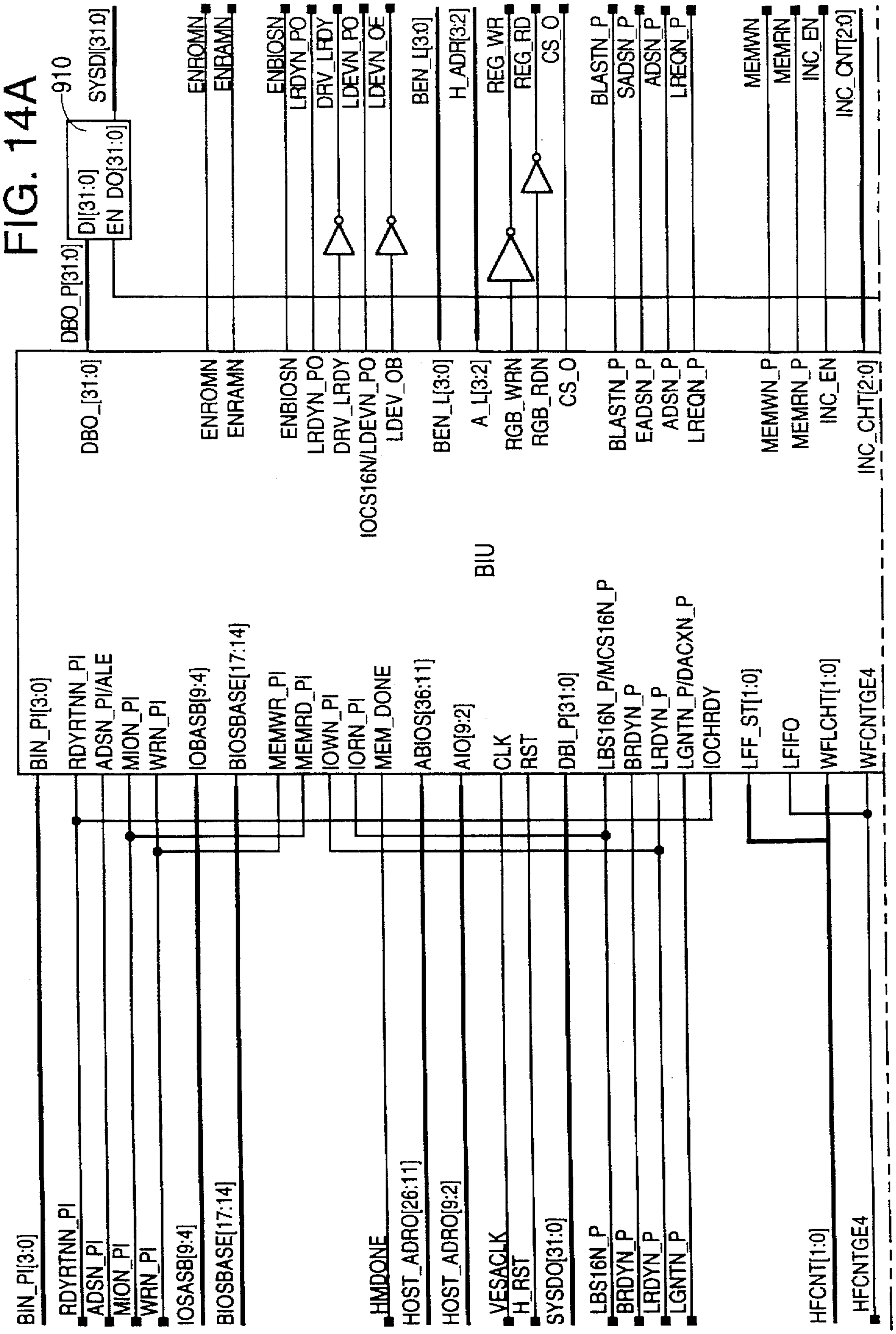
Figure 14B:
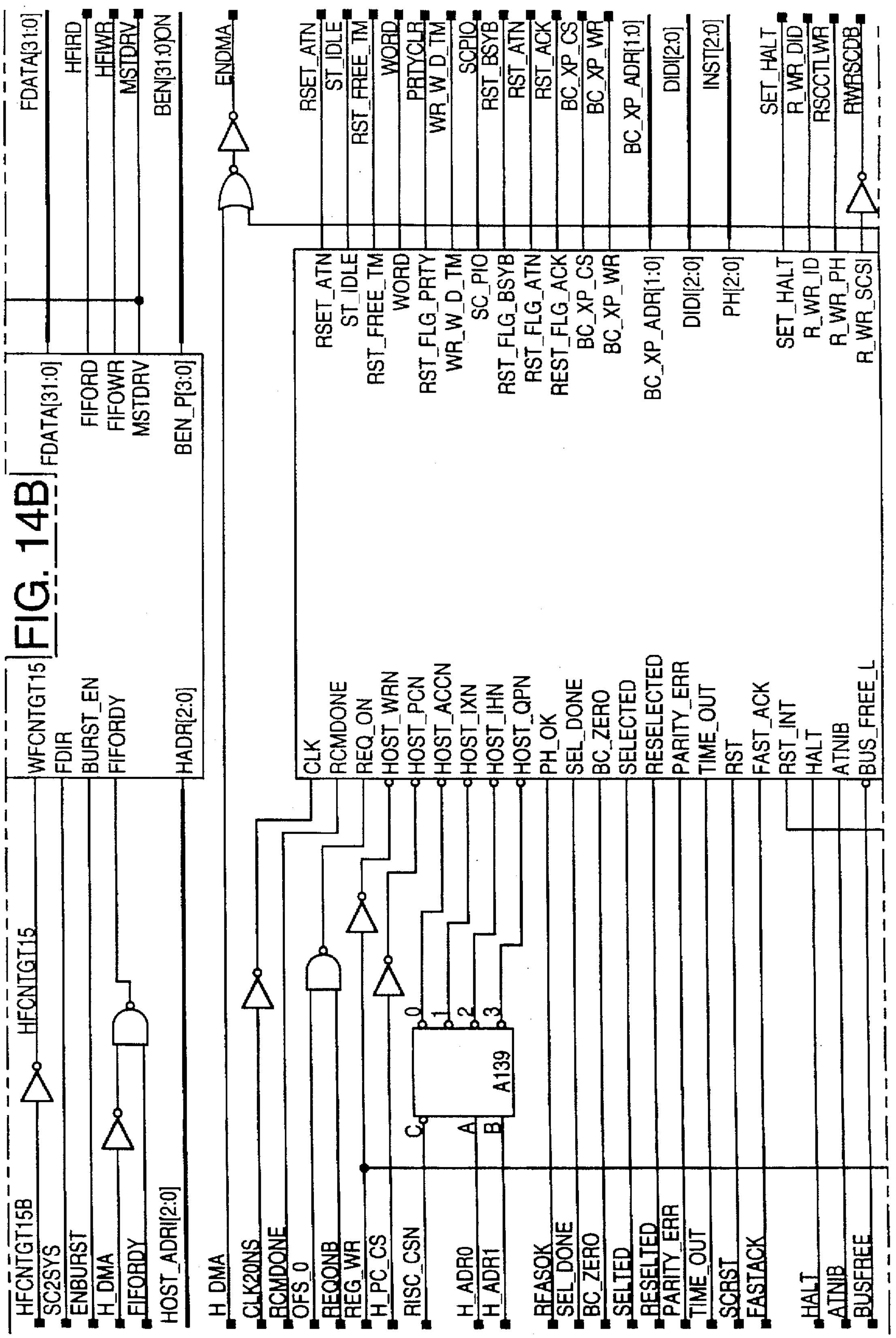
Figure 15A:
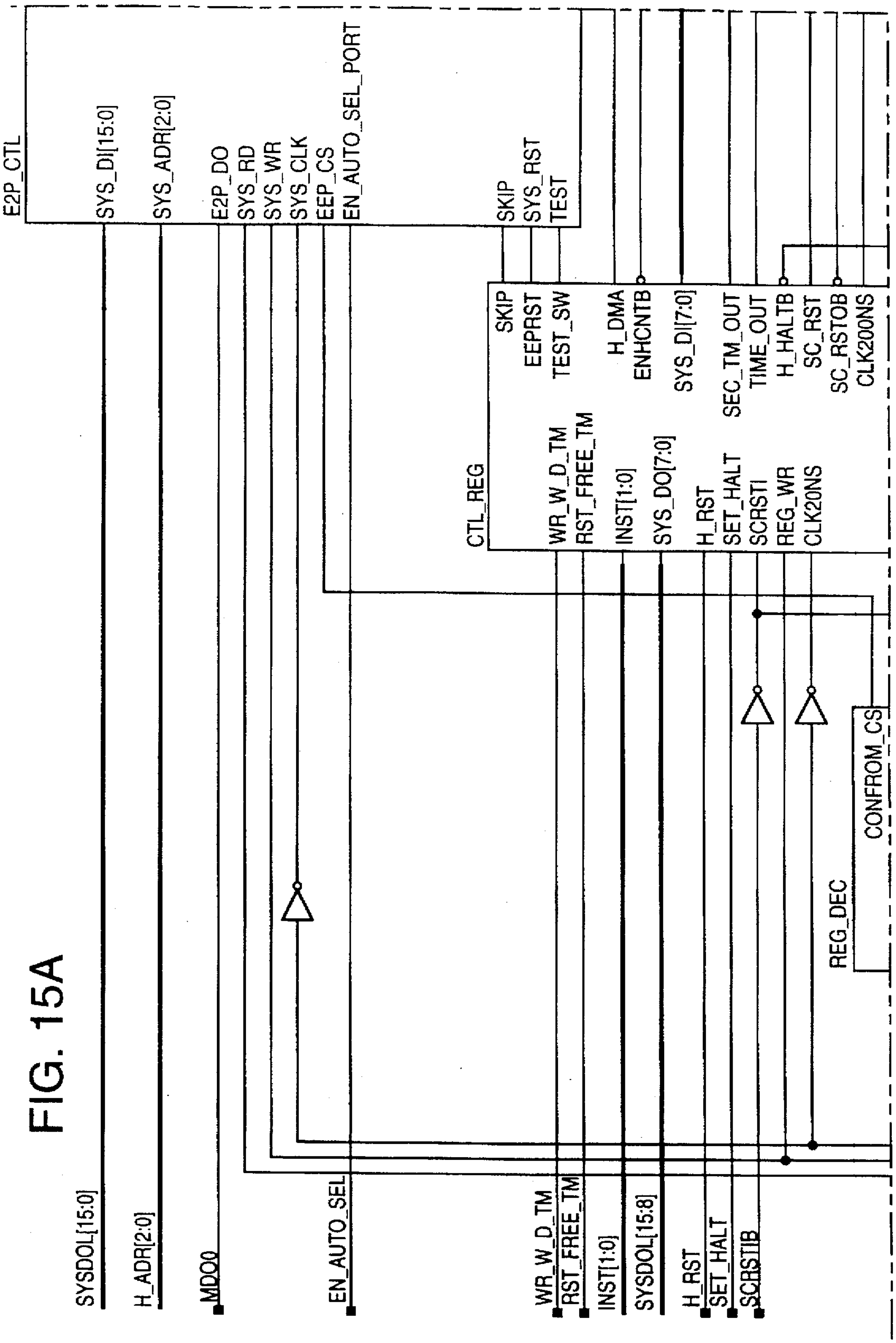
Figure 15B:
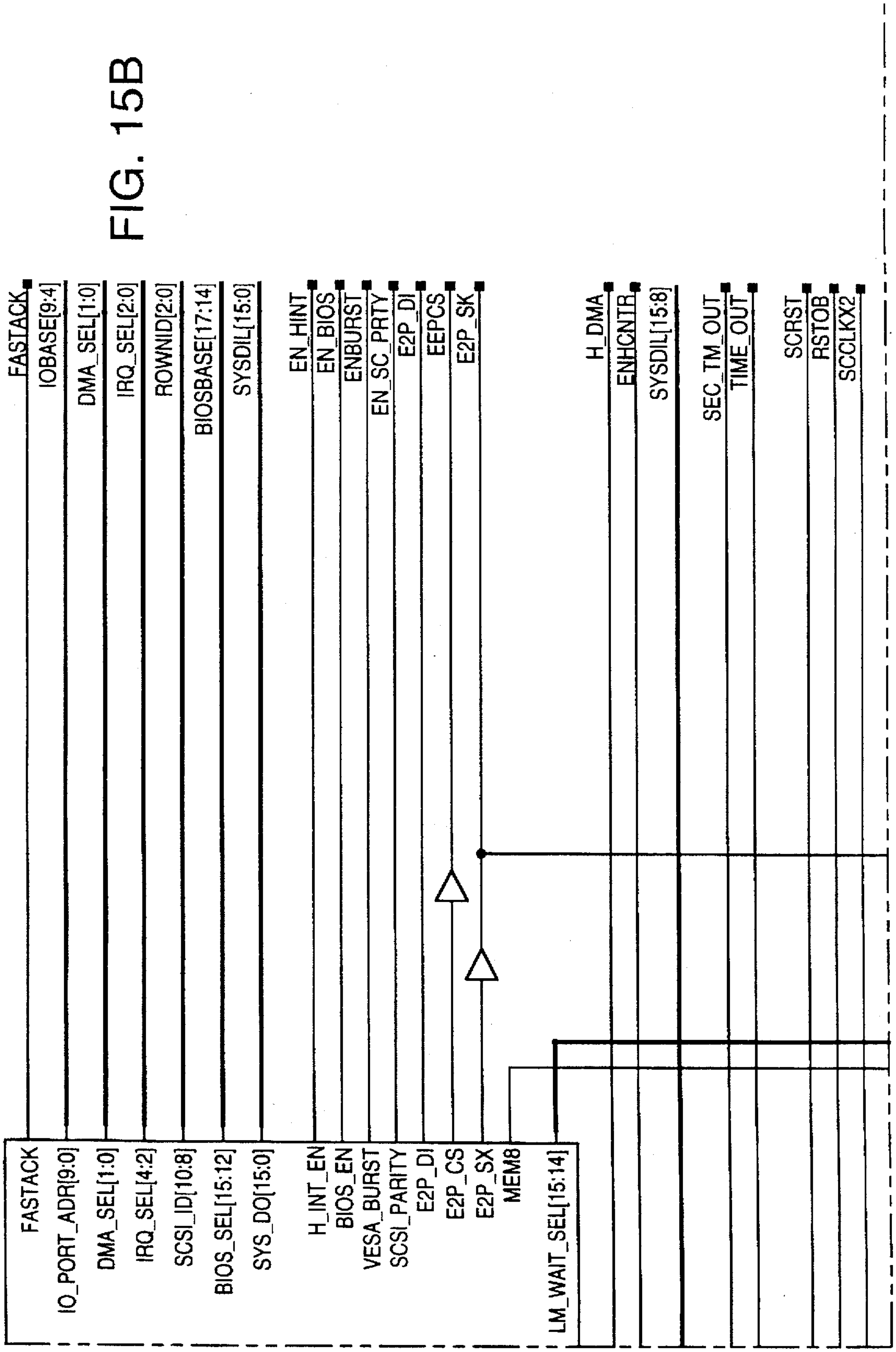
Figure 15C:
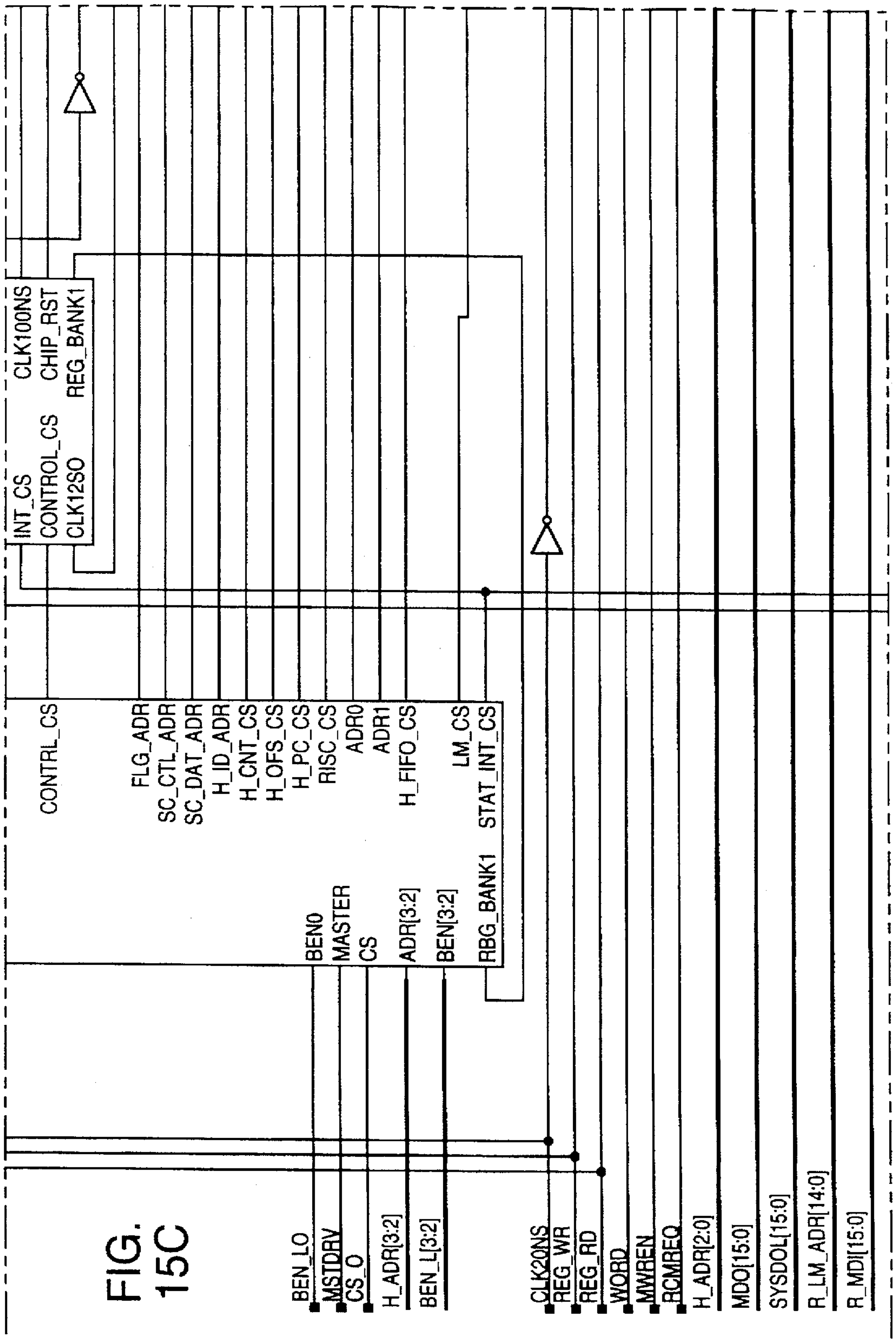
Figure 15D:
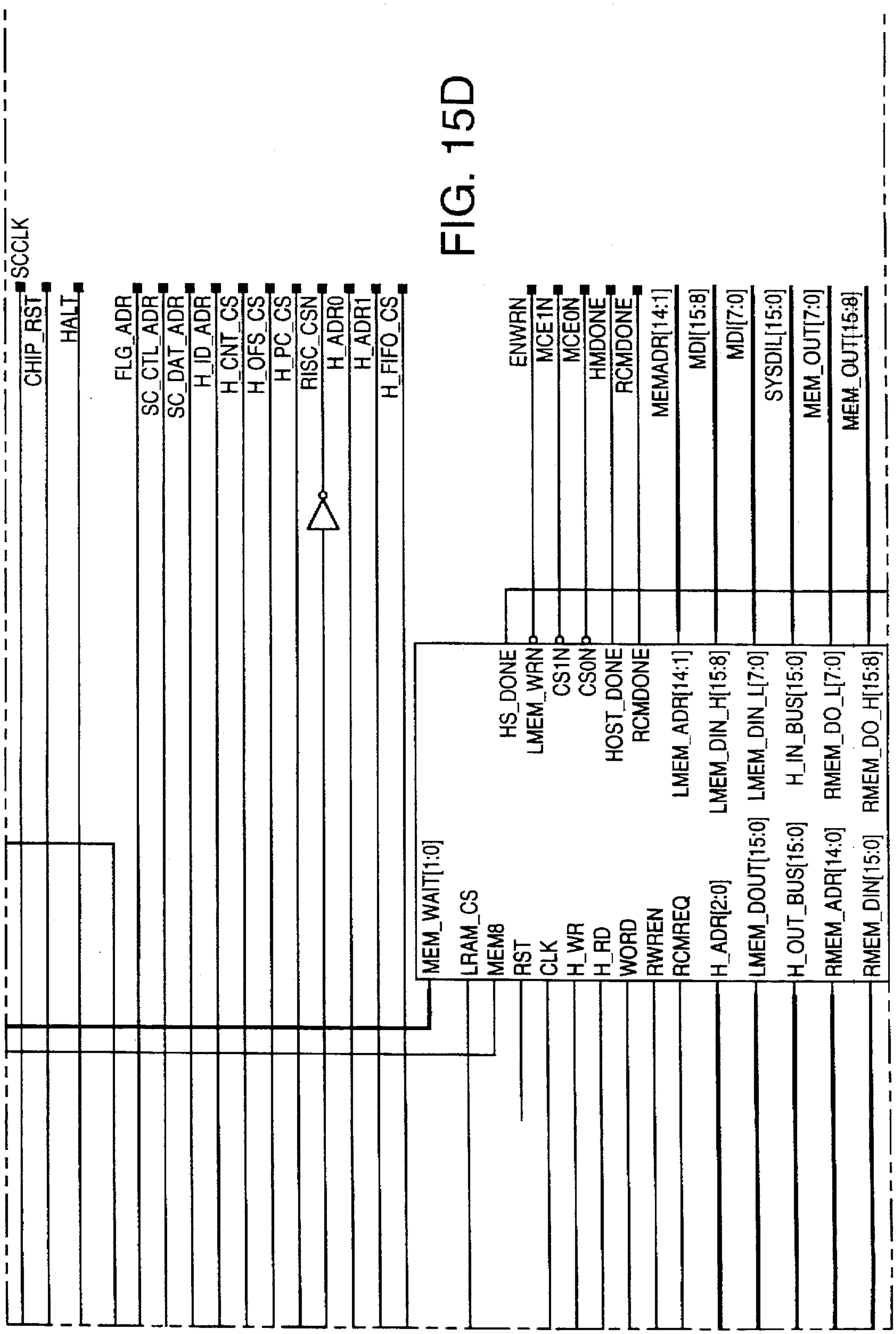
Figure 15E:
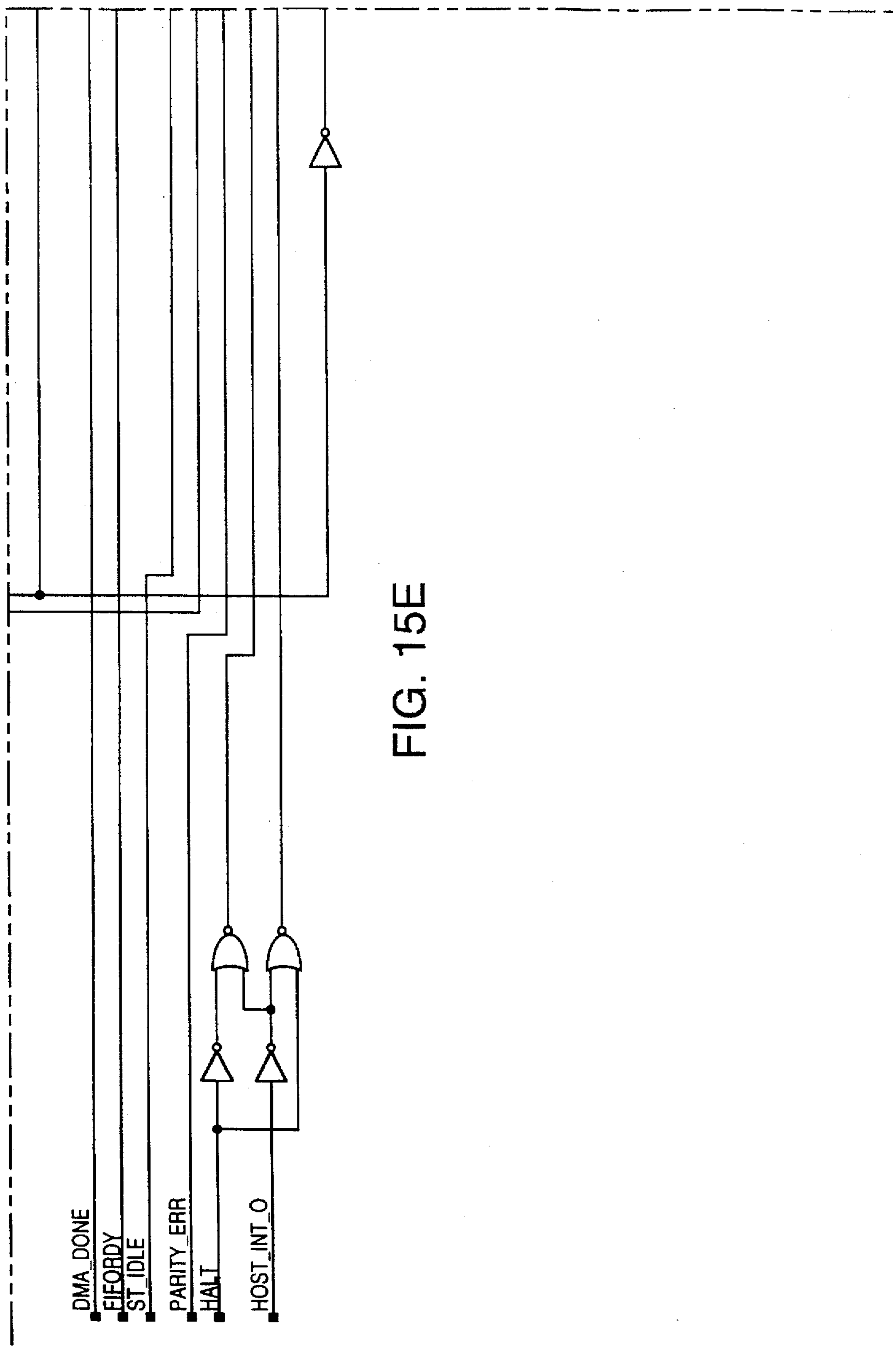
Figure 15F:
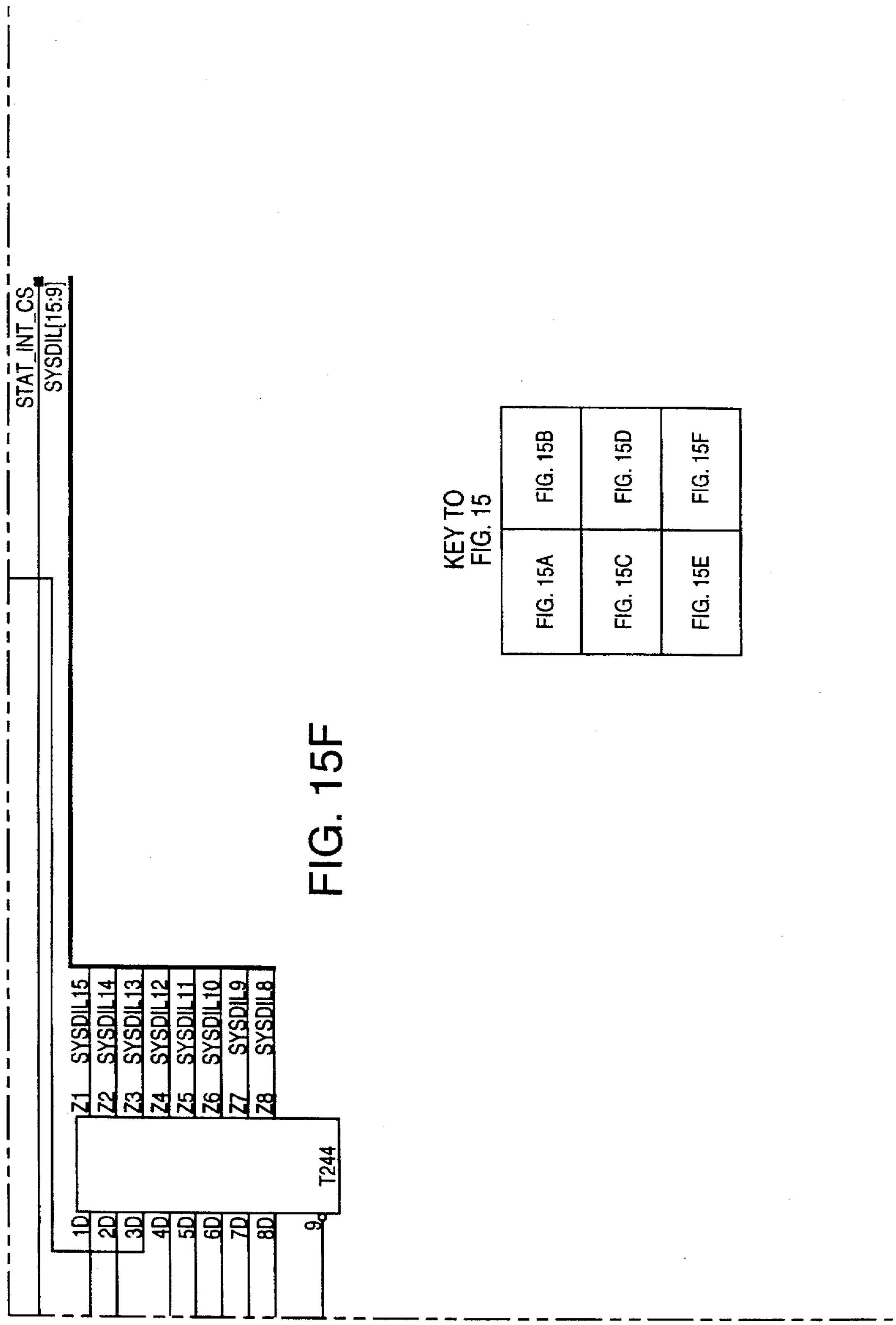
Figure 16A:
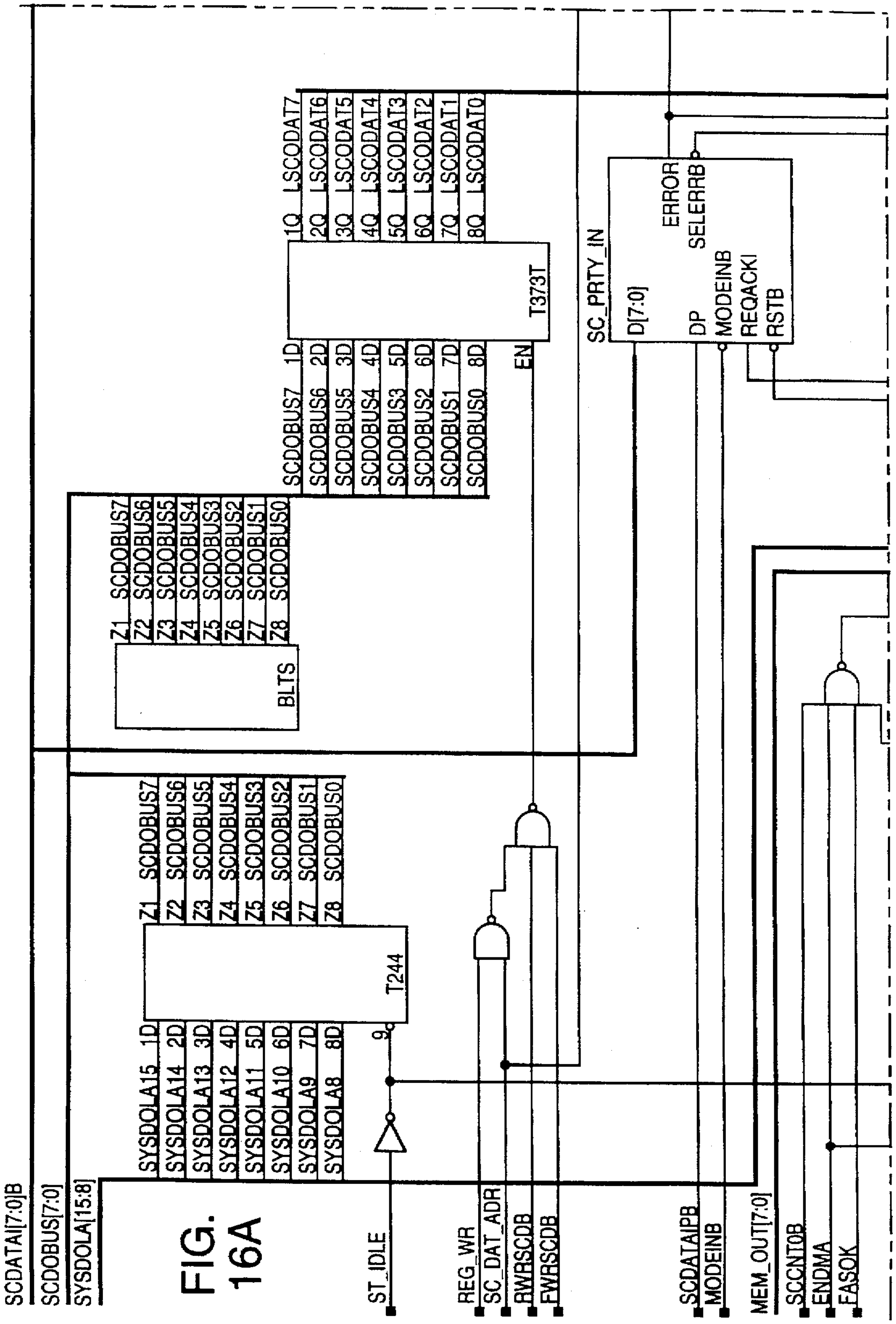
Figure 16B:
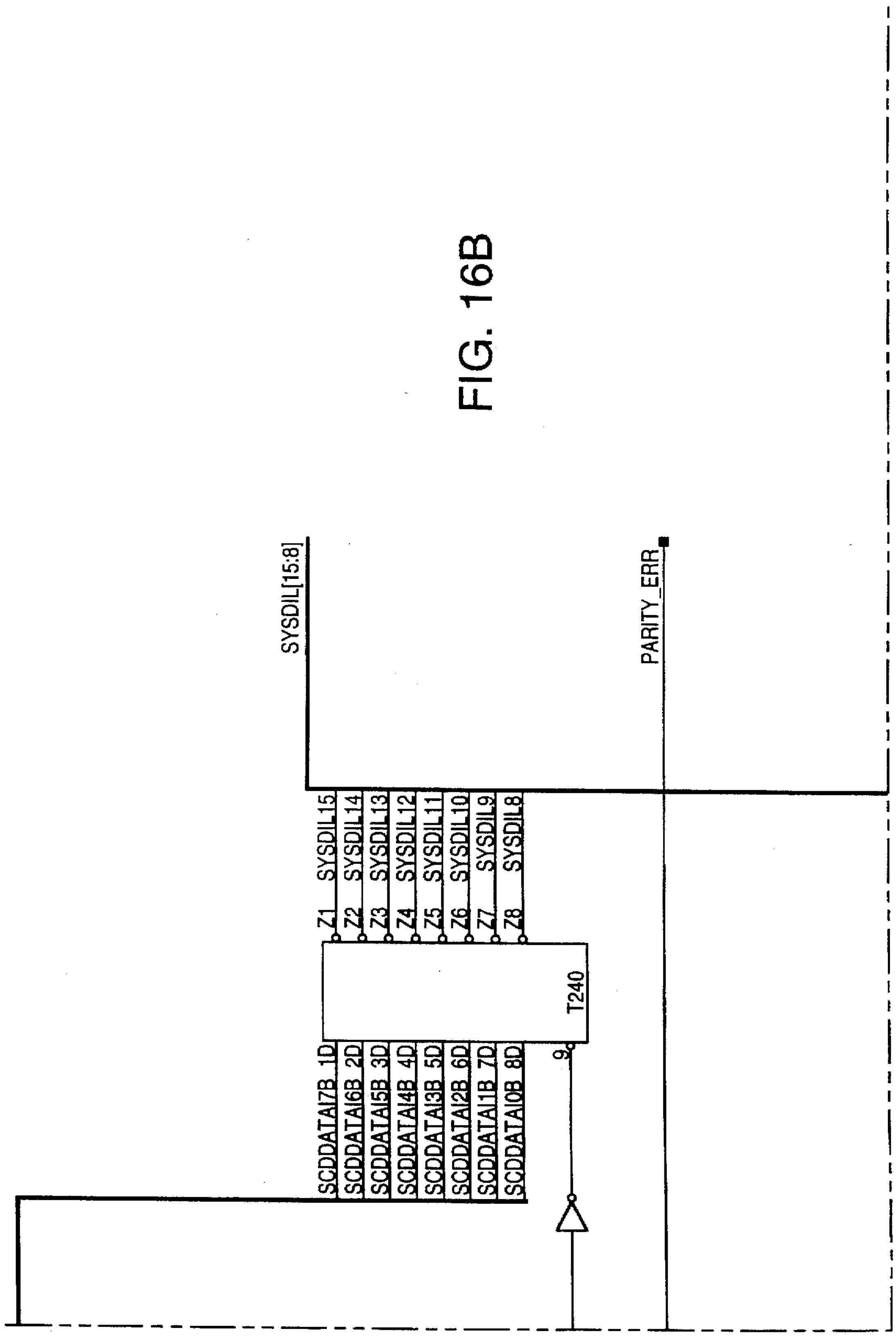
Figure 16C:
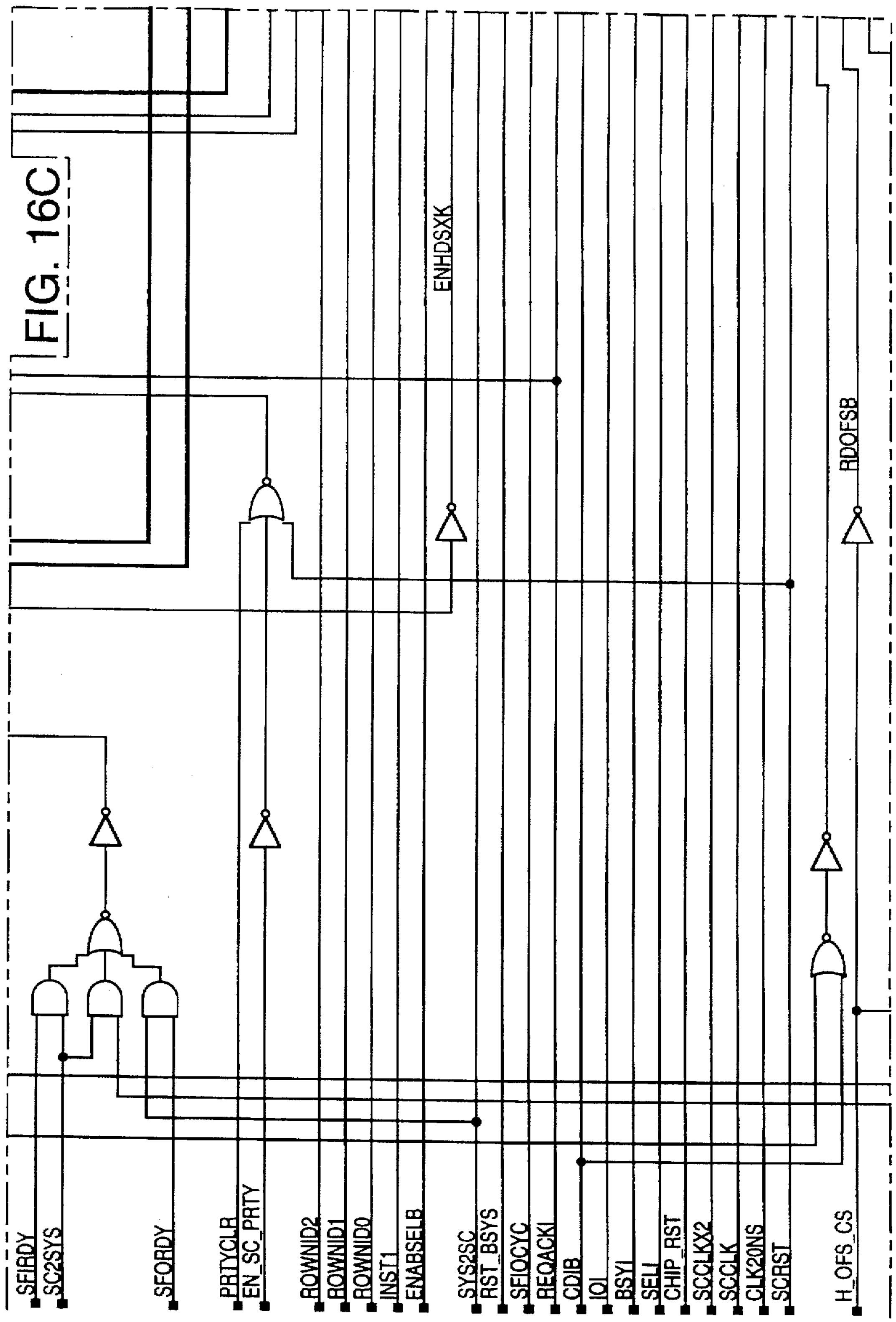
Figure 16D:
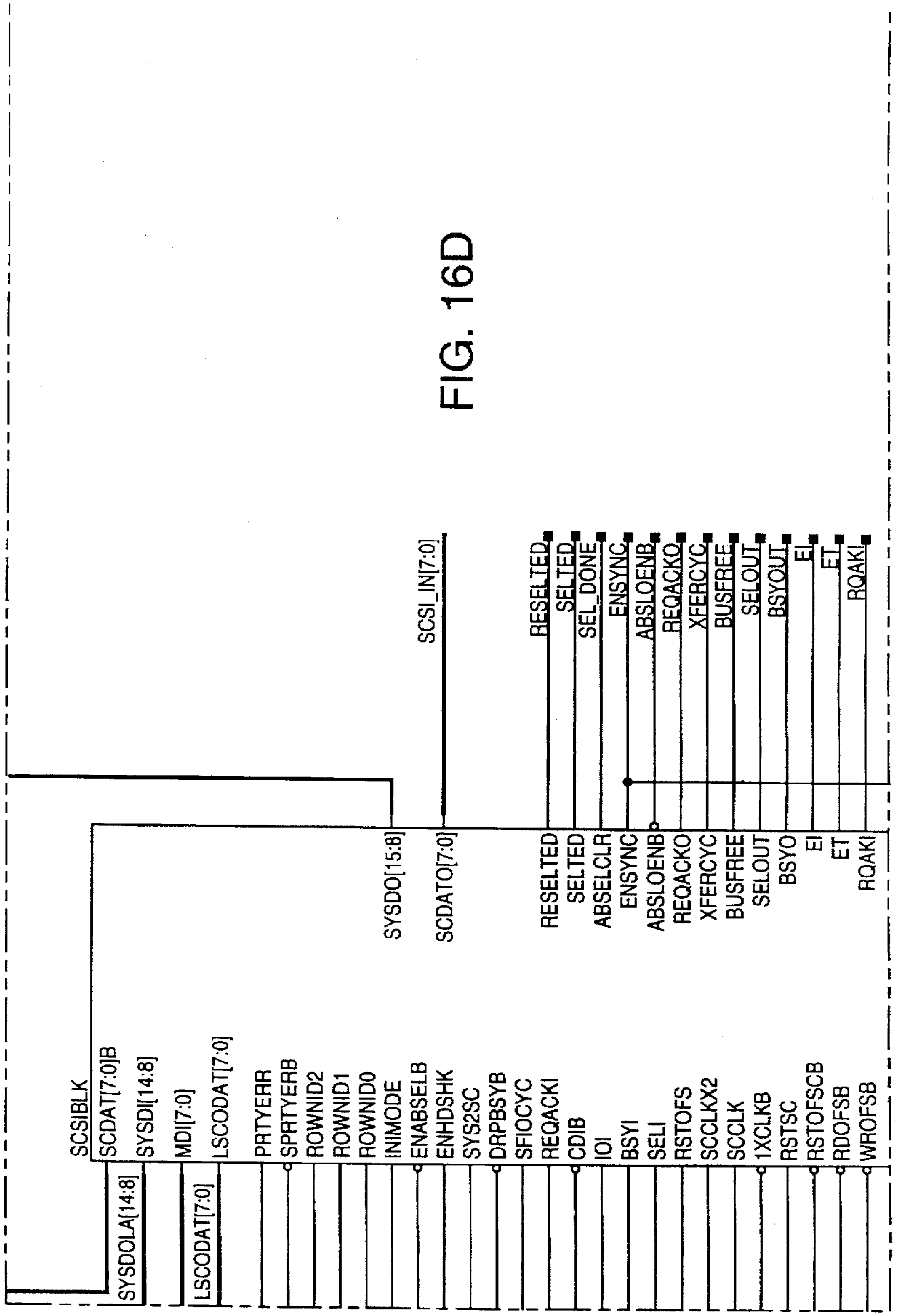
Figure 16E:
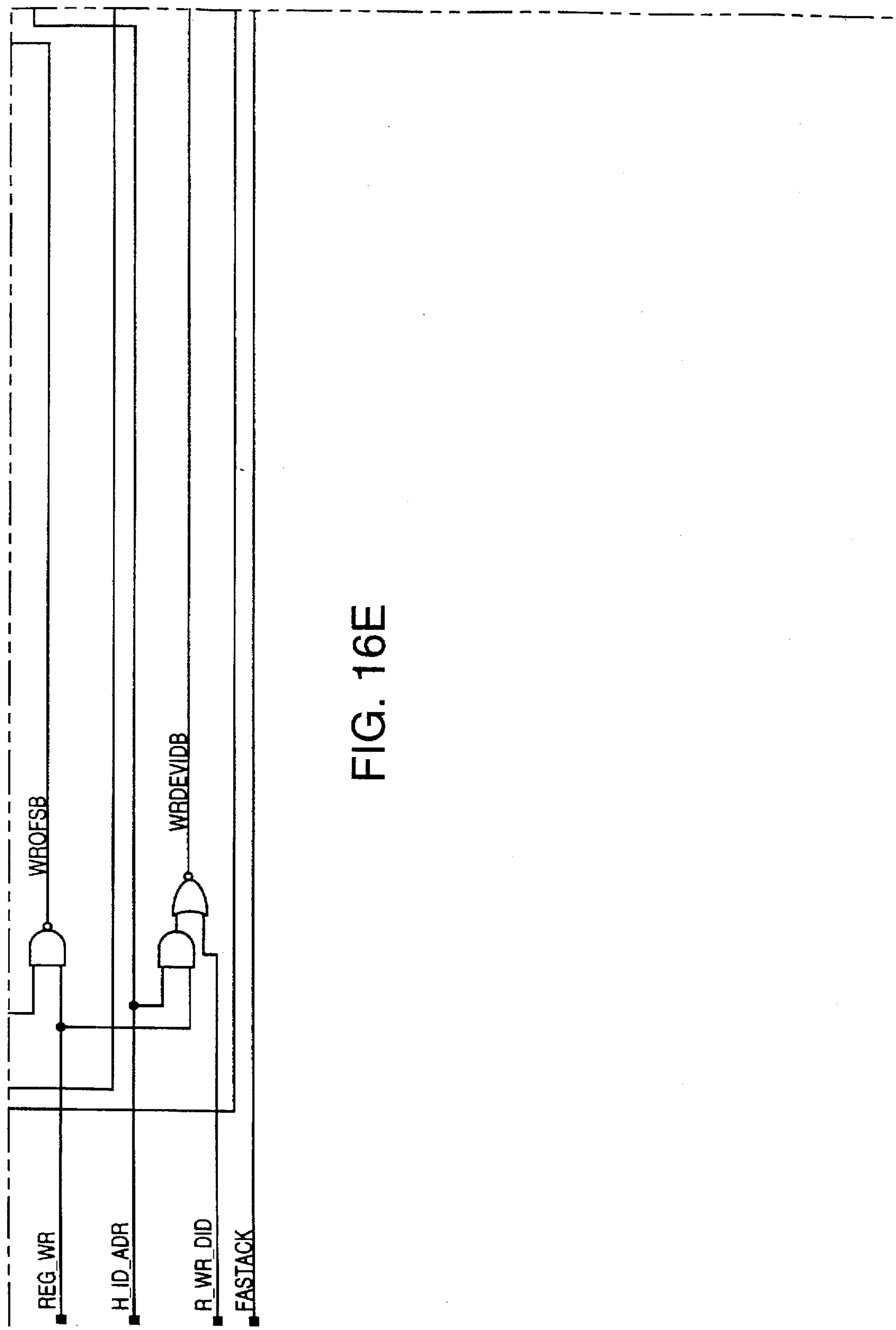
Figure 16F:
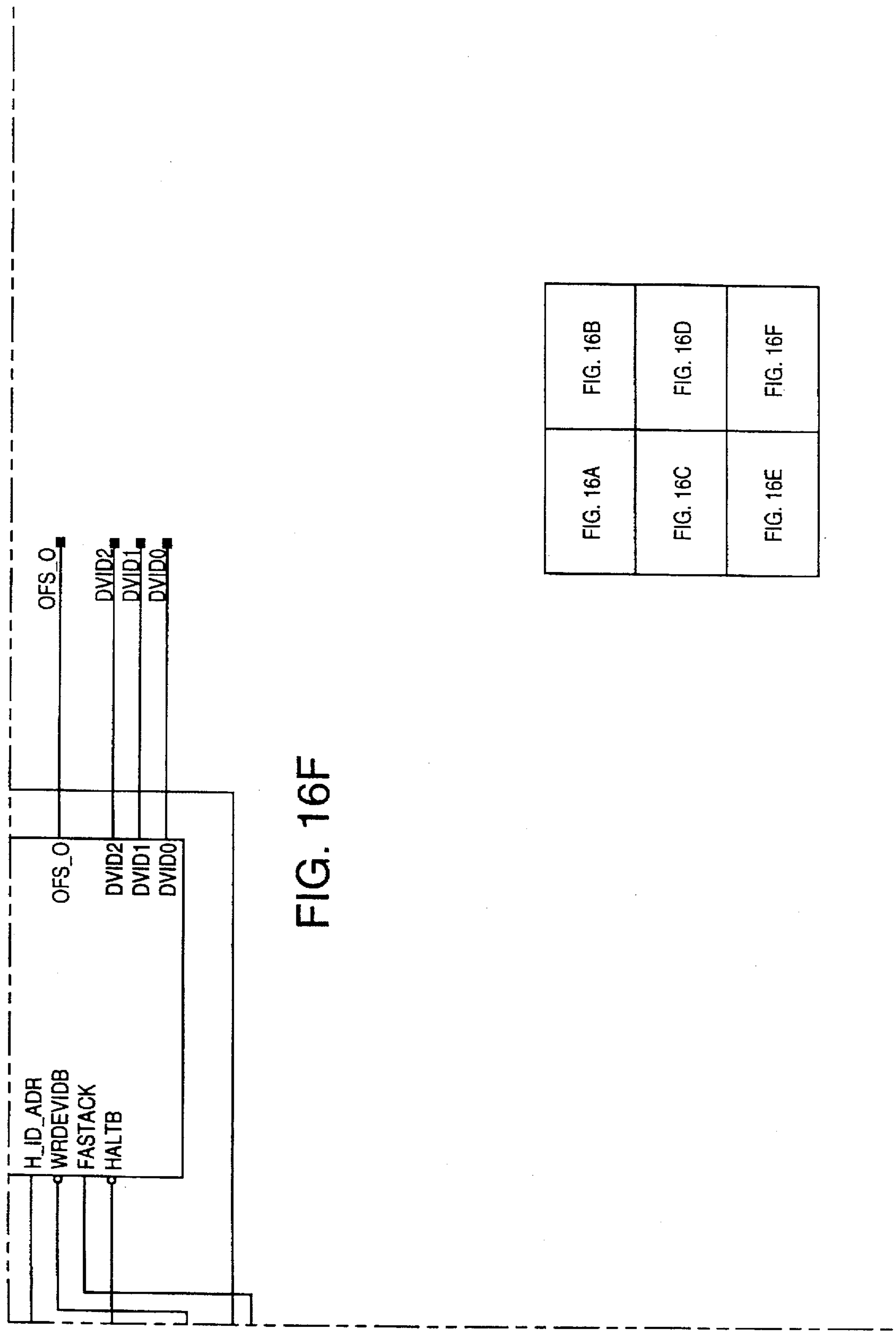
Figure 17A:
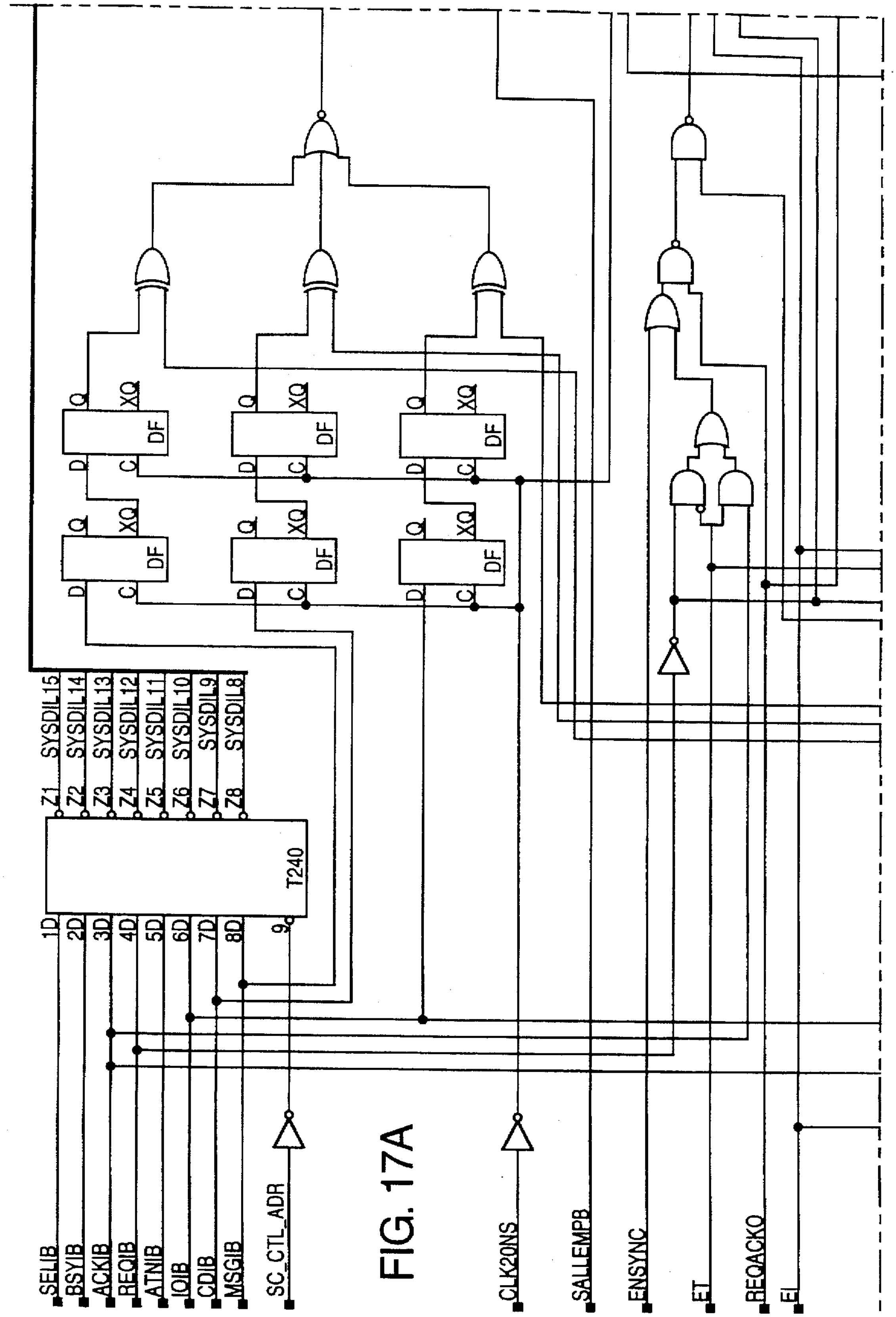
Figure 17B:
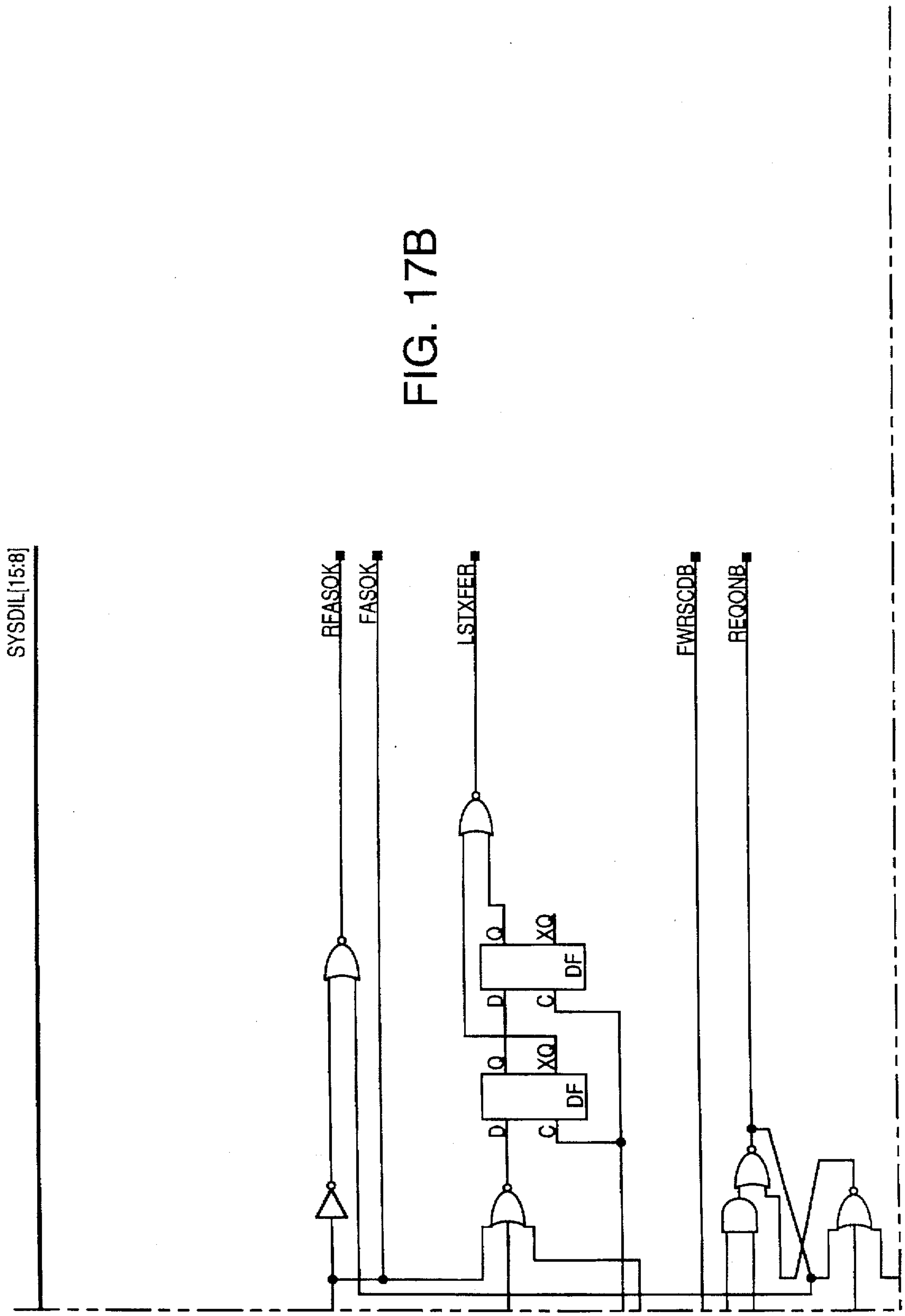
Figure 17C:
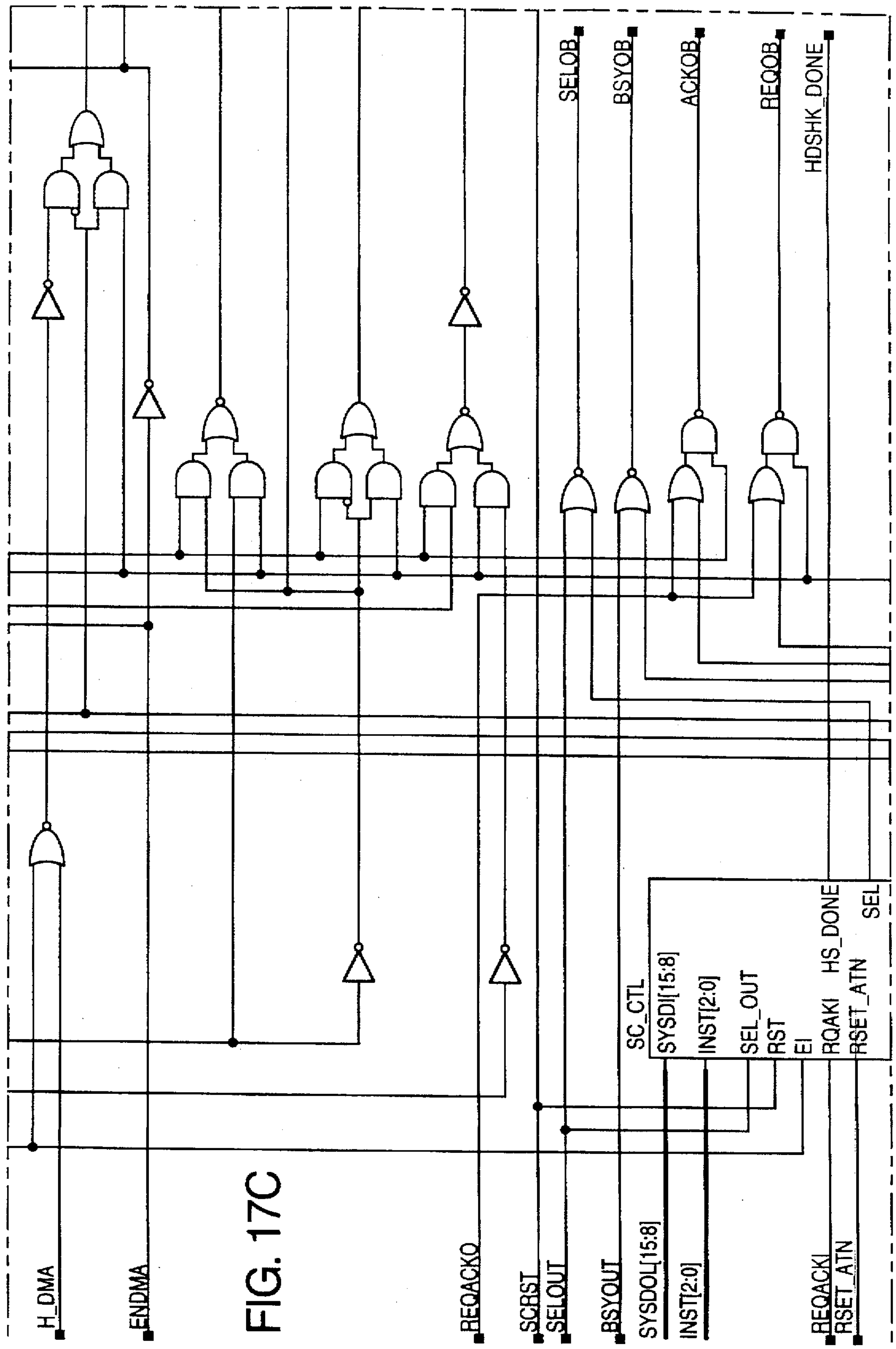
Figure 17D:
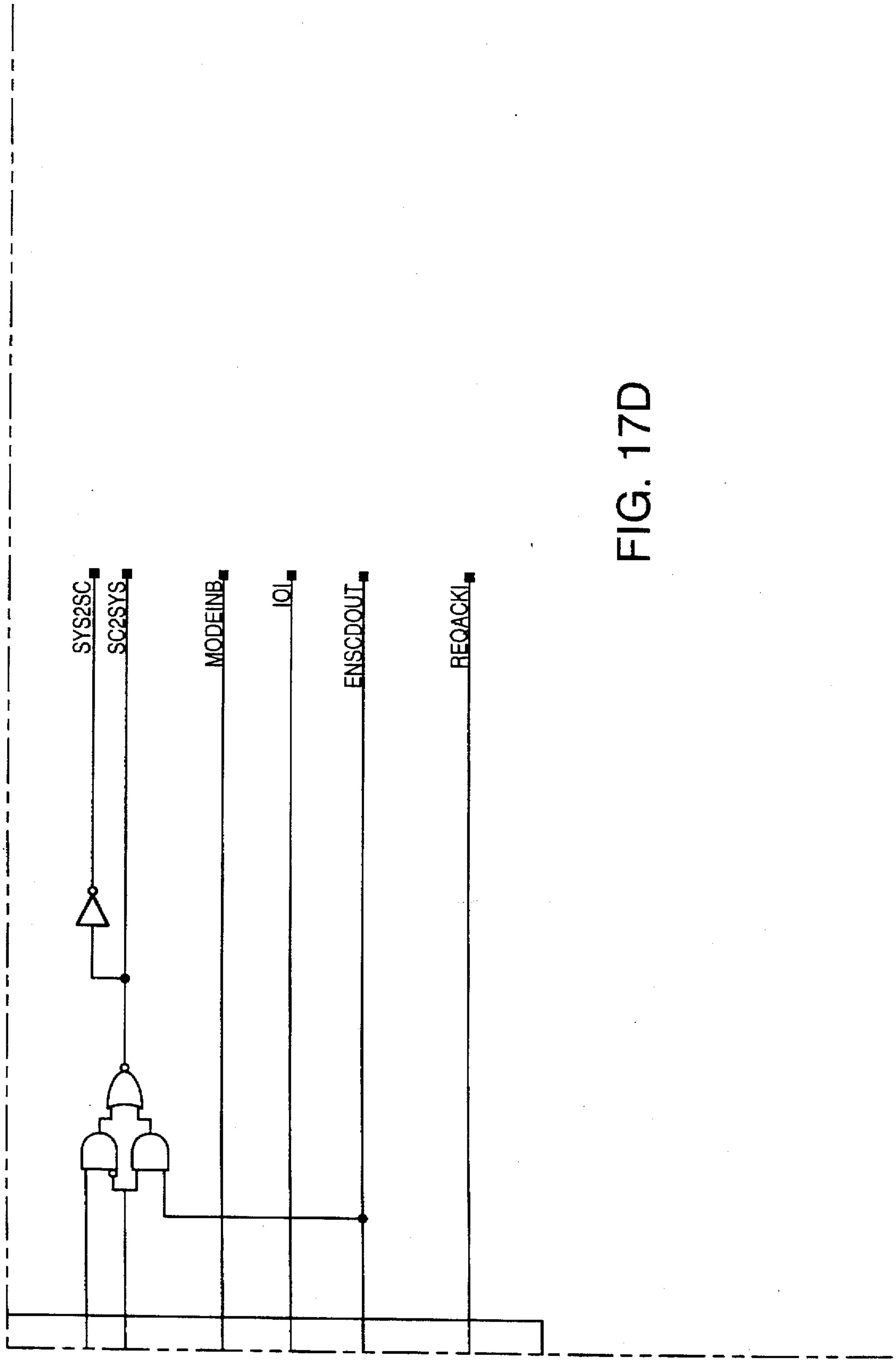
Figure 18A:
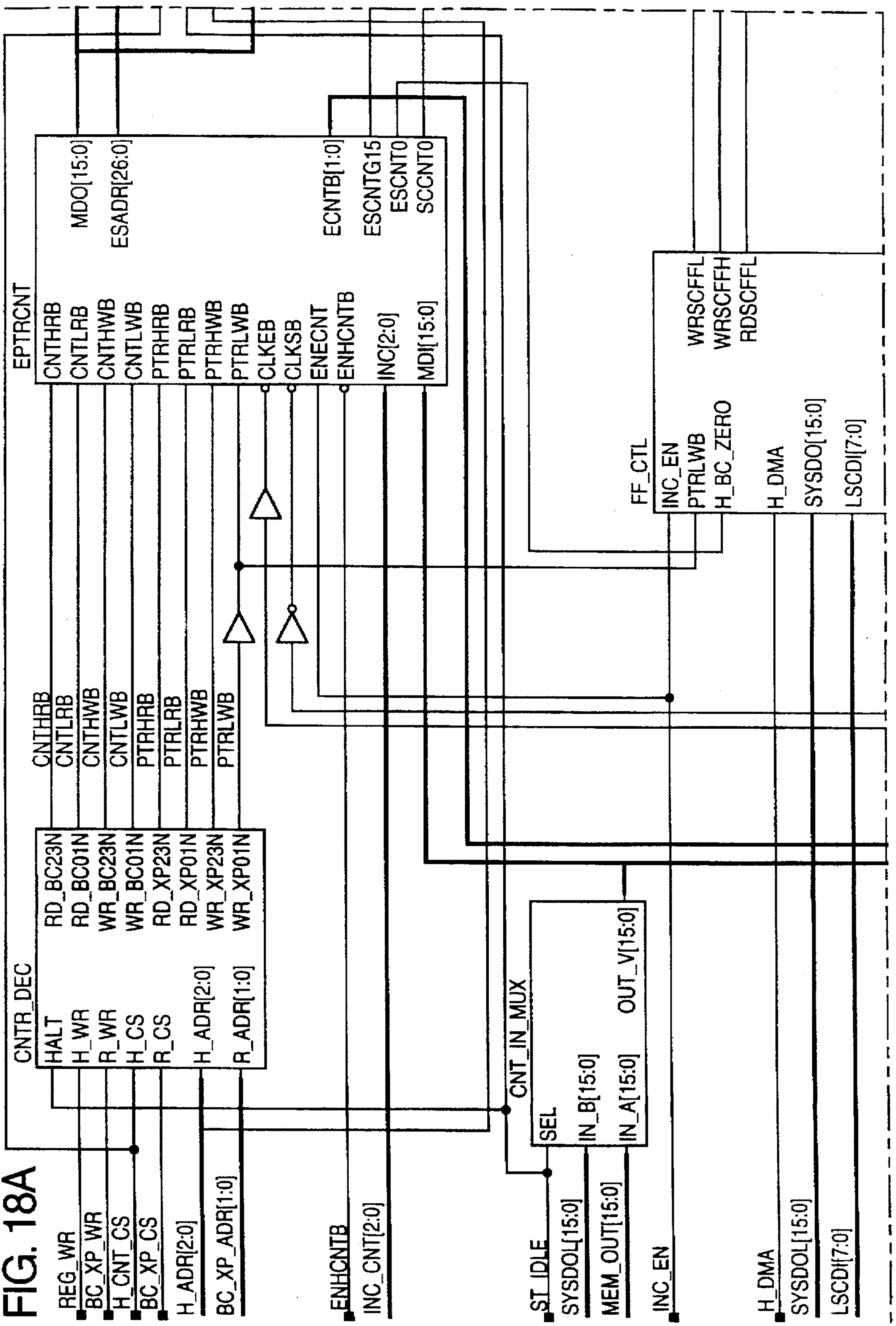
Figure 18B:
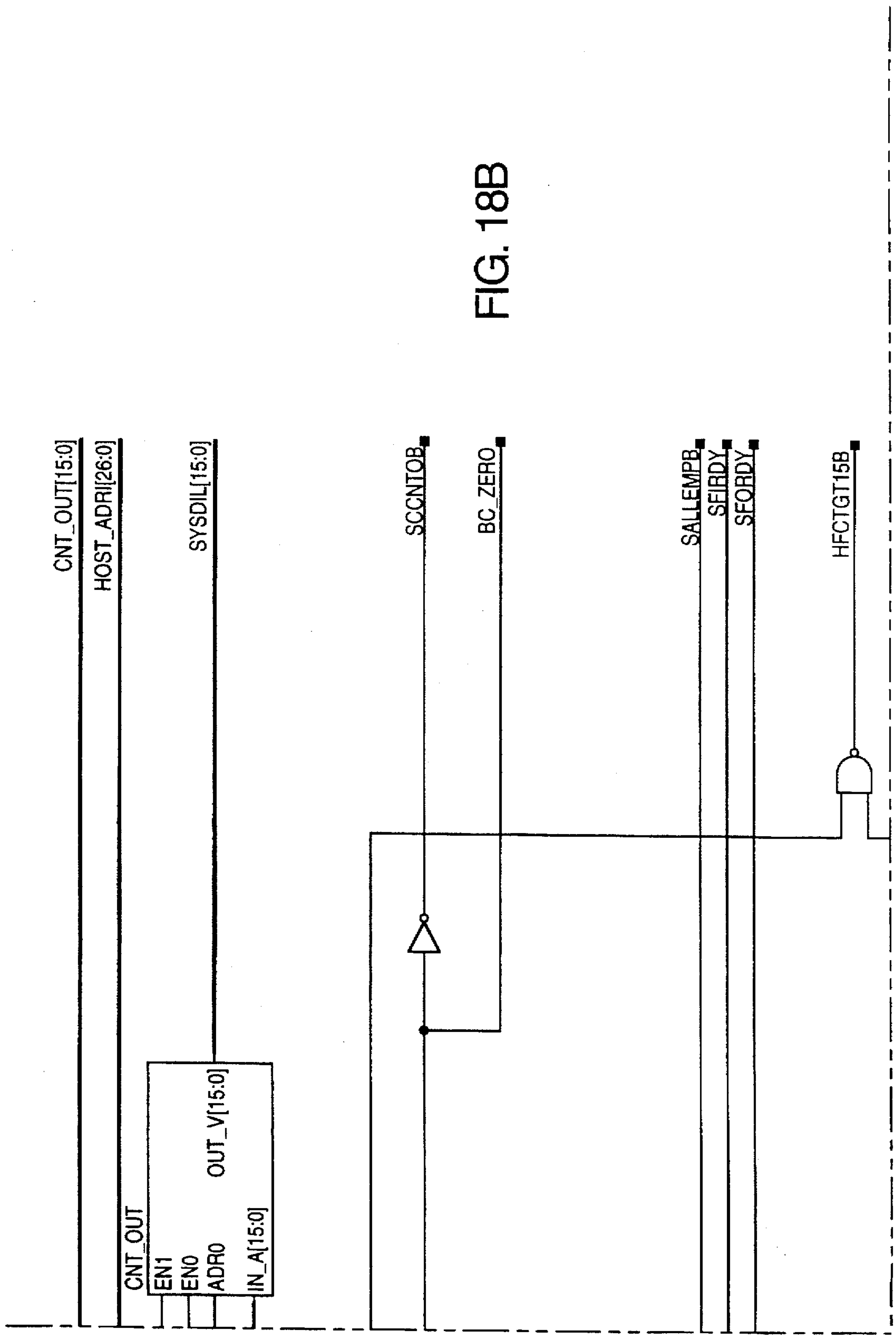
Figure 18C:
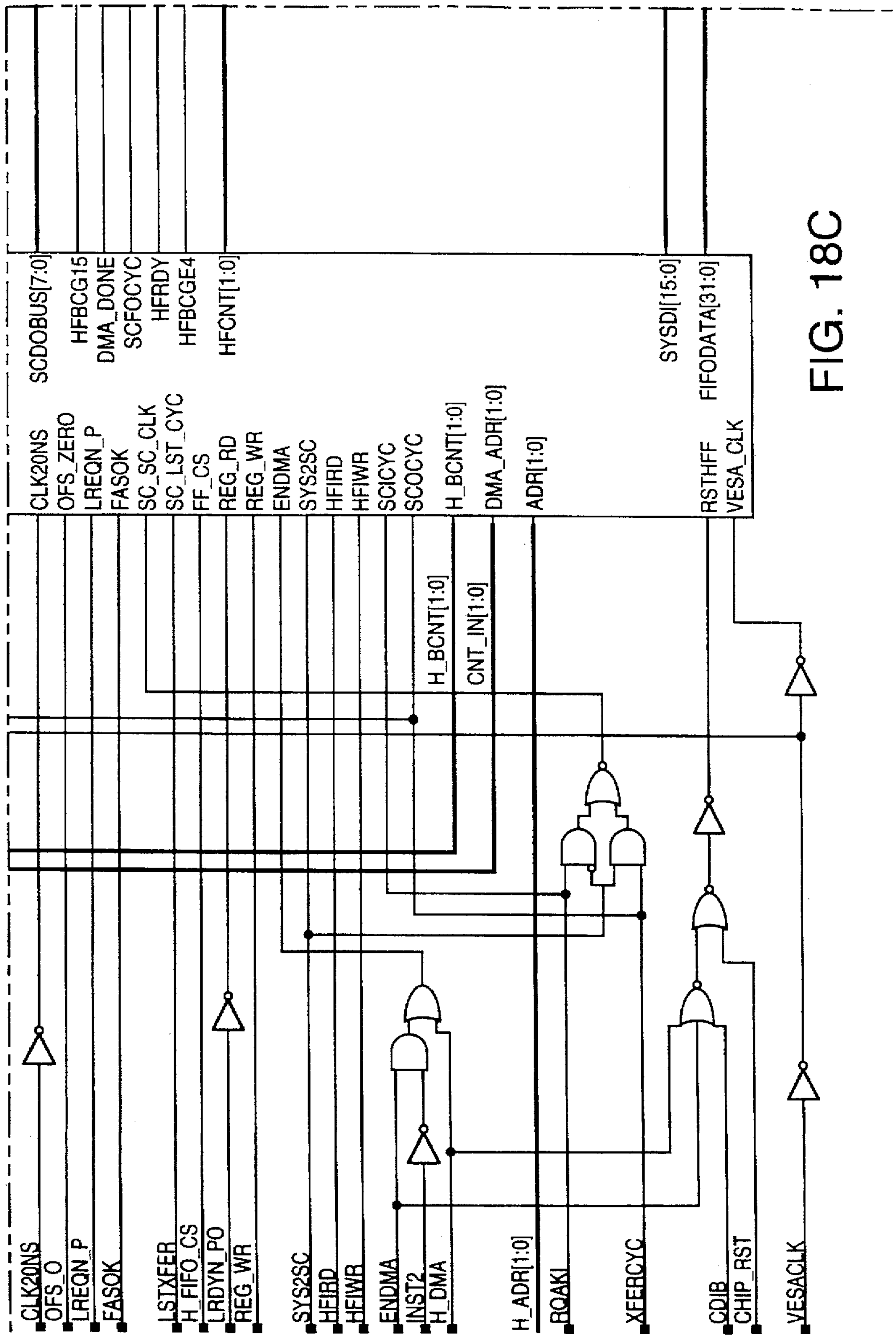
Figure 18D:
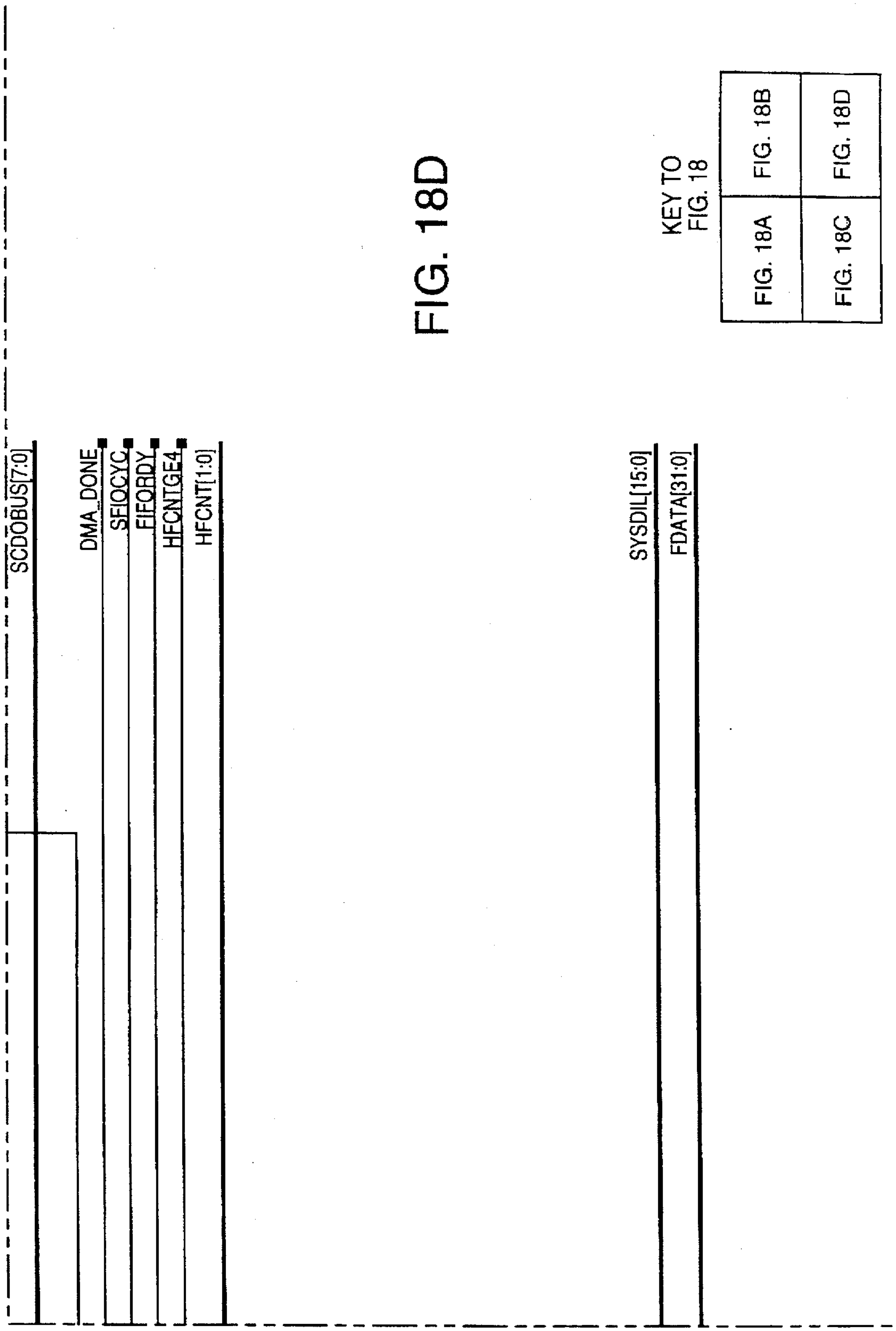
Figure 19A:
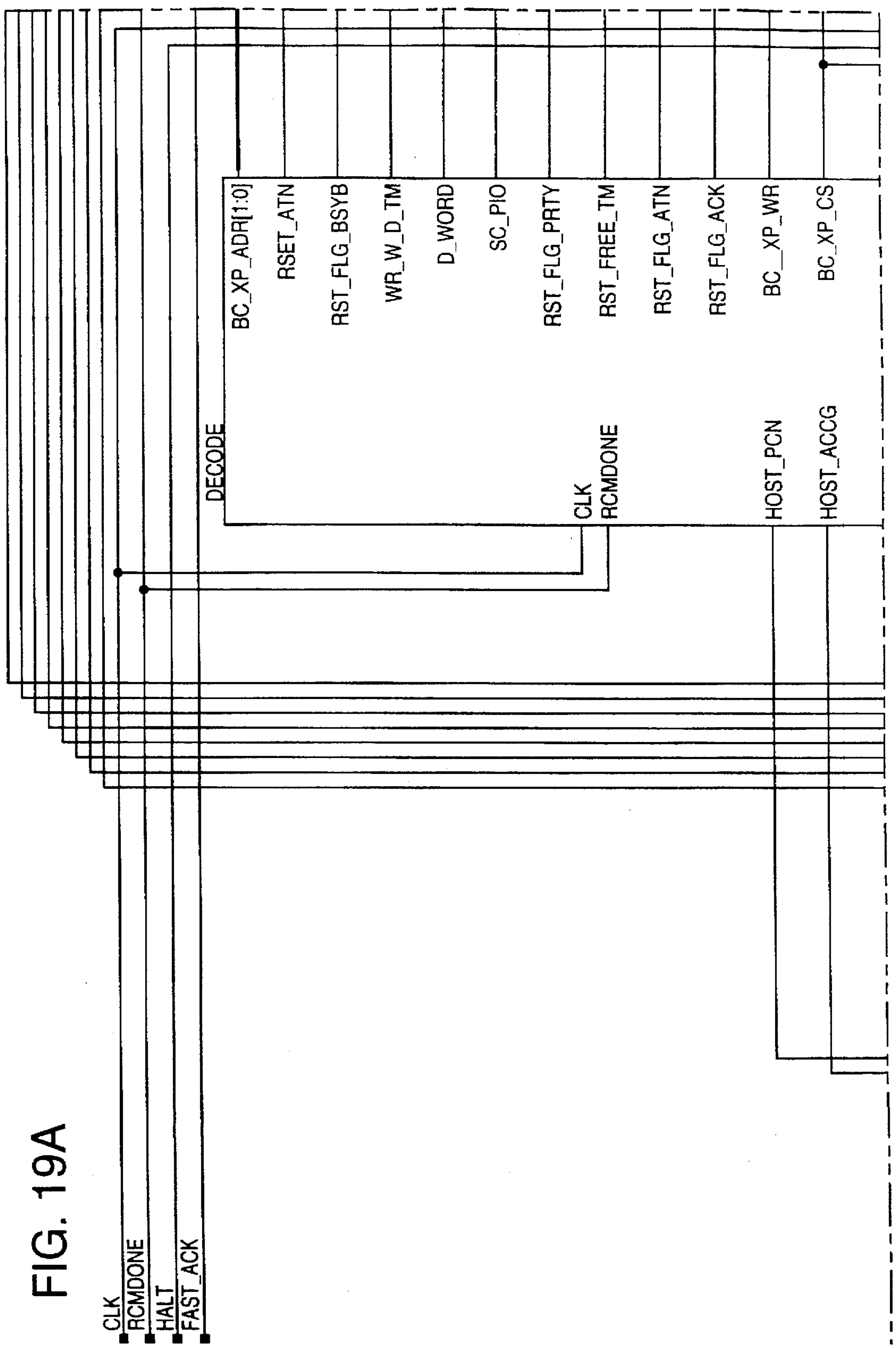
FIGS. 19–25 show block and circuit diagrams of some of the blocks shown in FIGS. 9–18.
Figure 19B:
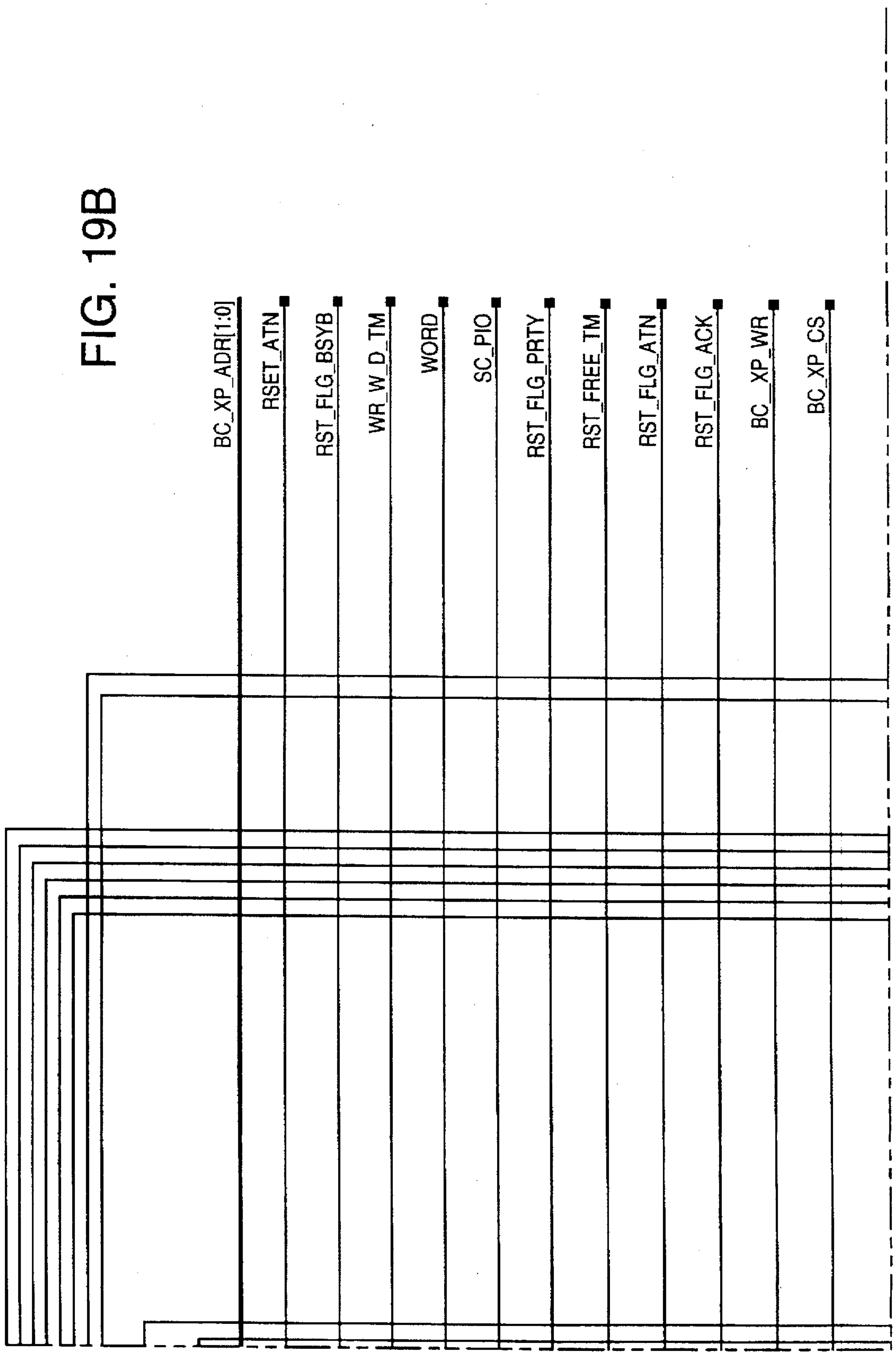
Figure 19C:
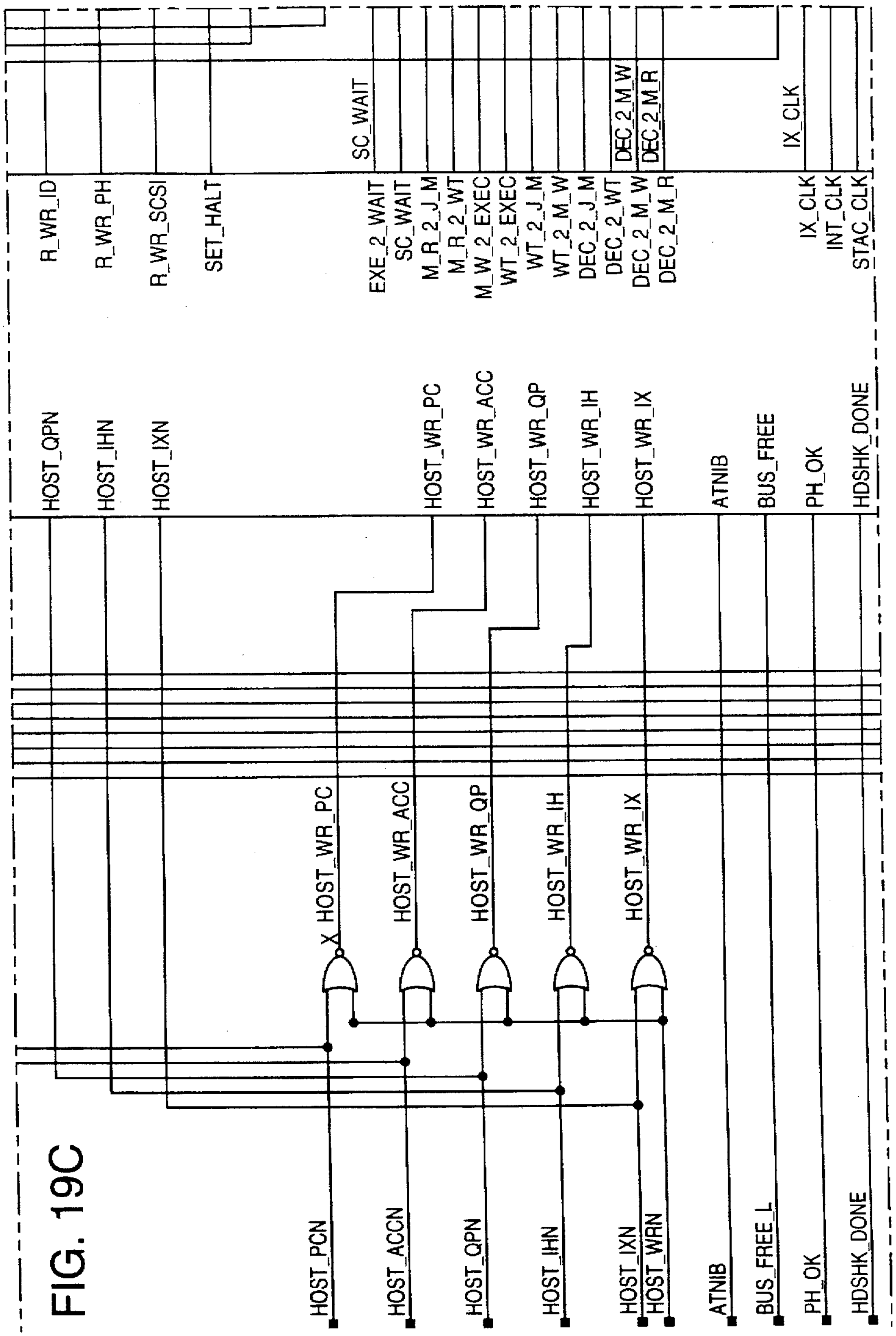
Figure 19D:
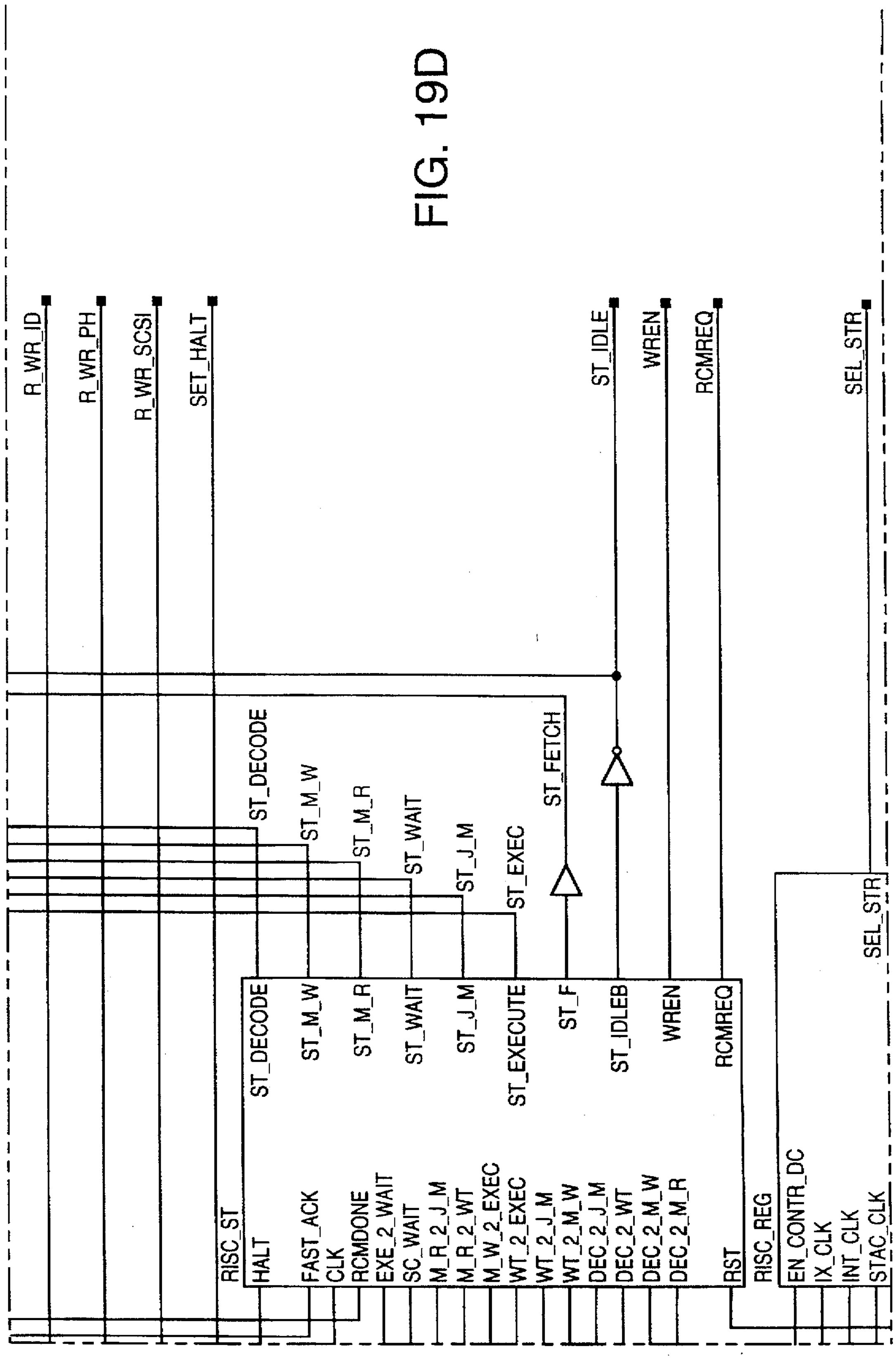
Figure 19E:
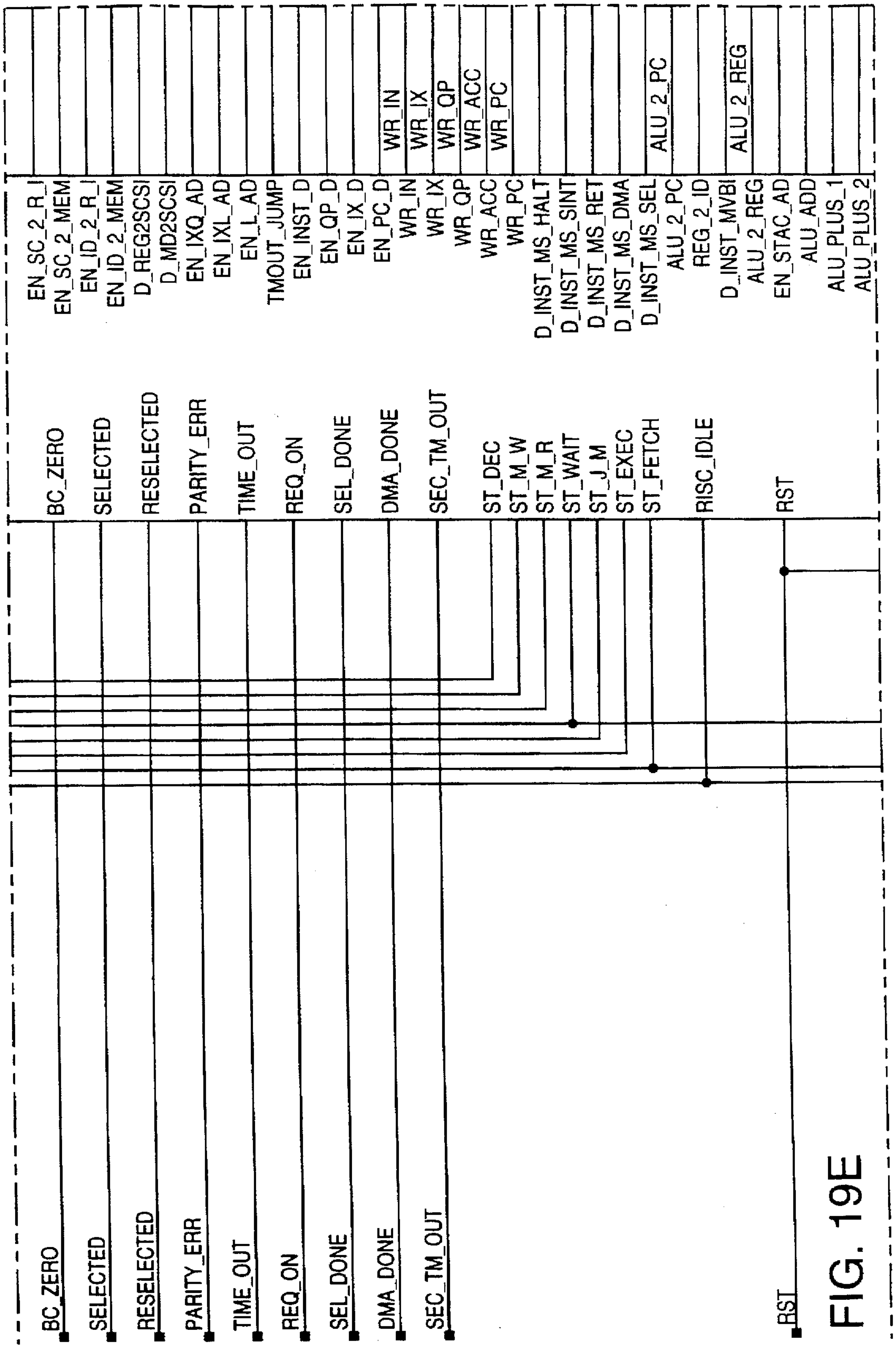
Figure 19F:
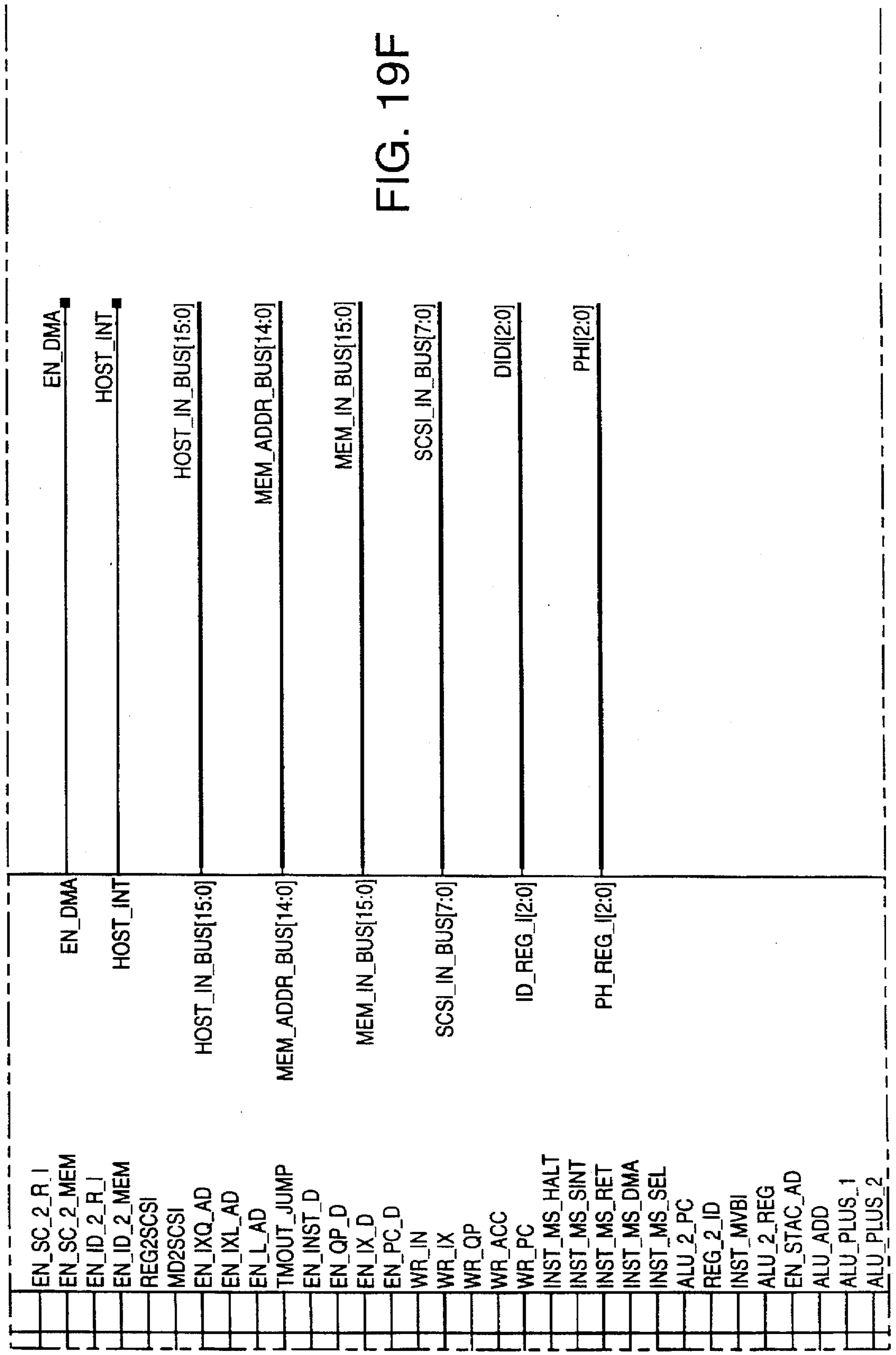
Figure 19G:
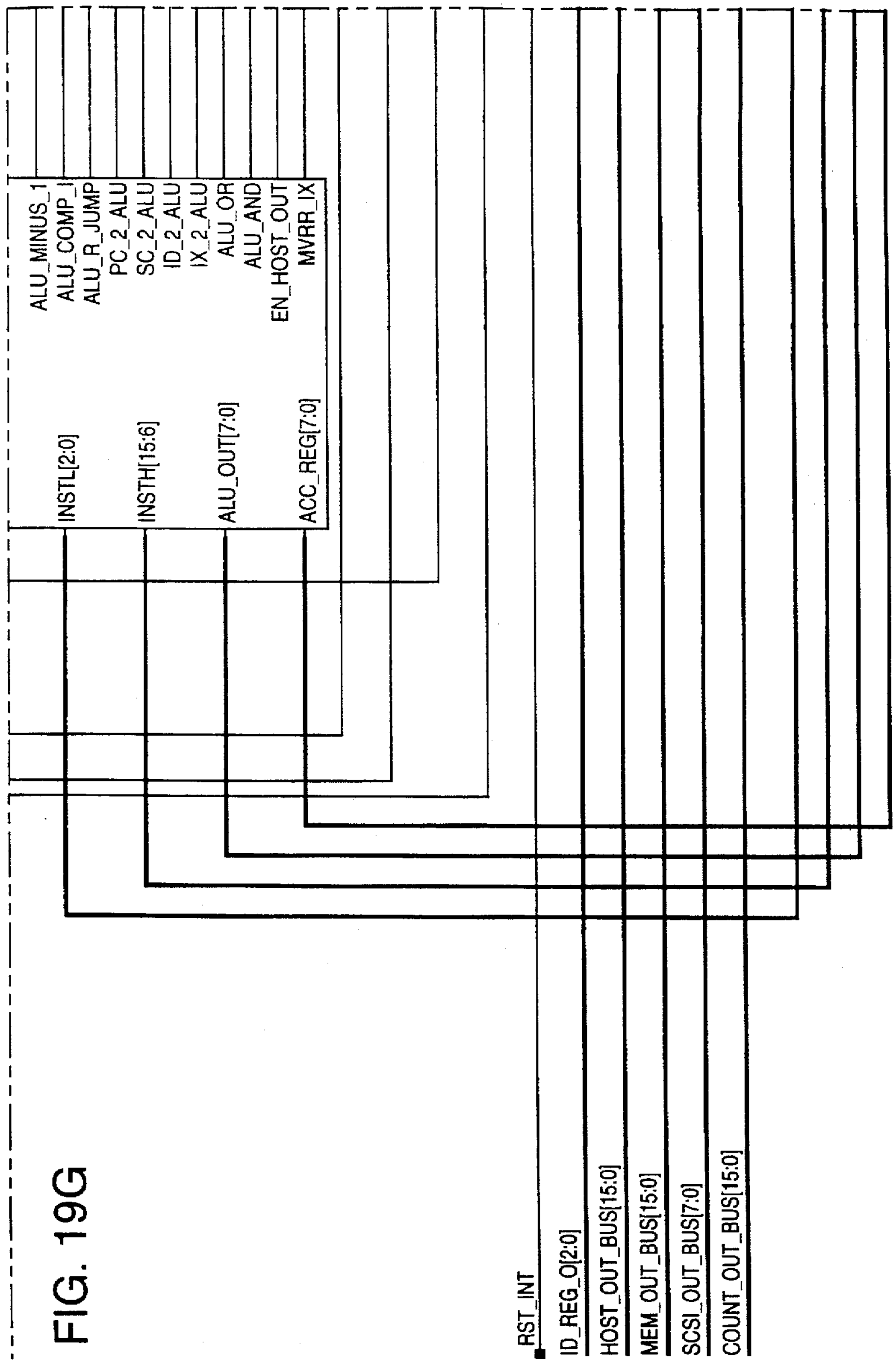
Figure 19H:
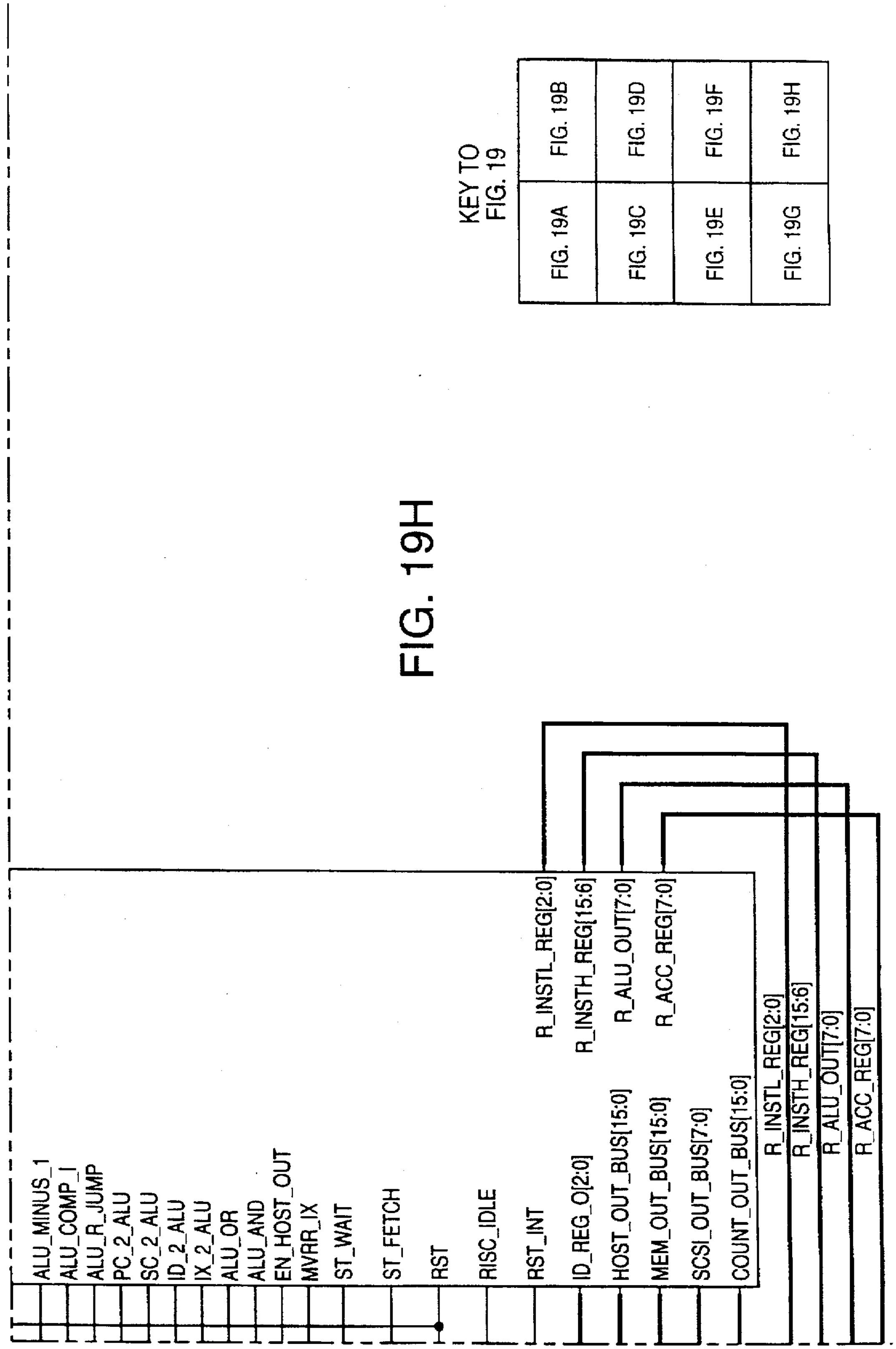
Figure 20A:
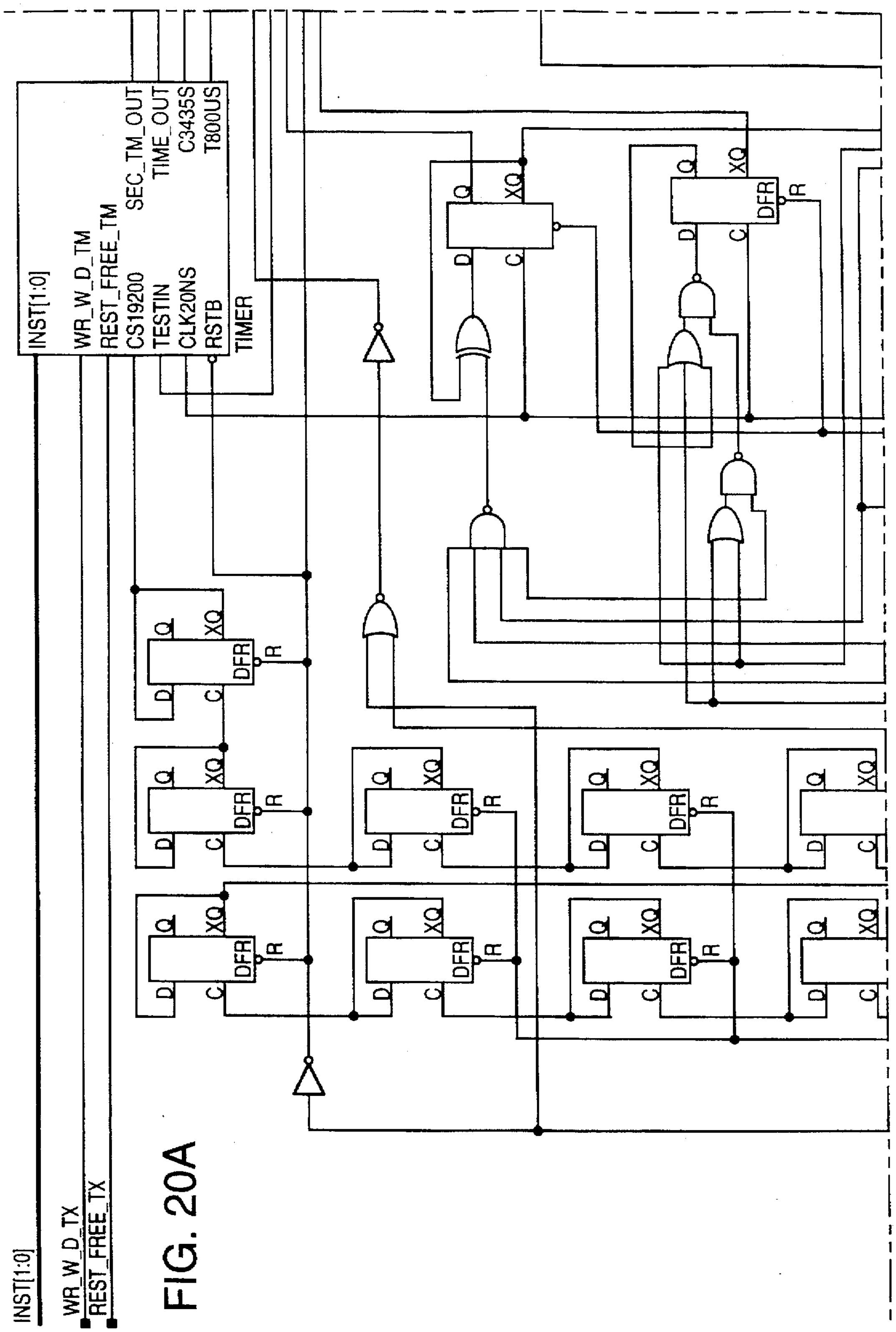
Figure 20B:
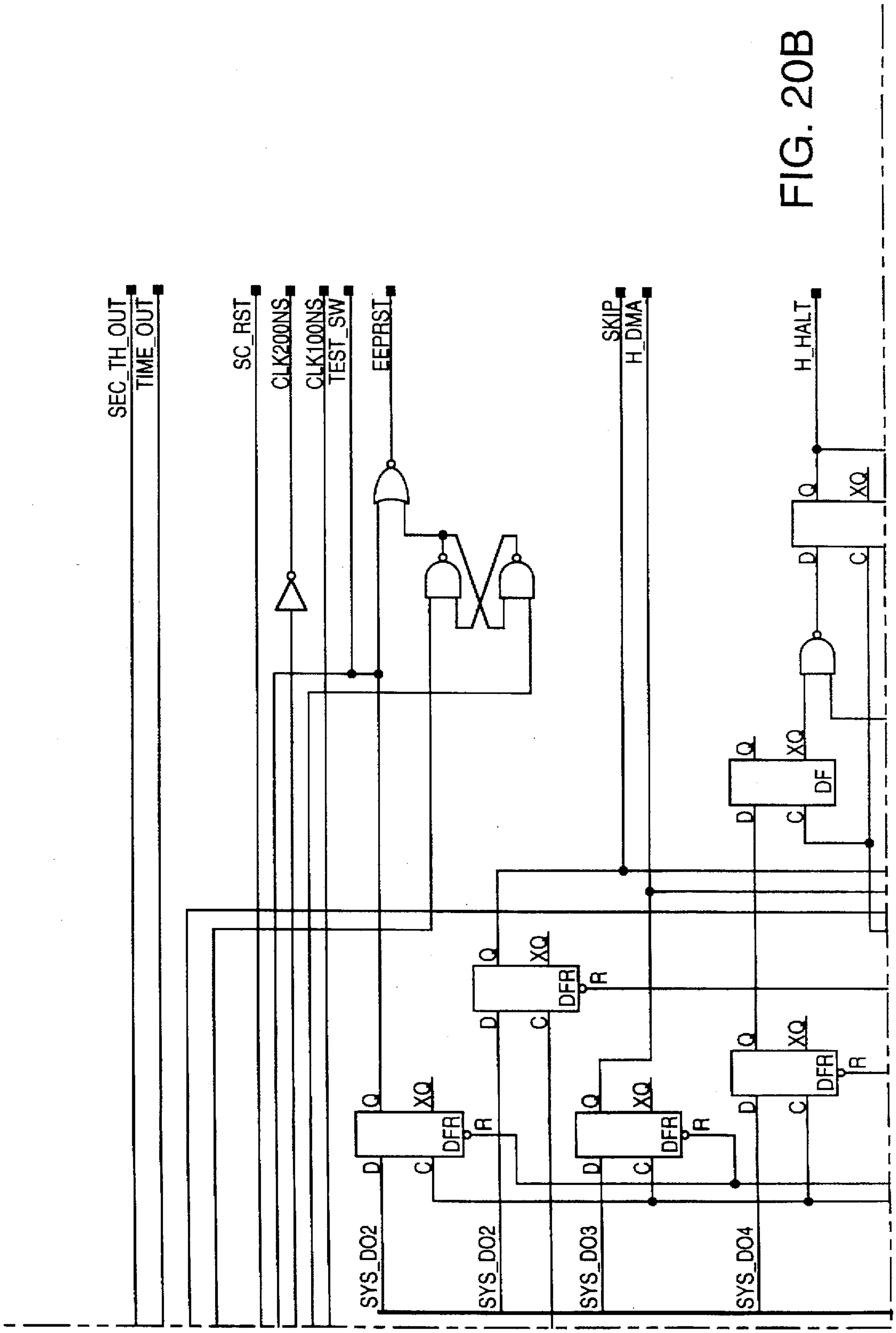
Figure 20C:
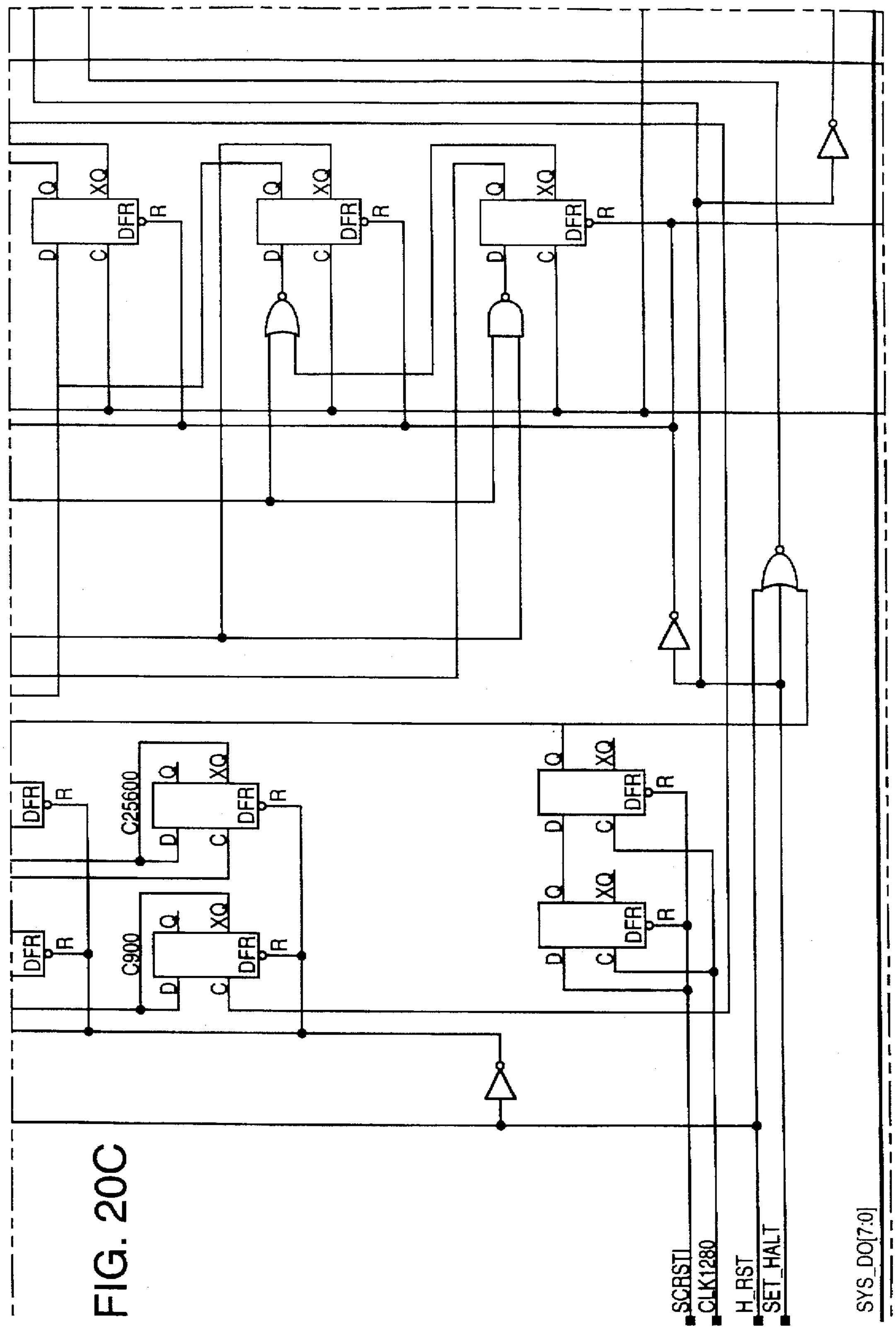
Figure 20D:
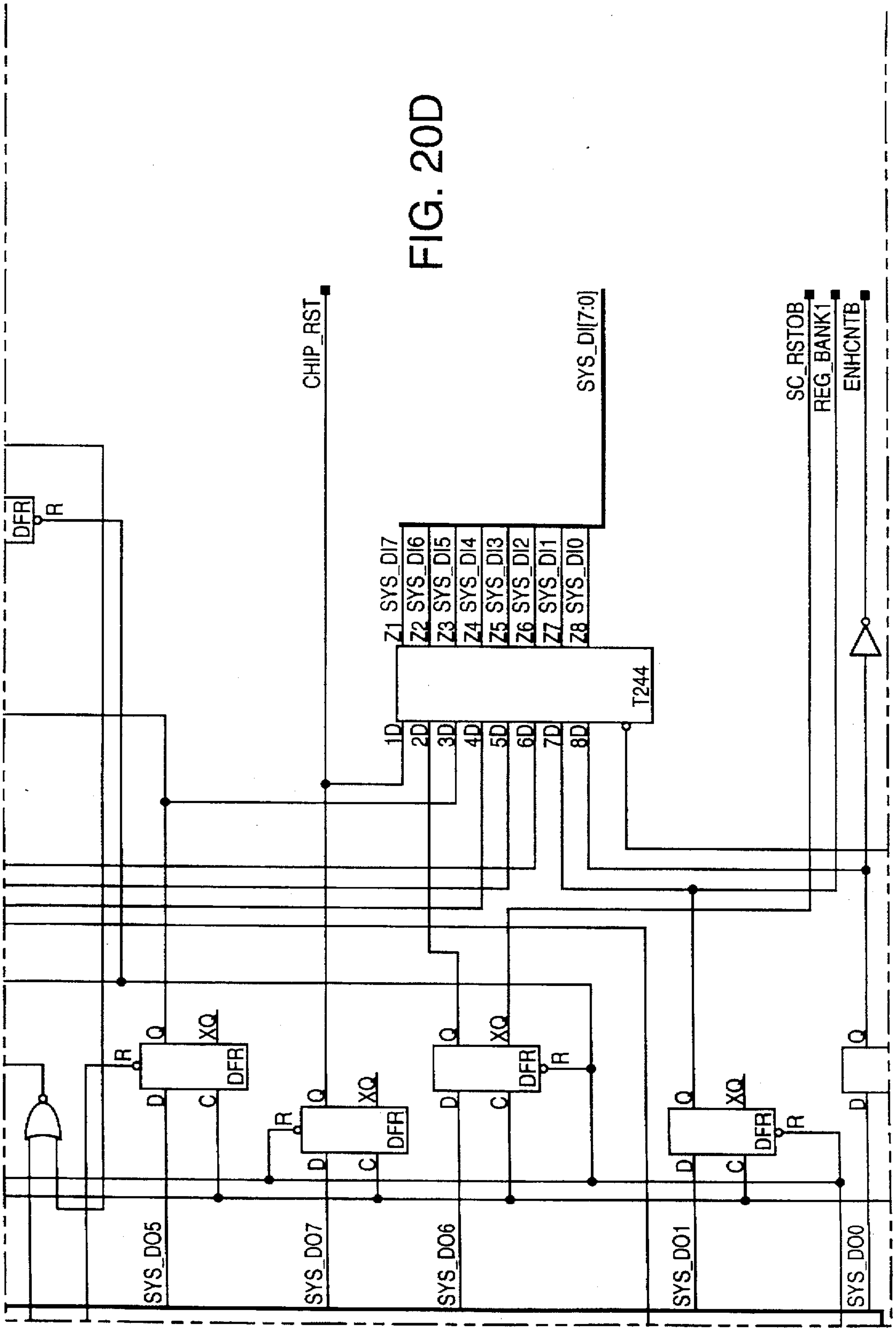
Figure 20E:
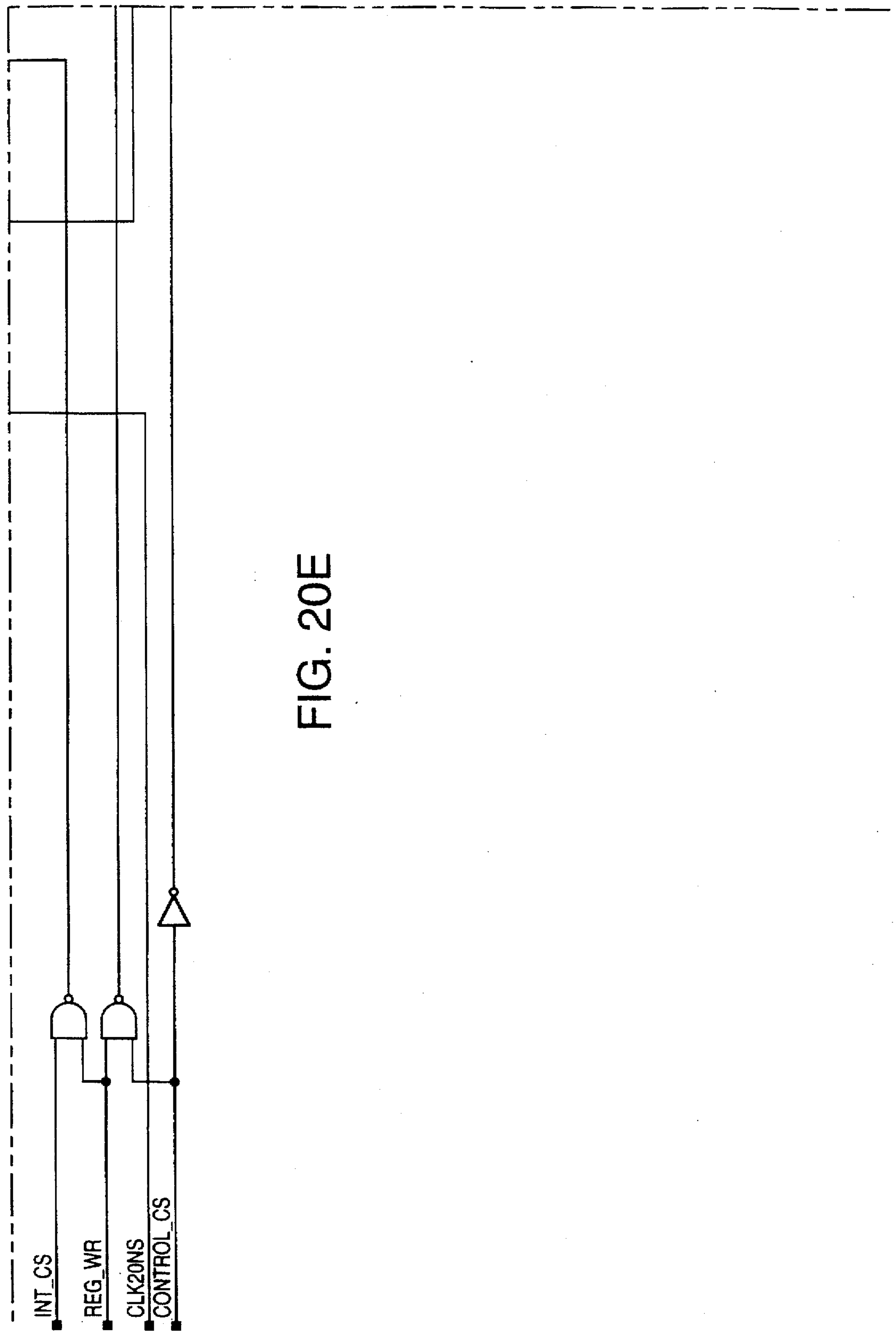
Figure 20F:
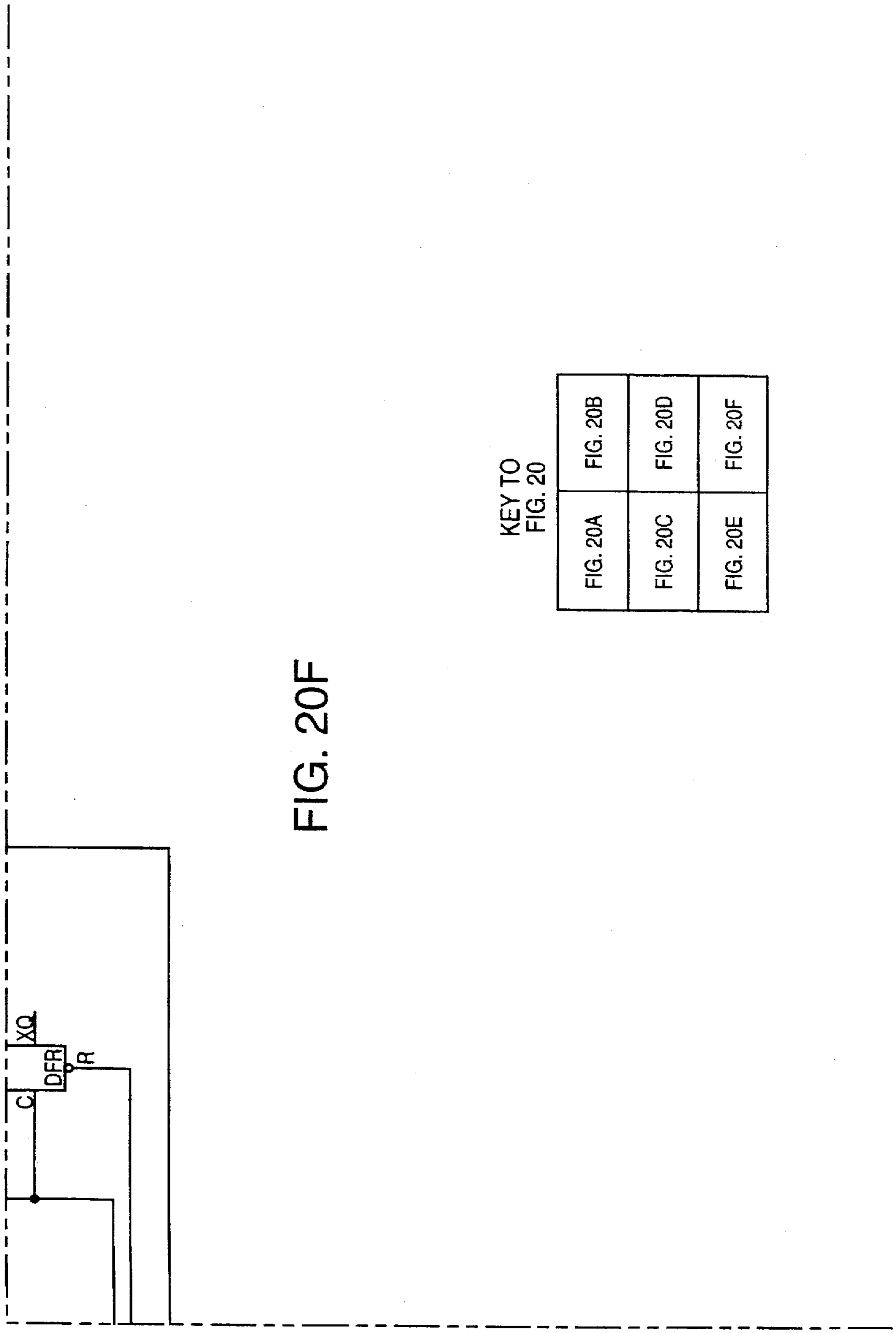
Figure 21A:
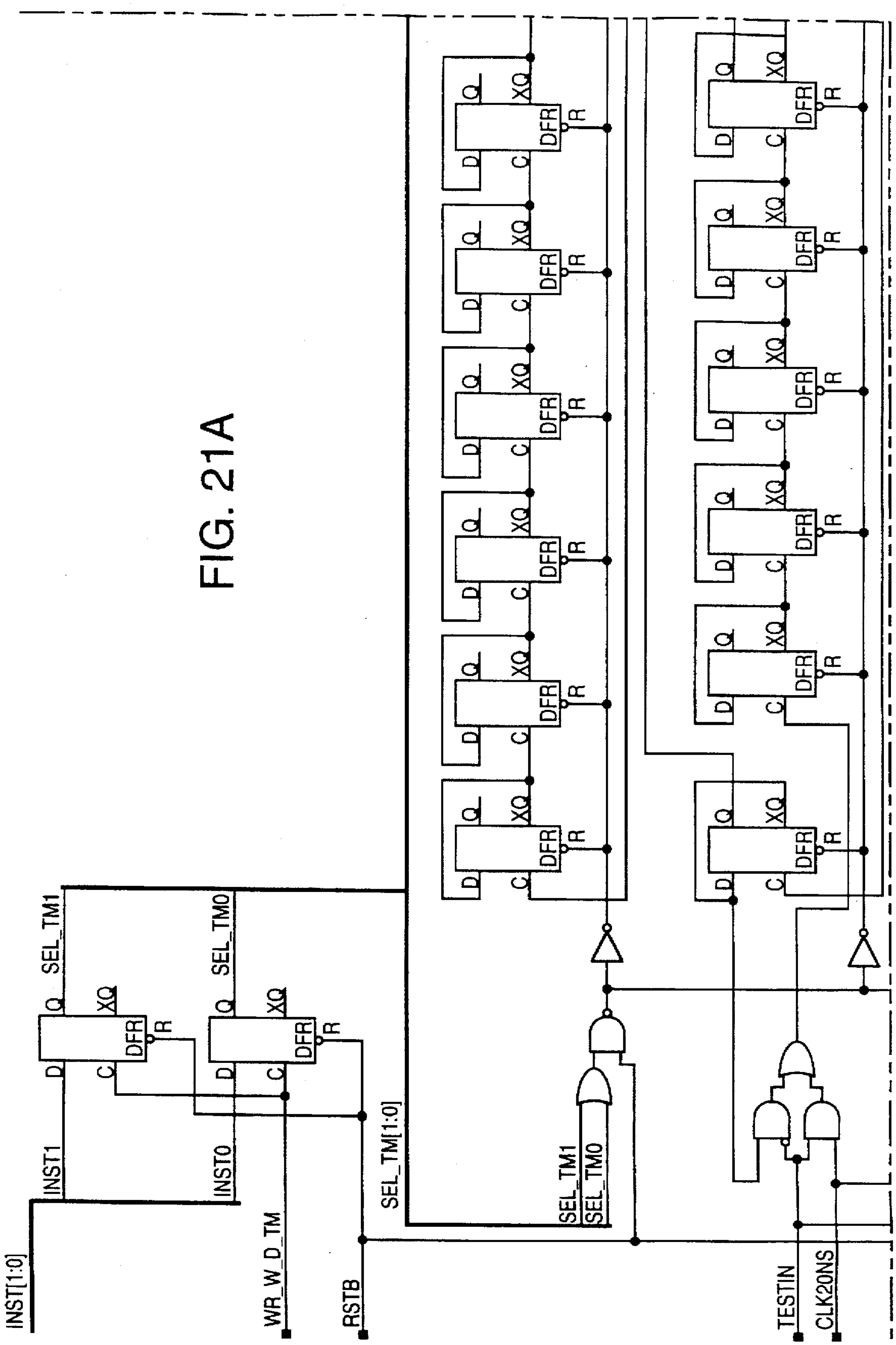
Figure 21B:
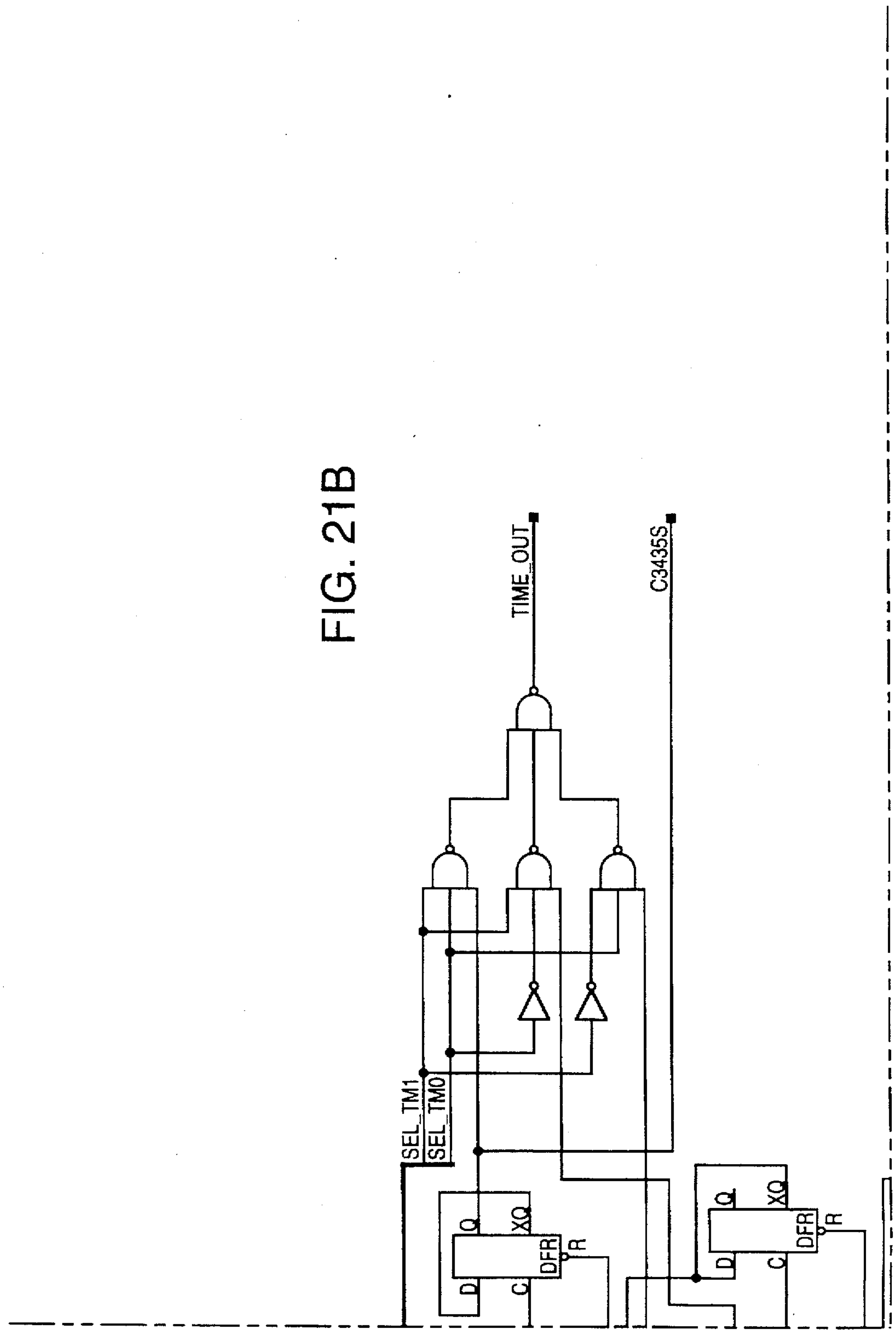
Figure 21C:
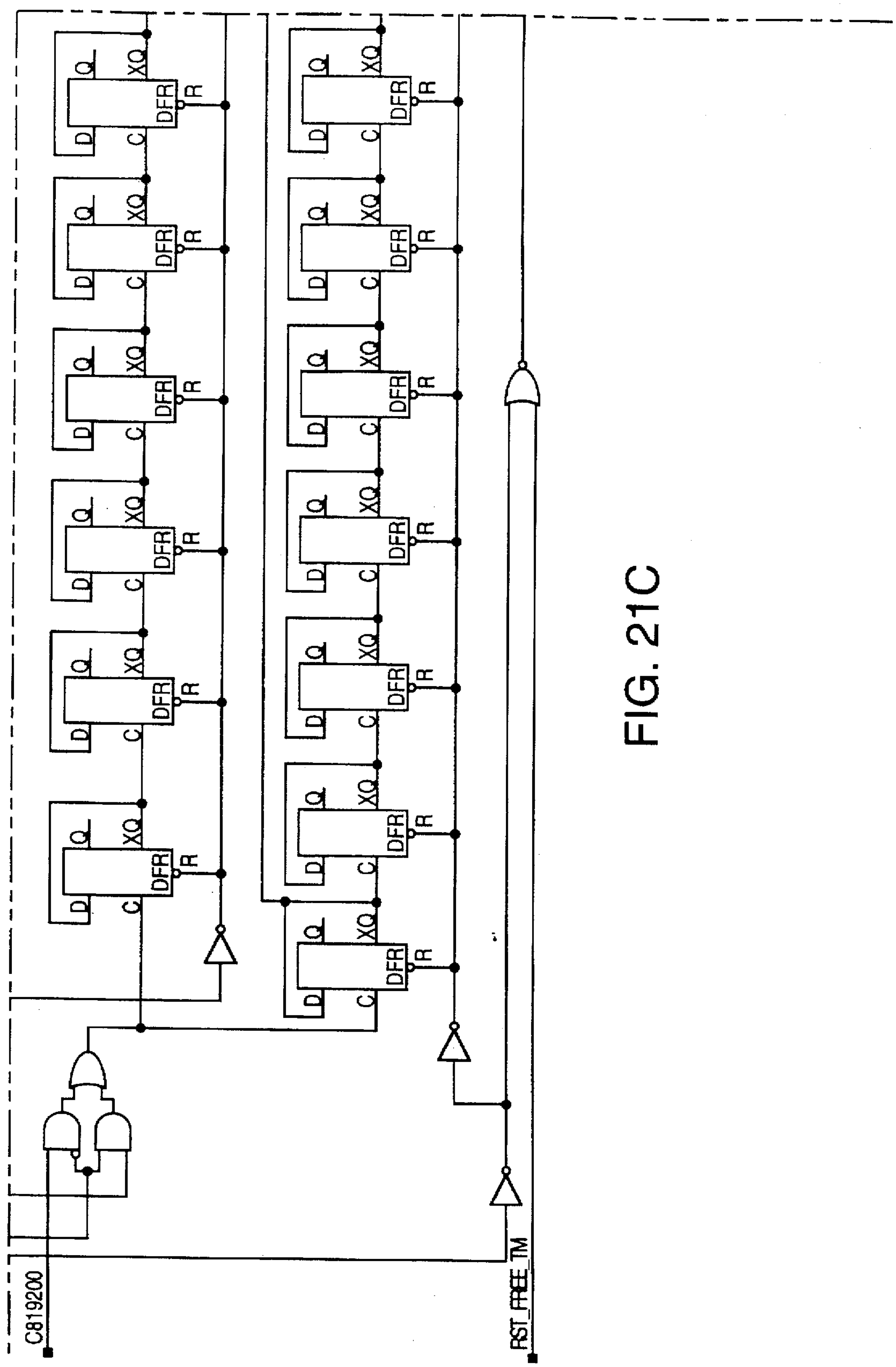
Figure 21D:
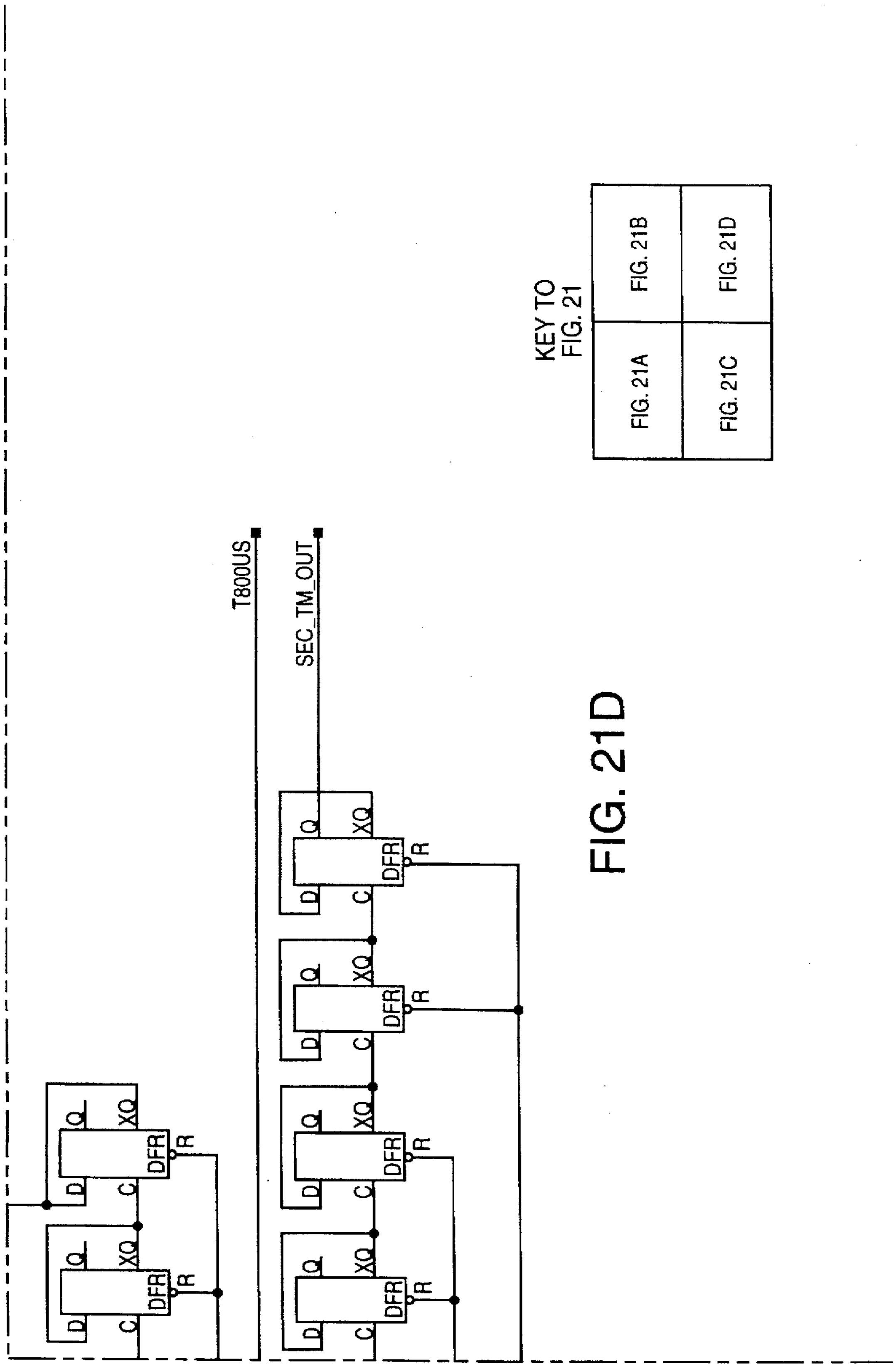
Figure 22A:
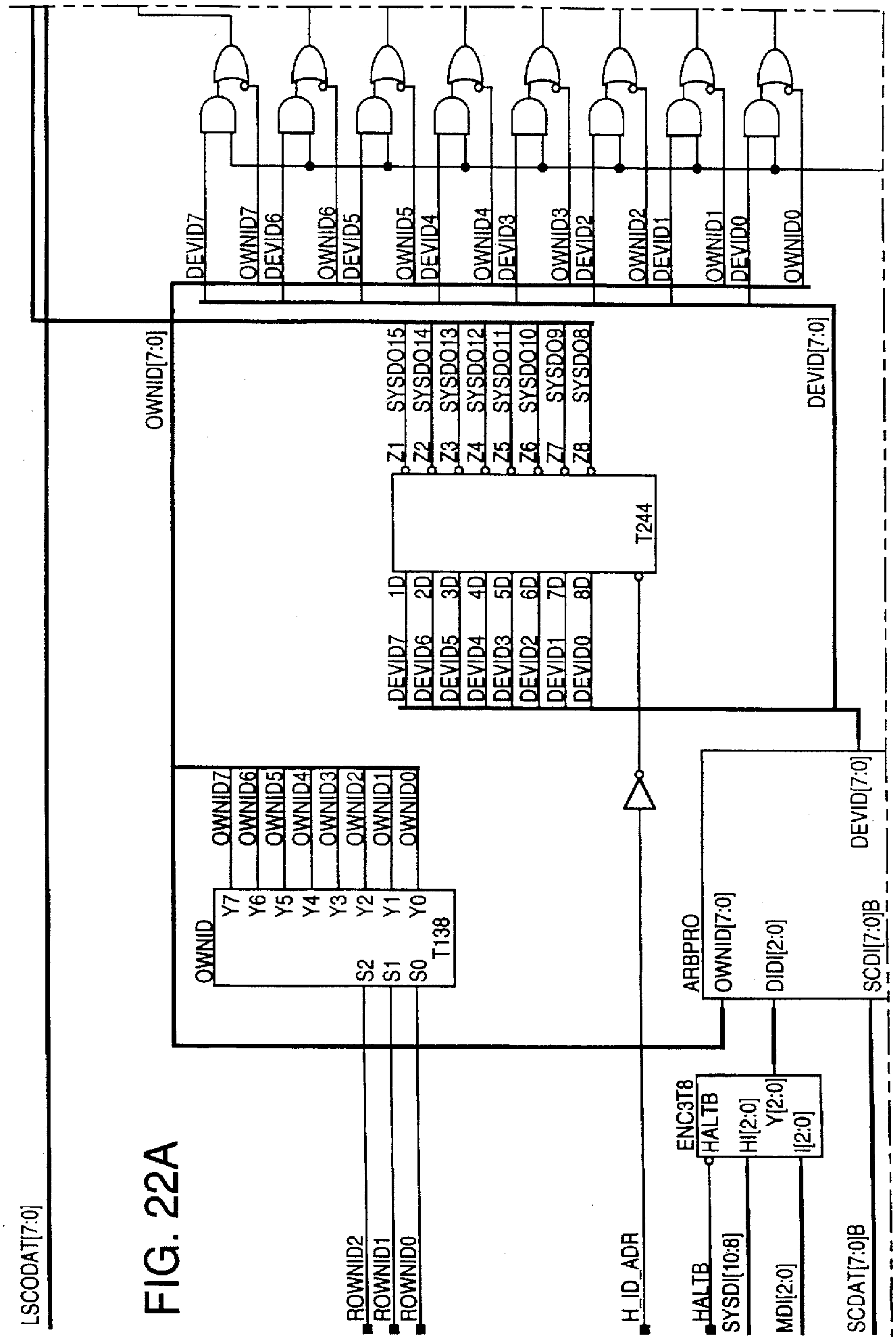
Figure 22B:
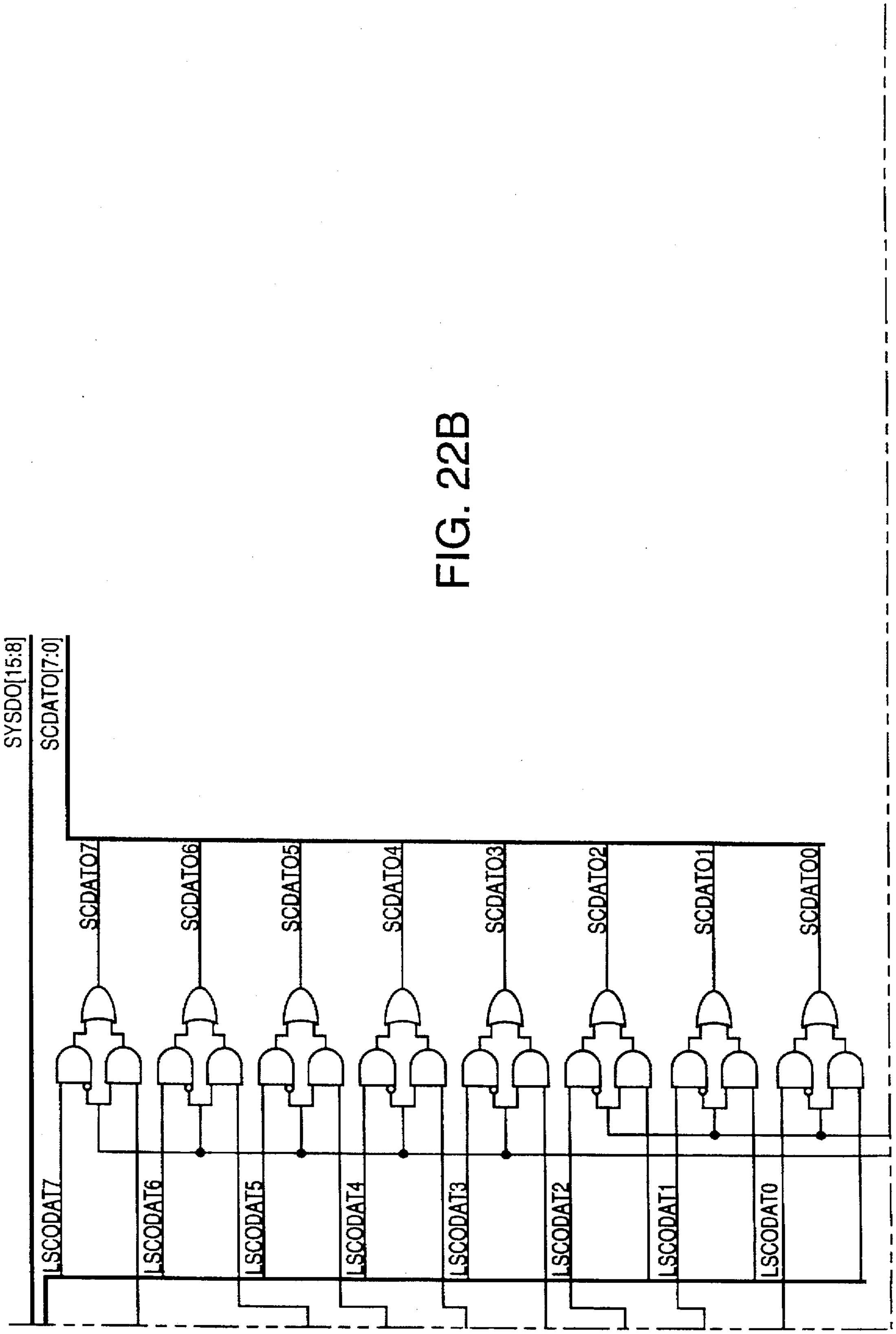
Figure 22C:
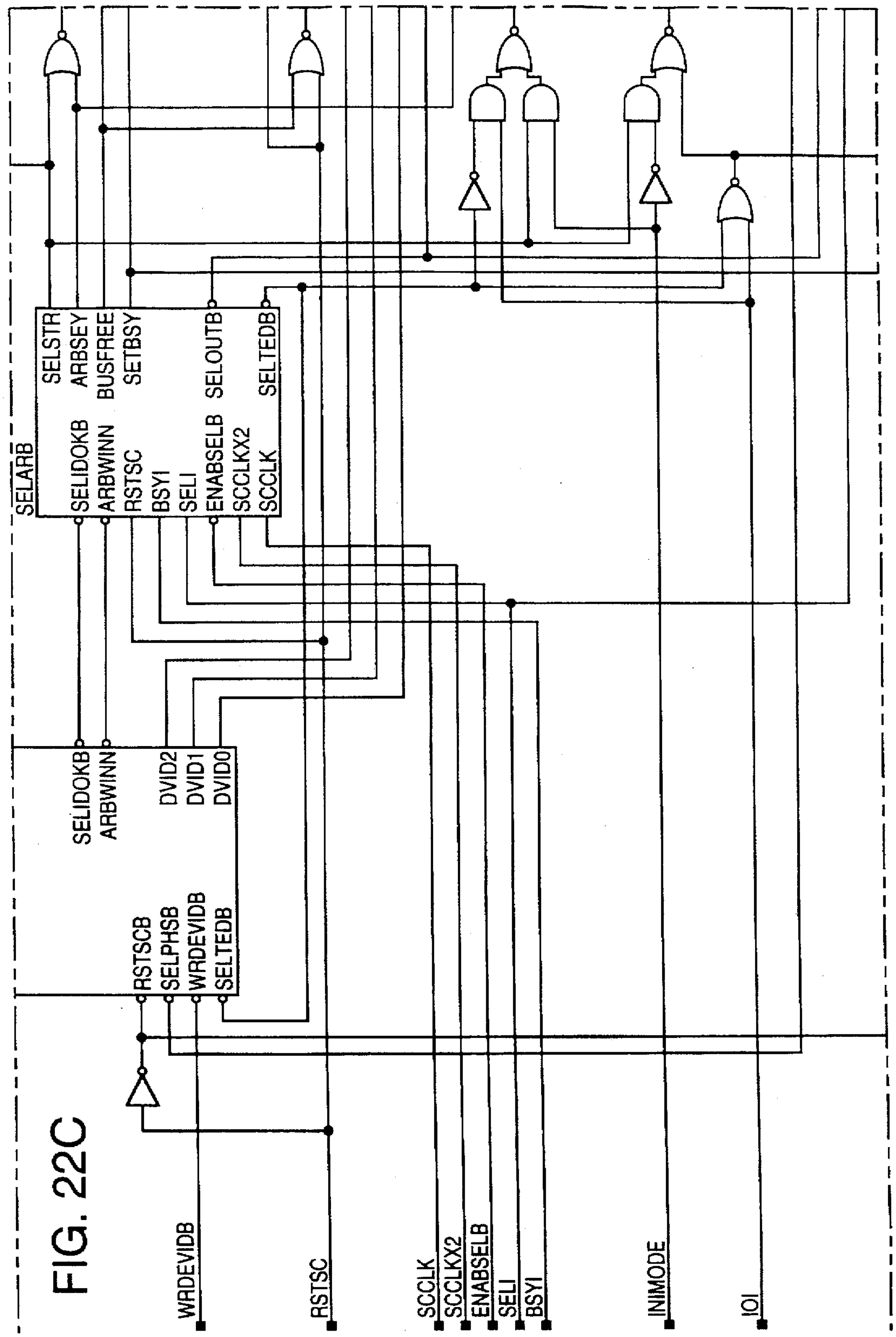
Figure 22D:
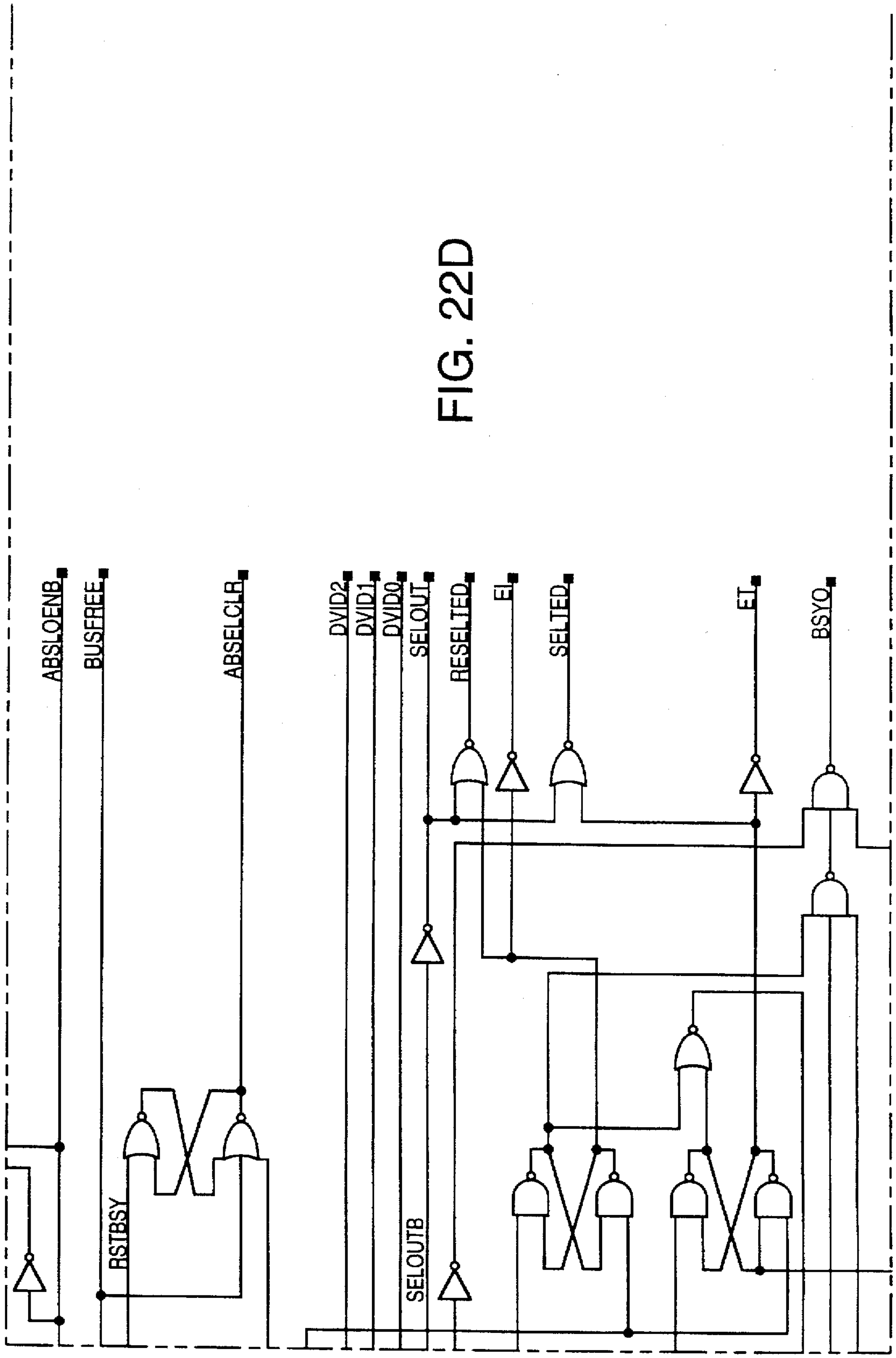
Figure 22E:
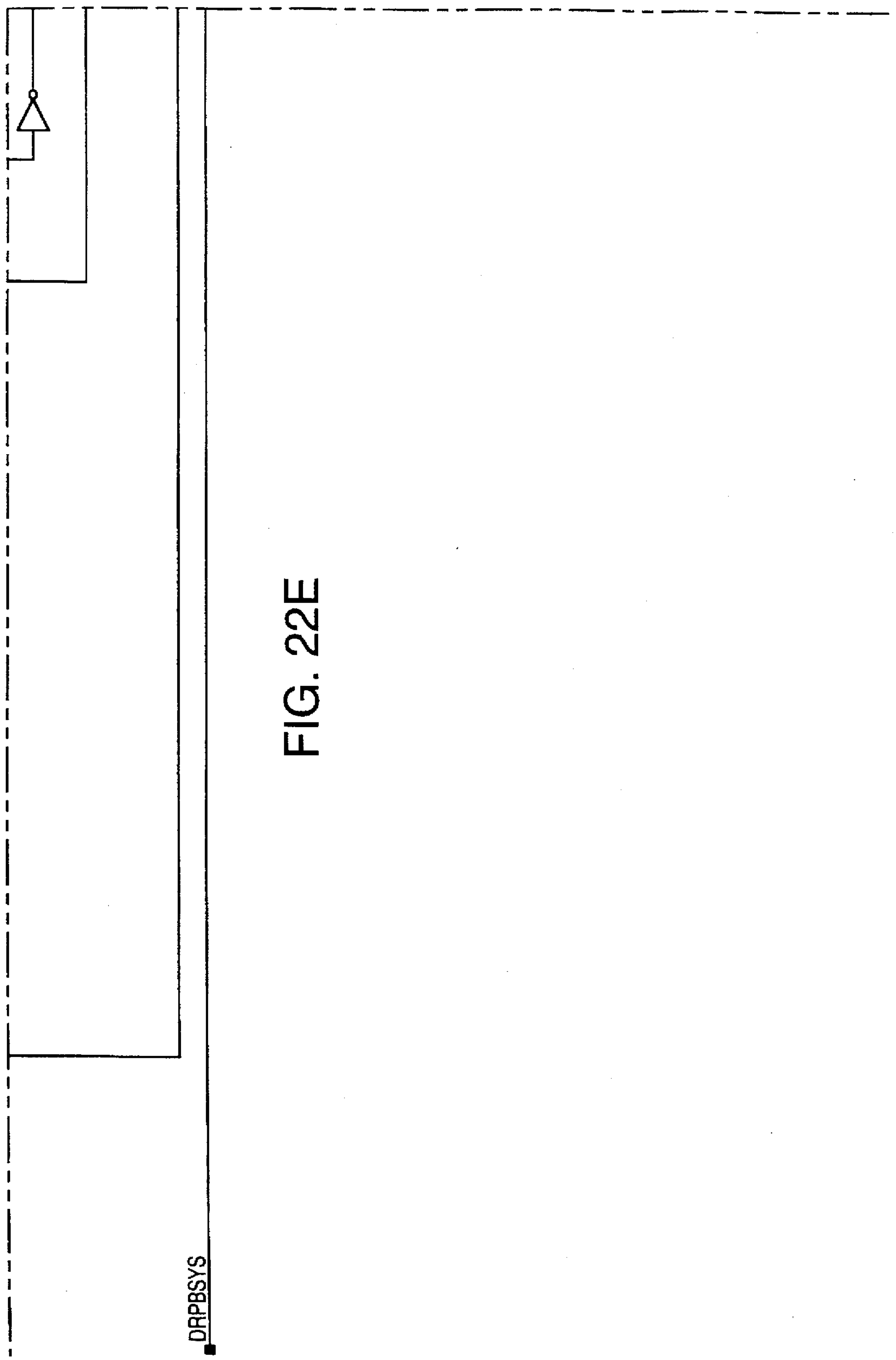
Figure 22F:
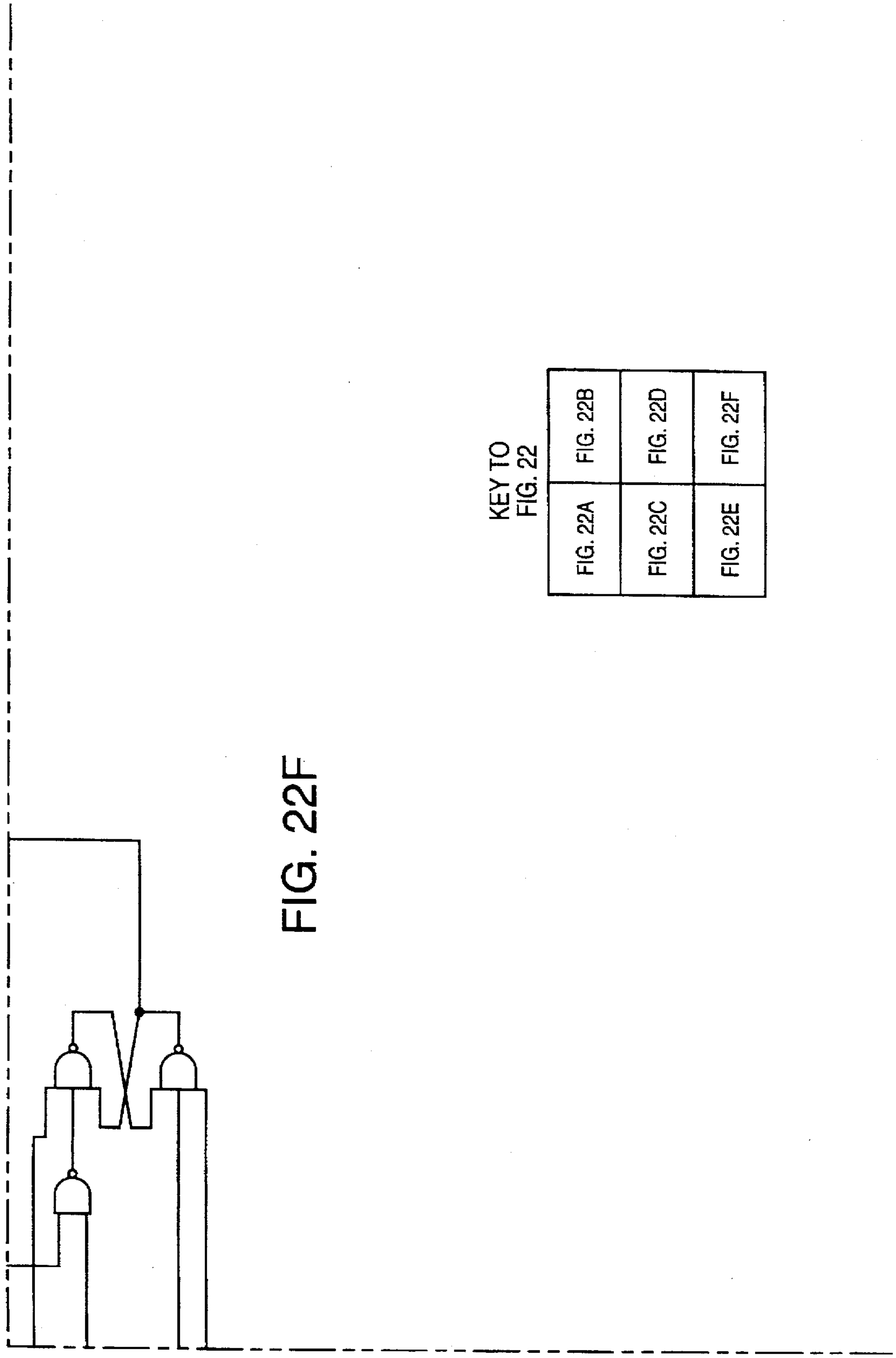

FIG. 14 shows blocks representing a host bus interface BIU and a RISC processor RISC with accompanying logic and lines for signals internal to the controller chip SEAL_1. Block A139 is a standard 2-to -4 decoder with identification number A139 from "SLA1000 Series Gate Array Family Cell Library" available from S-MOS Systems, Inc. (the S-MOS library). Block 910 is a 32-bit enable which enables or disable signals to internal data bus SYSDI.

Figure 9:
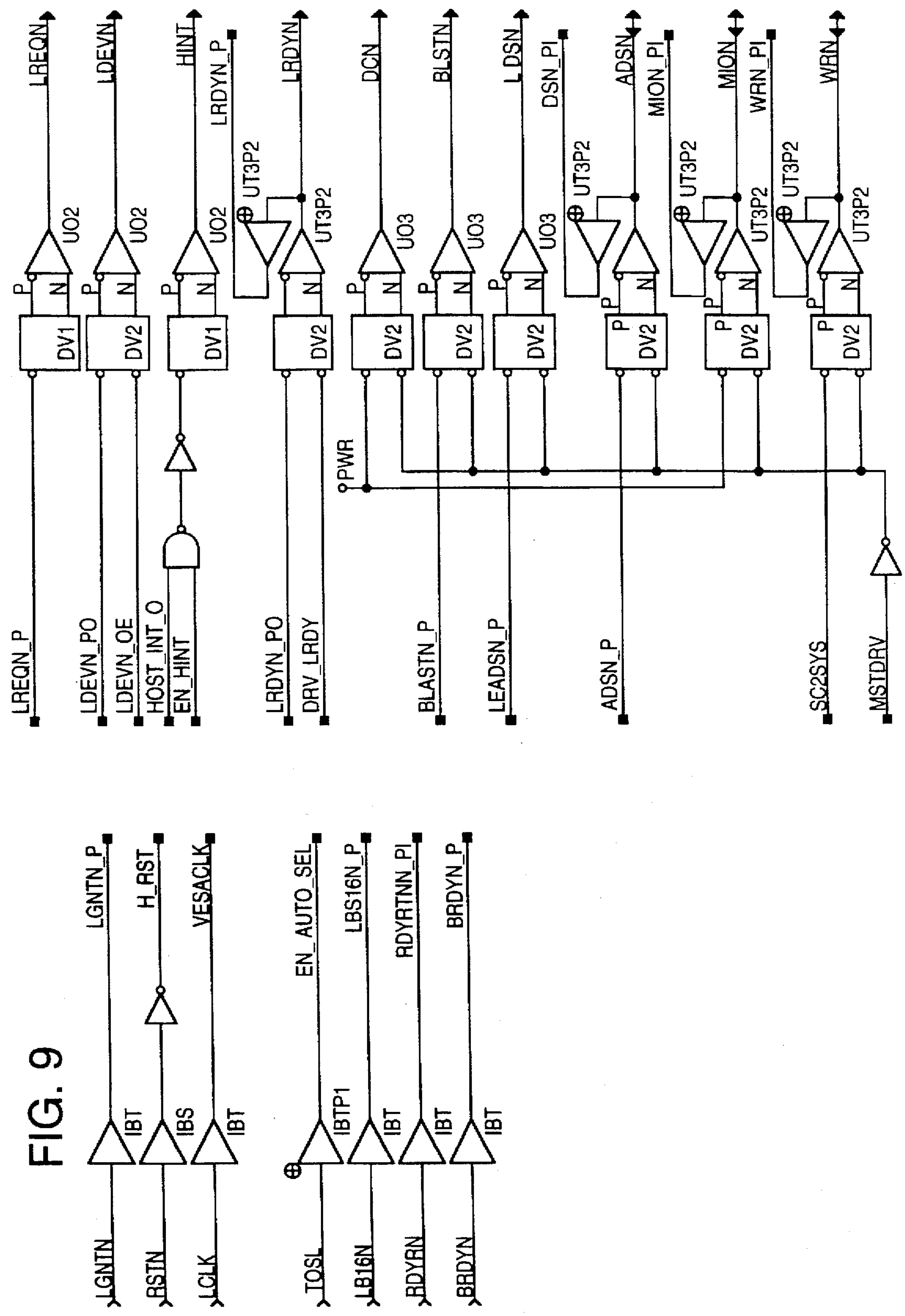
FIGS. 9–18 show block and circuit diagrams for the SCSI controller of FIG. 8.
Figure 11A:
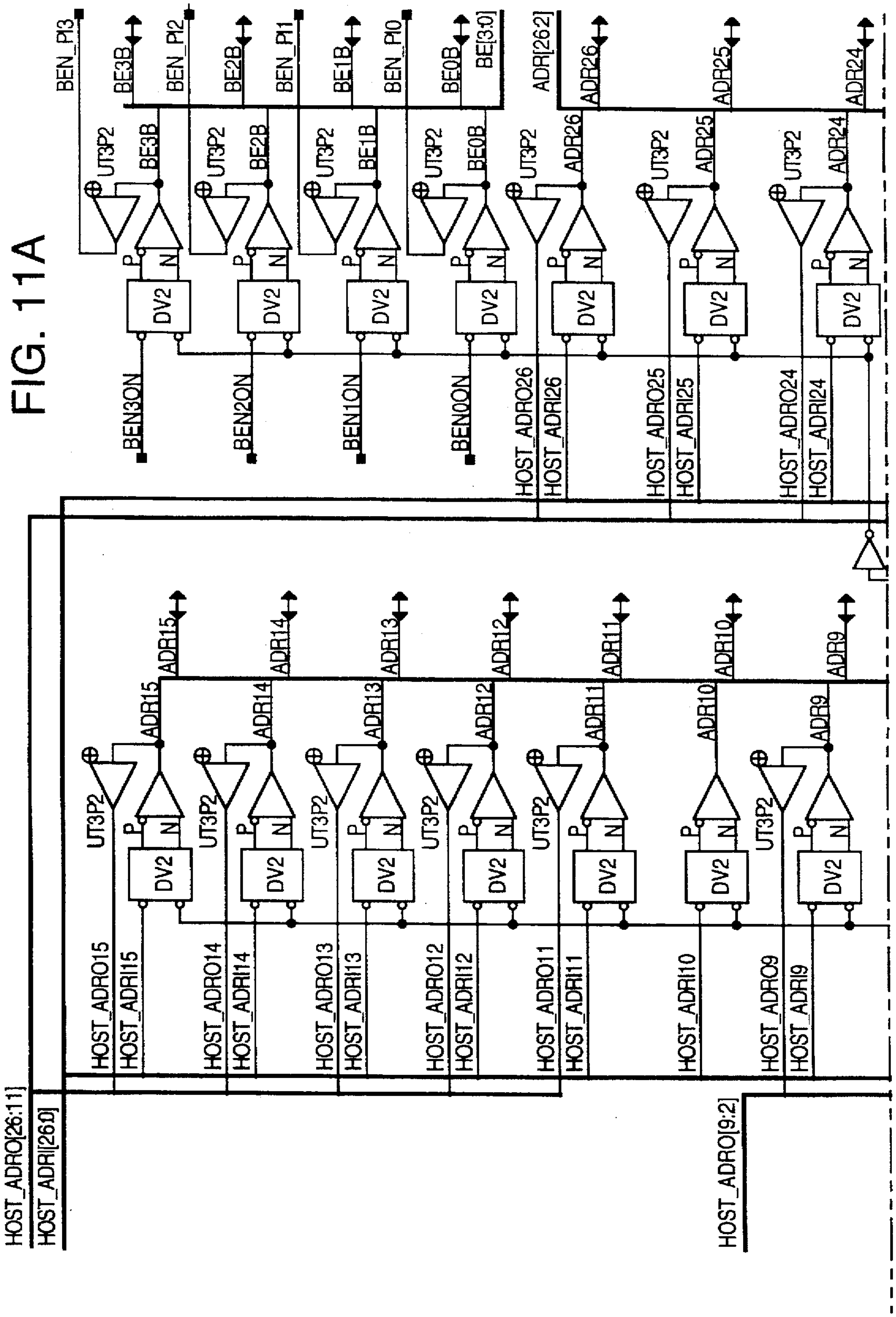
Figure 11B:
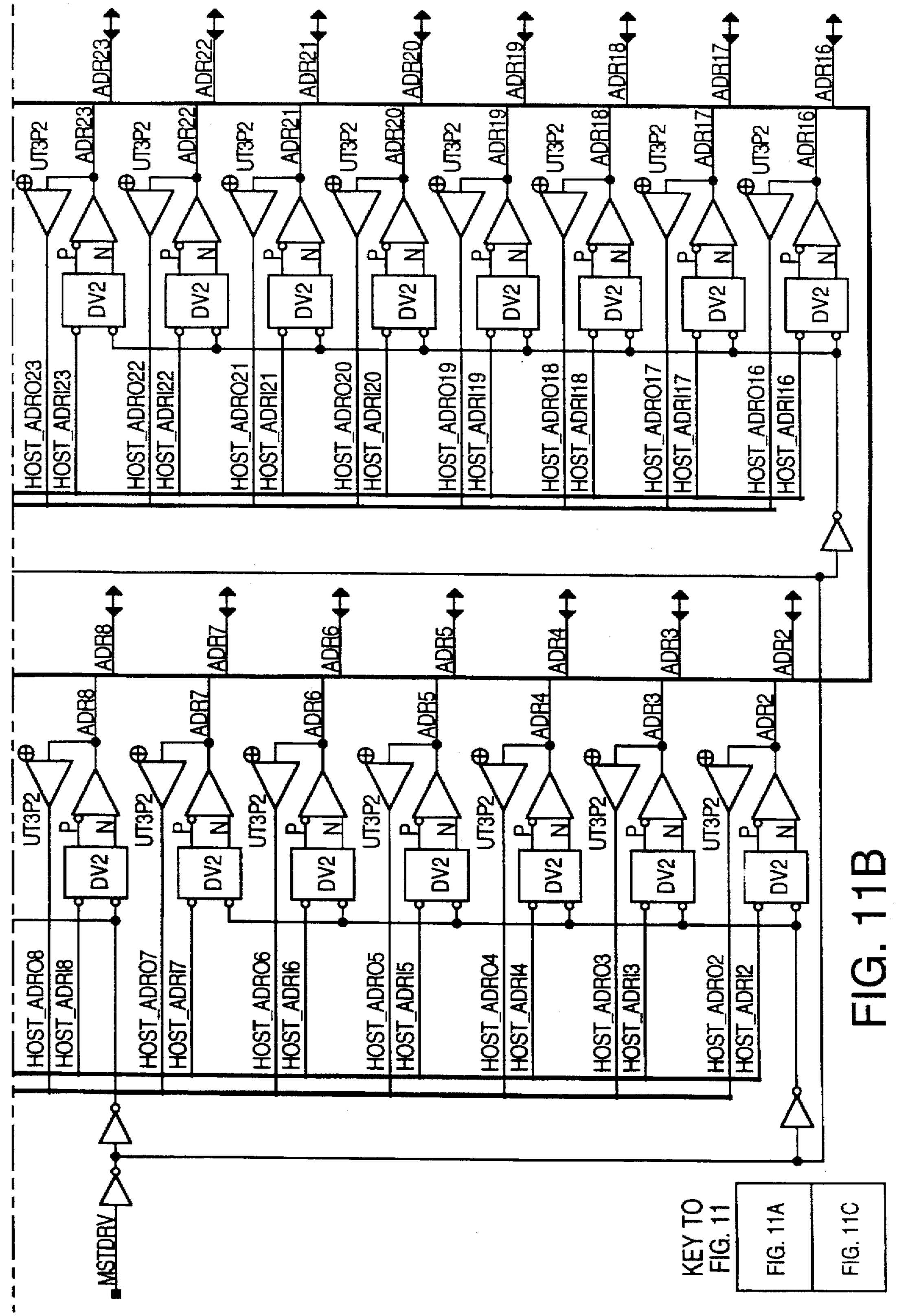
Figure 12A:
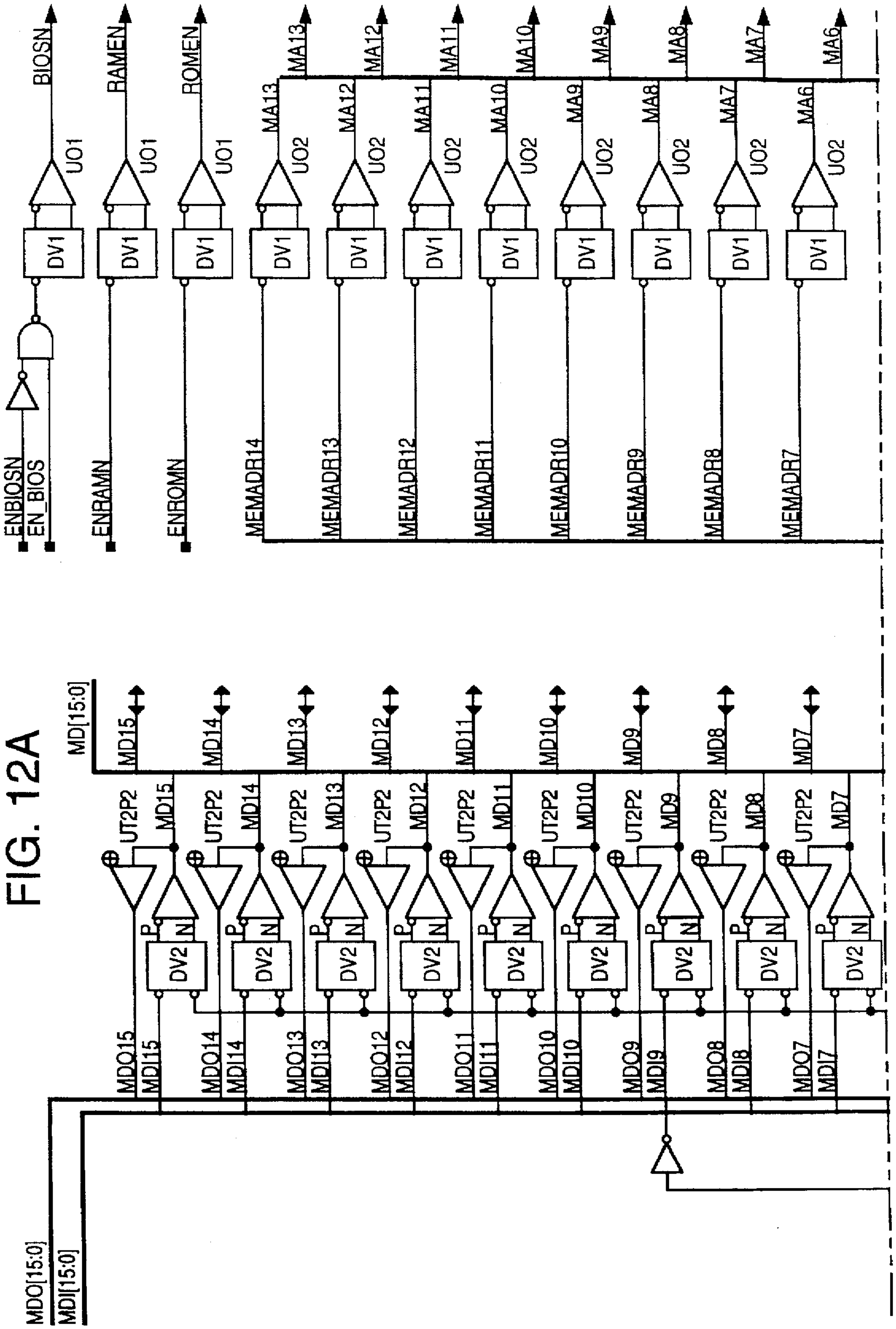
Figure 12B:
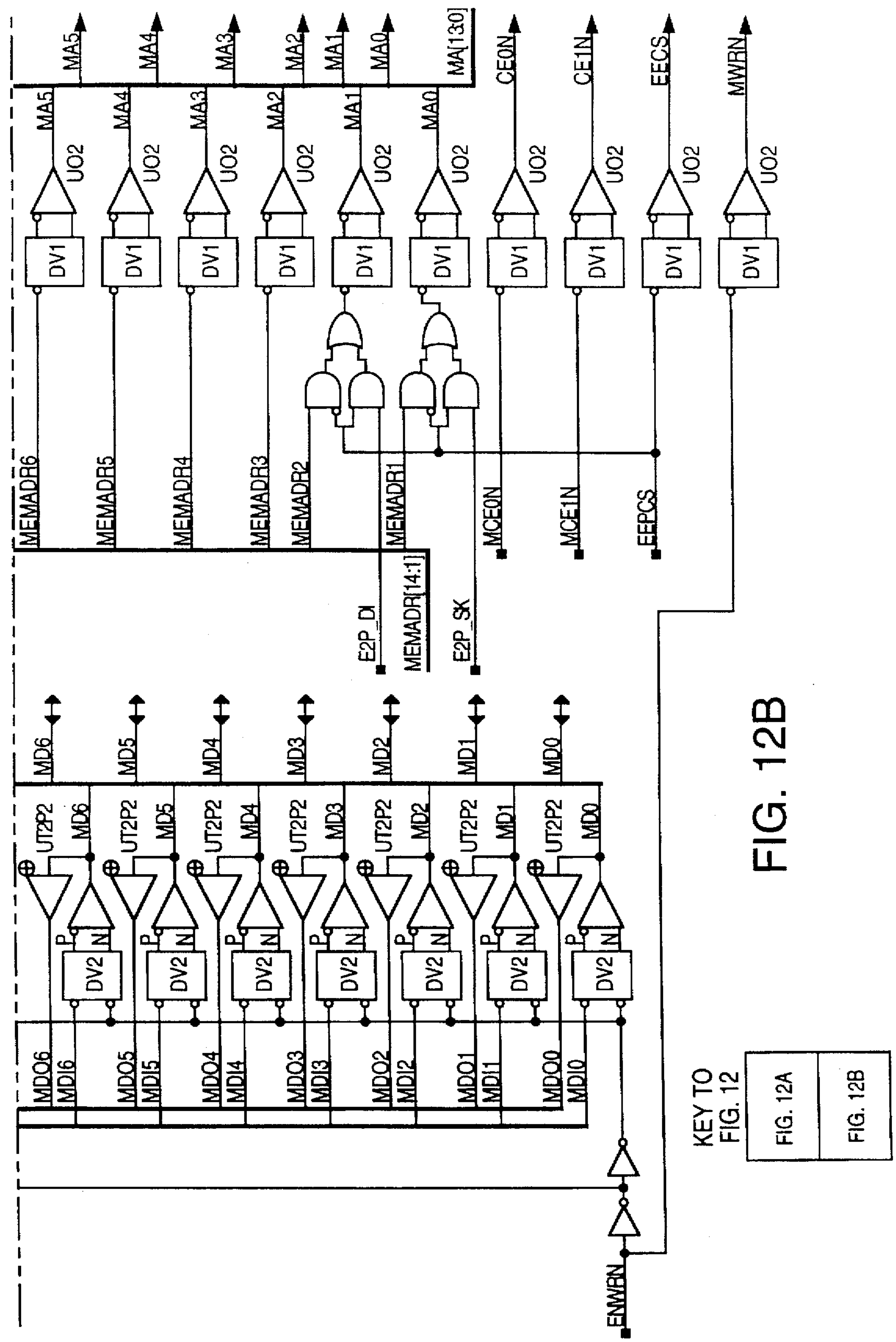
Figure 13A:
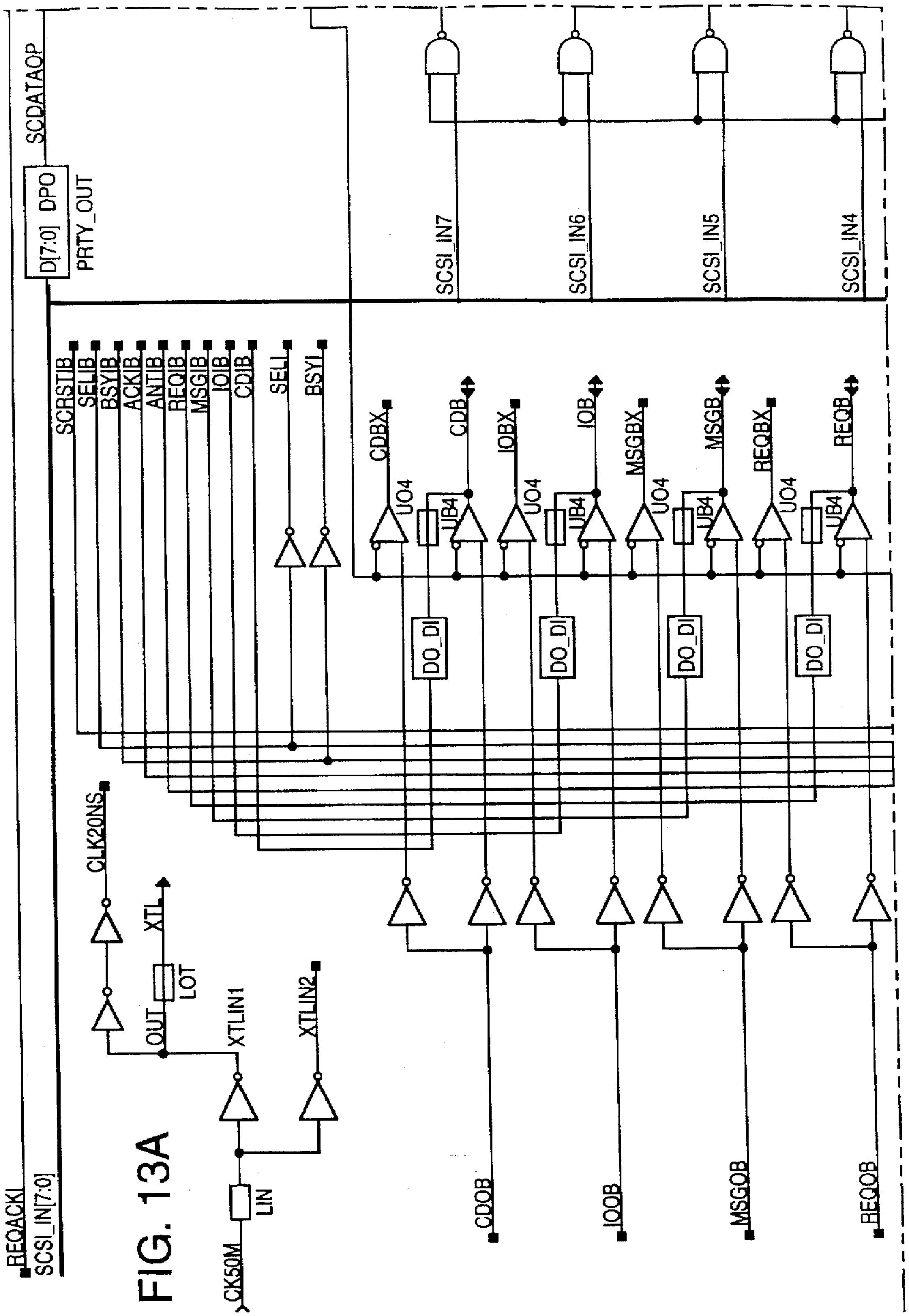
Figure 13B:
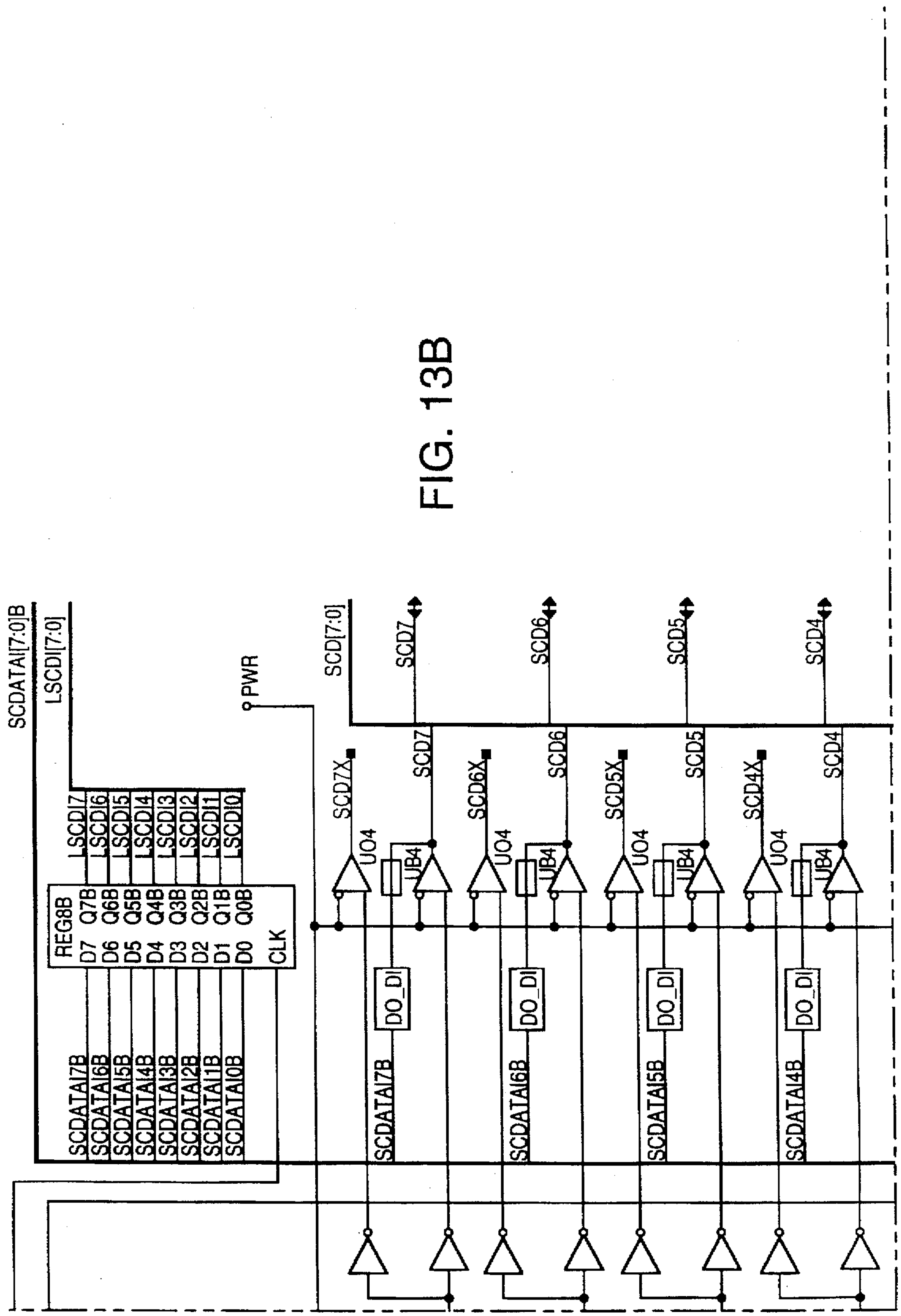
Figure 13C:
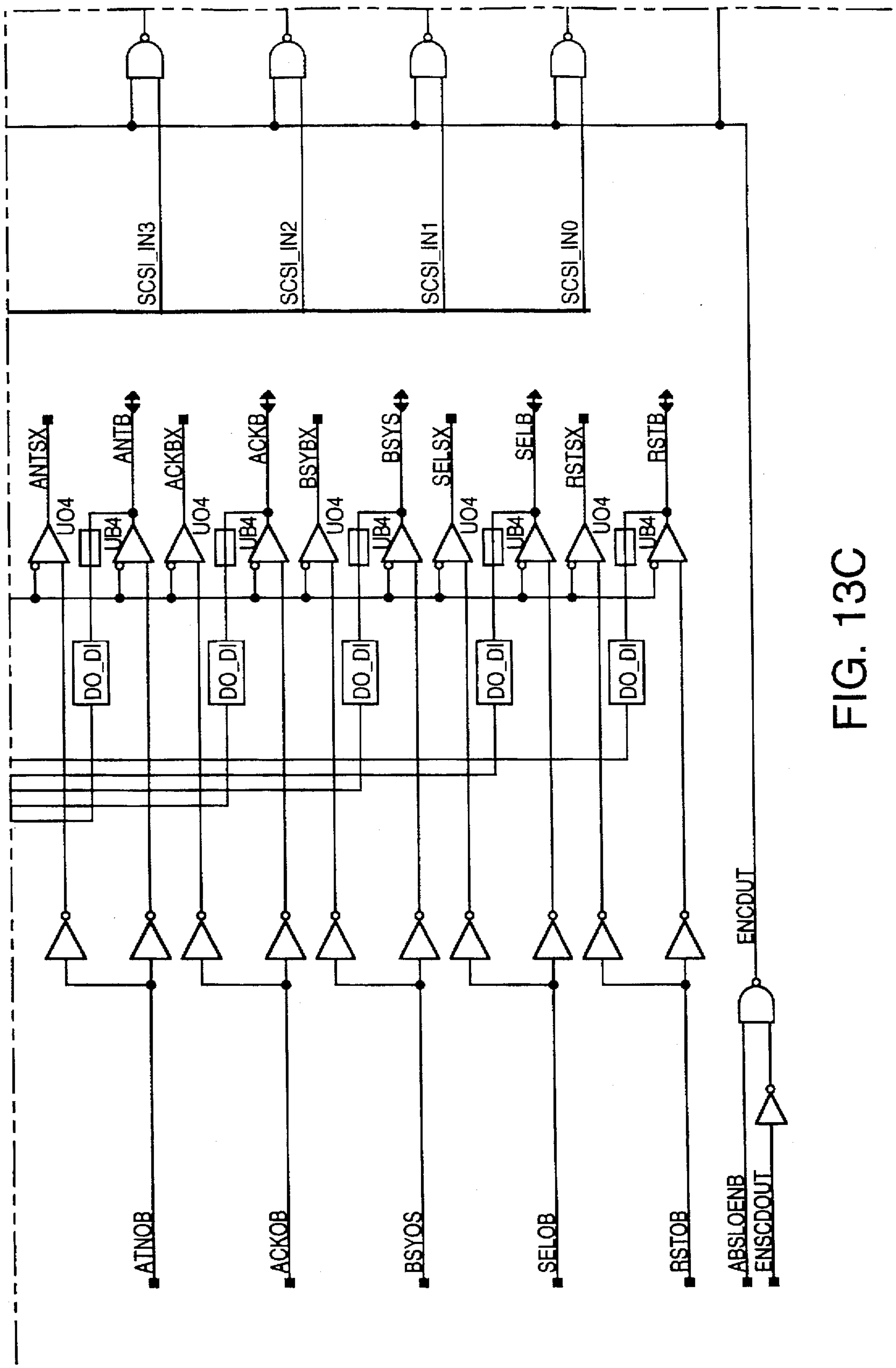
Figure 13D:
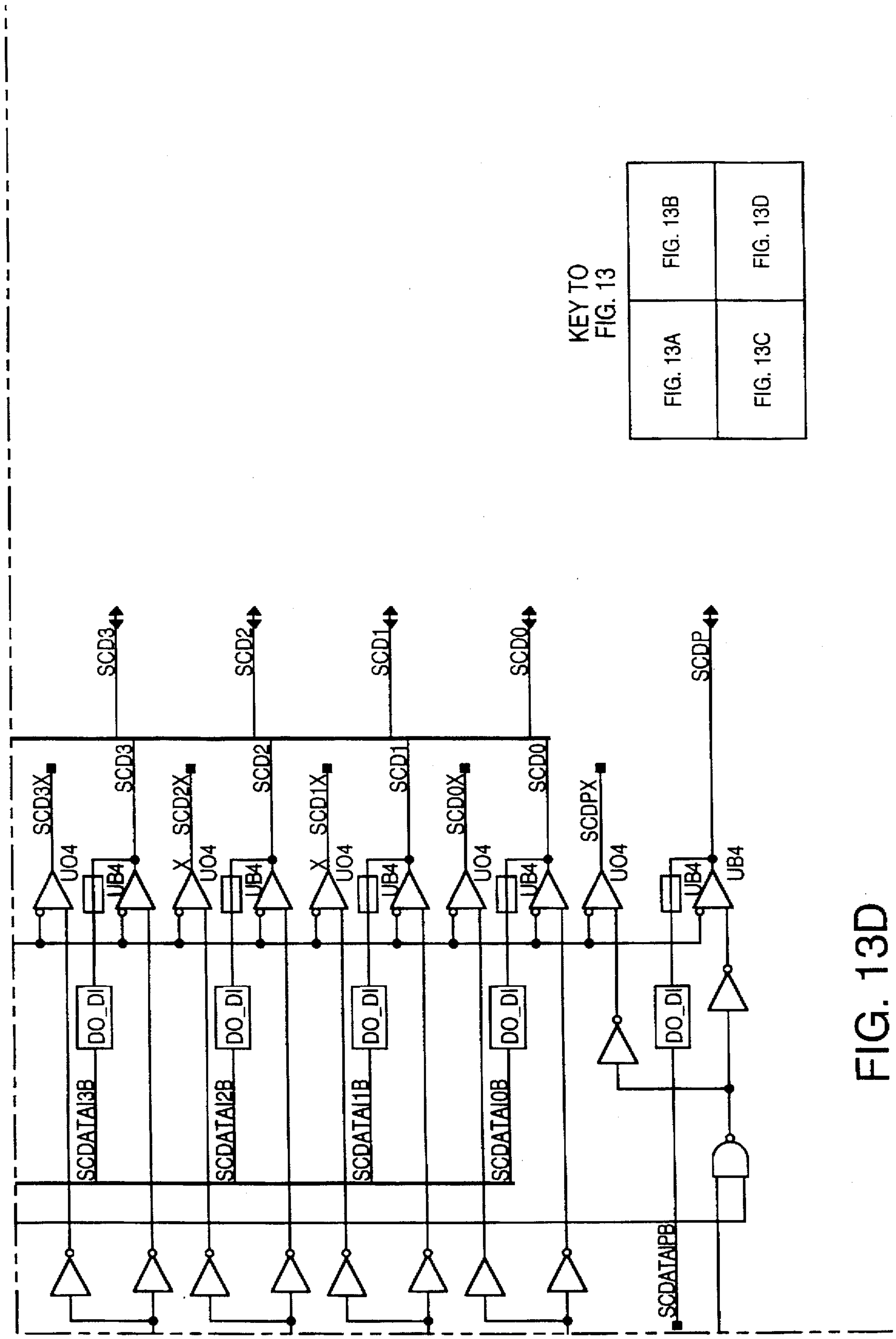

Host bus interface BIU implements the protocols necessary for communications on a VESA bus and connects to a VESA bus through the buffers shown in FIGS. 9–11. Such bus interface circuits are well known in the art and provided on a number of commercially available devices which the attach to VESA buses.

Processor RISC is tailored for control of an SCSI bus and for using the local memory and command description blocks as describe above. A more detailed block diagram of processor RISC is shown in FIG. 19. The primary blocks making up processor RISC are instruction decoding block DECODE, a state machine block RISC_ST, and processor register block RISC_REG. Complete description of the blocks DECODE, RISC_ST, and RISC_REG are provided in Appendix IV as VHDL programs.

FIG. 15 shows circuit blocks E2P_CTL is CTL REG, REG_DEC, LM_CTL, and T244. T244 is an 8-bit register from the S-MOS library. Block E2P_CTL controls an interface to external EEPROM including a circuit for selecting an I/O port address. The circuitry of block E2P_CTL is shown in the FIG. 4, of U.S. patent application entitled "METHOD AND CIRCUIT FOR RESOLVING I/O PORT ADDRESS CONFLICTS", attorney docket No. M-2563 and described in detail therein.

Blocks CTL_REG and REG_DEC are control registers and register decoders. Block REG_DEC implements the I/O port addresses as described in appendix I. A complete description of block REG_DEC is provided as a VHDL program in appendix IV. A schematic of block CTL_REG is shown in FIG. 20 with a gate level schematic of the timer block TIMER from FIG. 20 is shown in FIG. 21.

Local memory control LM_CTL in FIG. 15 provides and interface to local RAM attached to the I/O buses MA and MD. Local memory control LM_CTL accesses local RAM through data buses MDO and MDI and address bus MEMADR through the buffer circuitry of FIG. 12. Processor RISC from FIG. 14 access local RAM by providing an address on bus R_LM_ADR and writing data on bus R_MDI or reading data from bus MEM_OUT. A host computer can also accesses the local RAM through local memory control LM_CTL. Signals indicating a local address or data are provided by the host computer on I/O bus DAT and to local memory control LM_CTL though the buffer circuitry of FIG. 10 via bus SYSDOL. A local address is stored in a register internal to local memory control LM_CTL. Data is written through LM_CTL to local memory via bus MDI. Data is read by the host computer via bus SYSDIL and the buffer circuitry of FIG. 10. A complete description of block LM_CTL is provided in Appendix IV as a VHDL program.

Figure 24:
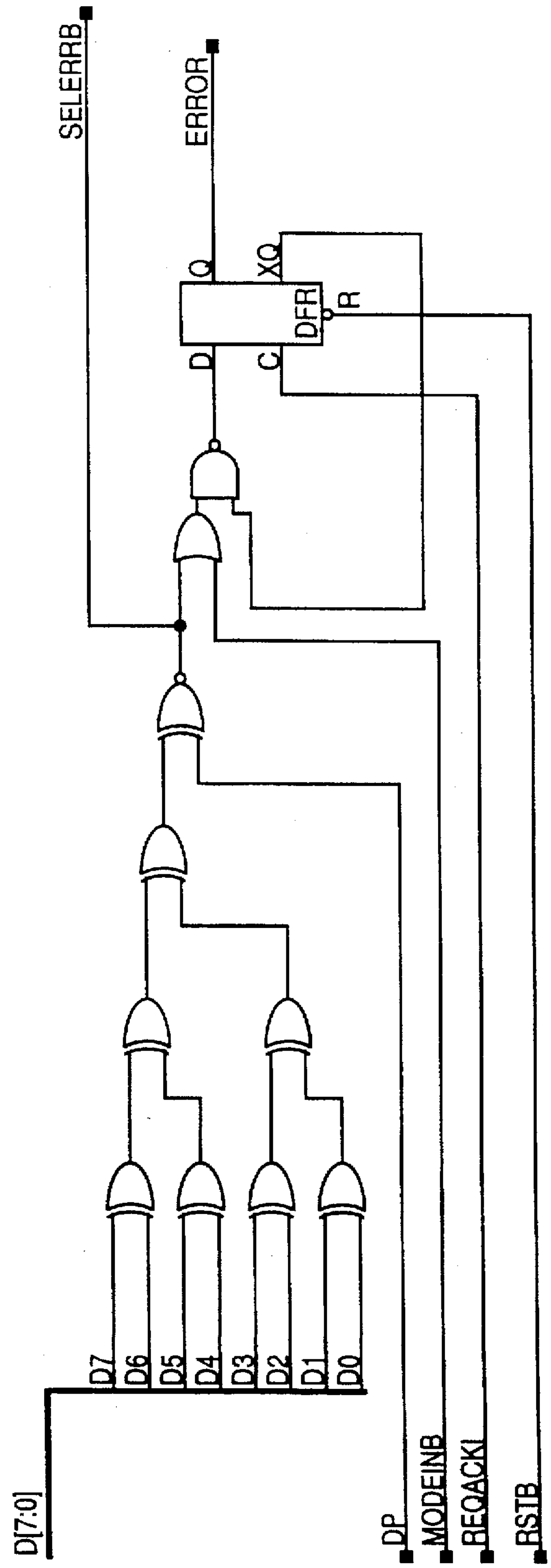
Figure 25A:
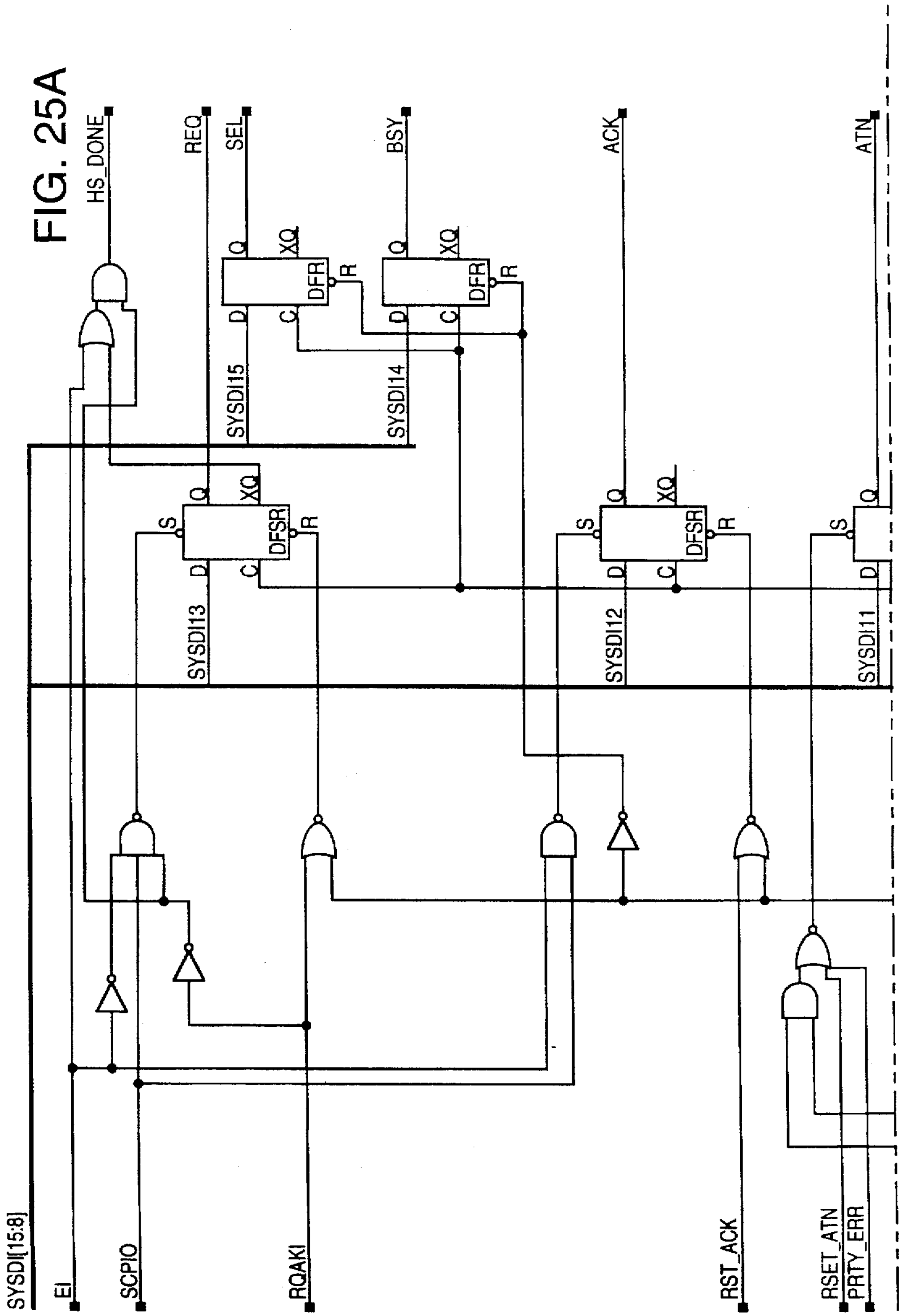
Figure 25B:
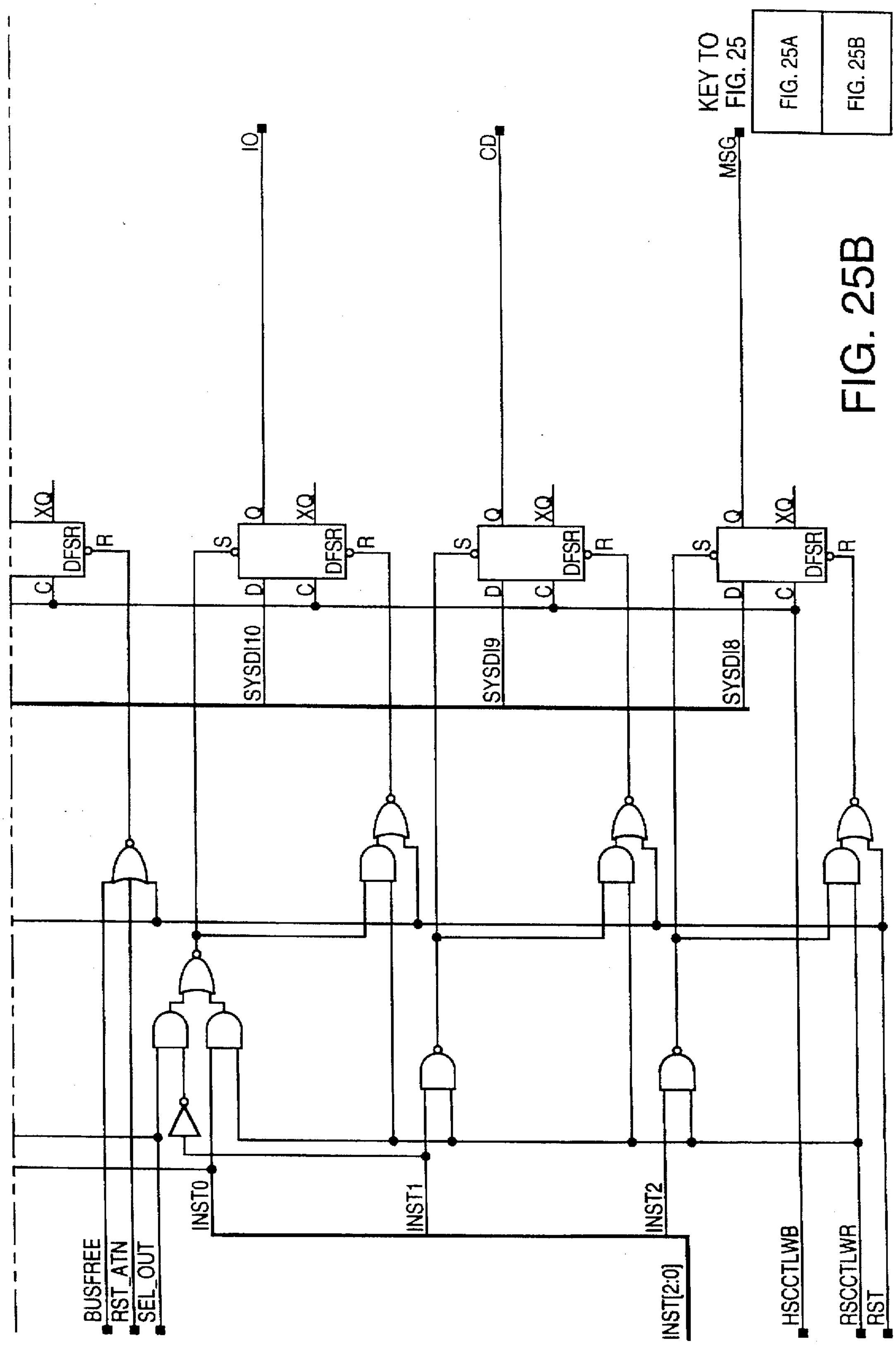

FIGS. 16 and 17 show elements of an SCSI interface. SCSI interfaces are well known in the art and commercially available in products such as the AIC-7780 from Adaptec, Inc. and the NRC 53C820 which are both SCSI controller chips. In FIGS. 16 and 17, blocks T244, BLT8, T373T, and T240 are respectively a buffer, a bus latch, a latch, and a tri-state buffer from the S-MOS library. Blocks SC_PRTY_IN, SCSIBLK, and SC_CTL respectively perform parity checks, produce and receive SCSI handshake signals, and control SCSI phase. A gate level schematic of block SC_PRTY_IN of FIG. 16 is shown in FIG. 24. A schematic of block SC_CTL of FIG. 17 is shown in FIG. 25.

Figure 23:
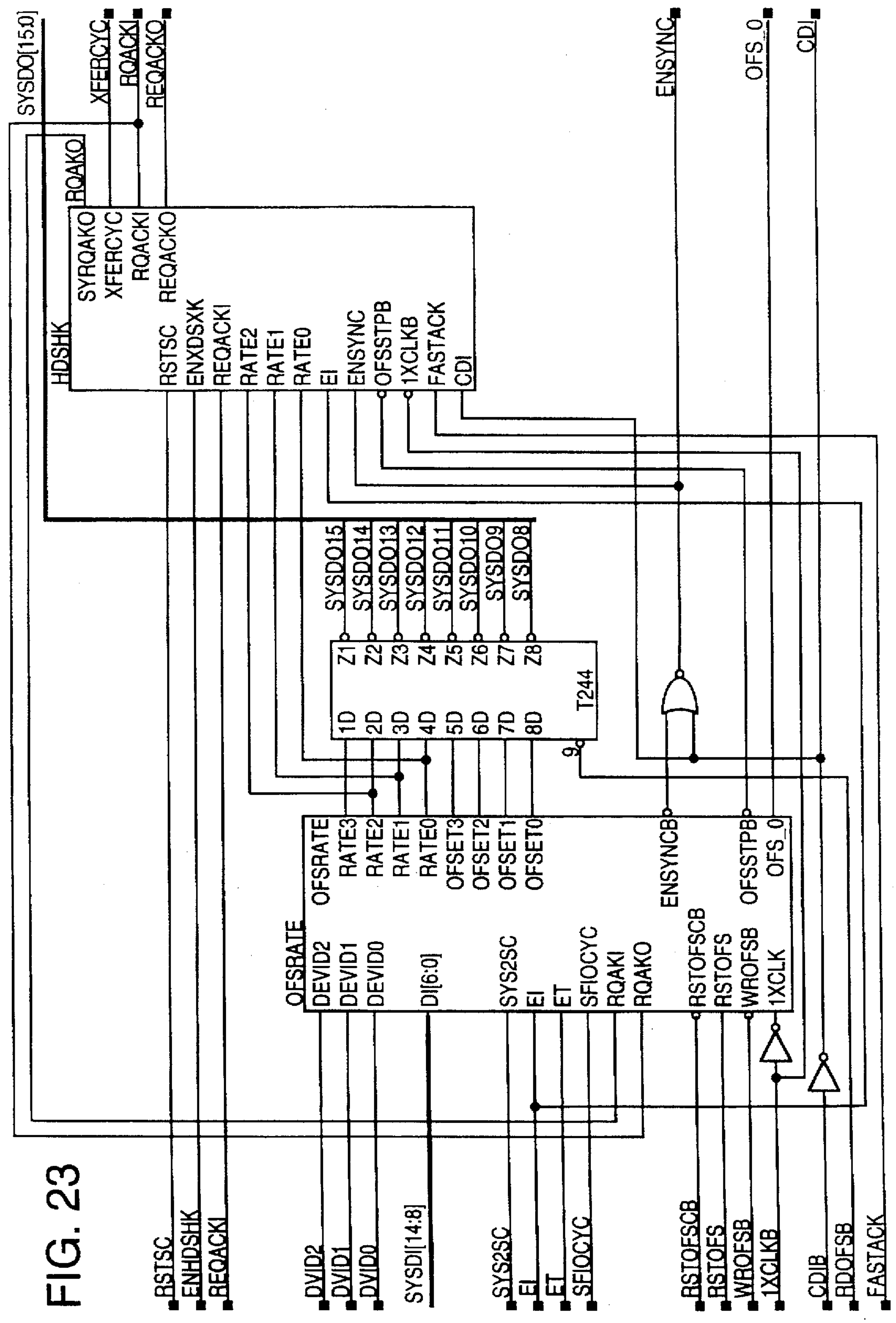

FIGS. 22 and 23 show a schematic of block SCSIBLK of FIG. 16. Block ENC3T9 is a selector which selects either MDI[2:0] or SYSDI[10:8] to supply a device ID to block ARBPRO. Block ARBPRO checks priority of the SCSI controller and other SCSI devices during the SCSI arbitration phase. In particular, block ARBPRO compares signals on bus SCDAT, the SCSI data bus, to signals on bus OWN ID to determine which device wins the arbitration. If the SCSI controller has higher priority, a signal on line ARBWINN indicates the controller won the arbitration. During selection phase, block ARBPRO checks if the number of bits set on the SCSI data bus is valid, two and only two. A device ID register in block ARBPRO indicates with which SCSI device the controller will comunicate. A signal on line WRDEVID writes a device ID from bus DIDI into the device ID register. If SELTEDB pulses, a device ID from bus SCDAT is written to the device ID register.

Block SELARB controls sequencing of arbitration and selection phases and detects SCSI bus free phase. The bus free phase is indicated by a signal on line BUSFREE. Arbiration is begun by a signal on line ENABSELB. The well known states in SCSI specification are implemented according to clock signals.

Block HDSHK in FIG. 23 provides both asynchronous and synchronous SCSI handshake signals. A signal on line ENHDSHK begin SCSI Handshake protocols for both synchronous and asynchronous transfer. A signal on line ENSYNC differentiates synchronized or asynchronized handshake. For synchronous transfers, signals on bus RATE [2:0] determines the synchronous transfer speed. Line OFSSTPB carries a signal that stops synchronous transfer if the offset counter status does not allow further synchronous data transfer.

For asynchronous, input SCSI request or acknowledge signals are provided on line REQACKI. Output SCSI acknowledge or request signals are provided on line REQACKO. Signals on line XFERCYC provide to the FIFO signals indicating data transfer. RQAKI is a one clock period pulse after detection of a signal on REQACKI used for internal logic.

Block OFSRATE in FIG. 23 is a local storage circuit that provides SCSI device offset and synchronous transfer rate information. Block OFSRATE is shown in FIG. 2 of U.S. patent application entitled "SCSI BUS CONTROLLER WITH STORAGE FOR PERIPHERAL DEVICE CONFIGURATION DATA", attorney docket No. M-2564.

FIG. 18 shows blocks CNTR_DEC, EPTRCNT, CNT_OUT, CNT_IN_MUX, and FF_CTL which implement an SCSI FIFO buffer, a host FIFO buffer, and control circuitry for DMA transfers. Such FIFO buffers are well known in the art, and in particular, are in the commercially available AIC-7780 and NRC 53C 820 chips mentioned above.

Although the present invention has been described with reference to particular embodiments, the description is only an example of the invention's application and should not be taken as a limitation. The scope of the present invention is defined by the following claims.

- 27 -

APPENDIX I

Bank 0 Registers

Base adr + 0--Word, Read Only--Two bytes of ASPI ID to identify the chip.
Base adr + 1--Byte, Read Only--One byte of ASPI ID to identify chip.

Setup program finds the chip using ASPI ID before configuring the chip.

Base adr + 2--Word, Read/Write--Configuration

| | |
|---|---|
| Bit 15-12 | BIOS address |
| Bit 11 | SCSI parity enable |
| Bit 10-8 | SCSI ID to be used by this chip |
| Bit 7 | VESA burst mode enable |
| Bit 6 | not used |
| Bit 5 | Host interrupt enable |
| Bit 4-2 | Host IRQ channel selection (not used by VESA) |
| Bit 1-0 | Host DMA channel selection (not used by VESA) |

Base adr + 4--Word, Read/Write--More Configuration stuff

| | |
|---|---|
| Bit 15-14 | Local memory wait state selection |
| Bit 13-12 | not used |
| Bit 11 | 8 bit local memory data width |
| Bit 10-8 | I/O port address (high order three bits) |
| Bit 7 | not used |
| Bit 6 | Fast SCSI ACK signal |
| Bit 5-0 | I/O port address (low order five bits) |

The data contained in the above two registers are initialized from the EEPROM, if available, at power up. Changing bits 10-8 and 5-0 of base_adr + 4 changes the base I/O port address. To make the change effective, the change must be written to the EEPROM and the power recycled.

Base adr + 3--Byte, Read only--Chip revision number

Base adr + 6--Word, Read/Write--EEPROM Data
Base adr + 7--Byte, Read only--EEPROM Command and Address These two registers are used to change the EEPROM contents and set up different configurations.

Base adr + 8--Word, Read/Write--Local RAM Data
Base adr + 10--Word, Read/Write--Local RAM Address To access the chip local RAM, the host computer writes a local address to the Local RAM Address register and follows with repeated IOR or IOW instructions written to high bit of the word at Base adr + 10. These registers are used to load the RISC program and the CDBs into the chip local memory. They can also be used to read the RISC program local variables during abnormal condition recovery.

Base adr + 9--Byte, Read only--Chip Status

| | |
|---|---|
| Bit 7 | DMA complete |
| Bit 6 | Host FIFO ready |
| Bit 5 | Local RAM access complete |
| Bit 4 | RISC halted |
| Bit 3 | SCSI reset in |
| Bit 2 | SCSI parity error |
| Bit 1 | CDB completed abnormally |
| Bit 0 | CDB completed normally |

Base adr + 10--Byte, Write only--Interrupt Acknowledge

| | |
|---|---|
| Bit 7-3 | not used |
| Bit 2 | Disable EEPROM auto-configuration |
| Bit 1 | Acknowledge abnormal CDB complete interrupt |
| Bit 0 | Acknowledge normal CDB complete interrupt |

These two registers, one read-only and one write-only, are typical status and interrupt registers.

Base adr + 11--Byte, Read/Write--Offset Register

Base adr + 12--Word, Read/Write--RISC Processor Program Counter

Base adr + 15--Byte, Read/Write--Chip Control

| | |
|---|---|
| Bit 7 | Chip reset |
| Bit 6 | SCSI reset |
| Bit 5 | RISC halt |
| Bit 4 | Single step (Write), Diagnostic failure (Read) |
| Bit 3 | DMA enable |
| Bit 2 | Timer clock select (should 0) |
| Bit 1 | Register bank number (0 or 1) |
| Bit 0 | Diagnostic bit |

To start the RISC program execution, both bits 5 and 4 must be reset. To single step the RISC program, reset bit 5 and bit 4. Bit 4 is reset by the hardware after executing one RISC instruction. Bit 1 is used to select either bank 0 or bank 1 of registers.

Bank 1 Registers

This Bank 1 is not used during normal operations but may be used to debug the chip or a RISC program.

Base adr + 0--Word, Read/Write--RISC accumulator.
Base adr + 1--Byte, Read/Write--RISC index register.
Base adr + 2--Word, Read/Write--RISC instruction register.
Base adr + 4--Word, Read/Write--FIFO 1,0.
Base adr + 6--Word, Read/Write--FIFO 3,2.

Base adr + 8--Word, Read/Write--DMA Address 1,0.
Base adr + 10--Word, Read/Write--DMA Address 3,2.
Base adr + 12--Word, Read/Write--DMA count 1,0.
Base adr + 14--Word, Read/Write--DMA count 3,2.
Base adr + 3--Byte, Read/Write--CDB pointer.

This register points to one of the 256 possible active CDBs.

Base adr + 5--Byte, Read/Write--SCSI Device ID.

This register identifies the SCSI device the chip is connecting to or trying to select Base adr + 7--Byte, Read/Write--hardware control flag.

Base adr + 9--Byte, Read/Write--SCSI Control.

| | |
|---|---|
| Bit 7 | CD |
| Bit 6 | IO |
| Bit S | MSG |
| Bit 4 | ATN |
| Bit 3 | Busy |
| Bit 2 | SEL |
| Bit 1 | REQ |
| Bit 0 | ACK |

Base adr + 11--Byte, Read/Write--SCSI Data

Base adr + 15--Byte, Read/Write--Chip Control

This is the same register as the one in bank 0.

Appendix II

Summary of RISC Instruction Set

| | 15 | 14 | 13 | 12 | 11 | 10 | 9 | 8 | 7 | 6 | 5 | 4 | 3 | 2 | 1 | 0 | 3rd & 4th byte |
|---|---|---|---|---|---|---|---|---|---|---|---|---|---|---|---|---|---|
| mov.b | 0 | 0 | B | r | r | r | 0 | 0 | i | la | la | la | la | la | la | la | |
| mov.b | 0 | 0 | B | r | r | r | 0 | 0 | o | la | la | la | la | la | la | la | |
| mov.w | 0 | 0 | W | r | r | r | 0 | 0 | i | la | la | la | la | la | la | la | |
| mov.w | 0 | 0 | W | r | r | r | 0 | 0 | o | la | la | la | la | la | la | la | |
| movq.b | 0 | 0 | B | r | r | r | 0 | 1 | i | | qa | qa | qa | qa | qa | qa | |
| movq.b | 0 | 0 | B | r | r | r | 0 | 1 | o | | qa | qa | qa | qa | qa | qa | |
| movq.w | 0 | 0 | W | r | r | r | 0 | 1 | i | | qa | qa | qa | qa | qa | qa | |
| movq.w | 0 | 0 | W | r | r | r | 0 | 1 | o | | qa | qa | qa | qa | qa | qa | |
| movqx.b | 0 | 0 | B | r | r | r | 1 | 0 | i | 0 | | | | | | | |
| movqx.b | 0 | 0 | B | r | r | r | 1 | 0 | o | 0 | | | | | | | |
| movqx.w | 0 | 0 | W | r | r | r | 1 | 0 | i | 0 | | | | | | | |
| movqx.w | 0 | 0 | W | r | r | r | 1 | 0 | o | 0 | | | | | | | |
| movr | 0 | 0 | B | rd | rd | rd | 1 | 1 | i | | | | | rs | rs | rs | |
| movr | 0 | 0 | B | rs | rs | rs | 1 | 1 | o | | | | | rd | rd | rd | |
| movi.b | 0 | 0 | 1 | B | r | r | 1 | 1 | I | I | I | I | I | I | I | I | |
| movi.w | 0 | 0 | 1 | W | r | r | 1 | 1 | | | | | | | | | 16 bit data |
| jtstf | 1 | 1 | 1 | f | f | f | t/f | ja | ja | ja | ja | ja | ja | ja | ja | ja | |
| jtst | 1 | 1 | 0 | b | b | b | t/f | ja | ja | ja | ja | ja | ja | ja | ja | ja | |
| jcmpi | 1 | 0 | 1 | | r | r | t/f | 0 | I | I | I | I | I | I | I | I | 12 bit jump addr |
| jcmpq | 1 | 0 | 1 | | r | r | t/f | 1 | | | qa | qa | qa | qa | qa | qa | 12 bit jump addr |
| jmp | 1 | 0 | 0 | 0 | ja | ja | ja | ja | ja | ja | ja | ja | ja | ja | ja | ja | |
| call | 1 | 0 | 0 | 1 | ja | ja | ja | ja | ja | ja | ja | ja | ja | ja | ja | ja | |
| ret | 0 | 1 | 1 | | | | 1 | 1 | 0 | | | | | | | | |
| rflag | 0 | 1 | 1 | f | f | f | 1 | 1 | 1 | | | | | | T | T | |
| dec | 0 | 1 | 0 | | | | 1 | 1 | 0 | | | | | | | | |
| inc | 0 | 1 | 0 | | | | 1 | 1 | 1 | | | | | | | | |
| xor | 0 | 1 | 0 | | | | 0 | 0 | 1 | la | la | la | la | la | la | la | |
| or | 0 | 1 | 0 | | | | 0 | 0 | 0 | la | la | la | la | la | la | la | |
| and | 0 | 1 | 1 | | | | 0 | 0 | | la | la | la | la | la | la | la | |
| xorq | 0 | 1 | 0 | | | | 0 | 1 | 1 | | qa | qa | qa | qa | qa | qa | |
| orq | 0 | 1 | 0 | | | | 0 | 1 | 0 | | qa | qa | qa | qa | qa | qa | |
| andq | 0 | 1 | 1 | | | | 0 | 1 | | | qa | qa | qa | qa | qa | qa | |
| waitfree | 0 | 1 | 0 | | | 1 | 1 | 0 | 0 | | | | | | | | |
| sel | 0 | 1 | 0 | | | 0 | 1 | 0 | 0 | | | | | | i/t | at | |
| dma | 0 | 1 | 0 | | | | 1 | 0 | 1 | | | | | | | | |
| sint | 0 | 1 | 1 | | | | 1 | 0 | 0 | | | | | | | | |
| halt | 0 | 1 | 1 | | | s | 1 | 0 | 1 | | | | | | | | |
| movx | 0 | 0 | W/B | r | r | r | 1 | 0 | i/o | 1 | | | | | | | |

*Key to Abbreviations*

| | |
|---|---|
| la | local memory address |
| qa | Q offset address (offset in current CDB) |
| ja | jump address |
| i | input = 0 |
| o | output = 1 |
| i/t | initiator/target, i = 1 |
| t/f | true/false, t = 1 |
| B | byte = 0 |
| W | word = 1 |
| rrr | register # |
| bbb | bit location in register (a) |
| fff | flag |
| I | immediate data |
| at | scsi attention, set = 1 |
| rd | register move destination |
| rs | register move source |
| s | s = 1, set interrupt |
| T | timer select |

Registers in RISC Processor

| | | |
|---|---|---|
| a | Accumulator | 000 |
| qp | Pointer to current CDB | 001 |
| ph | SCSI bus phase register | 001 |
| ix | index register | 010 |
| id_reg | SCSI ID selection reconnect | 010 |
| scsi_bus | SCSI data | 011 |
| pc | Program Counter | 011 |
| xp01 } | Transfer Pointer (Host) | 100 |
| xp23 } | Transfer Pointer (Host) | 101 |
| bc01 } | Transfer Counter | 110 |
| bc23 } | Transfer Counter | 111 |

The ASP, Inc. SASM ( SCSI Assembler ) User's Manual

A. Introduction

S/W Features:

1. two-pass assembler
2. generates comprehensive information of instruction usage
3. generates machine code at end of instruction, comments are retained. line number of listing is the same as source file.
4. generates information to support SCSI Symbolic Debugger.
5. symbols and labels may be case-sensitive or case-insensitive instructions and directives are always not case sensetive
6. includes a powerful constant experession evaluator. see section X
7. supports ANSI C preprocessor directives
8. instructions set has byte or word modifier that clearly shows it is a byte or word instruction S/W restrictions/convention :

1. Source file line length is limited to 256 characters per line.
2. generates one object file per one source file. does not create/link intermediate files.
3. symbol and label name cannot exceed 32 characters in length
4. label and instruction cannot be on the same line
5. label and symbol shall always begin with an alphebet H/W features and limitaions:

1. jump and compare instruction is combined.
2. data section is 128 bytes long and starts from address 0. however, the last three words are reserved for special functions. ( to be explained later )
3. code section cannot exceed 4KB.
4. there are 256 queues, from 0 to 255, accessible by setting queue pointer qp and the movq instruction .
5. supports index move both from queue and data section. the index is automatically incremented by one when its a byte instruction and by two when its a word instruction. However the index move from data section is limited to the first 64 bytes.
6. move word instruction to/from odd addess is illeagal.
7. forward/backward relative jmp offset cannot exceeds 1022 bytes
8. dma address range is 0 to 0x7FFFFFF ( 128 MB, 27 bits address line )
9. supports single-stepping mode
10. all registers are accessible from host
11. you cannot access accumulator's MSB by using byte instruction, it is always acted on LSB of accumulator, MSB is undefined afterwards.
12. call instruction cannot exceed two level deep. the last two words of data section are stacks. the stack automatically wraparound, if calls exceed two level deep the stacks are overwritten.

13. supports vectored time out trap. the trap use address 0x7A word as trap handler address. however the trap does not push program counter into stack, thus cannot return to point of interruption after its completion. the trap is treated more like a critical erorr handler.
14. syncronous transfer period 100 - 340 ns
15. syncronous REQ/ACK offset 0 - 15 bytes Input/Output filename convention

*.sas - pass-one source file
*.!01 - pass-one output file, pass-two source file
*.las - final listing file
*.eas - executable object file ( with error(s) detected at pass two )
*.oas - executable object file ( no error )

Note: If errors occured in pass one, the assembler doesn't go to pass two.

Introduction

SASM is a two-pass assembler, at first pass it substitutes all EQU symbols and generate the pass one output file with the extension name of ".!01". It also calculates label address and put symbols and labels into its internal look up table.

At pass one, the arguments and syntax of each instruction and directive is not analyzed, only the number of aguments are checked.

There shall have no more symbols and labels to precess at pass two. If there is any error occured at pass one, the assembler stops and does not go on to pass two. However, the pass one output file is not deleted.

At pass two the pass-one output is used as source file. Object file is generated as assembler proceeding each line, and resolving each symbol. the syntax is checked at this stage.

If there are errors at pass two, the output file is renamed to extension ".EAS". listing file is retained.

Preprocessor Directives

#DEFINE
#ELIF
#ELSE
#ENDIF
#ERROR

#IF
#IFDEF
#IFNDEF
#INCLUDE
#LINE
#UNDEF

Assembaler directives

| | |
|---|---|
| DB | define byte ( same as DC.B ) |
| DC.B | define constant byte |
| DC.W | define constant word |
| DS.B | define storage byte |
| DS.W | define storage word |
| DW | define word ( same as DC.W ) |
| EQU | strings equivalence |
| ORG | set curmet data/code address ( change address increment sequence ) |

Predefined internal symbols and variables

Register name list

| name | mode | size | description |
|---|---|---|---|
| ax | r/w | word | accumulator word ( 16 bits ) |
| al | r/w | byte | accumulator LSB ( 8 bits ) |
| qp | r/w | byte | queue pointer ( 8 bits ) |
| ix | r/w | byte | queue index ( 6 bits, 0 to 63 ) |
| sb | r/w | byte | scsi bus ( 8 bits ) |
| da0 | r/w | word | dma transfer pointer, lower word |
| da1 | r/w | word | dma transfer pointer, higher word |
| dc0 | r/w | word | dma transfer count, lower word |
| dc1 | r/w | word | dma transfer count, higher word |
| ph | r | byte | scsi phase ( 3 bits ) |
| id | r/w | byte | scsi id |
| pc | r/w | word | program counter |

Constant expression evaluation

The following is numerical prefixes:
0X, 0x : hexidecimal 0 : octal
0b, 0B : binary 'x': character constant
Note: numer may be separate by comma The following is binary operators:
* : multiplication / : division
+ : addition - : subtraction
// : remainder **: power The following is uniary operators:
| : bitwise OR & : bitwise AND
^ : bitwise XOR [ : square root + : unsigned value - : two's compliment negate
~ : one's compliment negate ! : not
@ : which bit is on ( only one bit on allowed )

The following is binary conditional evaluation operators:
Note: return one if condition is TRUE, return zero if condition is FALSE ==: equal to >=: greater than or equal to
<=: less than or equal to <>: not equal to
>: greater than <: less than
&&: and ||: or Note: you may use ( ) to change the operation precedence Example:

( ( 5+0x0A ) * ( 0b1111,0010 - 077 ) ) / 3 is ( 0x0110 | 0x1001 ) & ( 0x0001 | 0x1000 ) is 0x1001

( 2 ** 8 ) // 13 is ( ( 100 >= 0x10 ) && ( 0b101,101 == 033 ) ) || ( ( 0xff < 0x100 ) is TRUE @0b0100,0000 is 6

B. Instructions set

AND

Operation size: Byte
Registers: al
Description: AND specified local memory with AL, result is in AL
See also: ANDQ Example:

and.b al, byte

ANDQ

Operation size: Byte
Registers: al
Description: AND specified queue data with AL, result is in AL
See also: AND Example:

andq.b al, q[ 0 ]

CALL

Registers: not applicable
Description: push next instruction address into stack, and set program counter to new address, the called subroutine shall end with RET instruction Note: this instruction is used with RET instruction See also: ret, jmp Example:

```
call  0x0100
call  subroutine
```

DEC

Operation size: Byte
Registers: al
Description: decrement AL by one, put result back to AL
See also: INC Example:

```
dec.b   al
```

DMA

Registers: not applicable
Description: starts DMA

HALT

Registers: not applicable
Parameter: none or immediate value one
Note: a parameter of immediate zero is the same as no parameter
Description: stop RISC CPU, user may optional send interrupt to host Example:

```
halt
halt  #INT
```

INC

Operation size: Byte
Registers: AL
Description: increment AL by one, put result back to AL
See also: DEC Example:

```
inc.b  al
```

JCMPI

Operation size: Byte
Condition: .E .NE
Registers: AL
Description: compare AL with specified immediate value
        branch to new address if condition met
Example:

```
jcmpi.b.e  AL, #0, al_is_zero

jcmpi.b.ne  AL, #0xFF, al_is_not_0xff
```

JCMPQ

Operation size: Byte
Condition: .E .NE
Registers: AL
Description: compare AL with specified queue data
        branch to new address if condition met Example:

```
jcmpq.b.e  AL, q[0], al_equals_q_0

jcmpq.b.ne  AL, q[ 63 ], al_not_equals_q_63
```

JMP

Execution time:
Machine code size:
Instruction size:
Registers: not applicable
Description: move the specified new address data into program counter
        excution will begin at new address Example:

```
jmp   new_addr
```

JTST

Operation size: Byte
Condition: .BC .BS
Clock:

Machine code size:
Registers: AL
Description: test the specified bit is clear or set, and branch to
new address according if condition is true Example:

```
jtst.b.bc  AL, #0, al_bit0_is_clear

jtst.b.bs  AL, #1, al_bit1_is_not_set
```

JTSTF

Operation size: Byte
Condition: .BC .BS
Clock:
Machine code size:
Registers: AL
Description: test the specified bit of flag register is clear or set,
and branch to new address if condition is true Note: SASM define the following flag bit to be used with the instruction

```
SelectDone    equ  0 ; selection phase done
DcZero        equ  1 ; dma tranfer count zero
Selected      equ  2 ; selected by target
Reselected    equ  3 ; reselected by target
ParityError   equ  4 ; dam parity error flag set
FreeTimerSet  equ  5 ; free-running timer set, one unit time elapsed
```

Example:

```
jtstf.b.bc  #FreeTimerSet, free_timer_not_set
jtstf.b.bc  #Reselected, idle_next_tst_target_mode
jtstf.b.bc  #Selected, idle_next_cdb
jtstf.b.bs  #SelectDone, selection_completed
jtstf.b.bs  #DcZero, setup_status_req_wait
jtstf.b.bc  #ParityError, dc_not_zero_wait_status_in
```

LODQX

Operation size: Byte, Word
Machine code size:
Registers for byte instruction : AL, SB
Registers for word instruction : AX, DA0, DA1, DC0, DC1
Description: load AL/AX from queue by using IX register as index
IX is automatically incremented by one or two depends
on operation size is byte or word See also: MOVQX Example:

```
lodqx.b   al  ; same as  movqx.b al, q[ix]
lodqx.b   sb  ; same as  movqx.b sb, q[ix]

lodqx.w   ax  ; same as  movqx.w ax, q[ix]
lodqx.w   da0 ; same as  movqx.w da0, q[ix]
lodqx.w   da1 ; same as  movqx.w da1, q[ix]
lodqx.w   dc0 ; same as  movqx.w dc0, q[ix]
lodqx.w   dc1 ; same as  movqx.w dc1, q[ix]
```

LODX

Operation size: Byte, Word
Machine code size:
Registers for byte instruction : AL, SB
Registers for word instruction : AX, DA0, DA1, DC0, DC1
Description: load AL/AX from local memory by using IX register as index
IX is automatically incremented by one or two depends
on operation size is byte or word See also: MOVX Example:

```
lodx.b   al   ; same as  movx.b  al, [ix]
lodx.b   sb   ; same as  movx.b  sb, [ix]

lodx.w   ax   ; same as  movx.w  ax, [ix]
lodx.w   da0  ; same as  movx.w  da0, [ix]
lodx.w   da1  ; same as  movx.w  da1, [ix]
lodx.w   dc0  ; same as  movx.w  dc0, [ix]
lodx.w   dc1  ; same as  movx.w  dc1, [ix]
```

MOV

Operation size: Byte, Word
Registers for byte instruction: AL, QP, SB
Registers for word instruction: AX, PC, DA1, DC0, DC1

Description: move data between local memory and register

Exception: move data to DA0 is not allowed
you may use MOVQ.W to do it

Example:

```
mov.b   al, byte
mov.b   qp, byte
mov.b   sb, byte

mov.w   ax, word
mov.w   pc, addr
```

```
mov.w   da1, word
mov.w   dc0, word
mov.w   dc1, word
```

MOVI

Operation size: Byte, Word
Registers for byte instruction: AL, PH, IX, SB
Registers for word instruction: AX, DA1, DC0, DC1

Description: move immediate data to registers

Exception: move immediate data to DA0 is not allowed.
you may use MOVQ.W to do it Example:

```
movi.b  al, #0
movi.b  ph, #0x11
movi.b  ix, #12
movi.b  sb, #0xff

movi.w  ax, #0xFFFF
movi.w  da1, #0x0010
movi.w  dc0, #0x0800
movi.w  dc1, #0X0A00
```

MOVQ

Operation size: Byte, Word
Registers for byte instruction: AL, QP, IX, SB
Registers for word instruction: AX, PC, DA0, DA1, DC0, DC1, ID Description: move data between queue data and registers Exception: although ID is a byte register, you can only use word
instruction on it Example:

```
movq.b  al, q[ 0 ]
movq.b  qp, q[ 0x01 ]
movq.b  ix, q[ 0b0010 ] ; 0b0010 equals 2
movq.b  sb, q[ 017 ] ; 017 is a octal number, equals 15

movq.b  q[ 63 ], al ;
movq.b  q[ 62 ], qp
movq.b  q[ 61 ], ix
movq.b  q[ 60 ], sb

movq.w  ax, q[ 0 ]
movq.w  pc, q[ 2 ]
```

```
movq.w  id, q[ 4 ]   ; ID is byte register
movq.w  da0, q[ 6 ]
movq.w  da1, q[ 8 ]
movq.w  dc0, q[ 10 ]
movq.w  dc1, q[ 12 ]

movq.w  q[ 0 ], ax
movq.w  q[ 2 ], pc
movq.w  q[ 4 ], id   ; ID is byte register
movq.w  q[ 6 ], da0
movq.w  q[ 8 ], da1
movq.w  q[ 10 ], dc0
movq.w  q[ 12 ], dc1
```

MOVQX

Operation size: Byte, Word
Registers for byte instruction: AL, SB
Registers for word instruction: AX, DA0, DA1, DC0, DC1

Description: move data between queue index data and registers
the current IX is used as index location
IX is automatically incremented by one or two depends
on operation size is byte or word See also: LODQX, STOQX Example:

```
movqx.b   al, q[ix]
movqx.b   sb, q[ix]

movqx.b   q[ix], al
movqx.b   q[ix], sb

movqx.w   ax, q[ix]
movqx.w   da0, q[ix]
movqx.w   da1, q[ix]
movqx.w   dc0, q[ix]
movqx.w   dc1, q[ix]

movqx.w   q[ix], ax
movqx.w   q[ix], da0
movqx.w   q[ix], da1
movqx.w   q[ix], dc0
movqx.w   q[ix], dc1
```

MOVR

Operation size: Byte
Registers: AL
Syntax: MOVR dest_reg, src_reg

Description: mov data from source register to destination register

Example:

```
; use AL, QP as destination, SB, ID, IX as source
movr.b  al, sb
movr.b  al, id
movr.b  al, ix
movr.b  qp, sb
movr.b  qp, id
movr.b  qp, ix

; use SB, ID, IX as destination, AL, QP as source
movr.b  sb, al
movr.b  sb, qp
movr.b  id, al
movr.b  id, qp
movr.b  ix, al
movr.b  ix, qp
```

MOVX

Operation size: Byte, Word
Registers for byte instruction: AL, SB
Registers for word instruction: AX, DA0, DA1, DC0, DC1

Description: move data between ~~queue~~ LOCAL MEMORY index data and registers
the current IX is used as index location
IX is automatically incremented by one or two depends
on operation size is byte or word See also: LODX, STOX Example:

```
movx.b  al, [ix]
movx.b  sb, [ix]

movx.b  [ix], al
movx.b  [ix], sb

movx.w  ax, [ix]
movx.w  da0, [ix]
movx.w  da1, [ix]
movx.w  dc0, [ix]
movx.w  dc1, [ix]

movx.w  [ix], ax
movx.w  [ix], da0
movx.w  [ix], da1
movx.w  [ix], dc0
movx.w  [ix], dc1
```

OR

Operation size: Byte
Registers: AL
Syntax: OR register, local_memory_address

Description: OR specified local memory with AL, result is in AL
See also: ORQ

Example:

```
or.b   al, byte
```

ORQ

Operation size: Byte
Registers: AL
Syntax: ORQ(.B) register, local_memory_address Description: OR specified queue data with AL, result is in AL
See also: OR Example:

```
orq.b   al, q[ 1 ]
```

RET

Registers: not applicable
Description: mov a word from stack to program counter

Note: this instruction is used with CALL instruction

See also: CALL

RFLAG

Registers: not applicable

Description: reset the specifed bit on flag register

Note: SASM define the following values to be used with the instruction

```
ACK       equ    0 ; acknoledge
ATN_OFF   equ    1 ; negate attention
PARITY    equ    2 ; parity error
FTM       equ    3 ; free-running timer start
WTM       equ    4 ; watch dog timer
SB        equ    5 ; turn off scsi bus busy
ATN_ON    equ    6 ; raise attention
;
```

```
RESET_WTM   equ   0 ; turn off watch dog timer
TO_250MS    equ   1 ; select 250 milli-second
TO_10SEC    equ   2 ; select 10 second
TO_1HOUR    equ   3 ; select 1 hour
```

Example:

```
; two parameters

rflag   #WTM, #RESET_WTM
rflag   #WTM, #TO_250MS
rflag   #WTM, #TO_10SEC
rflag   #WTM, #TO_1HOUR

; one parameter

rflag   #FTM       ;
rflag   #ACK       ;
rflag   #PARITY    ;
rflag   #ATN_OFF   ; message out last byte, negate attention
rflag   #SB        ;
rflag   #ATN_ON    ; raise attention
```

SEL

Registers: not applicable
Syntax: SEL (Init or Trgt), #ATN

Description: Start SCSI arbitration, selection/reselection phase

Example:

```
sel  Init, #ATN
sel  Trgt, #ATN
```

SINT

Registers: not applicable
Syntax: SINT

Description: set host adaptor interrupt

Example:

```
sint
```

STOQX

Operation size: Byte, Word
Machine code size:

Registers for byte instruction : AL, SB
Registers for word instruction : AX, DA0, DA1, DC0, DC1
Description: store AL/AX to queue by using IX register as index
IX is automatically incremented by one or two depends on operation size is byte or word See also: MOVQX Example:

```
stoqx.b   al  ; same as  movqx.b q[ix], al
stoqx.b   sb  ; same as  movqx.b q[ix], sb

stoqx.w   ax  ; same as  movqx.w q[ix], ax
stoqx.w   da0 ; same as  movqx.w q[ix], da0
stoqx.w   da1 ; same as  movqx.w q[ix], da1
stoqx.w   dc0 ; same as  movqx.w q[ix], dc0
stoqx.w   dc1 ; same as  movqx.w q[ix], dc1
```

STOX

Operation size: Byte, Word
Machine code size:
Registers for byte instruction : AL, SB
Registers for word instruction : AX, DA0, DA1, DC0, DC1
Description: store AL/AX to local memory by using IX register as index
IX is automatically incremented by one or two depending operation size is byte or word
See also: MOVQX Example:

```
stox.b  al   ; same as  movx.b  [ix], al
stox.b  sb   ; same as  movx.b  [ix], sb

stox.w  ax   ; same as  movx.w  [ix], ax
stox.w  da0  ; same as  movx.w  [ix], da0
stox.w  da1  ; same as  movx.w  [ix], da1
stox.w  dc0  ; same as  movx.w  [ix], dc0
stox.w  dc1  ; same as  movx.w  [ix], dc1
```

WAITFREE

Registers: not applicable
Syntax: WAITFRE

Description: wait scsi bus free

XOR

Operation size: byte
Registers: AL
Syntax: XOR.B register, address

Description: eXclusive OR specified local memory with AL, result is in AL
See also: XORQ Example:

```
xor.b  al, byte
```

XORQ

Operation size: byte
Machine code size:
Registers: AL
Syntax: XORQ.B register, q[ index ]

Description: eXclusive OR specified queue data with AL, result is in AL
See also: XOR Example:

```
xorq.b  al, q[ 1 ]
```

APPENDIX III

*RISC Program Listing*

```
; ==============================================================
; ASPI.SAS                     By Karl Chen        © 1993
;
; ==============================================================
; Assembler definition
;
; register list
ax              equ           :0 ; accumulator word
al              equ           :0 ; accumulator LSB
qp              equ           :1 ; queue pointer
ix              equ           :2 ; queue index
sb              equ           :3 ; scsi bus
da0             equ           :4 ; dma transfer pointer, lower  word
dal             equ           :5 ; dma transfer pointer, higher word
dc0             equ           :6 ; dma transfer count, lower  word
dc1             equ           :7 ; dma transfer count, higher word
;
; tm      -       equ           :8  ; = 0, free running timer counter
ph              equ           :9  ; = 1, scsi phase
id              equ           :10 ; = 2, scsi id
pc              equ           :11 ; = 3, program counter
;
; ---  halt optional second parameter ---------------------------
INT             equ           1  ; send interrupt to host
;
; --- rflag first parameter -------------------------------------
ACK             equ           0  ; acknoledge
ATN_OFF         equ           1  ; drop attention
PARITY          equ           2  ; parity error
FTM             equ           3  ; free-running timer start
WTM             equ           4  ; watch dog timer
SB              equ           5  ; turn off scsi bus busy
ATN_ON          equ           6  ; raise attention
; ---  rflag optional second parameter ------------------------------------
RESET_WTM       equ           0  ; turn off watch dog timer
TO_250MS        equ           1  ; select 250 milli-second
TO_10SEC        equ           2  ; select 10 second
TO_1HOUR        equ           3  ; select 1 hour
;
; ---  selection first parameter ---------------------------------
Init            equ           I ; itself is initiator
Trgt            equ           T ; itself is target
ATN             equ           1 ; raise attention too
;
;
; ---  jtstf flag ------------------------------------------------
SelectDone      equ           0 ; selection phase done
DcZero  .       equ           1 ; dma tranfer count zero
Selected        equ           2 ; selected by target
Reselected      equ           3 ; reselected by target
ParityError     equ           4 ; dam parity error flag set
FreeTimerSet    equ           5 ; free-running timer set, one unit time elapsed
                                ; current time unit is one second
AtnRaised       equ           6 ; attension raised
; ==============================================================
;
```

```
QS_FREE             equ 0x00 ;
QS_READY            equ 0x01 ;
QS_DISC             equ 0x02 ;
QS_BUSY             equ 0x04 ;
QS_ACTIVE           equ 0x08 ;
QS_DATA_XFER        equ 0x10 ;
QS_DONE             equ 0x80 ;
;
QC_POST             equ 0x01 ;
QC_LINK             equ 0x02 ;
QC_SG_LIST          equ 0x04 ;
QC_DATA_IN          equ 0x08 ;
QC_DATA_OUT         equ 0x10 ;
QC_MSG_IN           equ 0x20 ; wait message in after message out
QC_MSG_OUT          equ 0x40 ; do message out after selection completed
QC_REQ_SENSE        equ 0x80 ;
; QC_DO_TAG_MSG     equ 0x10 ;
;
; completion status, q[ done_stat ]
QD_NO_ERROR              equ  0x00 ; command done without error
QD_BAD_CDB_TRG_ID        equ  0x01 ; illeagal target id
QD_SELECT_TIMEOUT        equ  0x02 ; selection phase time out
QD_NO_CMD_XFER           equ  0x03 ; no command transfer phase
QD_NO_DATA_XFER          equ  0x04 ; no data transfer phase
QD_DATA_XFER_UNDER_RUN   equ  0x05 ; DMA data UnderRun, xfer count not zero
QD_CAN_NOT_GET_SENSE     equ  0x06 ;
QD_BAD_SCSI_STATUS       equ  0x07 ;
QD_WTM_TIMEOUT           equ  0x08 ; watch-dog timer time out
;
; queue link q[ fwd ] & q[ bwd ] field definition
QLINK_TAIL               equ  0xFF ;
;
QUEUE_SIZE               equ  0x40 ;
;
; -------------------------------------------------------
; SCSI command queue, shall be the same as ASPI Host driver
;
#define fwd                  0  ; q forward pointer
#define bwd                  1  ; q backward pointer
#define cntl                 2  ; q control status
#define sg_entry_cnt         3  ; number of sg entry of the queue
                                ; meaningful for sg_list only

; for sg_list only
;
#define sg_list0             4  ; first sg list entry address
#define sg_list1             6  ; second sg list entry adress
#define sg_list2             8  ; third sg list entry address
#define sg_list3             10 ; fourth sg list entry address

;
; for non-sg_list only
;
#define cdb_len              4  ; SCSI command length
#define target_id            6  ; Target SCSI ID
#define target_lun           7  ; Target SCSI logical unit number
#define done_stat            8  ; q completion status
#define scsi_stat            9  ; SCSI command completion status
#define scsi_msg             10 ; command done message
#define reserved             11 ; reserved
```

```
;
; field 12-20 is for sg_list head queue only
;
#define sg_list_qp           12 ; the first sg_list queue pointer
#define sg_list_fwd_qp       13 ; the working sg_list queue's forword pointer
#define sg_page_size          14 ; sg entry transfer count ( except first and
last )
#define sg_first_xfer_cnt    16 ; sg entry first transfer count
#define sg_last_xfer_cnt     18 ; sg entry last transfer count
;
; field 12-20 is for non-sg_list only
;
#define data_cnt0            12 ; dam transfer count low word
#define data_cnt1            14 ; dam transfer count high word
#define data_addr0           16 ; dam transfer address low wor
#define data_addr1           18 ; dam transfer address high wor
;
#define sense_len            20 ; SCSI request sense data length
#define sense_addr0          22 ; request sense message buffer low word
#define sense_addr1          24 ; request sense message buffer high word
#define cdb                  26 ; SCSI CDB block, 12 bytes maximum
#define busy_loop            38 ;
#define init_busy_loop       39 ; set busy_loop to this value when expired
#define busy_retry           40 ;
#define timeout_chk          41 ; if zero, no disconnect timeout check
#define timeout_cnt0         42 ; free-running timer count LSB
#define timeout_cnt1         43 ; free-running timer count MSB
#define msg_out_code         44 ;
#define tag_code             45 ; first byte of queue tag messasge
                                ; either 0x20, 0x21, 0x22
                                ; second byte is queue tag, input active_cdb
#define status               46 ; q current execution status
                                ; this shall be the last byte
;
; host need not initialize data after here
;
#define x_saved_sg_entry_cnt 47 ;
#define x_saved_sg_index     48 ;
#define x_saved_sg_list_qp   49 ; the current working sg_list q pointer
;
#define x_reconnect_rtn      50 ;
#define x_saved_data_cnt0    52 ;
#define x_saved_data_cnt1    54 ;
#define x_saved_data_addr0   56 ;
#define x_saved_data_addr1   58 ;
#define reserved2            60 ; reserved
;
; ------------------------------------------------------------
; SCSI status bytes
;
;   bits of status byte
; -------------------------------------------------------
;  7  6  5  4   3  2  1  0         Status
; -------------------------------------------------------
;  R  R  0  0   0  0  0  R =0x00  GOOD
;  R  R  0  0   0  0  1  R =0x02  CHECK CONDITION
;  R  R  0  0   0  1  0  R =0x04  CONDITION MET
;  R  R  0  0   1  0  0  R =0x08  BUSY
```

```
;  R  R  0  1   0  0  0  R =0x10  INTERMEDIATE
;  R  R  0  1   0  1  0  R =0x14  INTERMEDIATE-CONDITION MET
;  R  R  0  1   1  0  0  R =0x18  RESERVATION CONFLICT
;  R  R  1  0   0  0  1  R =0x22  COMMAND TERMINATED
;  R  R  1  0   1  0  0  R =0x28  QUEUE FULL
;
;  All Other Codes               Reserved
;  bit 0, 6, 7 are reserved
; ---------------------------------------------------------------
SS_GOOD              equ 0x00 ; target has successfully completed the command
SS_CHK_CONDITION     equ 0x02 ; contigent allegiance condition has occured
SS_CONDITION_MET     equ 0x04 ; the requested operation is satisfied
SS_TARGET_BUSY       equ 0x08 ; target is busy
SS_INTERMID          equ 0x10 ; intermediate
SS_INTERMID_COND_MET equ 0x14 ; intermediate-condition met
                              ; the combination of condition-met ( 0x04 )
                              ; and intermediate ( 0x10 ) statuses
SS_RSERV_CONFLICT    equ 0x18 ; reservation conflict
SS_CMD_TERMINATED    equ 0x22 ; command terminated
                              ; by terminated I/O process message or
                              ; a contigent allegiance condition has occured
SS_QUEUE_FULL        equ 0x28 ; queue full
;
; ---------------------------------------------------------------
;                               MSG C/D I/O
PH_DATA_OUT   equ   (0b0000)  ;  0   0   0    I -> T, data out
PH_DATA_IN    equ   (0b0001)  ;  0   0   1    T -> I, data in
PH_CMD_OUT    equ   (0b0010)  ;  0   1   0    I -> T, command
PH_STAT_IN    equ   (0b0011)  ;  0   1   1    T -> I, status
PH_RES1       equ   (0b0100)  ;  1   0   0    reserved
PH_RES2       equ   (0b0101)  ;  1   0   1    reserved
PH_MSG_OUT    equ   (0b0110)  ;  1   1   0    I -> T, message in
PH_MSG_IN     equ   (0b0111)  ;  1   1   1    T -> I, message out
;
; ---------------------------------------------------------------
; scsi messages
MS_CMD_DONE       equ       0x00 ; command completed
MS_EXTEND         equ       0x01 ; first byte of extend message

; one byte messages, 0x02 - 0x1F
; 0x12 - 0x1F: reserved for one-byte messages
;                                     I T, I-initiator T-target support
;                                       O: Optional, M:mandatory
M1_SAVE_DATA_PTR       equ  0x02 ; O O save data pointer
M1_RESTORE_PTRS        equ  0x03 ; O O restore pointers
M1_DISCONNECT          equ  0x04 ; O O disconnect
M1_INIT_DETECTED_ERR   equ  0x05 ; M M initiator detected error
M1_ABORT               equ  0x06 ; O M abort
M1_MSG_REJECT          equ  0x07 ; M M message reject
M1_NO_OP               equ  0x08 ; M M no operation
M1_MSG_PARITY_ERR      equ  0x09 ; M M message parity error
M1_LINK_CMD_DONE       equ  0x0A ; O O link command completed
M1_LINK_CMD_DONE_WFLAG equ  0x0B ; O O link command completed with flag
M1_BUS_DVC_RESET       equ  0x0C ; O M bus device reset
M1_ABORT_TAG           equ  0x0D ; O O abort tag
M1_CLR_QUEUE           equ  0x0E ; O O clear queue
M1_INIT_RECOVERY       equ  0x0F ; O O initiate recovery
M1_RELEASE_RECOVERY    equ  0x10 ; O O release recovery
```

```
M. KILL_IO_PROC        equ  0x11 ; O O terminate i/o process

; --------------------------------------------------------------
; first byte of two-byte queue tag messages, 0x20 - 0x2F
; queue tag messages, 0x20 - 0x22
M. QTAG_MSG_SIMPLE      equ 0x20 ; O O simple queue tag
M. QTAG_MSG_HEAD        equ 0x21 ; O O head of queue tag
M. QTAG_MSG_ORDERED     equ 0x22 ; O O ordered queue tag
M. IGNORE_WIDE_RESIDUE  equ 0x23 ; O O ignore wide residue
; 0x24 - 0x2F: reserved
; 0x30 - 0x7F: reserved
; 0x80 - 0xFF: identify message
; --------------------------------------------------------------
; extended message, first byte is 0x01
; 0x04 - 0x7F: reserved
; 0x80 - 0xFF: vendor unique
MX MODIFY_DATA_PTS      equ  0x00 ; O O modify data pointer
MX SYNC_DATA_XFER_REQ   equ  0x01 ; O O syncronous data transfer request
MX SCSI1_IDENTIFY         equ  0x02 ; O O reserved, used for SCSI-1 extended
identify message
MX WIDE_DATA_XFER_REQ   equ  0x03 ; O O wide data transfer request
;
MS MIN_1BYTE            equ  0x02 ; 0x02 - 0x1F
MS MAX_1BYTE            equ  0x1F ; 0x02 - 0x1F
MS MIN_2BYTE            equ  0x20 ; 0x20 - 0x2F
MS MAX_2BYTE            equ  0x2F ; 0x20 - 0x2F
MS_MIN_IDENTIFY         equ  0x80 ; identify message ( over 0x80 )
; --------------------------------------------------------------------
; identify message bit setting
IM IDENTIFY_MSG         equ  0x80 ; bit 7, identify message
IM DISC_PRIV            equ  0x40 ; bit 6, allow disconnect priviledge
IM LUN_TAR              equ  0x20 ; bit 5, logical unit target
;
MASK_LUN                equ  0x07 ; to get only bit 0-2, LUN field
SG_ENTRY_PER_CDB        equ  0x0F ;
MAX_BUSY_RETRY          equ  0x10 ;
SELECTION_TIMEOUT       equ  0x10 ;
MAX_TIME_OUT            equ  0xFF ;
NULL                    equ  (0)  ; null pointer
ZERO                    equ  (0)  ;
ONE                     equ  ( ZERO + 1 )
;
; --------------------------------------------------------
ERR_DISC_TIMEOUT               equ 0x0001 ;
ERR_TARGET_MODE_NOT_SUPPORTED  equ 0x0002 ;
ERR_RECONNECT_NO_MSG_IN_1      equ 0x0003 ;
ERR_RECONNECT_NO_MSG_IN_2      equ 0x0004 ;
ERR_RECONNECT_BAD_ID_MSG       equ 0x0005 ;
ERR_SCSI2_RECONNECT_BAD_QTAG   equ 0x0006 ;
ERR_SCSI2_RECONNECT_BAD_QSTAT  equ 0x0007 ;
ERR_SCSI2_RECONNECT_BAD3       equ 0x0008 ;
ERR_SCSI2_RECONNECT_BAD4       equ 0x0009 ;
ERR_SCSI2_RECONNECT_BAD_ID     equ 0x000A ;
ERR_SCSI2_RECONNECT_BAD_LUN    equ 0x000B ;
ERR_SCSI1_RECONNECT_BAD        equ 0x000C ;
ERR_TARGET_NOT_SUPPORTED       equ 0x000D ;
ERR_NO_ID_MSG_AT_SELECT        equ 0x000E ;
ERR_NO_TAG_MSG_AT_SELECT       equ 0x000F ;
```

```
ERR_NO_CMD_OUT                   equ 0x0010 ;
ERR_CMD_OUT_INCOMPLETE           equ 0x0011 ;
ERR_NO_DATA_PHASE                equ 0x0012 ;
ERR_SENSE_XFER_INCOMPLETE        equ 0x0013 ;
ERR_INVALID_DATA_IN_PHASE        equ 0x0014 ;
ERR_INVALID_DATA_OUT_PHASE       equ 0x0015 ;
ERR_ABNORMAL_END_OF_DATA_XFER    equ 0x0016 ;
ERR_NO_STAT_IN                   equ 0x0017 ;
ERR_NO_CMD_CMPL_MSG              equ 0x0018 ;
ERR_BUSY_RETRY_TIMEOUT           equ 0x0019 ;
ERR_RESELECT_SCSI2_RTN           equ 0x001A ;
ERR_RESELECT_SCSI1_RTN           equ 0x001B ;
; date: 5/25/93
ERR_CMD_DONE_MSG                 equ 0x001C ;
ERR_LINK_CMD_DONE                equ 0x001D ;
ERR_LINK_CMD_DONE_WFLAG          equ 0x001E ;
ERR_SG_LIST_NO_DATA_XFER         equ 0x001F ;
ERR_PARITY_DATA_IN               equ 0x0020 ;
ERR_M1_MSG_IN                    equ 0x0021 ;
ERR_M2_MSG_IN                    equ 0x0022 ;
ERR_UNKNOWN_MSG_IN               equ 0x0023 ;
ERR_NO_MSG_IN_AT_EXTMSG          equ 0x0024 ;
ERR_SG_LIST_OVER_FLOW            equ 0x0025 ;
ERR_SG_LIST_UNDER_FLOW           equ 0x0026 ;
ERR_DONE_LINK_CORRUPTED          equ 0x0027 ;
ERR_EXT_MSG_IN_ERROR1            equ 0x0028 ;
ERR_EXT_MSG_IN_ERROR2            equ 0x0029 ;
ERR_UNKNOWN_MSG_IN_01            equ 0x002A ;
ERR_RAISE_ATN_FAILED_01          equ 0x002B ;
ERR_RAISE_ATN_FAILED_02          equ 0x002C ;
ERR_SAVE_DATA_PTR_STATUS         equ 0x002D ;
ERR_RES_DATA_PTR_STATUS          equ 0x002E ;
ERR_DATA_XFER_OVER_RUN           equ 0x002F ; overrun, target still in data phase
                                            ; we have to reset target
;
ERR_WTM_TIMEOUT                  equ 0x00FF ;
;
HALT_EXT_MSG                     equ 0x0100 ;
; ***********************************************************************
;
YEAR         equ 1993 ; year shall be greater than 1990
MONTH        equ 6    ; valid data 0 - 15
DAY          equ 14   ; valid data 0 - 31
VER_MAJOR    equ 1    ; major version number
VER_MINOR    equ 0    ; minor version number
;
CODE_BEG     equ 0x80 ;
VECT_BEG     equ ( (CODE_BEG) - (2*3) ) ;
DATA_BEG     equ ( (CODE_BEG) - 0x40 )  ;
;
; ================================================================
       ORG   ZERO
;
DATA_SECTION:
;
SYN_XFER          equ  1
MSGIN_BUF_SIZE    equ  ( (QUEUE_SIZE)- CMD_REQ_LEN )
;
```

```
msg_in_buffer:
;
;
#if  SYN_XFER
; ------------------------------------------------
syn_msg_buffer:
ext_msg_beg           dc.b   0x01 ; 0x01 is extended message
ext_msg_len           dc.b   0x03 ; message length
ext_msg_req_code      dc.b   0x01 ; 0x01 is syncronous negotiation
ext_msg_xfer_period   dc.b   25   ; 4 ns per unit number
ext_msg_offset        dc.b   15   ;
; ------------------------------------------------
#endif
;
CMD_REQ0         equ  0x03  ; request sense command code
CMD_REQ1         equ  0x00  ; lun bit 7-5, reserved bit 4-0
CMD_REQ2         equ  0x00  ; reserved
CMD_REQ3         equ  0x00  ; reserved
CMD_REQ4         equ  0x00  ; allocation length
CMD_REQ5         equ  0x00  ; control
CMD_REQ_LEN      equ  0x06
;
       ORG   ( (DATA_BEG) - CMD_REQ_LEN )
; ---------------------------------------------------------
cmd_req_sense     dc.b  CMD_REQ0 ; request sense command code
                  dc.b  CMD_REQ1 ; lun bit 7-5, reserved bit 4-0
                  dc.b  CMD_REQ2 ; reserved
                  dc.b  CMD_REQ3 ; reserved
                  dc.b  CMD_REQ4 ; allocation length
                  dc.b  CMD_REQ5 ; control
; -------------------------------------------------------------
; =================================================================
       ORG   DATA_BEG
halt_code         dc.w  0x0000
;
; day:   bit 0-4, 5 bits
; month: bit 5-8, 4 bits
; year:  bit 15-9, 7 bits
;
code_chk_sum      dc.w  0x0000 ; machine code check sum
version_date      dc.w  ( ((((YEAR)-1990)<<9)&0xFE00) | (((MONTH)<<5)&0x01E0)
| ((DAY)&0x001F) )
version_no        dc.b  ( (((VER_MAJOR) & 0x0F) << 4) | ((VER_MINOR) & 0x0F) )
;
host_scsi_id      dc.b  0x80 ; should be set by host
risc_next_ready   dc.b  0x00 ; tail of done queue
risc_done_next    dc.b  0x07 ; head of ready queue
scsi2_enable      dc.b  0xFF ; bit set if corresponding device is SCSI II
scsi1_busy        dc.b  0x00 ; bit set if corresponding device is busy
total_cdb_cnt     dc.b  0x00
active_cdb        dc.b  0x00 ;
reconnect_lun     dc.b  0x00 ;
saved_active_cdb  dc.b  0xFF ; used to check if active_cdb was no prcoess
                             ; because of re-connection
next_active_cdb   dc.b  0x00 ;
sync_negotiation  dc.b  0x00 ;
;
; ---  above data address should not be changed ----------
```

```
;
tempq           dc.b  0x00
count           dc.b  0x00
dummy           dc.b  0xaa
;
; ============================================================
        ORG   (VECT_BEG - 2)
WTM_SEL_TIMEOUT  equ   0x01  ; is selection time out
;
wtm_flag        dc.w  0x0000
        ORG   VECT_BEG
wtm_vect:
                jmp   wtm_isr ; watch dog timer timeout ISR
;
stack0          dc.w  0x0000
stack1          dc.w  0x0000
;
; ***************************************************************
        ORG   CODE_BEG
CODE_SECTION:
code_beg:
        movi.w     ax, #ZERO      ; watch dog timer ISR vector
        mov.w      wtm_flag, ax
; ============================================================
;
; ============================================================
idle_no_cdb:
        mov.b      qp, risc_next_ready
        movi.b     al, #QS_READY
;
idle_no_cdb1:
        jcmpq.b.ne  al, q[ status ], idle_no_cdb1
;
        movi.b     al, #QLINK_TAIL
        mov.b      saved_active_cdb, al
        mov.b      active_cdb, qp       ; save next ready queue to active_cdb
        movi.b     al, #ONE
        mov.b      total_cdb_cnt, al
        movq.b     al, q[ cntl ]
        jtst.b.bs  al, #@QC_SG_LIST, idle_no_cdb_sg_list
;
; next ready queue is not sg_list
;
        movq.b     al, q[ fwd ]
        mov.b      risc_next_ready, al
        jmp        idle_no_cdb_link_itself
; -----------------------------------------------------
; next ready queue is a sg_list
;
idle_no_cdb_sg_list:
;
; is sg_list, we set up q[ sg_list_qp ]
;
        movq.b     al, q[ fwd ] ; save first sg_list in al
        movq.b     q[ sg_list_qp ], al ;  first sg_list queue
        movq.b     q[ x_saved_sg_list_qp ], al ; working sg_list queue
;
; search and mark end of sg_list, testing QC_SG_LIST bit
```

```
; also set risc_next_ready
;
idle_no_cdb_srh_sg_tail:
       movq.b      qp, q[ fwd ]
       movq.b      al, q[ cntl ]
       jtst.b.bs   al, #@QC_SG_LIST, idle_no_cdb_srh_sg_tail
;
; the sg_list has QC_SG_LIST flag set, its q[fwd] is not terminated yet ( 0xFF
)
; if it is terminated, we cannot find the next ready queue
;
       mov.b       risc_next_ready, qp ; set risc_next_ready to q[fwd] of last
sg_list
       movq.b      qp, q[ bwd ] ; restore qp to tail of sg_list
       movi.b      al, #QLINK_TAIL
       movq.b      q[ fwd ], al ; host doesn't set LINK END, we must set it
       mov.b       qp, active_cdb   ; restore qp to active_cdb
;
; set up q[ sg_list_fwd_qp ], must after sg_list being terminated by
QLINK_TAIL
;
       movq.b      qp, q[ fwd ]
       movq.b      al, q[ fwd ] ; working sg_list queue's forward queue
       mov.b       qp, active_cdb
       movq.b      q[ sg_list_fwd_qp ], al ; the forward pointer of working
sg_list
;
idle_no_cdb_link_itself:
       mov.b       al, active_cdb
       movq.b      q[ fwd ], al  ; link pointers to itself
       movq.b      q[ bwd ], al
       jmp         ready_cdb_found
;
; ==========================================================
;
; ==========================================================
idle_next_cdb:
       movi.b      al, #QLINK_TAIL
       mov.b       saved_active_cdb, al
       rflag       #WTM, #RESET_WTM
       jtstf.b.bc  #FreeTimerSet, free_timer_not_set
       rflag       #FTM
       call        dec_timeout_cnt
;
free_timer_not_set:
       movi.b      al, #QS_READY
       jcmpq.b.e   al, q[ status ], ready_cdb_found
;
       movi.b      al, #QS_DISC
       jcmpq.b.ne  al, q[ status ], idle_next_test_busy
;
; the queue is disconnected
; check disconnect time out
;
       movi.b      al, #ZERO
       jcmpq.b.e   al, q[ timeout_chk ], test_next_ready ; no time out
checking needed
;
```

```
        jcmpq.b.e    al, q[ timeout_cntl ], disc_timeout_cntl_zero
        jmp          test_next_ready

disc_timeout_cntl_zero:
        jcmpq.b.e    al, q[ timeout_cntl ], disc_timeout_cntl_zero
        jmp          test_next_ready

disc_timeout_cnt0_zero:
        movi.w       ax, #ERR_DISC_TIMEOUT ; disconnection time out !
        jmp          error_halt
;
idle_next_test_busy:
        movi.b       al, #QS_BUSY
        jcmpq.b.ne   al, q[ status ], test_next_ready
;
; the queue is busy, decrement busy_loop,
; when it reach ZERO, test device ready
;
        movq.b       al, q[ busy_loop ]
        dec.b        al
        jcmpi.b.e    al, #ZERO, idle_next_test_busyl
        movq.b       q[ busy_loop ], al
        jmp          test_next_ready  ; busy loop not expired yet
;
; while retry not expired, keep trying
;
idle_next_test_busyl:
        movq.b       al, q[ init_busy_loop ]
        movq.b        q[ busy_loop ], al       ; set q[busy_loop] to init loop
value
        movq.b       al, q[ busy_retry ]
        jcmpi.b.e     al, #ZERO, ready_cdb_found ; if ZERO, always retry, no
timeout
        dec.b        al
        jcmpi.b.e    al, #ZERO, idle_busy_timeout ; loop expired, try again
        movq.b       q[ busy_retry ], al       ; decrement q[busy_retry]
;
; Note: q[busy_retry] is not decrmented to zero when timeout
;
idle_busy_timeout:
        movi.w       ax, #ERR_BUSY_RETRY_TIMEOUT
        jmp          error_halt
;
test_next_ready:
        mov.b        qp, risc_next_ready
        movi.b       al, #QS_READY
        jcmpq.b.ne   al, q[ status ], idle_next_test_flag ; you should restore
active_cdb
; -----------------------------------------------------
; next queue is ready
;
        mov.b        qp, active_cdb
        movq.b       al, q[ fwd ]
        mov.b        tempq, al    ; save tempq = active_cdb->q_fwd
        mov.b        al, risc_next_ready
        movq.b       q[ fwd ], al
;
        mov.b        qp, tempq
```

```
        mov.b          al, risc_next_ready
        movq.b         q[ bwd ], al
;
        mov.b          qp, risc_next_ready
        mov.b          al, active_cdb
        movq.b         q[ bwd ], al
        mov.b          active_cdb, qp
;
; the risc_next_ready is linked into the active queue
; now let risc_next_ready be the active_cdb
;
        mov.b          al, total_cdb_cnt
        inc.b          al
        mov.b          total_cdb_cnt, al
;
        movq.b         al, q[ cntl ]
        jtst.b.bs      al, #@QC_SG_LIST, idle_next_sg_list
;
; reset risc_next_ready, no sg_list
;
        movq.b         al, q[ fwd ]
        mov.b          risc_next_ready, al
        mov.b          al, tempq
        movq.b         q[ fwd ], al
        jmp            ready_cdb_found
;
; is sg_list, we set up q[ sg_list_qp ] & q[ x_saved_sg_list_qp ]
;
idle_next_sg_list:
        movq.b         al, q[ fwd ]
        movq.b         q[ sg_list_qp ], al
        movq.b         q[ x_saved_sg_list_qp ], al
;
; search and mark end of sg_list, also set risc_next_ready
; Note: after search ends, the qp is not at end of sg_list
;
idle_next_srh_sg_tail:
        movq.b         qp, q[ fwd ]
;
        movq.b         al, q[ cntl ]
        jtst.b.bs      al, #@QC_SG_LIST, idle_next_srh_sg_tail
;
; found next queue of sg_list end, now set risc_next_ready to the qp
;
        mov.b          risc_next_ready, qp
        movq.b         qp, q[ bwd ]  ; restore qp to end of sg_list
        movi.b         al, #QLINK_TAIL
        movq.b         q[ fwd ], al ; mark end of SG_LIST
        mov.b          qp, active_cdb
;
; set up q[ sg_list_fwd_qp ]
;
        movq.b         qp, q[ fwd ]
        movq.b         al, q[ fwd ] ; got working sg_list's forward pointer
        mov.b          qp, active_cdb
        movq.b         q[ sg_list_fwd_qp ], al
;
; now we link the sg_list header q[ fwd ]
```

- 58 -

```
;
        mov.b       al, tempq  ; tempq is last active_cdb->q_fwd
        movq.b      q[ fwd ], al
        jmp         ready_cdb_found
; ------------------------------------------------
idle_next_test_flag:
        mov.b       qp, active_cdb   ; restore active_cdb
;
        jtstf.b.bc  #Reselected, idle_next_tst_target_mode
;
        jmp         reselect_found
;
idle_next_tst_target_mode:
        jtstf.b.bc  #Selected, idle_next_cdb
;
; ============================================================
;
; ============================================================
scsi_target_mode:
        rflag       #WTM, #RESET_WTM
        movi.w      ax, #ERR_TARGET_MODE_NOT_SUPPORTED
        jmp         error_halt
;
; ============================================================
;
; ============================================================
reselect_found:
        rflag       #WTM, #RESET_WTM
        jcmpi.b.e   ph, #PH_MSG_IN, reselect_id_msg
        movi.w      ax, #ERR_RECONNECT_NO_MSG_IN_1
        jmp         error_halt
;
reselect_id_msg:
        movr.b      al, sb    ; first byte of message in phase
        rflag       #ACK
        jtst.b.bs   al, #@IM_IDENTIFY_MSG, reselect_chk_scsi2 ; IDENTIFY mesage
bit 7 always on, 0x80 - 0xFF
        movi.w      ax, #ERR_RECONNECT_BAD_ID_MSG
        jmp         error_halt
;
reselect_chk_scsi2:
;
; next 4 instructions to accomplish anding reconnect_lun with 0x07 !!!
;
        mov.b       reconnect_lun, al ; al contains sb, message in first byte
        movi.b      al, #MASK_LUN
        and.b       al, reconnect_lun
        mov.b       reconnect_lun, al
;
        movr.b      al, id
        and.b       al, scsi2_enable
        jcmpi.b.e   al, #ZERO, reselect_scsil
        jcmpi.b.ne  ph, #PH_MSG_IN, reselect_scsil
;
        movr.b      al, sb  ; second byte of message in phase
        rflag       #ACK
        jcmpi.b.e   al, #M2_QTAG_MSG_SIMPLE, reselect_q_simple
;
```

```
        movi.w       ax, #ERR_SCSI2_RECONNECT_BAD_QTAG
        jmp          error_halt
;
reselect_q_simple:
        jcmpi.b.e    ph, #PH_MSG_IN, reselect_chk_status
        movi.w       ax, #ERR_RECONNECT_NO_MSG_IN_2
        jmp          error_halt
;
reselect_chk_status:
        movr.b       qp, sb     ; third byte, must set qp to verify new qp's
q[status]
        rflag        #ACK
        movi.b       al, #QS_DISC
        jcmpq.b.e    al, q[ status ], reselect2_chk_id   ; check if q[status]
contain valid status
;
        movi.w       ax, #ERR_SCSI2_RECONNECT_BAD_QSTAT
        jmp          error_halt
;
reselect2_chk_id:
        movr.b       al, id
        jcmpq.b.e    al, q[ target_id ], reselect2_chk_lun
        movi.w       ax, #ERR_SCSI2_RECONNECT_BAD_ID
        jmp          error_halt
;
reselect2_chk_lun:
        mov.b        al, reconnect_lun
        jcmpq.b.e    al, q[ target_lun ], reselect2_found
        movi.w       ax, #ERR_SCSI2_RECONNECT_BAD_LUN
        jmp          error_halt
;
reselect2_found:
        mov.b        al, active_cdb
        mov.b        saved_active_cdb, al
        mov.b        active_cdb, qp
        movq.w       pc, q[ x_reconnect_rtn ] ; jump to where it disconnected
;
; program should jmp to last disconnected address
; in case it doesn't, we stop it
        movi.w       ax, #ERR_RESELECT_SCSI2_RTN
        jmp          error_halt
;
reselect_scsil:
        mov.b        al, total_cdb_cnt
        mov.b        tempq, al
;
; search loop begin
sel_next_scsil_beg:
        movi.b       al, #QS_DISC
        jcmpq.b.e    al, q[ status ], reselectl_srh_id
        jmp          get_next_scsil_queue
;
reselectl_srh_id:
        jcmpq.b.e    id, q[ target_id ], reselectl_srh_lun
        jmp          get_next_scsil_queue
;
reselectl_srh_lun:
        mov.b        al, reconnect_lun
```

```
        jcmpq.b.e    al, q[ target_lun ], reselect1_found
;
get_next_scsi1_queue:
        movq.b       qp, q[ fwd ]
        mov.b        al, tempq
        dec.b        al
        mov.b        tempq, al
        jcmpi.b.ne   al, #ZERO, sel_next_scsi1_beg
;
; loop expired, cannot find the cdb of disconnected scsi1
        mov.b        qp, active_cdb
        movi.w       ax, #ERR_SCSI1_RECONNECT_BAD
        jmp          error_halt
;
reselect1_found:
        mov.b        al, active_cdb
        mov.b        saved_active_cdb, al
        mov.b        active_cdb, qp
        movq.w       pc, q[ x_reconnect_rtn ]
;
; program should not return
; in case it does, we stop it
        movi.w       ax, #ERR_RESELECT_SCSI1_RTN
        jmp          error_halt
;
; ==========================================================
;
; ==========================================================
ready_cdb_found:
        rflag        #WTM, #RESET_WTM
        movi.b       al, #ZERO
        jcmpq.b.ne   al, q[ target_id ], ready_cdb_chk_id
        movi.b       al, #QD_BAD_CDB_TRG_ID
        movq.b       q[ done_stat ], al
        jmp          task_done
;
ready_cdb_chk_id:
        mov.b        al, host_scsi_id
        jcmpq.b.ne   al, q[ target_id ], ready_cdb_chk_busy
        movi.b       al, #QD_BAD_CDB_TRG_ID
        movq.b       q[ done_stat ], al
        jmp          task_done
;
ready_cdb_chk_busy:
        mov.b        al, scsi1_busy
        andq.b       al, q[ target_id ]
        jcmpi.b.e    al, #ZERO, ready_cdb_dev_not_busy  ; device not busy if bit
is off
;
; device has an unfinished command
; but may accept command if it is SCSI 2 ( support tagged message )
;
        mov.b        al, scsi2_enable
        andq.b       al, q[ target_id ]
        jcmpi.b.ne   al, #ZERO, ready_cdb_is_scsi2 ; device is scsi 2 if bit is
on
        movi.b       al, #QS_BUSY
        movq.b       q[ status ], al
```

```
        jmp             idle_next_cdb

;ready_cdb_is_scsi2:
;ready_cdb_dev_not_busy:
;
        movi.w          ax, #WTM_SEL_TIMEOUT    ; watch dog timer ISR vector
        mov.w           wtm_flag, ax

        rflag           #WTM, #TO_250MS
        movq.w          id, q[ target_id ]
        sel             Init, #ATN
        jtstf.b.bs      #SelectDone, selection_completed
;
        jtstf.b.bs      #Reselected, reselect_found
;
        jtstf.b.bs      #Selected, scsi_target_mode
;
        movi.b          al, #QD_SELECT_TIMEOUT
        movq.b          q[ done_stat ], al
        jmp             task_done
;
; ==================================================================
;
; ==================================================================
selection_completed:
        rflag           #WTM, #RESET_WTM
        movi.b          al, #QS_ACTIVE
        movq.b          q[ status ], al
;
; set watch dog timer here
;
        movi.w          ax, #ZERO       ; watch dog timer ISR vector
        mov.w           wtm_flag, ax
        rflag           #WTM, #TO_10SEC
        jcmpi.b.e       ph, #PH_MSG_OUT, chk_msg_out
;
        movi.w          ax, #ERR_NO_ID_MSG_AT_SELECT
        jmp             error_halt
;
chk_msg_out:
        movq.b          al, q[ cntl ]
        jtst.b.bc       al, #@QC_MSG_OUT, identify_msg
;
; We do not send tagged message if there are specical message(s) to send
; from the global message buffer, thus jmp to setup_cmd_xfer after calling
; message_out_identify
;
        call            message_out_identify
        jmp             setup_cmd_xfer
;
identify_msg:
;
        mov.b           al, scsi2_enable
        andq.b          al, q[ target_id ]
        jcmpi.b.ne      al, #ZERO, identify_scsi2
; ------------------------------------------------
; identify message scsi1
;
```

```
        rflag          #ATN_OFF ; message out last byte, negate attention
;
        movi.b         al, #( IM_IDENTIFY_MSG | IM_DISC_PRIV )
        orq.b          al, q[ target_lun ]
        movr.b         sb, al  ; hardware will send ACK after data sent to bus
        rflag          #ACK
;
        mov.b          al, scsil_busy
        orq.b          al, q[ target_id ]
        mov.b          scsil_busy, al  ; set current target id busy
        jmp            identify_done
; -------------------------------------------------------
identify_scsi2:
        movi.b         al, #( IM_IDENTIFY_MSG | IM_DISC_PRIV )
        orq.b          al, q[ target_lun ]
        movr.b         sb, al
        rflag          #ACK

        jcmpi.b.e      ph, #PH_MSG_OUT, tagged_queuing_1
        movi.w         ax, #ERR_NO_ID_MSG_AT_SELECT
        jmp            error_halt
;
; tagged queuing
;
; Note: if target queue is full, we will receive Queue Full status
SS_QUEUE_FULL
;
tagged_queuing_1:
        movq.b         sb, q[ tag_code ] ; either 0x20, 0x21, 0x22
        rflag          #ACK
        jcmpi.b.e      ph, #PH_MSG_OUT, tagged_queuing_2
        movi.w         ax, #ERR_NO_ID_MSG_AT_SELECT
        jmp            error_halt
;
tagged_queuing_2:
        rflag          #ATN_OFF  ; negate ATN before last ACK
;        mov.b          al, active_cdb  ; use active_cdb as queue tag
;        movr.b         sb, al
        movr.b         sb, qp
        rflag          #ACK
;
identify_done:
;
; ==========================================================
;
;
; ==========================================================
setup_cmd_xfer:
        movq.w         q[ x_reconnect_rtn ], pc
;
cmd_xfer_while_not_cmd_out:
        jcmpi.b.e      ph, #PH_CMD_OUT, cmd_xfer_outl
        jcmpi.b.e      ph, #PH_MSG_IN, cmd_xfer_chk_disc
        jcmpi.b.e      ph, #PH_MSG_OUT, cmd_xfer_noop
        jcmpi.b.e      ph, #PH_STAT_IN, cmd_xfer_stat_in
        movi.w         ax, #ERR_NO_CMD_OUT
        jmp            error_halt
;
```

```
cmd_xfer_chk_disc:
        call        chk_disconnect
        jmp         cmd_xfer_while_not_cmd_out
;
cmd_xfer_noop:
        call        send_noop
        jmp         cmd_xfer_while_not_cmd_out
;
cmd_xfer_stat_in:
        movi.b      al, #QD_NO_CMD_XFER
        movq.b      q[ done_stat ], al
        jmp         setup_status_xfer
;
cmd_xfer_out1:
        movq.b      al, q[ cntl ]
        jtst.b.bc   al, #@QC_REQ_SENSE, cmd_xfer_out2
; -----------------------------------------------------
; do request sense
        movi.b      ix, #cmd_req_sense
        movi.b      al, #CMD_REQ_LEN
;
cmd_xfer_req_sense:
        jcmpi.b.e   ph, #PH_CMD_OUT, cmd_xfer_req_sense1
;
        movi.w      ax, #ERR_CMD_OUT_INCOMPLETE
        jmp         error_halt
;
cmd_xfer_req_sense1:
        lodx.b      sb
        dec.b       al
        jcmpi.b.e   al, #ZERO, cmd_xfer_req_sense
;
#if 0
; do request sense
        movi.b      sb, #CMD_REQ0
        rflag       #ACK
        jcmpi.b.e   ph, #PH_CMD_OUT, cmd_xfer_sense1
        movi.w      ax, #ERR_CMD_OUT_INCOMPLETE
        jmp         error_halt
;
cmd_xfer_sense1:
        movi.b      sb, #CMD_REQ1
        rflag       #ACK
        jcmpi.b.e   ph, #PH_CMD_OUT, cmd_xfer_sense2
        movi.w      ax, #ERR_CMD_OUT_INCOMPLETE
        jmp         error_halt
;
cmd_xfer_sense2:
        movi.b      sb, #CMD_REQ2
        rflag       #ACK
        jcmpi.b.e   ph, #PH_CMD_OUT, cmd_xfer_sense3
        movi.w      ax, #ERR_CMD_OUT_INCOMPLETE
        jmp         error_halt
;
cmd_xfer_sense3:
        movi.b      sb, #CMD_REQ3
        rflag       #ACK
        jcmpi.b.e   ph, #PH_CMD_OUT, cmd_xfer_sense4
```

```
        movi.w      ax, #ERR_CMD_OUT_INCOMPLETE
        jmp         error_halt
;
cmd_xfer_sense4:
        movq.w      ax, q[ sense_len ]
        movr.b      sb, al
        rflag       #ACK
        jcmpi.b.e   ph, #PH_CMD_OUT, cmd_xfer_sense5
        movi.w      ax, #ERR_CMD_OUT_INCOMPLETE
        jmp         error_halt
;
cmd_xfer_sense5:
        movi.b      sb, #CMD_REQ5
        rflag       #ACK
        jmp         setup_data_xfer
#endif
;
cmd_xfer_out2:
        movi.b      ix, #cdb ; offset of command buffer
        movq.w      ax, q[ cdb_len ] ; AX = command len
;
cmd_xfer_beg:
        jcmpi.b.e   ph, #PH_CMD_OUT, cmd_xfer_out3
        movi.w      ax, #ERR_CMD_OUT_INCOMPLETE
        jmp         error_halt
;
cmd_xfer_out3:
        movqx.b     sb, q[ ix ]
        rflag       #ACK
        dec.b       al
        jcmpi.b.ne  al, #ZERO, cmd_xfer_beg
;
; if both QC_DATA_IN & QC_DATA_OUT bit set, then no data transfer is assumed
; date: 5/23/93
;
        movi.b      al, #( QC_DATA_IN | QC_DATA_OUT )
        andq.b      al, q[ cntl ]
        jcmpi.b.e   al, #( QC_DATA_IN | QC_DATA_OUT ), cmd_xfer_no_data
        jmp         cmd_xfer_tst_sg_list
;
cmd_xfer_no_data:
        movq.b      al, q[ cntl ]
        jtst.b.bc   al, #@QC_SG_LIST, setup_status_req_wait
;
        movi.w      ax, #ERR_SG_LIST_NO_DATA_XFER
        jmp         error_halt
;
cmd_xfer_tst_sg_list:
        movq.b      al, q[ cntl ]
        jtst.b.bs   al, #@QC_SG_LIST, cmd_xfer_sg_list
; ------------------------------------------------
; not sg_list
        movq.w      ax, q[ data_addr0 ]
        movq.w      q[ x_saved_data_addr0 ], ax
        movq.w      ax, q[ data_addr1 ]
        movq.w      q[ x_saved_data_addr1 ], ax
        movq.w      ax, q[ data_cnt0 ]
        movq.w      q[ x_saved_data_cnt0 ], ax
```

```
      movq.w      ax, q[ data_cntl ]
      movq.w      q[ x_saved_data_cntl ], ax
      jmp         setup_data_xfer
;
; ----------------------------------------------------
cmd_xfer_sg_list:
; ----------------------------------------------------
;
; setup transfer address low and high word
      movq.b      qp, q[ x_saved_sg_list_qp ] ; change qp to sg_list
;
      movq.b      al, q[ sg_entry_cnt ] ; al to be saved into sg_list head q
      movi.b      ix, #sg_list0  ;
      movqx.w     da0, q[ ix ]         ; ix=ix+2
      movqx.w     da1, q[ ix ]         ; ix=ix+2
;
; setup ix initial value
; if we are disconneted, after reconnection we restore dma register
; from saved area, we do not use ix to move entry,
; so ix should always point to next entry
;
; setup q[ x_saved_sg_entry_cnt ], and q[ x_saved_sg_entry_index ]
;
      mov.b       qp, active_cdb
;
; setup transfer byte count, low and high words
      movq.w      dc0, q[ sg_first_xfer_cnt ]
      movi.w      dc1, #ZERO ;  high word of transfer count should be zero
      movq.b      q[ x_saved_sg_entry_cnt ], al
      movq.b      q[ x_saved_sg_index ], ix
;
; ========================================================
;
; ========================================================
setup_data_xfer:
      movq.w      q[ x_reconnect_rtn ], pc
;
data_xfer_chk_data_in:
      jcmpi.b.e   ph, #PH_DATA_IN, data_xfer_chk_dir_in
      jmp         data_xfer_chk_data_out
;
data_xfer_chk_dir_in:
      movq.b      al, q[ cntl ]
      jtst.b.bc   al, #@QC_DATA_OUT, data_xfer_beg
;
      movi.w      ax, #ERR_INVALID_DATA_IN_PHASE
      jmp         error_halt
;
data_xfer_chk_data_out:
      jcmpi.b.e   ph, #PH_DATA_OUT, data_xfer_chk_dir_out
      jmp         data_xfer_chk_msg_in
;
data_xfer_chk_dir_out:
      movq.b      al, q[ cntl ]
      jtst.b.bc   al, #@QC_DATA_IN, data_xfer_beg
;
      movi.w      ax, #ERR_INVALID_DATA_OUT_PHASE
      jmp         error_halt
```

- 66 -

```
; ----------------------------------------------------
data_xfer_chk_msg_in:
       jcmpi.b.ne  ph, #PH_MSG_IN, data_xfer_chk_msg_out
       call        chk_disconnect
       jmp         data_xfer_chk_data_in
;
data_xfer_chk_msg_out:
       jcmpi.b.ne  ph, #PH_MSG_OUT, data_xfer_chk_stat_in
       call        send_noop
       jmp         data_xfer_chk_data_in
;
data_xfer_chk_stat_in:
       jcmpi.b.e   ph, #PH_STAT_IN, data_xfer_err_phase
       movi.w      ax, #ERR_NO_DATA_PHASE
       jmp         error_halt
;
data_xfer_err_phase:
       movi.b      al, #QD_NO_DATA_XFER
       movq.b      q[ done_stat ], al
       jmp         setup_status_xfer
;
data_xfer_beg:
       movq.b      al, q[ cntl ]
       jtst.b.bc   al, #@QC_REQ_SENSE, data_xfer_tst_sg_list
; ---------------------------------------------------
; Request Sense data_xfer
; ---------------------------------------------------
       movq.w      da0, q[ sense_addr0 ]
       movq.w      da1, q[ sense_addr1 ]
       movq.w      dc0, q[ sense_len ]
       movi.w      dc1, #ZERO
       movi.b      al, #QS_DATA_XFER
       movq.b      q[ status ], al
       dma
       jtstf.b.bs  #DcZero, setup_status_req_wait
       movi.w      ax, #ERR_SENSE_XFER_INCOMPLETE
       jmp         error_halt
;
data_xfer_tst_sg_list:
       movq.b      al, q[ cntl ]
       jtst.b.bc   al, #@QC_SG_LIST, data_xfer_not_sg_list
; -------------------------------------------------------
; prepre data transfer for sg list
       movi.b      al, #QS_DATA_XFER
       movq.b      q[ status ], al
;
; --------------------------------------------------------------
; SG LIST DATA XFER BEGIN
; --------------------------------------------------------------
data_xfer_sg_list:
       dma
;
; dma tranfer count not expired
; the disconnected or error exit
;
       jtstf.b.bc  #DcZero, dma_xfer_dc_not_zero
;
       movq.b      al, q[ x_saved_sg_entry_cnt ]
```

```
        dec.b         al
        movq.b        q[ x_saved_sg_entry_cnt ], al ; don't destory al !!!
        jcmpi.b.ne    al, #ZERO, data_xfer_fetch_next
;
; al is remain of sg entry count of
; al is zero, test end of list
;
        movq.b        al, q[ sg_list_fwd_qp ] ; al is used as next qp !!!
                                              ; do not destroy it
        jcmpi.b.e     al, #QLINK_TAIL, setup_status_req_wait ; exit from here !!
; --------------------------------------------------------
; the entry count expired on this sg_list queue
; we shall change q[ x_saved_sg_list_qp ] to next sg_list queue
;
; Note: ix will be incremented when we move next entry address
;       into dma register by using index move instruction
;
        movi.b        ix, #sg_list0 ; set ix to beginning of first sg_list
         movq.b          q[ x_saved_sg_list_qp ], al   ; set current working
sg_list_qp
;
        movq.b        qp, q[ x_saved_sg_list_qp ]
        movq.b        al, q[ sg_entry_cnt ]
        mov.b         qp, active_cdb
        movq.b        q[ x_saved_sg_entry_cnt ], al
;
; initialize q[ sg_list_fwd_qp ]
;
        movq.b        qp, q[ x_saved_sg_list_qp ]
        movq.b        al, q[ fwd ]
        mov.b         qp, active_cdb
        movq.b        q[ sg_list_fwd_qp ], al
;
; fetch next entry address of sg_list
;
data_xfer_fetch_next:
; ----------------------------------------------------------
; in this sg_list loop , the ix is saved berfore incremented
;
        movq.b        qp, q[ x_saved_sg_list_qp ]
        movqx.w       da0, q[ ix ]         ; ix=ix+2
        movqx.w       da1, q[ ix ]         ; ix=ix+2
;
        mov.b         qp, active_cdb  ; restore qp
;
; ** the al should contains q[ sg_entry_cnt ]
; if we come to here al is non-zero value
;
        jcmpi.b.ne    al, #ONE, data_xfer_not_last_sg_list
        movq.b        al, q[ sg_list_fwd_qp ]
        jcmpi.b.e     al, #QLINK_TAIL, data_xfer_last_sg_list
;
; more than one sg entry remain
;
data_xfer_not_last_sg_list:
        movq.w        dc0, q[ sg_page_size ]
        movi.w        dc1, #ZERO
        jmp           data_xfer_sg_list
```

```
;
; The last entry of sg_list
;
data_xfer_last_sg_list:
        movq.w      dc0, q[ sg_last_xfer_cnt ]
        movi.w      dc1, #ZERO
        jmp         data_xfer_sg_list
;
; -------------------------------------------------------
; prepare data transfer for non-sg_list
;
data_xfer_not_sg_list:
        movq.w      da0, q[ x_saved_data_addr0 ]
        movq.w      da1, q[ x_saved_data_addr1 ]
        movq.w      dc0, q[ x_saved_data_cnt0 ]
        movq.w      dc1, q[ x_saved_data_cnt1 ]
        movi.b      al, #QS_DATA_XFER
        movq.b      q[ status ], al
;
        dma
        jtstf.b.bc  #DcZero, dma_xfer_dc_not_zero
        jmp         setup_status_req_wait
;
; =======================================================
; DMA completed, transfer count non-zero
; =======================================================
dma_xfer_dc_not_zero:
;
; date: 5-26-93
        jtstf.b.bc  #ParityError, dc_not_zero_wait_status_in
        rflag       #PARITY
        movi.w      ax, #ERR_PARITY_DATA_IN
        jmp         error_halt
;
dc_not_zero_wait_status_in:
        jcmpi.b.e   ph, #PH_STAT_IN, dc_not_zero_stat_in
        jcmpi.b.ne  ph, #PH_MSG_IN, dc_not_zero_wait_msg_out
        call        chk_disconnect
        jmp         dc_not_zero_wait_status_in
;
dc_not_zero_wait_msg_out:
        jcmpi.b.ne  ph, #PH_MSG_OUT, dc_not_zero_no_stat_in
        call        send_noop
        jmp         dc_not_zero_wait_status_in
;
dc_not_zero_no_stat_in:
        movi.w      ax, #ERR_NO_STAT_IN
        jmp         error_halt
;
#if 0
        movi.b      al, #( QC_DATA_IN | QC_DATA_OUT )
        andq.b      al, q[ cntl ]
        jcmpi.b.ne  al, #ZERO, dc_not_zero_err ; check transfer count error
        jmp         setup_status_xfer  ; ignore tranfer count incomplete
#endif
;
; dc_not_zero_err:
dc_not_zero_stat_in:
```

```
       movi.b       al, #QD_DATA_XFER_UNDER_RUN
       movq.b       q[ done_stat ], al
       jmp          setup_status_xfer
;
; ==========================================================
;
; ==========================================================
setup_status_req_wait:
       movq.w       q[ x_reconnect_rtn ], pc
;
; date: 5-26-93
       jtstf.b.bc   #ParityError, wait_status_in
       rflag        #PARITY
       movi.w       ax, #ERR_PARITY_DATA_IN
       jmp          error_halt
; ----------------------------------------------------
; wait status phase or disconnection
;
wait_status_in:
       jcmpi.b.e    ph, #PH_STAT_IN, setup_status_xfer
       jcmpi.b.ne   ph, #PH_MSG_IN, wait_msg_out
       call         chk_disconnect
       jmp          wait_status_in
;
wait_msg_out:
       jcmpi.b.ne   ph, #PH_MSG_OUT, err_no_stat_in
       call         send_noop
       jmp          wait_status_in
;
; -------------------------------------------------------------
; if we come to here, target can only be in either of following three phases
; 1. PH_DATA_OUT: data out over run, target still in data out phase
; 2. PH_DATA_IN:  data in over run, target still in data in phase
; 3. PH_CMD_OUT:
;
err_no_stat_in:
       movi.w       ax, #ERR_NO_STAT_IN
       jmp          error_halt
;
; ==========================================================
;
; ==========================================================
setup_status_xfer:
       movq.b       q[ scsi_stat ], sb  ; get status
       rflag        #ACK
;
       jcmpi.b.e    ph, #PH_MSG_IN, status_chk_done
       movi.w       ax, #ERR_NO_CMD_CMPL_MSG
       jmp          error_halt
;
status_chk_done:
       movr.b       al, sb
       rflag        #ACK
       movq.b       q[ scsi_msg ], al
       jcmpi.b.e    al, #MS_CMD_DONE, status_done
;
       jcmpi.b.ne   al, #M1_LINK_CMD_DONE, status_chk_link_wflag
       movi.w       al, #ERR_LINK_CMD_DONE
```

```
        jmp         error_halt
;
status_chk_link_wflag:
        jcmpi.b.ne  al, #M1_LINK_CMD_DONE_WFLAG, status_err_scsi_msg
        movi.w      ax, #ERR_LINK_CMD_DONE_WFLAG
        jmp         error_halt
;
status_err_scsi_msg:
        movi.w      ax, #ERR_CMD_DONE_MSG
        jmp         error_halt
;
status_done:
        waitfree
        movi.b      al, #SS_GOOD
        jcmpq.b.e   al, q[ scsi_stat ], task_done
;
        movi.b      al, #SS_TARGET_BUSY
        jcmpq.b.ne  al, q[ scsi_stat ], status_chk
;
        movi.b      al, #QS_BUSY
        movq.b      q[ status ], al
;
status_chk:
        movi.b      al, #SS_CHK_CONDITION
        jcmpq.b.ne  al, q[ scsi_stat ], status_bad
;
        movq.b      al, q[ cntl ]
        jtst.b.bs   al, #@QC_REQ_SENSE, status_cannot_get_sense
;
; do request snese, original q[ cntl ] destroyed
; date: 5-26-93
;
        movi.b      al, #( QC_REQ_SENSE | QC_DATA_IN ) ; force do request sense
        movq.b      q[ cntl ], al
        movi.b      al, #QS_READY
        movq.b      q[ status ], al
        jmp         ready_cdb_found
;
status_cannot_get_sense:
        movi.w      ax, #QD_CAN_NOT_GET_SENSE
        jmp         task_done
;
status_bad:
        movi.b      al, #QD_BAD_SCSI_STATUS
        movq.b      q[ done_stat ], al
;
; ========================================================
;
; ========================================================
task_done:
        rflag       #WTM, #RESET_WTM
        mov.b       al, scsi1_busy
        andq.b      al, q[ target_id ]
         jcmpi.b.e    al, #ZERO,  task_done_unlink_q ; if not scsi 1, goto
task_done_x
;
; is scsi 1, clear scsi1_busy
;
```

```
        mov.b       al, scsil_busy
        xorq.b      al, q[ target_id ]
        mov.b       scsil_busy, al
;
task_done_unlink_q:
        mov.b       al, total_cdb_cnt
        jcmpi.b.e   al, #ONE, task_done_unlink_done
;
        movq.b      al, q[ fwd ]
        movq.b      qp, q[ bwd ]        ; current qp changed to q[bwd]
        movq.b      q[ fwd ], al
;
        mov.b       qp, active_cdb   ; restore active_cdb
        movq.b      al, q[ bwd ]
        movq.b      qp, q[ fwd ]        ; current qp changed to q[fwd]
        movq.b      q[ bwd ], al
;
        mov.b       qp, active_cdb   ; restore active_cdb
;
task_done_unlink_done:
        movq.b      al, q[ fwd ]
        mov.b       next_active_cdb, al
        mov.b       al, risc_done_next
        movq.b      q[ bwd ], al
;
        movq.b      al, q[ cntl ]
        jtst.b.bs   al, #@QC_SG_LIST, task_done_sg_list
;
; not sg_list, mark q[ fwd ] as tail
;
        movi.b      al, #QLINK_TAIL ; mark the queue as end of queue
        movq.b      q[ fwd ], al
        jmp         task_done_set_risc_done_next
;
; mark q[ fwd ] of sg_list's cdb to its sg_list
;
task_done_sg_list:
        movq.b      al, q[ sg_list_qp ]
        movq.b       q[ fwd ], al       ; let active_cdb->q_fwd = active_cdb-
>qx_sg_list_QP
;
task_done_set_risc_done_next:
        movi.b      al, #QS_DONE
        movq.b      q[ status ], al
        mov.b       qp, risc_done_next  ; qp changed to risc_done_next
        movq.b      al, q[ fwd ]
        jcmpi.b.e   al, #QLINK_TAIL, task_done_link_done_list
;
; error ! tail of done list is not #QLINK_TAIL
;
        movi.w      ax, #ERR_DONE_LINK_CORRUPTED
        jmp         error_halt
;
; link q[ fwd ] of done list tail to active_cdb
;
task_done_link_done_list:
        mov.b       al, active_cdb
        movq.b      q[ fwd ], al
```

```
      mov.b        risc_done_next, al
      mov.b        qp, active_cdb
;
; search end of list, both sg_lis and non-sg_list
; then set risc_next_done to end of active queue
;
done_set_risc_done_next:
      movq.b       al, q[ fwd ]
      jcmpi.b.e    al, #QLINK_TAIL, task_done_tail_found
      movq.b       qp, q[ fwd ]
      mov.b        risc_done_next, qp  ; do not put QLINK_TAIL into it
      jmp          done_set_risc_done_next
;
task_done_tail_found:
      sint         ; set interrupt to host
;
      mov.b        al, total_cdb_cnt
      dec.b        al
      mov.b        total_cdb_cnt, al
;
; when the total_cdb_cnt is zero, not even active_cdb is valid !!!
;
      jcmpi.b.e    al, #ZERO, idle_no_cdb  ; total_cdb_cnt = 0
      jcmpi.b.e    al, #ONE, get_next_active_cdb
      mov.b        al, saved_active_cdb
      jcmpi.b.e    al, #QLINK_TAIL, get_next_active_cdb
;
; reconnection occured in doing saved_active_cdb, redo the saved_active_cdb
;
      mov.b        qp, saved_active_cdb
      movi.b       al, #QS_READY
      jcmpq.b.ne   al, q[ status ], get_next_active_cdb
      mov.b        active_cdb, qp
      jmp          idle_next_cdb
;
; there is not reconnection happened in processing this cdb
;
get_next_active_cdb:
      mov.b        qp, next_active_cdb
      mov.b        active_cdb, qp
      jmp          idle_next_cdb
;
; ========================================================
;
; ========================================================
chk_disconnect:
      jcmpi.b.ne   ph, #PH_MSG_IN, check_disc_end
;
; date: 5-30-93
;
      movr.b       al, sb
      rflag        #ACK
      jcmpi.b.ne   al, #M1_SAVE_DATA_PTR, check_disc_msg
;
; date: 6/15/93 mark out checking q[ status ]
;
;       movq.b       al, q[ status ]
;       jcmpi.b.ne   al, #QS_DATA_XFER, save_data_ptr_err_status
```

```
; ---------------------------------------------
; save current dma register
        movq.w      q[ x_saved_data_addr0 ], da0
        movq.w      q[ x_saved_data_addr1 ], da1
        movq.w      q[ x_saved_data_cnt0 ], dc0
        movq.w      q[ x_saved_data_cnt1 ], dc1
        movq.b      q[ x_saved_sg_index ], ix ; save the ix for disconnection
;
        jmp         chk_disconnect
; ---------------------------------------------------
; currently this error is not processed !!!
;
save_data_ptr_err_status:
        movi.w      ax, #ERR_SAVE_DATA_PTR_STATUS
        jmp         error_halt
; ------------------------------------------------------
check_disc_msg:
        jcmpi.b.ne  al, #M1_DISCONNECT, check_disc_noop
;
; disconnect message
;
        waitfree
        movi.b      al, #QS_DISC
        movq.b      q[ status ], al
        jmp         idle_next_cdb
; -------------------------------------------------------
check_disc_noop:
        jcmpi.b.ne  al, #M1_NO_OP, check_disc_restore_ptrs
;
; do no thing when you get a noop message !!
;
        jmp         chk_disconnect
; ----------------------------------------------------------
check_disc_restore_ptrs:
        jcmpi.b.ne  al, #M1_RESTORE_PTRS, check_disc_ext_msg
; ------------------------------------------------
; handle Restore Pointer Message
        movq.b      al, q[ status ]
        jcmpi.b.ne  al, #QS_DISC, res_data_ptr_err_status
;
        movq.w      da0, q[ x_saved_data_addr0 ]
        movq.w      da1, q[ x_saved_data_addr1 ]
        movq.w      dc0, q[ x_saved_data_cnt0 ]
        movq.w      dc1, q[ x_saved_data_cnt1 ]
        movq.b      ix, q[ x_saved_sg_index ] ; restore ix from disconnection
        jmp         chk_disconnect
;
res_data_ptr_err_status:
        movi.w      ax, #ERR_RES_DATA_PTR_STATUS
        jmp         error_halt
;
; ----------------------------------------------------------
check_disc_ext_msg:
;
        jcmpi.b.ne  al, #MS_EXTEND, check_disc_more
        mov.b       msg_in_buffer, al
        call        message_in_01
;
```

```
; returned from message_in subroutine
; see if host want us to send message out
;
       movq.b      al, q[ cntl ]
       jtst.b.bc   al, #@QC_MSG_OUT, check_disc_no_more_msg
;
       rflag       #ATN_ON  ; we have message to send
       rflag       #ACK   ; we ACK the last bytes
       jcmpi.b.e   ph, #PH_MSG_OUT, check_disc_msg_out
;
; raise attension failed !
;
       movi.w      ax, #ERR_RAISE_ATN_FAILED_01
       jmp         error_halt
;
; host want us to send message out as result of last message in
;
check_disc_msg_out:
       call        message_out_beg
       jmp         chk_disconnect
;
check_disc_no_more_msg:
       rflag       #ACK   ; we ACK the last byte
;
       jmp         chk_disconnect
;
check_disc_more:
; ******************************
; for implement more check
; not implemented yet !!!
;
       jmp         chk_disconnect
;
check_disc_end:
       ret
; ==========================================================
;
; ==========================================================
send_noop:
       rflag       #ATN_OFF  ;  reset attention before last ACK
       movi.b      al, #M1_NO_OP
       movr.b      sb, al  ;
       rflag       #ACK
       ret
;
; ==========================================================
;
; ==========================================================
error_halt:
       mov.w       halt_code, ax
       halt        #INT
       mov.b       qp, active_cdb   ; restore active_cdb
;
; when error halt, total_cdb_cnt cannot be zero,
; so we jump back to idle_next_cdb
;
       jmp         idle_next_cdb
;
```

```
; ==========================================================
; watch dog-timer time out ISR
; ==========================================================
wtm_isr:
        mov.b       qp, active_cdb    ; restore active_cdb
        mov.b       al, wtm_flag
        jtst.b.bs   al, #@WTM_SEL_TIMEOUT, sel_timeout_isr
;
        movi.b      al, #QD_WTM_TIMEOUT
        movq.b      q[ done_stat ], al
        jmp         task_done
;
; ==========================================================
; selection time out ISR
; ==========================================================
sel_timeout_isr:
        movi.b      al, #QD_SELECT_TIMEOUT
        movq.b      q[ done_stat ], al
        jmp         task_done
;
; ==========================================================
; decrement q[ timeout_cnt ] until zero
;
; ==========================================================
dec_timeout_cnt:
        mov.b       al, total_cdb_cnt
        mov.b       tempq, al
;
dec_timeout_beg:
        movi.b      al, #QS_DISC
        jcmpq.b.e   al, q[ status ], dec_timeout_disc
        jmp         dec_timeout_next
;
dec_timeout_disc:
        movq.b      al, q[ timeout_chk ]
        jcmpi.b.ne  al, #ZERO, dec_timeout_chk
        jmp         dec_timeout_next
;
dec_timeout_chk:
        movq.b      al, q[ timeout_cnt1 ]
        jcmpi.b.ne  al, #ZERO, dec_msb_not_zero
        movq.b      al, q[ timeout_cnt0 ]
        jcmpi.b.ne  al, #ZERO, dec_msb_zero_lsb_not_zero
        jmp         dec_timeout_next    ; already zero !!
;
; MSB is not zero, LSB unknown at this time
;
dec_msb_not_zero:
        movq.b      al, q[ timeout_cnt0 ]
        dec.b       al
        movq.b      q[ timeout_cnt0 ], al
        jcmpi.b.e   al, #0xFF, dec_msb_also
        jmp         dec_timeout_next
;
dec_msb_also:
        movq.b      al, q[ timeout_cnt1 ]
        dec.b       al
        movq.b      q[ timeout_cnt1 ], al
```

```
        jmp          dec_timeout_next
;
dec msb_zero_lsb_not_zero:
        movq.b       al, q[ timeout_cnt0 ]
        dec.b        al
        movq.b       q[ timeout_cnt0 ], al
;
dec timeout_next:
        mov.b        al, tempq
        dec.b        al
        mov.b        tempq, al
        jcmpi.b.e    al, #ZERO, dec_timeout_done
        movq.b       qp, q[ fwd ]
        jmp          dec_timeout_beg
;
dec_timeout_done:
        mov.b        qp, active_cdb
        ret
;
; ============================================================
;
; ============================================================
message_out_identify:
        movi.b       al, #( IM_IDENTIFY_MSG )
        orq.b        al, q[ target_lun ]
        movr.b       sb, al  ; hardware will send ACK after data sent to bus
        rflag        #ACK
;
        jcmpi.b.e    ph, #PH_MSG_OUT, message_out_beg
;
        movi.w       ax, #ERR_NO_ID_MSG_AT_SELECT
        jmp          error_halt
; --------------------------------------------------------------------
; the entry point is called by check_disconnect to send out message
;
message_out_beg:
        mov.b        al, msg_in_buffer
        jcmpi.b.ne   al, #MS_EXTEND, message_out_not_ext ; do not destroy al !!
; --------------------------------------------------------------------
; send extended message, the al contains first byte of message
;
        movi.b       ix, #ZERO
        lodx.b       sb     ; extended message first byte
        rflag        #ACK
        mov.b        al, ext_msg_len ; extended message length
;
message_ext_loop_beg:
        jcmpi.b.e    ph, #PH_MSG_OUT, message_ext_loop1
        movi.w       ax, #ERR_NO_ID_MSG_AT_SELECT
        jmp          error_halt
;
message_ext_loop1:
        lodx.b       sb
        rflag        #ACK
;
        dec.b        al
;
        jcmpi.b.ne   al, #ZERO, message_ext_loop_beg
```

```
;
; message_ext_loop_end:
;
        jcmpi.b.e   ph, #PH_MSG_OUT, message_ext_last_byte
        movi.w      ax, #ERR_NO_ID_MSG_AT_SELECT
        jmp         error_halt
;
message_ext_last_byte:
        rflag       #ATN_OFF
        lodx.b      sb
        rflag       #ACK
;
        jcmpi.b.e   ph, #PH_MSG_IN, get_ext_msg_in
        movi.w      ax, #HALT_EXT_MSG
        mov.w       halt_code, ax
        halt        #INT
        jmp         test_ext_msg_done
;
get_ext_msg_in:
        call        message_in
;
test_ext_msg_done:
;
; if the QC_MSG_OUT flag is still on, send more message
;
        movq.b      al, q[ cntl ]
        jtst.b.bs   al, #@QC_MSG_OUT, prepare_msg_out_again
;
        rflag       #ACK
        ret
;
prepare_msg_out_again:
;
; We will raise attention again to send out more message
;
;        sel         Init, #ATN
        rflag       #ATN_ON
        rflag       #ACK
;
        jcmpi.b.e   ph, #PH_MSG_OUT, message_out_beg
        movi.w      ax, #ERR_RAISE_ATN_FAILED_02
        jmp         error_halt
;
; ----------------------------------------------------------------------
;
; send message, the al contains first byte of message
;
message_out_not_ext:
;
        rflag       #ATN_OFF
        movr.b      sb, al
        rflag       #ACK
        ret
;
; ================================================================
; this subroutine handles:
; 1. extended message
;
```

```
; Note: the subroutine does not reset ACK after last byte is sent
; ==============================================================
;
message_in:
;
        movr.b       al, sb
        rflag        #ACK
;
        mov.b        msg_in_buffer, al
        jcmpi.b.ne   al, #MS_EXTEND, not_ext_message_in
; -----------------------------------------------------------
; this entry point is called by check_discconect when extended
; message is received,
;
message_in_01:
        jcmpi.b.e    ph, #PH_MSG_IN, get_ext_msg_in_len
        movi.w       ax, #ERR_EXT_MSG_IN_ERROR1
        jmp          error_halt
;
get_ext_msg_in_len:
        movr.b       al, sb
        rflag        #ACK
        mov.b        ext_msg_len, al
        movi.b       ix, #2     ; start from
;
get_ext_msg_in_loop_beg:
        jcmpi.b.e    ph, #PH_MSG_IN, get_ext_msg_in_loop1
        movi.w       ax, #ERR_EXT_MSG_IN_ERROR2
        jmp          error_halt
;
get_ext_msg_in_loop1:
        dec.b        al
        jcmpi.b.e    al, #ZERO, get_ext_msg_in_loop_end
;
        stox.b       sb  ; store [ix] to sb, ix=ix+1
        rflag        #ACK
        jmp          get_ext_msg_in_loop_beg
;
get_ext_msg_in_loop_end:
;
; The last byte is not received yet
; We will not reset ack after it is sent as to prevent target from changing
; phase
;
        stox.b       sb         ; store the last byte of message in
;
        movi.w       ax, #HALT_EXT_MSG
        mov.w        halt_code, ax
        halt         #INT ; waiting for host to restart CPU
        ret
; -----------------------------------------------------------
;
;
not_ext_message_in:
        movi.w       ax, #ERR_UNKNOWN_MSG_IN_01
        jmp          error_halt
;
        ret
```

```
;
        END  ; End Of File
```

APPENDIX IV

```
--
-- This is synthesize model for SEAL register decode logic
--

-- library WORK;
-- use WORK.sys_pkg.all;

entity reg_dec is
  port (
        cs : in vlbit;
        master : in vlbit;
        adr : in vlbit_vector (3 downto 2);
        ben : in vlbit_vector (3 downto 2);
        ben0 : in vlbit;
        reg_bank1 : in vlbit;

        adr1 : out vlbit;
        adr0 : out vlbit;
        risc_cs : out vlbit;        -- risc register address
        confrom_cs : out vlbit;     -- configuration register and EEprom
        h_pc_cs : out vlbit;
        h_ofs_cs : out vlbit;
        lm_cs : out vlbit;
        contrl_cs : out vlbit;
        stat_int_cs : out vlbit;

        h_cnt_cs : out vlbit;       -- transfer pointer and counter
        h_id_adr : out vlbit;
        sc_dat_adr : out vlbit;
        sc_ctl_adr : out vlbit;
        h_fifo_cs : out vlbit;
        flg_adr : out vlbit
    );
end reg_dec;

architecture BEHAVIORAL of reg_dec is

  signal adr0_i : vlbit;
  signal adr1_i : vlbit;
  signal confrom_i : vlbit;

begin
  adr1_i <= NOT ben(3);
  adr0_i <= ben(2) and ben0;
  adr0 <= adr0_i;
  adr1 <= adr1_i;
  confrom_cs  <= confrom_i;
  confrom_i   <= cs and NOT master and NOT reg_bank1 and NOT adr(3);
  lm_cs       <= cs and NOT master and NOT reg_bank1 and     adr(3);
  h_pc_cs     <= cs and NOT master and NOT reg_bank1 and     adr(3) and     adr(2)
                 and NOT adr1_i;
  h_ofs_cs    <= cs and NOT master and NOT reg_bank1 and     adr(3) and NOT adr(2)
                 and     adr1_i and     adr0_i;
  stat_int_cs <= cs and NOT master and NOT reg_bank1 and     adr(3) and NOT adr(2)
```

```
            and NOT adr1_i and    adr0_i;
contrl_cs  <= cs and NOT master              and    adr(3) and    adr(2)
           and    adr1_i and    adr0_i;

risc_cs    <= cs and NOT master and    reg_bank1 and NOT adr(3) and NOT adr(2);
h_fifo_cs  <= cs and NOT master and    reg_bank1 and NOT adr(3) and    adr(2);
h_id_adr   <= cs and NOT master and    reg_bank1 and NOT adr(3) and    adr(2)
           and NOT adr1_i and    adr0_i;
flg_adr    <= cs and NOT master and    reg_bank1 and NOT adr(3) and    adr(2)
           and    adr1_i and    adr0_i;
h_cnt_cs   <= cs and NOT master and    reg_bank1 and    adr(3);
sc_ctl_adr <= cs and NOT master and    reg_bank1 and    adr(3) and NOT adr(2)
           and NOT adr1_i and    adr0_i;
sc_dat_adr <= cs and NOT master and    reg_bank1 and    adr(3) and NOT adr(2)
           and    adr1_i and    adr0_i;

end BEHAVIORAL;
```

```
-- This is behavioral model for top level Local Memory
--
--library WORK;
--use WORK.sys_pkg.all;

entity lm_ctl is
 port (
-- RISC block interface
     RCMREQ : in vlbit;                  -- level, reset by RCMDONE
     RCMDONE : out vlbit;                -- pulse, local memory to RISC acknowlodge
     RWREN : in vlbit;                   -- 1 = write, 0 = read
     WORD : in vlbit;                    -- 1 = word, 0 = byte
     RMEM_DIN  : in vlbit_vector(15 downto 0);
     RMEM_DO_H : out vlbit_vector(15 downto 8);
     RMEM_DO_L : out vlbit_vector(7 downto 0);
     RMEM_ADR  : in vlbit_vector(14 downto 0);

-- VESA / ISA block interface
-- VESA is always word operation
     H_IN_BUS : out vlbit_vector(15 downto 0);
     H_OUT_BUS : in vlbit_vector(15 downto 0);
     HOST_DONE : out vlbit;
     LRAM_CS : in vlbit;
     H_ADR  : in vlbit_vector(2 downto 0);
     H_WR   : in vlbit;
     H_RD   : in vlbit;

-- External memory interface
     LMEM_DIN_H  : out vlbit_vector(15 downto 8);
     LMEM_DIN_L  : out vlbit_vector(7 downto 0);
     LMEM_DOUT   : in  vlbit_vector(15 downto 0);
     LMEM_ADR    : out vlbit_vector(14 downto 1);
     CS0N  : out vlbit;
     CS1N  : out vlbit;
     HS_DONE  : out vlbit;
     LMEM_WRN : out vlbit;
-- Genernal signal
     MEM_WAIT : in vlbit_vector(1 downto 0);
     MEM8 : in vlbit;
     RST : in vlbit;
     CLK : in vlbit
     );
end lm_ctl;

architecture BEHAVIORAL of lm_ctl is
  signal hr_state : vlbit_vector(1 downto 0);
  signal lp_state : vlbit_vector(2 downto 0);
  signal lmc_state : vlbit_vector(2 downto 0);

  constant lp_st0v: vlbit_vector(2 downto 0) := b"000";
  constant lp_st1v: vlbit_vector(2 downto 0) := b"001";
  constant lp_st2v: vlbit_vector(2 downto 0) := b"010";
```

```
 constant lp_st3v: vlbit_vector(2 downto 0) := b"011";
 constant lp_st4v: vlbit_vector(2 downto 0) := b"100";
 constant lp_st5v: vlbit_vector(2 downto 0) := b"101";
--constant lp_st6v: vlbit_vector(2 downto 0) := b"110";

 constant idlev  : vlbit_vector(2 downto 0) := b"000";
 constant cy_10v : vlbit_vector(2 downto 0) := b"001";
 constant cy_11v : vlbit_vector(2 downto 0) := b"010";
 constant cy_12v : vlbit_vector(2 downto 0) := b"011";
 constant cy_20v : vlbit_vector(2 downto 0) := b"100";
 constant cy_21v : vlbit_vector(2 downto 0) := b"101";
 constant lastv  : vlbit_vector(2 downto 0) := b"110";

 constant hr_st0v: vlbit_vector(1 downto 0) := b"00";
 constant hr_st1v: vlbit_vector(1 downto 0) := b"01";
 constant hr_st2v: vlbit_vector(1 downto 0) := b"10";
 constant hr_st3v: vlbit_vector(1 downto 0) := b"11";

 constant lp_st0: integer := 0;
 constant lp_st1: integer := 1;
 constant lp_st2: integer := 2;
 constant lp_st3: integer := 3;
 constant lp_st4: integer := 4;
 constant lp_st5: integer := 5;
--constant lp_st6: integer := 6;

 constant idle  : integer := 0;
 constant cy_10 : integer := 1;
 constant cy_11 : integer := 2;
 constant cy_12 : integer := 3;
 constant cy_20 : integer := 4;
 constant cy_21 : integer := 5;
 constant last  : integer := 6;

 constant hr_st0: integer := 0;
 constant hr_st1: integer := 1;
 constant hr_st2: integer := 2;
 constant hr_st3: integer := 3;

 signal hmreq  : vlbit;
 signal hwren  : vlbit;
 signal risc_gnt : vlbit;
 signal host_gnt : vlbit;

 signal lat_r_dat0 : vlbit;

 signal HWR_LMEM_DAT   : vlbit;
 signal HWR_LMEM_ADR   : vlbit;
 signal HRD_LMEM_DAT   : vlbit;
 signal HRD_LMEM_DAT_L : vlbit;
 signal HRD_LMEM_DAT_H : vlbit;
 signal HRD_LMEM_ADR_L : vlbit;
 signal HRD_LMEM_ADR_H : vlbit;
```

```
 signal h_lmem_reg : vlbit_vector(15 downto 0);
 signal h_lmem_reg_h_in : vlbit_vector(7 downto 0);
 signal h_lmem_reg_l_in : vlbit_vector(7 downto 0);
 signal h_lmem_adrh : vlbit_vector(15 downto 8);
 signal h_lmem_adrl : vlbit_vector(7 downto 0);
-- signal h_lmem_adr_in : vlbit_vector(15 downto 0);
 signal r_lmem_reg : vlbit_vector(7 downto 0);
 signal res_17 : vlbit_1d(16 downto 0);

 signal lmem_proc  : vlbit;
 signal wr_en      : vlbit;
 signal latch_data : vlbit;
 signal rst_proc   : vlbit;
 signal start_proc : vlbit;
 signal done       : vlbit;
 signal wr_en_inc_adr : vlbit;
 signal rd_en_inc_adr : vlbit;

 signal cycle_1    : vlbit;
 signal cycle_2    : vlbit;

 signal cs1_mem16  : vlbit;
 signal cs1_mem8   : vlbit;
 signal inc_h_adr  : vlbit;
 signal inc_h_adr_clkh     : vlbit;
 signal inc_h_adr_clkl     : vlbit;
 signal lmem_wr_hdat_l     : vlbit;
 signal lmem_wr_hdat_l_clk     : vlbit;
 signal lmem8_wr_hdat_h    : vlbit;
 signal lmem8_wr_hdat_h_clk    : vlbit;
 signal lmem16_wr_hdat_h   : vlbit;
 signal lmem16_wr_hdat_h_clk   : vlbit;

begin

-------------------------------------------------------------------------------

 control : block
  begin

   LMEM_WRN <= not ((host_gnt and HWREN and wr_en) or
            (risc_gnt and RWREN and wr_en)) ;

   CS0N  <= not (host_gnt or
          (risc_gnt and not (cycle_1 and RMEM_ADR(0) and (not WORD) and not MEM8 ))) ;

   cs1_mem16 <= host_gnt or
          (risc_gnt and cycle_1 and     WORD ) or
          (risc_gnt and cycle_1 and not WORD and RMEM_ADR(0));
   cs1_mem8  <= (host_gnt and cycle_2 ) or
          (risc_gnt and cycle_2 ) or
          (risc_gnt and cycle_1 and not WORD and RMEM_ADR(0));
   CS1N    <= (not MEM8 and not cs1_mem16) or
              (MEM8 and    cs1_mem8);
```

```
   -- CS1 = lmem_adr(0) when MEM8=1
   -- CS1 = lmem_cs1    when MEM8=0 or MEM16=1
   lat_r_dat0 <= risc_gnt and (not RWREN) and latch_data and cycle_1 and WORD and not MEM8;

   RCMDONE <= risc_gnt and done;

--  RMOE <= RCMREQ and risc_gnt and not RWREN;

   HS_DONE <= NOT hmreq;
   HOST_DONE <= not (LRAM_CS AND (not H_ADR(2))            AND (not H_ADR(0)) and
hmreq);

   HWR_LMEM_DAT <= (not hmreq) AND LRAM_CS AND H_WR AND (not H_ADR(2)) AND
(not H_ADR(1)) AND (not H_ADR(0)) ;
   HWR_LMEM_ADR <= (not hmreq) AND LRAM_CS AND H_WR AND (not H_ADR(2)) AND
H_ADR(1) AND (not H_ADR(0)) ;
   HRD_LMEM_DAT_L <= LRAM_CS AND H_RD AND (not H_ADR(2)) AND (not H_ADR(1)) ;
   HRD_LMEM_DAT_H <= LRAM_CS AND H_RD AND (not H_ADR(2)) AND (not H_ADR(1))
AND (not H_ADR(0));
   HRD_LMEM_ADR_L <= LRAM_CS AND H_RD AND                  H_ADR(1);
   HRD_LMEM_ADR_H <= LRAM_CS AND H_RD AND                  H_ADR(1) AND (not
H_ADR(0));
   HRD_LMEM_DAT <= LRAM_CS AND H_RD AND (not H_ADR(2)) AND (not H_ADR(1)) AND
(not H_ADR(0));

   res_17 <= addum((h_lmem_adrh & h_lmem_adrl) , '0' & b"10");
  end block control;

------------------------------------------------------------------------------

 risc_mem_out : block
  begin

   RMEM_DO_L(7 downto 0) <=
     r_lmem_reg when risc_gnt='1' and WORD='1' and MEM8='1' and cycle_2='1' else
     LMEM_DOUT(15 downto 8) when risc_gnt='1' and WORD='0' and MEM8='0' and
RMEM_ADR(0)='1' else
     LMEM_DOUT(7 downto 0);

   RMEM_DO_H(15 downto 8) <=
        LMEM_DOUT(7 downto 0) when risc_gnt='1' and WORD='1' and MEM8='1' else
        LMEM_DOUT(15 downto 8);

  end block risc_mem_out;

------------------------------------------------------------------------------

 local_mem_in : block
  begin

   LMEM_DIN_L(7 downto 0) <=
    h_lmem_reg(7 downto 0) when host_gnt='1' and cycle_1='1' else
    h_lmem_reg(15 downto 8) when host_gnt='1' and cycle_2='1' else
    RMEM_DIN(15 downto 8) when risc_gnt='1' and cycle_2='1' else
```

```
    RMEM_DIN(7 downto 0);

   LMEM_DIN_H(15 downto 8) <=
    h_lmem_reg(15 downto 8) when host_gnt='1' and cycle_1='1' and MEM8='0' else
    RMEM_DIN(7 downto 0) when risc_gnt='1' and WORD='0' and MEM8='0' and
RMEM_ADR(0)='1' else
    RMEM_DIN(15 downto 8);

  end block local_mem_in;

------------------------------------------------------------------------

 latch_lmem_risc_reg0 : process
  begin

   wait until (CLK = '1' and CLK'event);

   if lat_r_dat0 = '1' then
    r_lmem_reg <= LMEM_DOUT(7 downto 0);
   end if;


  end process latch_lmem_risc_reg0;


------------------------------------------------------------------------

 local_mem_address : block
  begin

   LMEM_ADR(14 downto 1) <=
    h_lmem_adrh(14 downto 8) & h_lmem_adrl(7 downto 1) when host_gnt='1' else
    RMEM_ADR(14 downto 1);

  end block local_mem_address;
------------------------------------------------------------------------

 host_req : process
-- variable nx_state : vlbit_vector(1 downto 0);
 begin
  wait until ((CLK = '1' and CLK'event) or RST = '1');
   if RST = '1' then
    hmreq <= '0';
    hwren <= '0';
    wr_en_inc_adr <= '0';
    rd_en_inc_adr <= '0';
    hr_state  <= hr_st0v;
   else
       case integer(hr_state) is
     when hr_st0 =>
         if HWR_LMEM_ADR='1' then
       hr_state  <= hr_st1v;
         elsif HRD_LMEM_DAT ='1' then
       hr_state  <= hr_st1v;
```

```
            rd_en_inc_adr <= '1';
          elsif HWR_LMEM_DAT ='1' then
        hr_state  <= hr_st2v;
            wr_en_inc_adr <= '1';
          end if;
      when hr_st1 =>
          if HWR_LMEM_ADR='0' and HRD_LMEM_DAT ='0' then
        hmreq <= '1';
        hr_state  <= hr_st3v;
          end if;
      when hr_st2 =>
          if  HWR_LMEM_DAT ='0' then
        hmreq <= '1';
        hwren <= '1';
        hr_state  <= hr_st3v;
          end if;
      when hr_st3 =>
          if host_gnt='1' and done='1' then
        hmreq <= '0';
        hwren <= '0';
        wr_en_inc_adr <= '0';
        rd_en_inc_adr <= '0';
        hr_state  <= hr_st0v;
          end if;
      when others =>
        hr_state  <= b"XX";
        end case;
  end if;
 end process host_req;
-----------------------------------------------------------------------------

rd_host_reg : block
 begin

   H_IN_BUS(15 downto 8) <=
    h_lmem_reg(15 downto 8) when HRD_LMEM_DAT_H='1' else
    h_lmem_adrh when HRD_LMEM_ADR_H='1' else
    B"ZZZZZZZZ";
   H_IN_BUS(7 downto 0) <=
    h_lmem_reg(7 downto 0) when HRD_LMEM_DAT_L='1' else
    h_lmem_adrl when HRD_LMEM_ADR_L='1' else
    B"ZZZZZZZZ";
 end block rd_host_reg;
-----------------------------------------------------------------------------
host_reg_bus_in : block
 begin
--    h_lmem_adr_in <=
--      res_17(15 downto 0) when inc_h_adr = '1' else
--      H_OUT_BUS(15 downto 0);

    h_lmem_reg_l_in <=
      LMEM_DOUT(7 downto 0) when lmem_wr_hdat_l = '1' else
      H_OUT_BUS(7 downto 0);
```

```
  h_lmem_reg_h_in <=
   LMEM_DOUT(15 downto 8) when lmem16_wr_hdat_h = '1' else
   LMEM_DOUT(7 downto 0)  when lmem8_wr_hdat_h = '1' else
   H_OUT_BUS(15 downto 8);

--  inc_h_adr_clk   <= inc_h_adr and (not clk) and not HWR_LMEM_ADR;
  inc_h_adr_clkh   <= inc_h_adr and (not clk);
  inc_h_adr_clkl   <= inc_h_adr and (not clk);
  lmem_wr_hdat_l   <= host_gnt and cycle_1 and latch_data;
  lmem_wr_hdat_l_clk  <= host_gnt and cycle_1 and latch_data and (not clk) ;
  lmem8_wr_hdat_h  <= host_gnt and cycle_2 and latch_data and MEM8;
  lmem8_wr_hdat_h_clk  <= host_gnt and cycle_2 and latch_data and MEM8 AND (not clk);
  lmem16_wr_hdat_h <= host_gnt and cycle_1 and latch_data and (not MEM8);
  lmem16_wr_hdat_h_clk <= host_gnt and cycle_1 and latch_data and (not MEM8) AND (not clk);
  end block host_reg_bus_in;
------------------------------------------------------------------------------
 wr_host_adrh : process
 begin
  wait until ((inc_h_adr_clkh='1' and inc_h_adr_clkh'event) or (HWR_LMEM_ADR='1'));
  if HWR_LMEM_ADR = '1' then
    h_lmem_adrh <= h_out_bus(15 downto 8);
  else
    h_lmem_adrh <= res_17(15 downto 8);
--  if HWR_LMEM_ADR = '1' then
--      h_lmem_adrh <= h_lmem_adr_in(15 downto 8);
--      h_lmem_adrl <= h_lmem_adr_in(7 downto 0);
--  else
--      h_lmem_adrh <= h_lmem_adr_in(15 downto 8);
--      h_lmem_adrl <= h_lmem_adr_in(7 downto 0);
  end if;
 end process wr_host_adrh;
------------------------------------------------------------------------------
 wr_host_adrl : process
 begin
  wait until ((inc_h_adr_clkl='1' and inc_h_adr_clkl'event) or (HWR_LMEM_ADR='1'));
  if HWR_LMEM_ADR = '1' then
    h_lmem_adrl <= h_out_bus(7 downto 0);
  else
    h_lmem_adrl <= res_17(7 downto 0);
  end if;
 end process wr_host_adrl;


 wr_host_reg_l : process(lmem_wr_hdat_l_clk, HWR_LMEM_DAT, h_lmem_reg_l_in)
 begin
  if (lmem_wr_hdat_l_clk='1') or (HWR_LMEM_DAT = '1') then
    h_lmem_reg(7 downto 0) <= h_lmem_reg_l_in;
  end if;
 end process wr_host_reg_l;

 wr_host_reg_h : process (lmem16_wr_hdat_h_clk, lmem8_wr_hdat_h_clk,
                HWR_LMEM_DAT, h_lmem_reg_h_in)
 begin
  if (lmem16_wr_hdat_h_clk='1' or lmem8_wr_hdat_h_clk ='1' or HWR_LMEM_DAT = '1') then
```

```
    h_lmem_reg(15 downto 8) <= h_lmem_reg_h_in;
  end if;
end process wr_host_reg_h;

---------------------------------------------------------------------------
local_mem_process : process

  begin

  wait until (start_proc ='1'  and start_proc'event ) or (rst_proc = '1') or (RST='1');
    if RST='1' then
      lmem_proc <= '0';
    elsif rst_proc = '1' then
      lmem_proc <= '0';
    else
      lmem_proc <= '1';
    end if;

end process local_mem_process;

---------------------------------------------------------------------------

local_mem_wr_en : process
  begin
  wait until ((CLK = '0' and CLK'event) or RST ='1') ;
    if RST='1' then
      wr_en <= '0';
    else
      if lmem_proc = '1' then
        wr_en <= '1' ;
      elsif latch_data ='1' then
        wr_en <= '0';
      end if;
    end if;
end process local_mem_wr_en;

---------------------------------------------------------------------------

local_mem_process_control : process

begin
  wait until ((CLK = '1' and CLK'event) or RST = '1');
    if RST = '1' then
      rst_proc  <= '0';
      latch_data <= '0';
      lp_state  <= lp_st0v;
    else
      case integer(lp_state) is

        when lp_st0 =>
            if lmem_proc='1' then
          if MEM_WAIT(1)='0' and MEM_WAIT(0)='0' then
              rst_proc  <= '1';
              lp_state <= lp_st4v;
```

```
        else
            lp_state <= lp_st1v;
          end if;
      end if;

    when lp_st1 =>
          if MEM_WAIT(1)='0' and MEM_WAIT(0)='1' then
            rst_proc  <= '1';
            lp_state <= lp_st4v;
          else
            lp_state <= lp_st2v;
          end if;

    when lp_st2 =>
          if MEM_WAIT(1)='1' and MEM_WAIT(0)='0' then
            rst_proc  <= '1';
            lp_state <= lp_st4v;
          else
            lp_state <= lp_st3v;
          end if;

--      when lp_st3 =>
--  if MEM_WAIT(1)='1' and MEM_WAIT(0)='1' then
--    rst_proc  <= '1';
--    lp_state <= lp_st5v;
--       else
--    lp_state <= lp_st4v;
--  end if;

    when lp_st3 =>
          rst_proc  <= '1';
          lp_state <= lp_st4v;

    when lp_st4 =>
          rst_proc  <= '0';
      latch_data <= '1';
          lp_state <= lp_st5v;

    when lp_st5 =>
      latch_data <= '0';
          lp_state <= lp_st0v;
    when others =>
      lp_state  <= b"XXX";
        end case;
  end if;

 end process local_mem_process_control;

-----------------------------------------------------------------------------

 local_mem_control : process
 begin
   wait until ((CLK = '1' and CLK'event) or RST = '1');
    if RST = '1' then
```

```
      host_gnt <= '0';
      risc_gnt <= '0';
  cycle_1  <= '0';
  cycle_2  <= '0';
  start_proc <= '0';
  done     <= '0';
  lmc_state  <= idlev;
else
      case integer(lmc_state) is
   when idle =>
         if HMREQ='1' then
           start_proc <= '1';
           host_gnt <= '1';
           lmc_state <= cy_10v;
           cycle_1  <= '1';
         elsif RCMREQ='1' and HMREQ='0' then
           start_proc <= '1';
           risc_gnt <= '1';
           lmc_state <= cy_10v;
           cycle_1  <= '1';
         end if;

   when cy_10 =>
         start_proc <= '0';
         lmc_state <= cy_11v;

   when cy_11 =>
         if lmem_proc = '0' then
      if (risc_gnt='1' and ((MEM8='0' and WORD='1') or WORD='0')) or
        (host_gnt='1' and MEM8='0' ) then
            done <= '1';
            lmc_state <= lastv;
      else
            lmc_state <= cy_12v;
           end if;
    end if;

   when cy_12 =>
            start_proc <= '1';
       cycle_1  <= '0';
       cycle_2  <= '1';
            lmc_state <= cy_20v;

   when cy_20 =>
         start_proc <= '0';
         lmc_state <= cy_21v;

   when cy_21 =>
         if lmem_proc = '0' then
            done <= '1';
            lmc_state <= lastv;
         end if;

   when last =>
```

```
          done <= '0';
        host_gnt <= '0';
        risc_gnt <= '0';
        cycle_1  <= '0';
        cycle_2  <= '0';
          lmc_state <= idlev;
      when others =>
        lmc_state  <= b"XXX";
     end case;
----host wr data : write lmem_data then inc. host lmem_adr
----host rd data : inc. host lmem_adr then rd lmem_data
----host wr adr  : rd lmem_data didn't change host lmem_adr

     if (host_gnt='1' and lmc_state = lastv  and wr_en_inc_adr='1')
             or  (hr_state = hr_st1v and HRD_LMEM_DAT='0' and rd_en_inc_adr='1') then
       inc_h_adr <= '1';
     else
       inc_h_adr <= '0';
     end if;
    end if;
  end process local_mem_control;

end BEHAVIORAL;
```

```
--
-- File name : risc_st.vhd
-- Create by Don Chang

-- This is synthesize model for RISC state machine
          take out all random logic put it into decoder logic file
--

-- library WORK;
-- use WORK.sys_pkg.all;

entity risc_st is
 port (
-- RISC block interface
        RCMREQ : out vlbit;           -- level, reset by RCMDONE
        RCMDONE : in vlbit;           -- pulse, local memory to RISC acknowlodge
        WREN : out vlbit;             -- 1 = write, 0 = read
-- register and decoder interface
        sc_wait : in vlbit;
        halt : in vlbit;
        fast_ack : in vlbit;

        dec_2_m_r : in vlbit;
        dec_2_m_w : in vlbit;
        dec_2_wt : in vlbit;
        dec_2_j_m : in vlbit;
        exe_2_wait : in vlbit;
        wt_2_m_w : in vlbit;
        wt_2_j_m : in vlbit;
        wt_2_exec : in vlbit;
        m_w_2_exec : in vlbit;
        m_r_2_wt : in vlbit;
        m_r_2_j_m : in vlbit;

        st_f : out vlbit;
        st_decode : out vlbit;
        st_execute : out vlbit;
        st_wait : out vlbit;
        st_m_r : out vlbit;
        st_j_m : out vlbit;
        st_m_w : out vlbit;
        st_idleb : out vlbit;

        RST : in vlbit;
        CLK : in vlbit
    );
end risc_st;

architecture BEHAVIORAL of risc_st is
 signal st_fetch : vlbit;
 signal st_p_dec : vlbit;
 signal st_dec : vlbit;
 signal st_exec : vlbit;
 signal st_wt : vlbit;
```

```
  signal st_mem_wr : vlbit;
  signal st_mem_rd : vlbit;
  signal st_j_m_cyc : vlbit;
  signal req_clk : vlbit;
  signal sync_sc_w : vlbit;
  signal st_extra_wait : vlbit;
  signal exe_ack_wt : vlbit;
  signal mem_r_ack_wt : vlbit;
  constant idle : integer := 0;
  constant fetch : integer := 128;
  constant pre_decode : integer := 64;
  constant decode : integer := 32;
  constant execute : integer := 16;
  constant risc_wait : integer := 8;
  constant mem_wr : integer := 4;
  constant mem_rd : integer := 2;
  constant jp_mem_cyc : integer := 1;
  constant extra_wait : integer := 256;
  signal state : vlbit_vector (8 downto 0);
begin
  misc_logic : block
  begin
    state <= st_extra_wait & st_fetch & st_p_dec & st_dec &
      st_exec & st_wt & st_mem_wr & st_mem_rd & st_j_m_cyc;
    WREN <= st_mem_wr;
    RCMREQ <= (st_j_m_cyc or st_mem_wr or st_mem_rd or st_fetch) and NOT RCMDONE;
    st_j_m <= st_j_m_cyc;
    st_m_r <= st_mem_rd;
    st_m_w <= st_mem_wr;
    st_f <= st_fetch;
    st_decode <= st_dec;
    st_execute <= st_exec;
    st_wait <= st_wt;
    st_idleb <= NOT (NOT st_fetch and NOT st_p_dec and NOT st_dec and
      NOT st_exec and NOT st_wt and NOT st_mem_wr and NOT st_mem_rd and
      NOT st_j_m_cyc);
    exe_ack_wt <= NOT fast_ack and exe_2_wait;
    mem_r_ack_wt <= NOT fast_ack and m_r_2_wt;
  end block misc_logic;

  risc_st_machine : process
  begin
    wait until (RST = '1') or (CLK = '1' and CLK'EVENT);
    if RST = '1' then
      st_extra_wait <= '0';
      st_fetch <= '0';
      st_mem_rd <= '0';
      st_j_m_cyc <= '0';
      st_mem_wr <= '0';
      st_exec <= '0';
      st_p_dec <= '0';
      st_dec <= '0';
      st_wt <= '0';
    else
```

```
sync_sc_w <= sc_wait;
case v1d2int(state) is
 when idle =>
  if halt = '0' then
   st_fetch <= '1';
  end if;
----------------------------------------------------------------------------------------------------
 when fetch =>
  if RCMDONE = '1' then
   st_p_dec <= '1';
   st_fetch <= '0';
  end if;
----------------------------------------------------------------------------------------------------
 when pre_decode =>
  st_p_dec <= '0';
  st_dec <= '1';
----------------------------------------------------------------------------------------------------
 when decode =>
  if dec_2_m_r = '1' then
   st_mem_rd <= '1';
  elsif dec_2_m_w = '1' then
   st_mem_wr <= '1';
  elsif dec_2_wt = '1' then
   st_wt <= '1';
  elsif dec_2_j_m = '1' then
   st_j_m_cyc <= '1';
  else
   st_exec <= '1';
  end if;
  st_dec <= '0';
----------------------------------------------------------------------------------------------------
 when execute =>
  if exe_ack_wt = '1' then
   st_extra_wait <= '1';
  elsif exe_2_wait = '1' then
   st_wt <= '1';
  elsif halt = '0' then
   st_fetch <= '1';
  end if;
  st_exec <= '0';
----------------------------------------------------------------------------------------------------
 when risc_wait =>
  if sync_sc_w = '0' then
   if wt_2_m_w = '1' then
    st_mem_wr <= '1';
   elsif wt_2_j_m = '1' then
    st_j_m_cyc <= '1';
   elsif wt_2_exec = '1' then
    st_exec <= '1';
   elsif halt = '0' then
    st_fetch <= '1';
   end if;
   st_wt <= '0';
  end if;
```

```
--------------------------------------------------------------------------------
    when mem_wr =>
     if RCMDONE = '1' then
      if m_w_2_exec = '1' then
       st_exec <= '1';
      elsif halt = '0' then
       st_fetch <= '1';
      end if;
      st_mem_wr <= '0';
     end if;
--------------------------------------------------------------------------------
    when mem_rd =>
     if RCMDONE = '1' then
      if mem_r_ack_wt = '1' then
       st_extra_wait <= '1';
      elsif m_r_2_wt = '1' then
       st_wt <= '1';
      elsif m_r_2_j_m = '1' then
       st_j_m_cyc <= '1';
      elsif halt = '0' then
       st_fetch <= '1';
      end if;
      st_mem_rd <= '0';
     end if;
--------------------------------------------------------------------------------
    when jp_mem_cyc =>
     if RCMDONE = '1' then
      if halt = '0' then
       st_fetch <= '1';
      end if;
      st_j_m_cyc <= '0';
     end if;
    when extra_wait =>
     st_extra_wait <= '0';
     st_wt <= '1';
    when others =>
   end case;
  end if;
 end process risc_st_machine;
end BEHAVIORAL;
```

```
-
- This is synthesize model of RISC register block
-- Program histroy
-- 04/07/93     Created by Don Chang
-- 04/15/93     add return and stack logic
-- 04/15/93     add word to port
-- 04/22/93     take all random logic out put them into decoder logic
--

library WORK;
use WORK.sys_pkg.all;

entity risc_reg is
 port (
        count_out_bus : in vlbit_vector(15 downto 0);
        scsi_in_bus : out vlbit_vector(7 downto 0);
        scsi_out_bus : in vlbit_vector(7 downto 0);
        mem_in_bus : out vlbit_vector(15 downto 0);
        mem_out_bus : in vlbit_vector(15 downto 0);
        mem_addr_bus : out vlbit_vector(14 downto 0);
        host_in_bus : out vlbit_vector(15 downto 0);
        host_out_bus : in vlbit_vector(15 downto 0);
        r_acc_reg : out vlbit_vector (7 downto 0);
        r_insth_reg : out vlbit_vector (15 downto 6);
        r_instl_reg : out vlbit_vector (2 downto 0);
        r_alu_out : out vlbit_vector (7 downto 0);

        ph_reg_i : out vlbit_vector(2 downto 0);
        id_reg_i : out vlbit_vector(2 downto 0);
        id_reg_o : in vlbit_vector(2 downto 0);

        alu_and : in vlbit;
        alu_or : in vlbit;
--      alu_comp : in vlbit;
        alu_add : in vlbit;
        ix_2_alu : in vlbit;
        id_2_alu : in vlbit;
        sc_2_alu : in vlbit;
        pc_2_alu : in vlbit;
        alu_r_jump : in vlbit;
        alu_comp_i : in vlbit;
        alu_minus_1 : in vlbit;
        alu_plus_2 : in vlbit;
        alu_plus_1 : in vlbit;
        en_stac_ad : in vlbit;
        alu_2_reg : in vlbit;
        inst_mvbi : in vlbit;
        alu_2_pc : in vlbit;
        reg_2_id : in vlbit;
        mvrr_ix : in vlbit;

        inst_ms_sel : in vlbit;
        inst_ms_dma : in vlbit;
        inst_ms_ret : in vlbit;
```

```
        inst_ms_sint : in vlbit;
        inst_ms_halt : in vlbit;

        risc_idle : in vlbit;
--      set_halt : out vlbit;

        host_int : out vlbit;
        rst_int : in vlbit;

        en_dma : out vlbit;
        sel_str : out vlbit;

-- decoder and register block to state machine interface signal
        st_fetch : in vlbit;
--      st_exec : in vlbit;
        st_wait : in vlbit;
------------------------------------------------------------------------------------------------
        wr_pc : in vlbit;           -- write program counter pulse
        wr_acc : in vlbit;          -- write accumulator pulse
        wr_qp : in vlbit;           -- write Q pointer pulse
        wr_ix : in vlbit;           -- write index register pulse
        wr_ih : in vlbit;           -- write instruction holding register pulse
        en_pc_d : in vlbit;         -- enable program counter to data bus
        en_ix_d : in vlbit;         -- enable index register to data bus
        en_qp_d : in vlbit;
        en_host_out : in vlbit;
        en_cuntr_do : in vlbit;
--      en_tm_2_r_i : in vlbit;
        en_sc_2_r_i : in vlbit;
        en_id_2_r_i : in vlbit;
        en_sc_2_mem : in vlbit;
        en_id_2_mem : in vlbit;
        en_inst_d : in vlbit;       -- enable instruction holding register to data bus

--      en_qp_ad : in vlbit;
        en_l_ad : in vlbit;
        en_ixq_ad : in vlbit;
        en_ixl_ad : in vlbit;
        tmout_jump : in vlbit;

        md2scsi : in vlbit;
        reg2scsi : in vlbit;
        stac_clk : in vlbit;
        int_clk : in vlbit;
        ix_clk : in vlbit;

------------------------------------------------------------------------------------------------
        RST : in vlbit
    );
end risc_reg;


architecture BEHAVIORAL of risc_reg is
```

```
signal pc_reg : vlbit_vector(11 downto 1);
signal acc_reg : vlbit_vector(15 downto 0);
signal qp_reg : vlbit_vector(7 downto 0);
signal ix_reg : vlbit_vector(5 downto 0);
signal inst_reg : vlbit_vector(15 downto 0);
signal stac_reg : vlbit;
signal alu_out : vlbit_vector(11 downto 0);
signal reg_in_bus : vlbit_vector(15 downto 0);
signal reg_out_bus : vlbit_vector(15 downto 0);
signal pc_i_bus : vlbit_vector(11 downto 1);
signal inst_i_bus : vlbit_vector(15 downto 0);
signal id_reg_x : vlbit_vector(7 downto 1);
signal id_reg : vlbit_vector (7 downto 0);
signal ix_in_bus : vlbit_vector (5 downto 0);

begin
-----------------------------------------------------------------------------------------------

data_bus_logic : block
begin

-- id_reg is 3 bits come from device id register
-- scsi came from scsi out bus
-- move register to register acturly move data from external register
-- to internal register
  reg_in_bus <=
    host_out_bus(15 downto 0) after 2 ns when risc_idle = '1' else
    "0000" & alu_out after 2 ns when alu_2_reg = '1' else
    "00000000" & id_reg after 2 ns when en_id_2_r_i = '1' else
    "00000000" & scsi_out_bus after 2 ns when en_sc_2_r_i = '1' else
--    "00000000" & tm_reg after 2 ns when en_tm_2_r_i = '1' else
    inst_reg after 2 ns when en_inst_d = '1' else
    "0000000000" & ix_reg(5 downto 0) when mvrr_ix = '1' else
    mem_out_bus after 2 ns;

-- id_reg is 3 bits come from device id register
-- counter and pointer register are located outside
-- scsi also located outside
  reg_out_bus <=
     "0000" & pc_reg(11 downto  1) & '0' after 2 ns when en_pc_d = '1' else
     "00000000" & qp_reg(7 downto 0) after 2 ns when en_qp_d = '1' else
     "0000000000" & ix_reg(5 downto 0) after 2 ns when en_ix_d = '1' else
     inst_reg(15 downto 0) after 2 ns when en_inst_d = '1'  else
     acc_reg after 2 ns;

------
  ix_in_bus <= host_out_bus(13 downto 8) when risc_idle = '1' else
     inst_reg(5 downto 0) when inst_mvbi = '1' else
     acc_reg(5 downto 0) when mvrr_ix = '1' else
     mem_out_bus(5 downto 0) after 2 ns;
------
  scsi_in_bus <=
     mem_out_bus(7 downto 0) after 2 ns when md2scsi = '1' else
     reg_out_bus(7 downto 0) after 2 ns when reg2scsi = '1' else
```

```
    "ZZZZZZZZ" after 2 ns;
------
  mem_in_bus <=
    count_out_bus (15 downto 0) when en_cuntr_do = '1' else
    "00000000" & scsi_out_bus (7 downto 0) when en_sc_2_mem = '1' else
    "00000000" & id_reg (7 downto 0) when en_id_2_mem = '1' else
    reg_out_bus(15 downto 0) after 2 ns;
------
  host_in_bus <=
   "ZZZZZZZZZZZZZZZZ" when en_host_out = '0' else
   qp_reg(7 downto 0) & inst_reg(7 downto 0) when en_qp_d = '1' else
   "00" & ix_reg(5 downto 0) & acc_reg(7 downto 0) when en_ix_d = '1' else
   reg_out_bus;
------
  pc_i_bus <=
   alu_out(10 downto 0) after 2 ns when alu_2_pc = '1' else
   reg_in_bus(11 downto 1) after 2 ns;

------
  id_reg_x <=
   reg_out_bus(7 downto 1) after 2 ns when reg_2_id = '1' else
   mem_out_bus(7 downto 1) after 2 ns;
  conv_id_i : block
  begin
   id_reg_i(0) <= id_reg_x(7) or id_reg_x(5) or id_reg_x(3) or id_reg_x(1);
   id_reg_i(1) <= id_reg_x(7) or id_reg_x(6) or id_reg_x(3) or id_reg_x(2);
   id_reg_i(2) <= id_reg_x(7) or id_reg_x(6) or id_reg_x(5) or id_reg_x(4);
  end block conv_id_i;

----
  inst_i_bus <=
   host_out_bus(15 downto 0) when risc_idle = '1' else
   mem_out_bus;

 end block data_bus_logic;

-------------------------------------------------------------------------
-- sint. rflag, sel, dma
 misc_inst_logic : block
 begin

-- halt logic change into decode and latch locate in control register block
--  halt_logic : process
--  begin
--    wait until ((st_exec = '1' and st_exec'event) or RST = '1' or clr_halt = '1' or set_halt = '1');
--    if RST = '1' then
--      risc_idle <= '1';
--    elsif set_halt = '1' then
--      risc_idle <= '1';
--    elsif clr_halt = '1' then
--      risc_idle <= '0';
--    else
--      risc_idle <= inst_ms_halt;
--    end if;
```

```
--   end process halt_logic;
--------
  sel_logic : process
  begin
   wait until ((st_wait = '1' and st_wait'event) or RST = '1' or st_fetch = '1');
   if RST = '1' then
    sel_str <= '0';
   elsif st_fetch = '1' then
    sel_str <= '0';
   else
    sel_str <= inst_ms_sel;
   end if;
  end process sel_logic;
--------
  sint_logic : process
  begin
   wait until ((int_clk = '1' and int_clk'event) or RST = '1' or rst_int = '1');
   if RST = '1' then
    host_int <= '0';
   elsif rst_int = '1' then
    host_int <= '0';
   else
    host_int <= inst_ms_sint or inst_ms_halt;
   end if;
  end process sint_logic;
--------
  en_dma <= inst_ms_dma and st_wait;

 end block misc_inst_logic;

--------------------------------------------------------------------

 addr_bus_logic : block
 begin
  mem_addr_bus <=
    "000" & pc_reg(11 downto 1) & '0' when pc_2_alu = '1' and tmout_jump = '0' else
    "0000000011111" & (inst_ms_ret xor stac_reg) & '0' when en_stac_ad  = '1' else
    "000000001111010" when tmout_jump = '1' else
    "00000000" & inst_reg(6 downto 0) when en_l_ad = '1' else
    '1' & qp_reg(7 downto 0) & ix_reg(5 downto 0) when en_ixq_ad = '1' else
    "000000000" & ix_reg(5 downto 0) when en_ixl_ad = '1' else
    '1' & qp_reg(7 downto 0) & inst_reg(5 downto 0);
 end block addr_bus_logic;

--------------------------------------------------------------------

 stac_register : process
 begin
  wait until ((stac_clk = '0' and stac_clk'event) or RST = '1');
  if RST = '1' then
   stac_reg <= '1';
  else
   stac_reg <= NOT stac_reg;
  end if;
```

```
end process stac_register;

--------------------------------------------------------------------

program_counter : process
begin
  wait until (wr_pc = '0' and wr_pc'event);
  pc_reg <= pc_i_bus;
end process program_counter;

--------------------------------------------------------------------

accumulator : process
begin
  wait until (wr_acc = '0' and wr_acc'event);
  acc_reg <= reg_in_bus;
end process accumulator;

--------------------------------------------------------------------

q_pointer_reg : process
begin
  wait until (wr_qp = '0' and wr_qp'event);
  if risc_idle = '0' then
    qp_reg <= reg_in_bus(7 downto 0);
  else
    qp_reg <= host_out_bus(15 downto 8);
  end if;
end process q_pointer_reg;

--------------------------------------------------------------------

index_reg : process
begin
  wait until ((ix_clk = '0' and ix_clk'event) or wr_ix = '1');
  if wr_ix = '1' then
    ix_reg <= ix_in_bus;
  else
    ix_reg <= alu_out(5 downto 0);
  end if;
end process index_reg;

--------------------------------------------------------------------

inst_hold_reg : process (wr_ih, inst_i_bus)
begin
-- wait until (wr_ih = '0' and wr_ih'event);
  if wr_ih = '1' then
    inst_reg <= inst_i_bus(15 downto 0);
  end if;
end process inst_hold_reg;

--------------------------------------------------------------------
```

```
alu : block
  signal alu_in_a : vlbit_vector(11 downto 0);
  signal alu_in_b : vlbit_vector(11 downto 0);

begin
  alu_in_a <=
    "000000000001" when alu_plus_1 = '1' else
    "000000000010" when alu_plus_2 = '1' else
    "111111111111" when alu_minus_1 = '1' else
    inst_reg(11 downto 0) when alu_comp_i = '1' else
    inst_reg(8) & inst_reg(8) & inst_reg(8) & inst_reg(8 downto 0)
                  when alu_r_jump = '1' else
    mem_out_bus(11 downto 0);

  alu_in_b <=
    "0" & pc_reg(11 downto  1) after 2 ns when pc_2_alu = '1' else
    "0000" & scsi_out_bus after 2 ns when sc_2_alu = '1' else
    "0000" & id_reg after 2 ns when id_2_alu = '1' else
    "000000" & ix_reg after 2 ns when ix_2_alu = '1' else
    acc_reg(11 downto 0) after 2 ns;

  alu_out <=
    add_12bit (alu_in_a, alu_in_b) after 2 ns when alu_add = '1' else
    "0000" & or_8bit (alu_in_a, alu_in_b) after 2 ns when alu_or = '1' else
    "0000" & and_8bit (alu_in_a, alu_in_b) after 2 ns when alu_and = '1' else
    "0000" & comp_8bit (alu_in_a, alu_in_b) after 2 ns;
end block alu;

out_signal : block
begin
  r_acc_reg <= acc_reg(7 downto 0);
  r_insth_reg <= inst_reg(15 downto 6);
  r_instl_reg <= inst_reg(2 downto 0);
  r_alu_out <= alu_out(7 downto 0);
  ph_reg_i <= inst_reg(2 downto 0);
--   halt <= risc_idle;
  conv_id_o : block
  begin
    id_reg(0) <= NOT id_reg_o(2) and NOT id_reg_o(1) and NOT id_reg_o(0);
    id_reg(1) <= NOT id_reg_o(2) and NOT id_reg_o(1) and id_reg_o(0);
    id_reg(2) <= NOT id_reg_o(2) and id_reg_o(1) and NOT id_reg_o(0);
    id_reg(3) <= NOT id_reg_o(2) and id_reg_o(1) and id_reg_o(0);
    id_reg(4) <= id_reg_o(2) and NOT id_reg_o(1) and NOT id_reg_o(0);
    id_reg(5) <= id_reg_o(2) and NOT id_reg_o(1) and id_reg_o(0);
    id_reg(6) <= id_reg_o(2) and id_reg_o(1) and NOT id_reg_o(0);
    id_reg(7) <= id_reg_o(2) and id_reg_o(1) and id_reg_o(0);
  end block conv_id_o;
 end block out_signal;
end BEHAVIORAL;
```

```
--
-- This is synthesize model for RISC decoder logic
--

-- library WORK;
-- use WORK.sys_pkg.all;

entity decode is
  port (
        CLK : in vlbit;
        rst : in vlbit;
        RCMDONE : in vlbit;

        insth : in vlbit_vector (15 downto 6);
        instl : in vlbit_vector (2 downto 0);
        alu_and : out vlbit;
        alu_or : out vlbit;
--      alu_comp : out vlbit;
        alu_add : out vlbit;
        ix_2_alu : out vlbit;
        id_2_alu : out vlbit;
        sc_2_alu : out vlbit;
        pc_2_alu : out vlbit;
        alu_r_jump : out vlbit;
        alu_comp_i : out vlbit;
        alu_minus_1 : out vlbit;
        alu_plus_2 : out vlbit;
        alu_plus_1 : out vlbit;
        en_stac_ad : out vlbit;
        alu_2_reg : out vlbit;
        d_inst_mvbi : out vlbit;
        alu_2_pc : out vlbit;
        reg_2_id : out vlbit;
        mvrr_ix : out vlbit;
        alu_out : in vlbit_vector (7 downto 0);

        risc_idle : in vlbit;
        set_halt : out vlbit;
        rset_atn : out vlbit;
        d_inst_ms_sel : out vlbit;
        d_inst_ms_dma : out vlbit;
        d_inst_ms_ret : out vlbit;
        d_inst_ms_sint : out vlbit;
        d_inst_ms_halt : out vlbit;

-- decoder and register block to state machine interface signal
        st_fetch : in vlbit;
        st_exec : in vlbit;
        st_j_m : in vlbit;
        st_wait : in vlbit;
        st_m_r : in vlbit;
        st_m_w : in vlbit;
        st_dec : in vlbit;
----------------------------------------------------------------------------------------------------
```

```
        wr_pc : out vlbit;          -- write program counter pulse
        wr_acc : out vlbit;                -- write accumulator pulse
        wr_qp : out vlbit;          -- write Q pointer pulse
        wr_ix : out vlbit;          -- write index register pulse
        wr_ih : out vlbit;          -- write instruction holding register pulse
        en_pc_d : out vlbit;        -- enable program counter to data bus
        en_ix_d : out vlbit;        -- enable index register to data bus
        en_qp_d : out vlbit;
--      en_cntr_do : out vlbit;
        en_inst_d : out vlbit;      -- enable instruction holding register to data bus

--      en_qp_ad : out vlbit;
        en_l_ad : out vlbit;
        en_ixq_ad : out vlbit;
        en_ixl_ad : out vlbit;
        tmout_jump : out  vlbit;
        d_md2scsi : out vlbit;
        d_reg2scsi : out vlbit;
        en_id_2_mem : out vlbit;
        en_id_2_r_i : out vlbit;
        en_sc_2_mem : out vlbit;
        en_sc_2_r_i : out vlbit;
        en_host_out : out vlbit;

        stac_clk : out vlbit;
        int_clk : out vlbit;
        ix_clk : out vlbit;

        dec_2_m_r : out vlbit;
        dec_2_m_w : out vlbit;
        dec_2_wt : out vlbit;
        dec_2_j_m : out vlbit;
        exe_2_wait : out vlbit;
        wt_2_m_w : out vlbit;
        wt_2_j_m : out vlbit;
        wt_2_exec : out vlbit;
        m_w_2_exec : out vlbit;
        m_r_2_wt : out vlbit;
        m_r_2_j_m : out vlbit;
        sc_wait : out vlbit;

        r_wr_scsi : out vlbit;
        r_wr_ph : out vlbit;
        r_wr_id : out vlbit;
        bc_xp_adr : out vlbit_vector(1 downto 0);
        bc_xp_cs : out vlbit;
        bc_xp_wr : out vlbit;
--      r_wr_bc01 : out vlbit;
--      r_wr_bc23 : out vlbit;
--      r_wr_xp01 : out vlbit;
--      r_wr_xp23 : out vlbit;
--      r_rd_bc01 : out vlbit;
--      r_rd_bc23 : out vlbit;
--      r_rd_xp01 : out vlbit;
```

```
--      r_rd_xp23 : out vlbit;

        rst_flg_bsyb : out vlbit;
        rst_flg_ack : out vlbit;
        rst_flg_atn : out vlbit;
        rst_flg_prty : out vlbit;
        rst_free_tm : out vlbit;
        wr_w_d_tm : out vlbit;

        sc_pio : out vlbit;
        d_word : out vlbit;

        acc_reg : in vlbit_vector (7 downto 0);

        sec_tm_out : in vlbit;
        time_out : in vlbit;
        parity_err : in vlbit;
        reselected : in vlbit;
        selected : in vlbit;
        bc_zero : in vlbit;
        sel_done : in vlbit;
        hdshk_done : in vlbit;
        dma_done : in vlbit;
        ph_ok : in vlbit;
        req_on : in vlbit;
        bus_free : in vlbit;
        atnib : in vlbit;

        host_ixn : in vlbit;
        host_ihn : in vlbit;
        host_qpn : in vlbit;
        host_accn : in vlbit;
        host_pcn : in vlbit;
--      host_rdn : in vlbit;
        host_wr_ix : in vlbit;
        host_wr_ih : in vlbit;
        host_wr_qp : in vlbit;
        host_wr_acc : in vlbit;
        host_wr_pc : in vlbit
    );
end decode;

architecture BEHAVIORAL of decode is

        signal  inst_move : vlbit;
        signal  inst_jump : vlbit;
        signal  inst_misc : vlbit;

-- Q pointer offset addressing
        signal  mv_rq : vlbit;
-- direct local memory addressing
        signal  mv_rl : vlbit;
-- index addressing
        signal  mv_x : vlbit;
```

```
-- register to register move
        signal   mv_rr : vlbit;
-- immediate data move
        signal   mv_i : vlbit;
        signal   mv_wi : vlbit;
        signal   mv_bi : vlbit;

        signal   inst_mvbi : vlbit;
        signal   inst_mvrq : vlbit;
        signal   inst_mvrl : vlbit;
        signal   inst_mvx : vlbit;
        signal   inst_mvrr : vlbit;
        signal   inst_mvwi : vlbit;

-- flag test jump
        signal   jp_tstf : vlbit;
-- bit test jump
        signal   jp_tstb : vlbit;
-- compare jump
        signal   jp_comp : vlbit;
-- long jump and call
        signal   jp_call : vlbit;

        signal   inst_jp_t_f : vlbit;
        signal   inst_jp_t_b : vlbit;
        signal   inst_jp_c_q : vlbit;
        signal   inst_jp_c_i : vlbit;
        signal   inst_jpx : vlbit;
        signal   inst_call : vlbit;
-- jump condition
        signal   true_jump : vlbit;
        signal   jump_true : vlbit;
        signal   chk_sel : vlbit_vector (2 downto 0);

-- misc instruction
        signal   ms_and : vlbit;
        signal   ms_or : vlbit;
        signal   ms_xor : vlbit;
        signal   ms_incr : vlbit;
        signal   ms_decr : vlbit;
-- register input bus control
        signal   ms_reg_op : vlbit;

        signal   inst_ms_orq : vlbit;
        signal   inst_ms_orl : vlbit;
        signal   inst_ms_andq : vlbit;
        signal   inst_ms_andl : vlbit;
        signal   inst_ms_xorq : vlbit;
        signal   inst_ms_xorl : vlbit;
        signal   inst_ms_incr : vlbit;
        signal   inst_ms_decr : vlbit;

-- the rest miscellaneous instruction decode
        signal   inst_ms_rflag : vlbit;
```

```
        signal  inst_ms_ret : vlbit;
        signal  inst_ms_sint : vlbit;
        signal  inst_ms_dma : vlbit;
        signal  inst_ms_w_f : vlbit;
        signal  inst_ms_sel : vlbit;
        signal  inst_ms_halt : vlbit;

        signal  inst_word : vlbit;
        signal  word : vlbit;

        signal  reg_out : vlbit;

-- register address
        signal  reg_acc_adr : vlbit;
        signal  reg_qp_adr : vlbit;
        signal  reg_ph_adr : vlbit;
        signal  reg_ix_adr : vlbit;
        signal  reg_id_adr : vlbit;
        signal  reg_pc_adr : vlbit;
        signal  reg_sc_adr : vlbit;
--      signal  reg_xp01_adr : vlbit;
--      signal  reg_xp23_adr : vlbit;
--      signal  reg_bc01_adr : vlbit;
--      signal  reg_bc23_adr : vlbit;

-- exception register address
        signal  reg_accxi_adr : vlbit;
        signal  reg_scx_adr : vlbit;
        signal  reg_idx_adr : vlbit;
        signal  reg_ixx_adr : vlbit;

-- flag address
        signal  flag_bsy : vlbit;
        signal  flag_ack : vlbit;
        signal  flag_atn : vlbit;
        signal  flag_set_atn : vlbit;
        signal  flag_prty : vlbit;
        signal  flag_ftm : vlbit;
        signal  flag_wdtm : vlbit;

        signal  en_ix_ad : vlbit;
        signal  md2scsi : vlbit;
        signal  reg2scsi : vlbit;

-- alu operation
        signal  alu_plus_1_x : vlbit;
        signal  alu_plus_2_x : vlbit;
        signal  alu_minus_1_x : vlbit;
        signal  alu_r_jump_x : vlbit;

-- watch dog timer
        signal  wr_wd_tm : vlbit;
        signal  time_out_set : vlbit;
        signal  time_out_clk : vlbit;
```

```
    signal   tmout_jump_i : vlbit;

begin

inst_dec_logic : block
begin

-- instruction class
  inst_move <= NOT insth(15) and NOT insth(14);
  inst_jump <= insth(15);
  inst_misc <= NOT insth(15) and insth(14);

-- Q pointer offset addressing
  mv_rq <= NOT insth(9) and insth(8);
-- direct local memory addressing
  mv_rl <= NOT insth(9) and NOT insth(8);
-- index addressing
  mv_x <= insth(9) and NOT insth(8);
-- register to register move
  mv_rr <= NOT insth(13) and insth(9) and insth(8);
-- immediate data move
  mv_i <= insth(13) and insth(9) and insth(8);
  mv_wi <= mv_i and insth(12);
  mv_bi <= mv_i and NOT insth(12);

  inst_mvbi <= inst_move and mv_bi;
  inst_mvrq <= inst_move and mv_rq;
  inst_mvrl <= inst_move and mv_rl;
  inst_mvx <= inst_move and mv_x;
  inst_mvrr <= inst_move and mv_rr;
  inst_mvwi <= inst_move and mv_wi;

-- flag test jump
  jp_tstf <= insth(14) and insth(13);
-- bit test jump
  jp_tstb <= insth(14) and NOT insth(13);
-- compare jump
  jp_comp <= NOT insth(14) and insth(13);
-- long jump and call
  jp_call <= NOT insth(14) and NOT insth(13);

  inst_jp_t_f <= inst_jump and jp_tstf;
  inst_jp_t_b <= inst_jump and jp_tstb;
  inst_jp_c_q <= inst_jump and insth(8) and jp_comp;
  inst_jp_c_i <= inst_jump and NOT insth(8) and jp_comp;
  inst_jpx <= inst_jump and jp_call and NOT insth(12);
  inst_call <= inst_jump and jp_call and insth(12);
-- jump condition
  true_jump <= insth(9);
  chk_sel <= insth(12 downto 10);

-- misc instruction
  ms_and <= insth(13) and NOT insth(9);
  ms_or <= NOT insth(13) and NOT insth(9) and NOT insth(7);
```

```
  ms_xor <= NOT insth(13) and NOT insth(9) and insth(7);
  ms_incr <= NOT insth(13) and insth(9) and insth(8) and insth(7);
  ms_decr <= NOT insth(13) and insth(9) and insth(8) and NOT insth(7);
-- register input bus control
  ms_reg_op <= inst_misc and (ms_and or ms_or or ms_incr or ms_decr);

  inst_ms_orq <= inst_misc and ms_or and insth(8);
  inst_ms_orl <= inst_misc and ms_or and NOT insth(8);
  inst_ms_xorq <= inst_misc and ms_xor and insth(8);
  inst_ms_xorl <= inst_misc and ms_xor and NOT insth(8);
  inst_ms_andq <= inst_misc and ms_and and insth(8);
  inst_ms_andl <= inst_misc and ms_and and NOT insth(8);
  inst_ms_incr <= inst_misc and ms_incr;
  inst_ms_decr <= inst_misc and ms_decr;

-- the rest miscellaneous instruction decode
  inst_ms_ret <= inst_misc and insth(13) and insth(9) and insth(8) and NOT insth(7);
  inst_ms_sel <= inst_misc and NOT insth(13) and NOT insth(10) and insth(9) and
                NOT insth(8) and NOT insth(7);
  inst_ms_w_f <= inst_misc and NOT insth(13) and insth(10) and insth(9) and
                NOT insth(8) and NOT insth(7);
  inst_ms_dma <= inst_misc and NOT insth(13) and insth(9) and NOT insth(8) and insth(7);
  inst_ms_rflag <= inst_misc and insth(13) and insth(9) and insth(8) and insth(7);
  inst_ms_sint <= inst_misc and insth(13) and insth(9) and NOT insth(8) and NOT insth(7);
  inst_ms_halt <= inst_misc and insth(13) and insth(9) and NOT insth(8) and insth(7);

  inst_word <= inst_move and insth(13) and NOT mv_bi;
  word <= (inst_move and insth(13) and (NOT mv_bi or NOT reg_id_adr)) or
      (inst_jump and NOT(jp_comp and st_m_r)) or
      inst_ms_ret or st_fetch;

  reg_out <= insth(7);

-- register address
  reg_acc_adr <= NOT insth(12) and NOT insth(11) and NOT insth(10);
  reg_qp_adr <= NOT insth(12) and NOT insth(11) and insth(10);
  reg_ph_adr <= NOT insth(12) and NOT insth(11) and insth(10);
  reg_ix_adr <= NOT insth(12) and insth(11) and NOT insth(10);
  reg_id_adr <= NOT insth(12) and insth(11) and NOT insth(10);
  reg_pc_adr <= NOT insth(12) and insth(11) and insth(10);
  reg_sc_adr <= NOT insth(12) and insth(11) and insth(10);

-- exception register address
  reg_accxi_adr <= insth(12) and NOT insth(11) and NOT insth(10);
  reg_scx_adr <= NOT instl(2) and instl(1) and instl(0);
  reg_idx_adr <= NOT instl(2) and instl(1) and NOT instl(0);
  reg_ixx_adr <= NOT instl(2) and NOT instl(1) and instl(0);

-- flag address
  flag_ack <= NOT insth(12) and NOT insth(11) and NOT insth(10);
  flag_atn <= NOT insth(12) and NOT insth(11) and insth(10);
  flag_prty <= NOT insth(12) and insth(11) and NOT insth(10);
  flag_ftm <= NOT insth(12) and insth(11) and insth(10);
  flag_wdtm <= insth(12) and NOT insth(11) and NOT insth(10);
```

```
  flag_bsy <= insth(12) and NOT insth(11) and insth(10);
  flag_set_atn <= insth(12) and insth(11) and NOT insth(10);

-- counter and pointer address
  bc_xp_adr <= insth(11 downto 10);
--   reg_xp01_adr <= insth(12) and NOT insth(11) and NOT insth(10);
--   reg_xp23_adr <= insth(12) and NOT insth(11) and insth(10);
--   reg_bc01_adr <= insth(12) and insth(11) and NOT insth(10);
--   reg_bc23_adr <= insth(12) and insth(11) and insth(10);

 end block inst_dec_logic;

------------------------------------------------------------------------

 control_logic : block
  signal reg_wr : vlbit;
 begin

-- register output bus control
-- default acc register
  en_pc_d <= (inst_mvrq and reg_pc_adr and inst_word and NOT risc_idle) or
             (inst_mvrl and reg_pc_adr and inst_word and NOT risc_idle) or
             (inst_mvx and reg_pc_adr and inst_word and NOT risc_idle) or
             (inst_jpx and st_m_w and NOT risc_idle)or
             (inst_call and st_m_w and NOT risc_idle) or
             (NOT host_pcn and risc_idle);
  en_qp_d <= (inst_mvrq and reg_qp_adr and NOT inst_word and NOT risc_idle) or
             (inst_mvrl and reg_qp_adr and NOT inst_word and NOT risc_idle) or
             (inst_mvx and reg_qp_adr and NOT inst_word and NOT risc_idle) or
             (inst_mvrr and reg_qp_adr and NOT inst_word and NOT risc_idle) or
             (NOT host_qpn and risc_idle);
  en_ix_d <=  (inst_mvrq and reg_ix_adr and NOT inst_word and NOT risc_idle) or
             (inst_mvrl and reg_ix_adr and NOT inst_word and NOT risc_idle) or
             (inst_mvx and reg_ix_adr and NOT inst_word and NOT risc_idle) or
             (NOT host_ixn and risc_idle);
  en_inst_d <= (inst_mvbi and NOT risc_idle) or
             (inst_jpx and st_exec and NOT risc_idle) or
             (inst_call and st_exec and NOT risc_idle) or
             (NOT host_ihn and risc_idle);

-- memory data bus control
-- default register data out bus
  en_id_2_mem <= (inst_mvrq and inst_word and reg_id_adr);
  en_sc_2_mem <= (inst_mvrq and reg_sc_adr and NOT inst_word) or
             (inst_mvrl and reg_sc_adr and NOT inst_word) or
             (inst_mvx and reg_sc_adr and NOT inst_word);
--   en_cuntr_do <= (inst_mvrl or inst_mvrq or inst_mvx) and
--                 (reg_bc01_adr or reg_bc23_adr or reg_xp01_adr or reg_xp23_adr);

-- register in bus control
-- default memory data out bus
  alu_2_reg <= inst_ms_incr or inst_ms_decr or inst_ms_andl or inst_ms_orl or
              inst_ms_andq or inst_ms_orq or inst_ms_xorq or inst_ms_xorl;
  en_id_2_r_i <= inst_mvrr and reg_idx_adr;
```

```
  en_sc_2_r_i <= inst_mvrr and reg_scx_adr;

-- scsi data bus control
  md2scsi <= (inst_mvrq and reg_sc_adr and NOT inst_word and not risc_idle) or
             (inst_mvrl and reg_sc_adr and NOT inst_word and not risc_idle) or
             (inst_mvx and reg_sc_adr and NOT inst_word and not risc_idle);
  reg2scsi <= (inst_mvrr and reg_scx_adr and reg_out and not risc_idle) or
              (inst_mvbi and reg_sc_adr and not risc_idle);

-- memory address bus control
-- default    en_qp_ad
-- en_pc_ad = pc_2_alu
--   en_qp_ad <= inst_mvrq or inst_ms_orq or inst_ms_andq or
--             (inst_jp_c_q and st_m_r);
  en_l_ad <= inst_mvrl or inst_ms_orl or inst_ms_andl or inst_ms_xorl;
  en_ix_ad <= inst_mvx;
  en_stac_ad <= inst_call or inst_ms_ret;

-- program counter bus control
-- default register in bus
  alu_2_pc <= st_fetch or inst_jp_t_b or inst_jp_t_f or (st_j_m and NOT jump_true) or inst_mvwi;

-- id register output bus control
  reg_2_id <= inst_mvrr;

-- register write control logic
-- internal register write logic
  reg_wr <= st_m_r and RCMDONE and NOT CLK;
  wr_acc <= ((inst_mvrl or inst_mvrq or inst_mvx) and
                 NOT reg_out and reg_acc_adr and reg_wr) or
            (inst_mvwi and reg_wr and reg_accxi_adr) or
            (inst_mvbi and reg_acc_adr and st_exec) or
            (inst_mvrr and NOT reg_out and reg_acc_adr and st_exec) or
            (inst_ms_incr and reg_acc_adr and st_exec) or
            (inst_ms_decr and reg_acc_adr and st_exec) or
            ((inst_ms_orl or inst_ms_andl or inst_ms_orq or inst_ms_andq or
              inst_ms_xorl or inst_ms_xorq) and reg_acc_adr and reg_wr) or
            host_wr_acc;
  wr_ix <= (inst_move and NOT inst_word and NOT reg_out and reg_ix_adr and
      reg_wr and (mv_rl or mv_rq)) or
    (inst_mvbi and reg_ix_adr and st_exec) or
    (inst_mvrr and reg_out and reg_ixx_adr and st_exec) or
    host_wr_ix;
  ix_clk <= (en_ix_ad and st_m_r and RCMDONE and NOT CLK) or
    (en_ix_ad and st_m_w and RCMDONE and NOT CLK);
  wr_ih <= (st_fetch and RCMDONE and NOT CLK) or
    host_wr_ih;
  wr_qp <= ((inst_mvrl or inst_mvrq) and NOT inst_word and NOT reg_out and
      reg_qp_adr and reg_wr) or
    (inst_mvrr and NOT inst_word and NOT reg_out and reg_qp_adr and
     st_exec) or
    host_wr_qp;
  wr_pc <=
      ((inst_mvrl or inst_mvrq) and inst_word and NOT reg_out and reg_pc_adr and reg_wr) or
```

```
      (jump_true and st_exec and NOT CLK and (inst_jp_t_b or inst_jp_t_f)) or
      (st_j_m and RCMDONE and NOT CLK) or                          -- jump comp
      ((inst_jpx or inst_call) and st_exec and NOT CLK) or
      (st_fetch and RCMDONE and NOT CLK) or
      (inst_mvwi and reg_wr) or
      (inst_ms_ret and reg_wr) or
      host_wr_pc;

  stac_clk <= (inst_ms_ret and reg_wr) or (inst_call and st_exec);

  int_clk <= (inst_ms_sint and st_exec) or
             (inst_ms_halt and st_exec and instl(0));

-- external register write logic
  r_wr_scsi <= (md2scsi and reg_wr) or (reg2scsi and st_exec);
  r_wr_ph <= (inst_mvbi and reg_ph_adr and st_exec) or
             (inst_jp_c_i and reg_ph_adr and st_dec);
  r_wr_id <= (inst_move and inst_word and reg_id_adr and NOT reg_out and
             reg_wr) or
             (inst_mvrr and reg_idx_adr and reg_out and st_exec);
  bc_xp_cs <= inst_move and inst_word and NOT mv_bi and NOT (mv_wi and reg_accxi_adr) and
        insth(12);
  bc_xp_wr <= reg_wr;
--  r_wr_bc01 <= (inst_move and inst_word and reg_bc01_adr and reg_wr);
--  r_wr_bc23 <= (inst_move and inst_word and reg_bc23_adr and reg_wr);
--  r_wr_xp01 <= (inst_move and inst_word and reg_xp01_adr and reg_wr and NOT mv_wi);
--  r_wr_xp23 <= (inst_move and inst_word and reg_xp23_adr and reg_wr);
--  r_rd_bc01 <= inst_word and reg_bc01_adr and reg_out and
--               (inst_mvrl or inst_mvrq or inst_mvx);
--  r_rd_bc23 <= inst_word and reg_bc23_adr and reg_out and
--               (inst_mvrl or inst_mvrq or inst_mvx);
--  r_rd_xp01 <= inst_word and reg_xp01_adr and reg_out and
--               (inst_mvrl or inst_mvrq or inst_mvx);
--  r_rd_xp23 <= inst_word and reg_xp23_adr and reg_out and
--               (inst_mvrl or inst_mvrq or inst_mvx);

-- reset flag these signal should send to outside
  rst_flg_bsyb <= NOT (inst_ms_rflag and flag_bsy and st_exec);
  rst_flg_ack <= inst_ms_rflag and flag_ack and st_exec;
  rst_flg_atn <= inst_ms_rflag and flag_atn and st_exec;
  rset_atn <= inst_ms_rflag and flag_set_atn and st_exec;
  rst_flg_prty <= inst_ms_rflag and flag_prty and st_exec;
  rst_free_tm <= inst_ms_rflag and flag_ftm and st_exec;
  wr_wd_tm <= inst_ms_rflag and flag_wdtm and st_exec and NOT clk;
  set_halt <= inst_ms_halt and (st_exec or st_dec) and NOT clk;

-- scsi handshake enable signal

  sc_pio <= (st_wait and (inst_move and mv_rr and reg_scx_adr)) or
            (st_wait and inst_move and reg_sc_adr and
             (mv_rl or mv_rq or mv_x)) or
            (st_wait and inst_mvbi and reg_sc_adr);

-- branch logic
```

```
-- compare Q, compare immediate, test bit, test flag
-- because program counter uses same adder-comparator comp_equal has to be latched

  jump_control : block
   signal latch_equal : vlbit;
   signal chk_bit : vlbit;
   signal chk_flag : vlbit;
   signal comp_latch : vlbit;
   signal comp_equal : vlbit;
  begin
   comp_latch <= (inst_jp_c_i and st_dec) or
                 (inst_jp_c_q and reg_wr);
   comp_equal <= NOT alu_out(7) and NOT alu_out(6) and NOT alu_out(5) and
            NOT alu_out(4) and NOT alu_out(3) and NOT alu_out(2) and
            NOT alu_out(1) and NOT alu_out(0);

   latch_comp : process (comp_latch, comp_equal)
   begin
    if (comp_latch = '1') then
     latch_equal <= comp_equal;
    end if;
   end process latch_comp;

   with v1d2int(chk_sel(2 downto 0)) select
    chk_bit <= acc_reg(7) when 7,
               acc_reg(6) when 6,
               acc_reg(5) when 5,
               acc_reg(4) when 4,
               acc_reg(3) when 3,
               acc_reg(2) when 2,
               acc_reg(1) when 1,
               acc_reg(0) when others;
   with v1d2int(chk_sel(2 downto 0)) select
    chk_flag <= NOT atnib when 6,
               sec_tm_out when 5,
               parity_err when 4,
               reselected when 3,
               selected when 2,
               bc_zero when 1,
               sel_done when others;
   jump_true <= ((latch_equal and jp_comp and NOT reg_ph_adr) or
                (jp_comp and reg_ph_adr and ph_ok) or
                (chk_bit and jp_tstb) or (chk_flag and jp_tstf)) xor
                 NOT true_jump;
  end block jump_control;
  sc_wait <= NOT ((inst_jump and req_on) or
                (inst_ms_sel and (selected or reselected or sel_done)) or
                  (inst_move and hdshk_done) or
                  (inst_ms_dma and dma_done) or
                  (inst_ms_w_f and bus_free) or tmout_jump_i);

 end block control_logic;

 alu_control : block
```

```
begin
 alu_and <= inst_ms_andl or inst_ms_andq;
 alu_or <= inst_ms_orl or inst_ms_orq;
--  alu_comp <= inst_jp_c_q or inst_jp_c_i;
 alu_add <= alu_plus_2_x or alu_plus_1_x or alu_minus_1_x or alu_r_jump_x;
 ix_2_alu <= inst_mvx;
 id_2_alu <= inst_jp_c_q and reg_id_adr;
 sc_2_alu <= (inst_jp_c_q or inst_jp_c_i) and reg_sc_adr;
 pc_2_alu <= st_fetch or st_j_m or inst_jp_t_f or inst_jp_t_b or inst_mvwi;
 alu_r_jump_x <= inst_jp_t_f or inst_jp_t_b;
 alu_comp_i <= inst_jp_c_i;
 alu_minus_1_x <= inst_ms_decr;
 alu_plus_2_x <= inst_mvx and inst_word;
 alu_plus_1_x <= (inst_mvx and NOT inst_word) or inst_ms_incr or
                 st_fetch or st_j_m or inst_mvwi;
end block alu_control;

state_decode : block
begin
 dec_2_m_r <=
   inst_jp_c_q or inst_mvwi or inst_ms_ret or inst_ms_andq or inst_ms_andl or
                 inst_ms_orq or inst_ms_orl or inst_ms_xorq or inst_ms_xorl or
   (NOT reg_out and (inst_mvrl or inst_mvrq or inst_mvx));
 dec_2_m_w <=
      (reg_out and NOT reg_sc_adr  and NOT word and
        (inst_mvrl or inst_mvrq or inst_mvx)) or
      (reg_out and word and
        (inst_mvrl or inst_mvrq or inst_mvx)) or
      inst_call;
 dec_2_wt <= (inst_mvrr and reg_scx_adr and not reg_out) or
      (NOT word and reg_sc_adr and reg_out and
        (inst_mvrl or inst_mvrq or inst_mvx)) or
      (inst_jp_c_i and reg_ph_adr) or
      inst_ms_sel or inst_ms_dma or inst_ms_w_f;
 dec_2_j_m <=  inst_jp_c_i and NOT reg_ph_adr;          -- jump compare I
 exe_2_wait <= (inst_mvbi and reg_sc_adr) or
      (inst_mvrr and reg_scx_adr and reg_out);
 wt_2_m_w <= (reg_sc_adr and reg_out and
      (inst_mvrl or inst_mvrq or inst_mvx));
 wt_2_j_m <= inst_jp_c_i and reg_ph_adr;
 wt_2_exec <= inst_mvrr and not reg_out and reg_scx_adr;
 m_w_2_exec <= inst_call;
 m_r_2_wt <= NOT reg_out and reg_sc_adr and NOT word and
        (inst_mvrl or inst_mvrq or inst_mvx);
 m_r_2_j_m <= inst_jp_c_q;
 time_out_set <= st_wait and time_out;
 time_out_clk <= tmout_jump_i and st_fetch;
end block state_decode;

latch_timeout : process
begin
 wait until ((time_out_clk= '0' and time_out_clk'event) or
   rst = '1' or time_out_set = '1');
 if rst = '1' then
```

```
    tmout_jump_i <= '0';
  elsif time_out_set = '1' then
    tmout_jump_i <= '1';
  else
    tmout_jump_i <= '0';
  end if;
end process latch_timeout;

to_out : block
begin
  d_word <= word;
  en_ixq_ad <= en_ix_ad and NOT insth(6);
  en_ixl_ad <= en_ix_ad and insth(6);
  mvrr_ix <= inst_mvrr and reg_ixx_adr;
  d_inst_ms_sint <= inst_ms_sint;
  d_inst_ms_ret <= inst_ms_ret;
  d_inst_ms_dma <= inst_ms_dma;
  d_inst_ms_sel <= inst_ms_sel;
  d_inst_ms_halt <= inst_ms_halt;
  d_inst_mvbi <= inst_mvbi;
  d_md2scsi <= md2scsi;
  d_reg2scsi <= reg2scsi;
  en_host_out <= NOT host_pcn or NOT host_qpn or NOT host_accn or
                 NOT host_ixn or NOT host_ihn;
  alu_minus_1 <= alu_minus_1_x;
  alu_plus_1 <= alu_plus_1_x;
  alu_plus_2 <= alu_plus_2_x;
  alu_r_jump <= alu_r_jump_x;
  wr_w_d_tm <= wr_wd_tm;
  tmout_jump <= tmout_jump_i;
end block to_out;

end BEHAVIORAL;
```

We claim:

1. A host adapter comprising:

a host bus interface circuit for sending and receiving signals on local bus of a host computer;

a device bus interface for sending and receiving signals on a device bus which couples to one or more peripheral devices;

a processor operably coupled to the host bus interface circuit and to the device bus interface; and a local memory control circuit for accessing a local memory of the host adapter, the local memory control circuit being coupled to the processor and to the host bus interface circuit, wherein:

the processor and the host computer can access a local memory through the local memory control circuit and exchange data which describes a command to a peripheral device on the device bus;

the host computer accesses the local memory by asserting on the local bus an address signal corresponding to the host adapter and a data signal indicating an address of a storage location in the local memory;

the local memory control circuit includes a host address register coupled to the host bus interface circuit, wherein the host address register stores the address of the storage location identified by the data signal from the host computer; and the local memory control circuit provides, the address from the host address register as a local address during data transfer between the host computer and the local memory.

2. The host adapter of claim 1, further comprising a local memory attached to local memory control circuit, wherein a portion of the local memory is partitioned into a plurality of command description blocks, each command description block being a set of storage locations dedicated for containing a description of a command to a peripheral device on the device bus.

3. The host adapter of claim 2, wherein the command description blocks are logically ordered into a list and each of the command description blocks comprises:

a storage location for containing a forward pointer which indicates a local address of a next command description block in the list; and a storage location for containing a backward pointer which indicates a local address of a previous command description block in the list.

4. The host adapter of claim 2, wherein:

a first set of the command description blocks are logically ordered into a first list and a second set of the command description blocks are logically ordered into a second list;

the first list contains command description blocks that contain descriptions of commands for peripheral devices on the device bus; and the second list contains command description blocks that are available for the host computer to write a description of a command.

5. The host adapter of claim 2, wherein:

the processor further comprises a first register for a command description block number; and the first register provides to the memory interface circuit a signal indicating a set of bits in a starting address of a command description block which corresponds to the command description block number.

6. The host adapter of claim 5, wherein the processor further comprises:

a second register for holding an instruction to be executed by the processor;

a third register for holding an index value; and a multiplexer having input leads coupled to the second register and to the third register, select leads coupled to the second register, and output leads coupled to the memory interface circuit to provide an address offset within a command description block.

7. A host adapter comprising:

a host bus interface circuit for sending and receiving signals on a local bus of a host computer;

a device bus interface comprising an SCSI interface circuit for sending and receiving signals to one or more peripheral devices on an SCSI bus;

a processor operably coupled to the host bus interface circuit and to the device bus interface; and a local memory control circuit for accessing a local memory of the host adapter, the local memory control circuit being coupled to the processor and to the host bus interface circuit, wherein the processor and the host computer can access a local memory through the local memory control circuit and exchange data which describes a command to a peripheral device on the SCSI bus, and wherein the host computer accesses the local memory by asserting on the local bus an address signal corresponding to the host adapter and a data signal indicating an address of a storage location in the local memory.

8. The host adapter of claim 7, further comprising a local memory attached to local memory control circuit, wherein a portion of the local memory is partitioned into a plurality of command description blocks each command description block containing a set of storage locations dedicated for a description of a command to a peripheral device on the SCSI bus.

9. The host adapter of claim 8, wherein the command description blocks are logically ordered into a list and each of the command description blocks comprises:

a storage location for a forward pointer which indicates the local address of the next command description block in the list; and a storage location for a backward pointer which indicates the local address of the previous command description block in the list.

10. The host adapter of claim 8, wherein:

a first set of the command description blocks are logically ordered into a first list and a second set of the command description blocks that are logically ordered into a second list;

the first list contains command description blocks that contain descriptions of commands to peripheral devices on the SCSI bus; and the second list contains command description blocks that are available for the host computer to write a description of a command.

11. The host adapter of claim 8, wherein:

the processor further comprises a first register for a command description block number; and the first register provides to the memory interface circuit a signal indicating a set of bits in a starting address of a command description block which corresponds to the command description block number.

12. The host adapter of claim 11, wherein the SCSI interface circuit comprises means for writing an SCSI-2 tag message from a peripheral device on the SCSI bus into the first register of the processor.

13. The host adapter of claim 11, wherein the processor further comprises:

a second register for holding an instruction to be executed by the processor;

a third register for holding an index value; and a multiplexer having input leads coupled to the second register and to the third register, select leads coupled to the second register, and output leads coupled to the memory interface circuit, the multiplexer providing an address offset within a command description block.

14. The adapter of claim 7, wherein:

the local memory control circuit includes a host address register coupled to the host bus interface circuit, wherein the host address register stores the address of the storage location identified by the data signal from the host computer; and the local memory control circuit provides, the address from the host address register as a local address during data transfer between the host computer and the local memory.

15. A method for providing communications between a host computer and peripheral devices attached to a device bus, comprising the step of:

providing an adapter including a host bus interface coupled to the host computer, a device bus interface coupled to the device bus, a local memory, and a processor;

allocating space in the local memory for command description blocks;

listing empty command description blocks in a free list;

having the host computer write an address value into a register in the host bus interface, wherein the address value identifies one of the command description blocks which was allocated in the local memory and listed in the free list;

having the host computer write data via the host interface into the local memory, wherein the address value in the register selects the command description block into which the data is written, and wherein the data describes a command for a peripheral device on the device bus and indicates that the command description block is ready to be processed;

having the processor check the free list for ready command description blocks;

having the processor move any ready command description blocks from the free list to an active list; and having the processor control the device bus interface to process a command as described in a command description block listed in the active list.

16. The method of 15, further comprising the steps of:

having the processor change the data in a command description block to indicate that a command indicated by the command description block is complete;

having the processor move the complete command description block from the active list to the free list;

having the host computer check completed command description block and change the data in the command description block to indicate that the command description block is empty.

17. The method of claim 15, wherein the step of having the processor move a ready command description blocks from the free list to an active list further comprises inserting the command description block into an active list that is circular linked list.

18. The method of claim 15, wherein the step of having the host computer write data into a command description block listed the free list further comprises:

writing additional data into a second command description block, wherein the additional data describes additional parameters of the command described by data written into the first command description block; and writing a pointer to the second command description block into the first command description block.

19. The method of claim 15, wherein:

the device bus is an SCSI bus;

the command description block are numbered; and the step of having the processor control the device bus interface to process a command further comprises transmitting the number of command description block as an SCSI-2 tag message.

20. The host adapter of claim 2, wherein each command description block contains $2^N$ storage locations and has a starting address which differs by $2^N$ from a starting address of a command description block which is adjacent in the local memory.

21. The host adapter of claim 8, wherein each command description block contains $2^N$ storage locations and has a starting address which differs by $2^N$ from a starting address of a command description block which is adjacent in the local memory.

22. A host adapter comprising:

a host bus interface circuit for connection to a local bus of a host computer, the host bus interface including an address decode circuit and a data latch circuit, wherein the data latch circuit latches data from the local bus in response to the address decode circuit identifying that an address signal on the local bus corresponds to a port address of the host adapter;

a device bus interface for sending and receiving signals on a device bus which couples to one or more peripheral devices;

a processor operably coupled to the host bus interface circuit and to the device bus interface; and a local memory control circuit coupled to the processor and to the host bus interface circuit, the local memory control circuit including a host address register coupled to receive data from the data latch circuit and a multiplexer having a first input bus coupled to the host address register and a second input bus coupled to the processor, wherein multiplexer selects either the host address register or the processor as the source of a local address for a local memory.

23. The host adapter of claim 22, further comprising a local memory attached to local memory control circuit, wherein a first portion of the local memory is dedicated for a program to be executed by the processor, and a second portion of the local memory is partitioned into a plurality of command description blocks, each command description block being a set of storage locations dedicated for data relating to a command to a peripheral device on the device bus.

24. The host adapter of claim 23, wherein the local memory further comprises a third portion containing a list of the command description blocks to which the host computer may write.

* * * * *